US008543603B2

(12) United States Patent
Boris et al.

(10) Patent No.: US 8,543,603 B2
(45) Date of Patent: Sep. 24, 2013

(54) VISUALIZATION OF DATA RELATIONSHIPS BETWEEN COMPONENTS OF A PROJECT

(75) Inventors: Ann S. Boris, Philadelphia, PA (US); Daniel Rohtbart, Brookline, MA (US); Jeffrey Murphy, Coopersburg, PA (US)

(73) Assignee: Numoda Technologies, Inc., Philadelphia, PA (US)

( * ) Notice: Subject to any disclaimer, the term of this patent is extended or adjusted under 35 U.S.C. 154(b) by 0 days.

(21) Appl. No.: 12/390,949

(22) Filed: Feb. 23, 2009

(65) Prior Publication Data

US 2009/0193001 A1 Jul. 30, 2009

Related U.S. Application Data

(63) Continuation of application No. 11/017,519, filed on Dec. 20, 2004, now Pat. No. 7,496,610, which is a continuation of application No. 09/724,541, filed on Nov. 27, 2000, now Pat. No. 6,834,285.

(60) Provisional application No. 60/192,094, filed on Mar. 24, 2000.

(51) Int. Cl.
*G06F 7/00* (2006.01)
*G06F 17/30* (2006.01)

(52) U.S. Cl.
USPC ................ 707/783; 707/736; 707/805; 705/2

(58) Field of Classification Search
USPC .............................. 707/783, 736, 805; 705/2
See application file for complete search history.

(56) References Cited

U.S. PATENT DOCUMENTS

| | | | | |
|---|---|---|---|---|
| 4,905,080 | A | | 2/1990 | Watanabe et al. |
| 5,220,657 | A | * | 6/1993 | Bly et al. ...................... 711/152 |
| 5,379,213 | A | | 1/1995 | Derks |
| 5,437,027 | A | | 7/1995 | Bannon et al. |
| 5,544,360 | A | | 8/1996 | Lewak et al. |
| 5,560,005 | A | | 9/1996 | Hoover et al. |
| 5,570,415 | A | | 10/1996 | Stretton et al. |
| 5,615,112 | A | | 3/1997 | Liu Sheng et al. |
| 5,666,490 | A | * | 9/1997 | Gillings et al. ............... 709/238 |
| 5,680,619 | A | * | 10/1997 | Gudmundson et al. ....... 717/108 |
| 5,765,140 | A | * | 6/1998 | Knudson et al. ............. 705/7.15 |
| 5,802,514 | A | * | 9/1998 | Huber .......................... 715/769 |
| 5,857,201 | A | | 1/1999 | Wright, Jr. et al. |
| 5,870,765 | A | | 2/1999 | Bauer et al. |
| 5,873,086 | A | | 2/1999 | Fujii et al. |
| 5,899,998 | A | | 5/1999 | McGauley et al. |
| 5,913,208 | A | * | 6/1999 | Brown et al. ................. 707/706 |
| 5,949,692 | A | | 9/1999 | Beausang et al. |
| 5,950,173 | A | | 9/1999 | Perkowski |
| 5,956,708 | A | * | 9/1999 | Dyko et al. ........................... 1/1 |
| 5,970,490 | A | | 10/1999 | Morgenstern |
| 5,995,965 | A | | 11/1999 | Experton |

(Continued)

OTHER PUBLICATIONS

International Search Report for PCT/US01/09227, dated Jun. 12, 2001, 1 page.

(Continued)

*Primary Examiner* — Cam Truong

(74) *Attorney, Agent, or Firm* — Panitch Schwarze Belisario & Nadel LLP

(57) ABSTRACT

A computer-implemented method is disclosed for visualizing data relationships between components of a project for identifying potential duplication of selected components. One of the components is data collection assignments.

2 Claims, 117 Drawing Sheets

(56) References Cited

U.S. PATENT DOCUMENTS

| | | | | | |
|---|---|---|---|---|---|
| 5,999,908 | A | | 12/1999 | Abelow | |
| 6,012,067 | A | | 1/2000 | Sarkar | |
| 6,035,297 | A | * | 3/2000 | Van Huben et al. | 707/695 |
| 6,058,393 | A | | 5/2000 | Meier et al. | |
| 6,063,128 | A | | 5/2000 | Bentley et al. | |
| 6,065,008 | A | | 5/2000 | Simon et al. | |
| 6,067,523 | A | | 5/2000 | Bair et al. | |
| 6,092,189 | A | | 7/2000 | Fisher et al. | |
| 6,108,635 | A | * | 8/2000 | Herren et al. | 705/2 |
| 6,112,206 | A | | 8/2000 | Morris et al. | |
| 6,193,152 | B1 | | 2/2001 | Fernando et al. | |
| 6,233,600 | B1 | | 5/2001 | Salas et al. | |
| 6,298,347 | B1 | | 10/2001 | Wesley | |
| 6,324,571 | B1 | | 11/2001 | Hacherl | |
| 6,356,880 | B1 | * | 3/2002 | Goossens et al. | 705/30 |
| 6,385,664 | B1 | * | 5/2002 | Drees | 719/331 |
| 6,401,085 | B1 | | 6/2002 | Gershman et al. | |
| 6,425,525 | B1 | | 7/2002 | Swaminathan et al. | |
| 6,519,763 | B1 | * | 2/2003 | Kaufer et al. | 717/101 |
| 6,697,997 | B1 | | 2/2004 | Fujimura | |
| 2003/0046307 | A1 | * | 3/2003 | Rivette et al. | 707/104.1 |

OTHER PUBLICATIONS

Yamagishi et al., “A Multi-Representational Design Data Capture System,” IEEE Custom Integrated Circuits Conference, 1993, pp. 13.2.1-13.2.4, 4 pages.

* cited by examiner

*Figure 1B* (PRIOR ART)

10 Current Systems for a data capture and Distribution Project

Non Technical Staff

22 Managers

30 Couriers

36 Field Workers

38 Printer Admin.

42 Data Entry

Computer Related Equipment

26 Template Software

28 Templates

34 Mobile Hardware

40 Printers

Technical Staff

32 Programmers

Logic

24 Logic

24FD Form design Logic
24QA Quality Assurance Logic
24DE Data Entry Logic

Interface

44 Data Entry Interface to Main Database

46 Look up for Work Due

48 Logistics Reports Interface

50 Reporting Interface to Main Database

74 Delivery of Reports Loop

80 Modification Report Request

76 Redo of Report

72 Redo of Data Collection Loop

82 Design/Development Redo Loop

84 Redo of an Assignment

20 Main Database

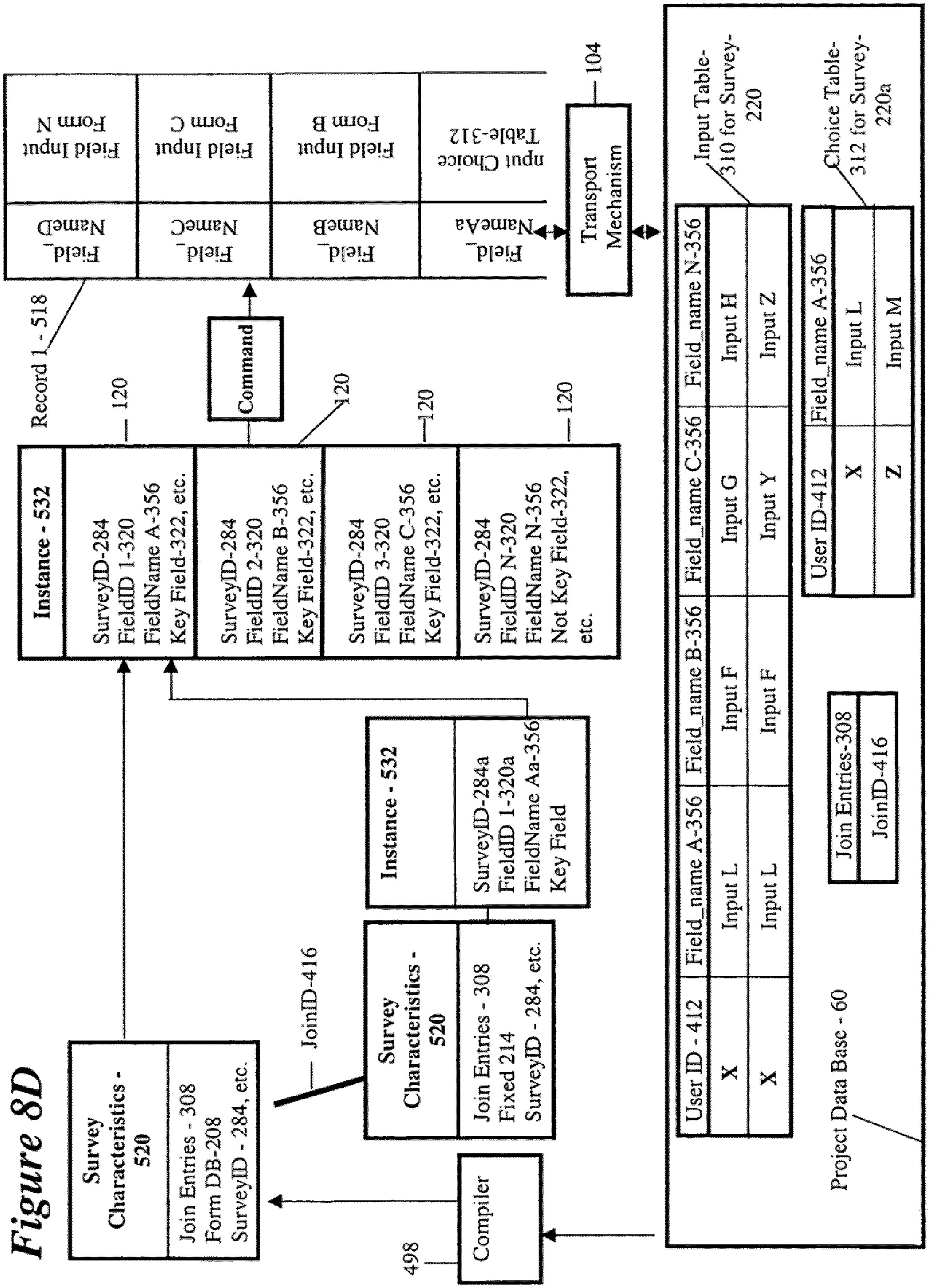
Figure 8D
Survey Characteristics - 520
Join Entries - 308
Form DB-208
SurveyID - 284, etc.
JoinID-416
Survey Characteristics - 520
Join Entries - 308
Fixed 214
SurveyID - 284, etc.
Instance - 532
SurveyID-284a
FieldID 1-320a
FieldName Aa-356
Key Field
Instance - 532
SurveyID-284
FieldID 1-320
FieldName A-356
Key Field-322, etc.
SurveyID-284
FieldID 2-320
FieldName B-356
Key Field-322, etc.
SurveyID-284
FieldID 3-320
FieldName C-356
Key Field-322, etc.
SurveyID-284
FieldID N-320
FieldName N-356
Not Key Field-322, etc.
120
Command
Record 1 - 518
Field_NameD
Field Input Form N
Field_NameC
Field Input Form C
Field_NameB
Field Input Form B
Field_NameAa
input Choice Table-312
Transport Mechanism
104
498
Compiler
Input Table-310 for Survey-220
User ID - 412
Field_name A-356
Field_name B-356
Field_name C-356
Field_name N-356
X
Input L
Input F
Input G
Input H
X
Input L
Input F
Input Y
Input Z
Choice Table-312 for Survey-220a
User ID-412
Field_name A-356
X
Input L
Z
Input M
Join Entries-308
JoinID-416
Project Data Base - 60

*Figure 17A*
Entity Relationships for Table: Assignment's Provider
AssignmentsAssignment's Provider
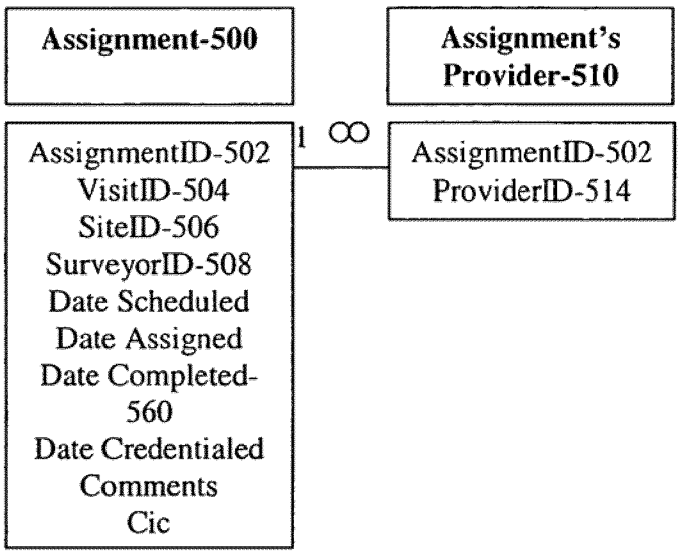
Attributes: Enforced, Cascade Updates, Cascade Deletes
Attributes: One-To-Many
ProvidersAssignment's Provider
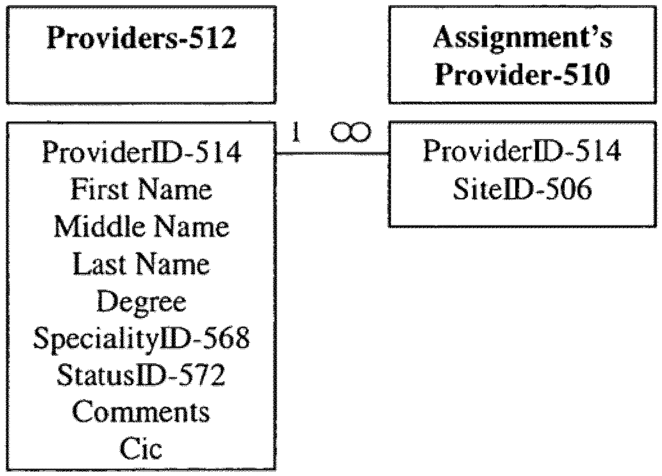
Attributes: Enforced, Cascade Deletes
Attributes: One-To-Many

*Figure 17B*
SurveyorsAssignments
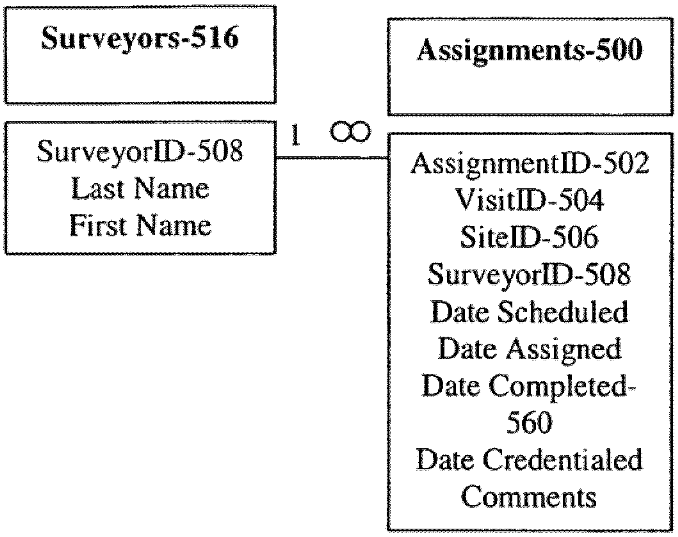
Attributes: Enforced, Cascade Updates, Cascade Deletes
Attributes: One-To-Many
Visit TypesAssignments
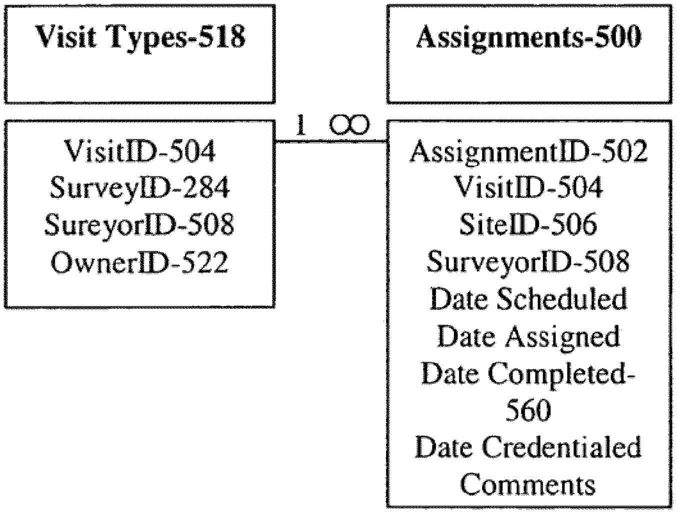
Attributes: Enforced
Attributes: One-To-Many

*Figure 17C*
Visit TypesAssignments1
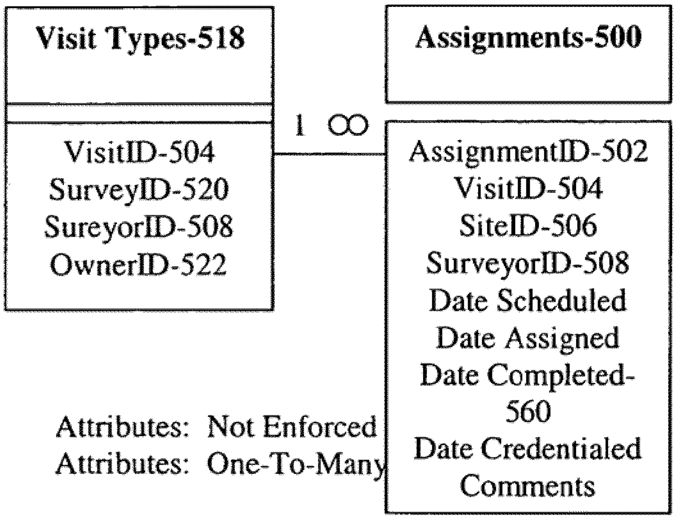
CoordinatorsCoordinator's Hospital
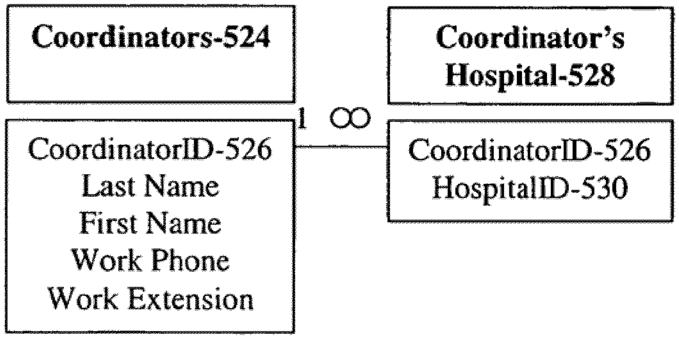
Attributes: Enforced, Cascade Updates, Cascade Deletes
Attributes: One-To-Many
HospitalsCoordinator's Hospital
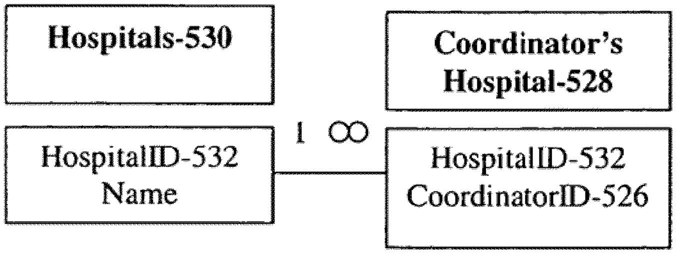
Attributes: Enforced, Cascade Updates, Cascade Deletes
Attributes: One-To-Many

*Figure 17D*
CoordinatorsProvider's Coordinator
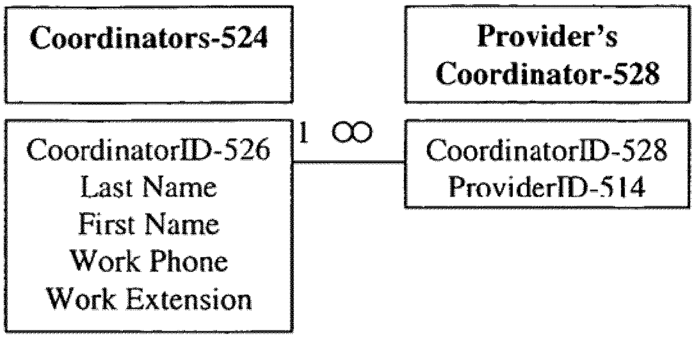
Attributes: Enforced, Cascade Updates, Cascade Deletes
Attributes: One-To-Many
GroupsGroup's Site
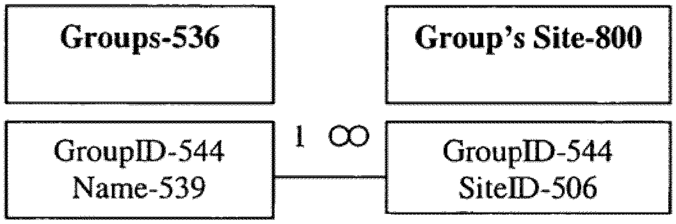
Attributes: Enforced, Cascade Updates, Cascade Deletes
Attributes: One-To-Many
SitesGroup's Site
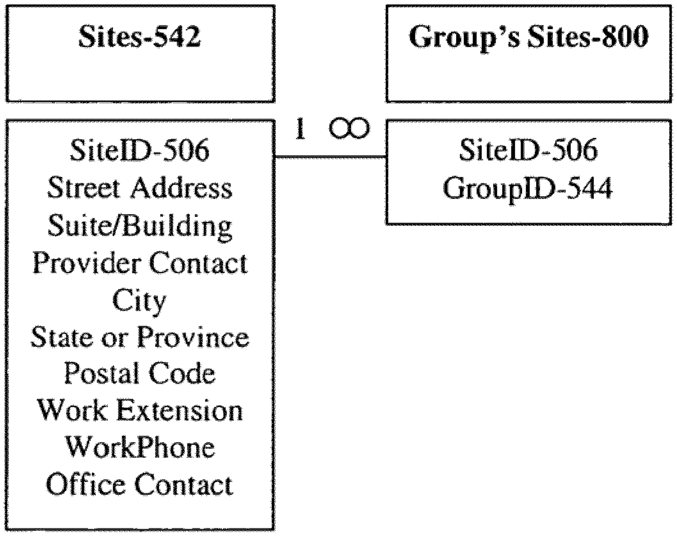
Attributes: Enforced

*Figure 17E*
Attributes: One-To-Many
GroupProvider's Groups
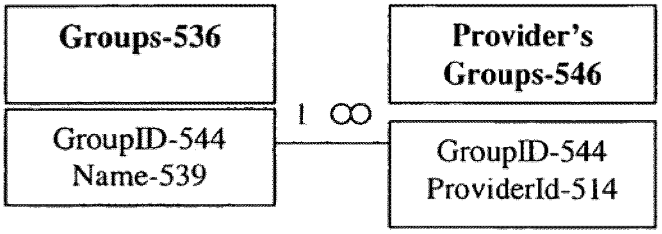
Attributes: Enforced
Attributes: One-To-Many
HospitalsProvider's Hospital
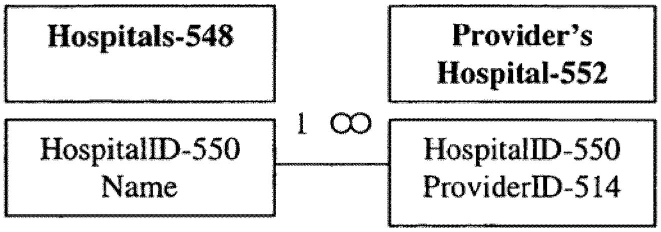
Attributes: Enforced, Cascade Updates, Cascade Deletes
Attributes: One-To-Many
ProvidersProvide Site Link
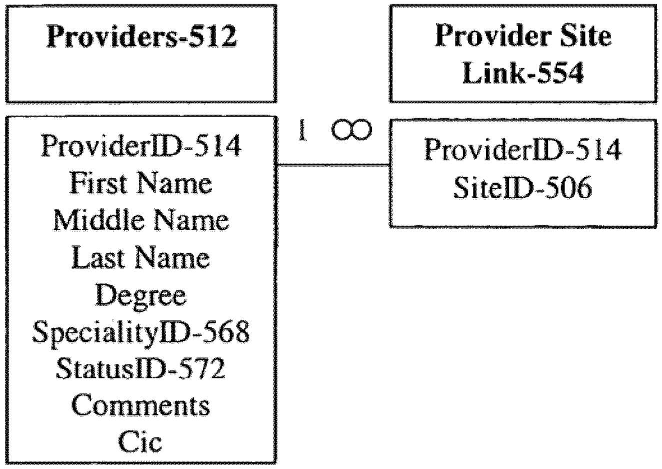
Attributes: Enforced
Attributes: One-To-Many
SiteProvide Site Link

*Figure 17G*
Attributes: Enforced
Attributes: One-To-Many
ProvidersProvider's Hospital
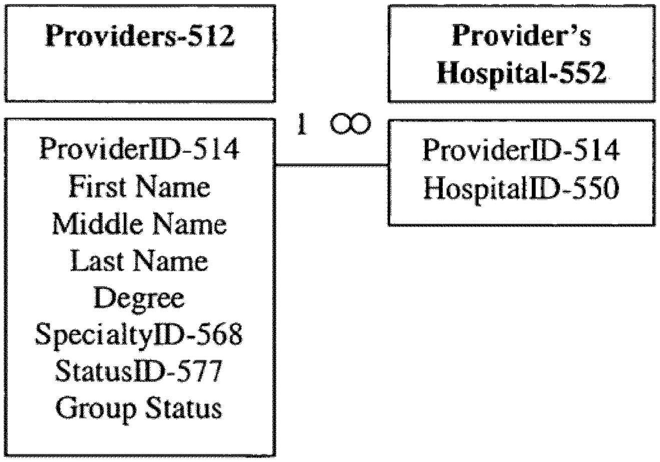
Attributes: Enforced, Cascade Deletes
Attributes: One-To-Many
Specialty TypesProviders
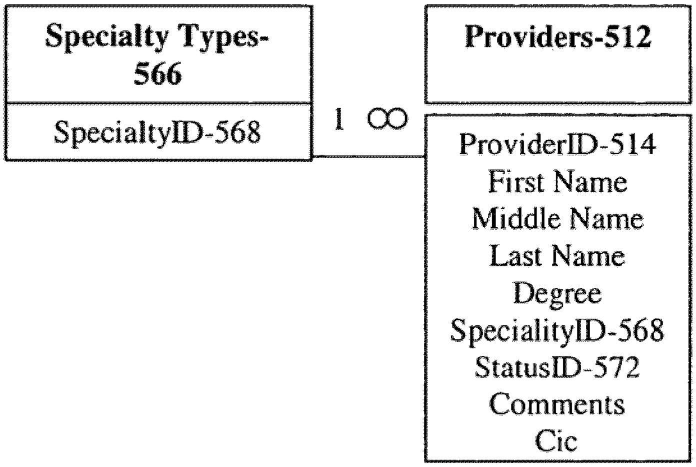
Attributes: Enforced
Attributes: One-To-Many
Status TypesProviders Attributes: Enforced
Attributes: One-To-Many

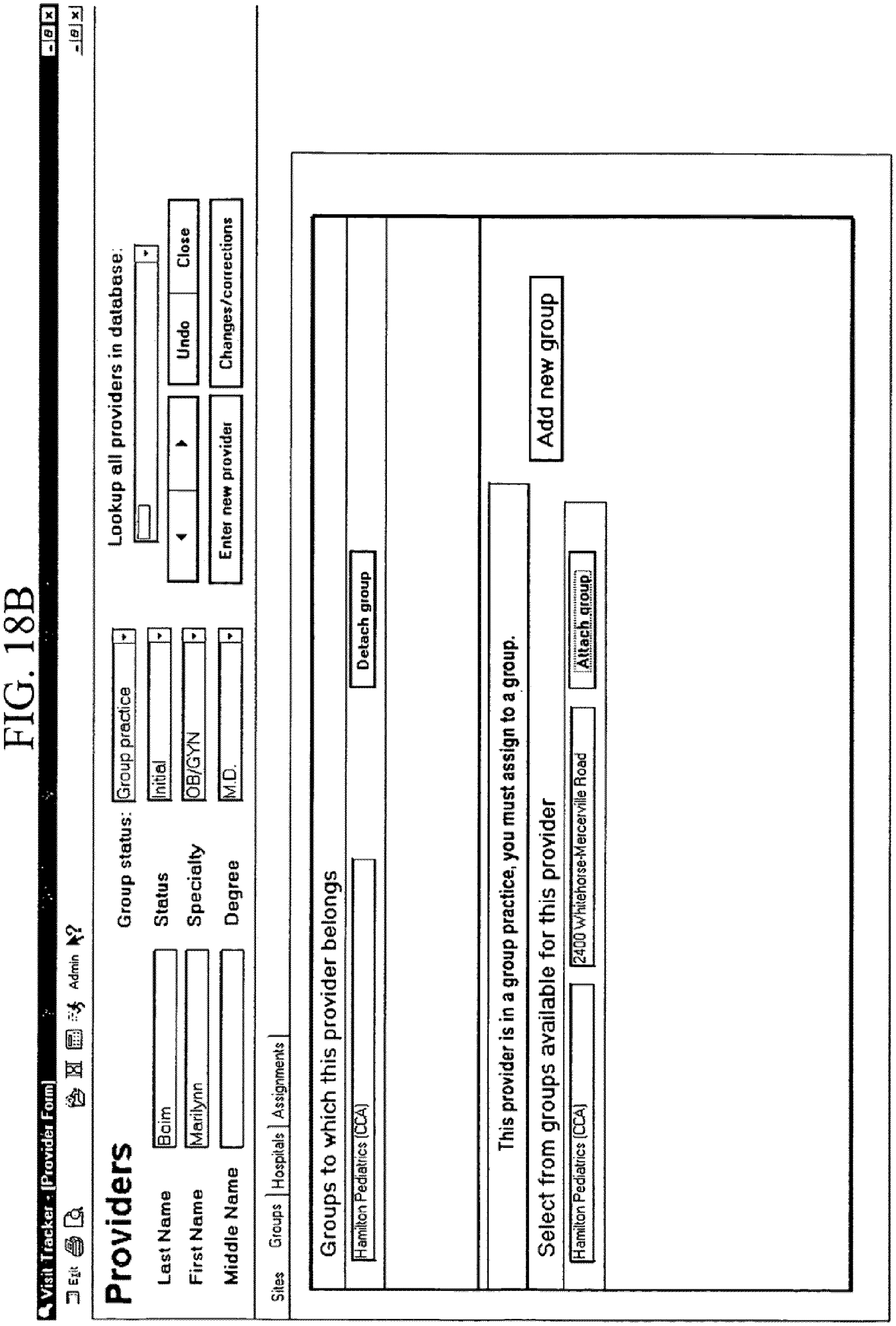

FIG. 18B

Visit Tracker - [Provider Form]

Exit  Admin

Providers

| | |
|---|---|
| Last Name | Boim |
| First Name | Marilynn |
| Middle Name | |

Group status: Group practice
Status: Initial
Specialty: OB/GYN
Degree: M.D.

Lookup all providers in database:

Enter new provider    Undo    Close
                     Changes/corrections

Sites | Groups | Hospitals | Assignments

Groups to which this provider belongs

Hamilton Pediatrics (CCA)

Detach group

This provider is in a group practice, you must assign to a group.

Select from groups available for this provider

Hamilton Pediatrics (CCA)   2400 Whitehorse-Mercerville Road

Attach group

Add new group

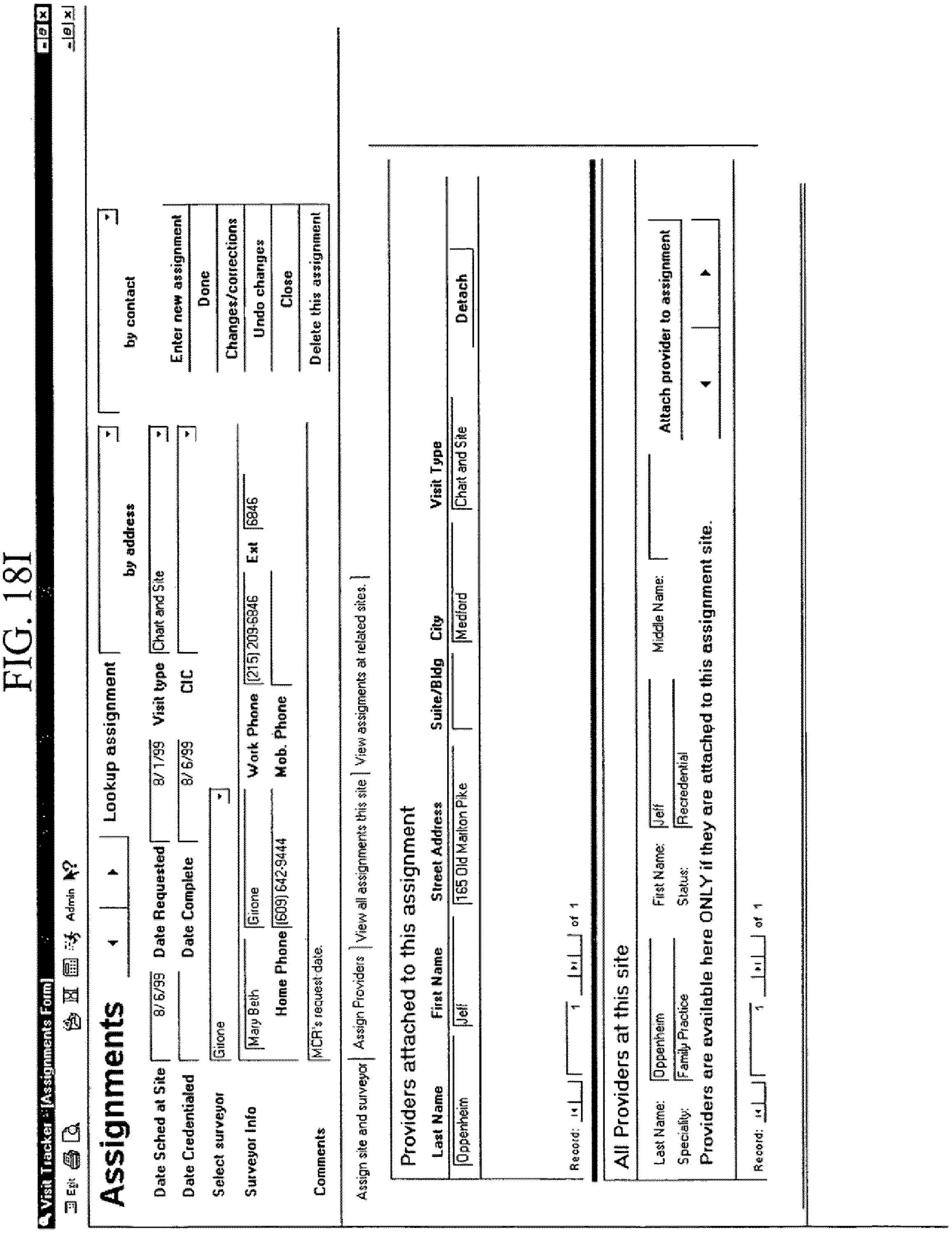

FIG. 18I

Assignments

| | | Lookup assignment | | by address | | by contact |
|---|---|---|---|---|---|---|

Date Sched at Site: 8/6/99   Date Requested: 8/1/99   Visit type: Chart and Site
Date Credentialed:            Date Complete: 8/6/99    CIC:

Select surveyor: Girone

Surveyor Info: May Beth Girone   Work Phone: (215) 209-6846   Ext: 6846
Home Phone: (609) 642-9444   Mob. Phone:

Enter new assignment
Done
Changes/corrections
Undo changes
Close
Delete this assignment Comments: MCR's request date.

Assign site and surveyor | Assign Providers | View all assignments this site | View assignments at related sites.

Providers attached to this assignment

| Last Name | First Name | Street Address | Suite/Bldg | City | Visit Type | |
|---|---|---|---|---|---|---|
| Oppenheim | Jeff | 165 Old Marlton Pike | | Medford | Chart and Site | Detach |

Record: 1 of 1

All Providers at this site

Last Name: Oppenheim   First Name: Jeff   Middle Name:
Specialty: Family Practice   Status: Recredential Providers are available here ONLY if they are attached to this assignment site.

Attach provider to assignment

Record: 1 of 1

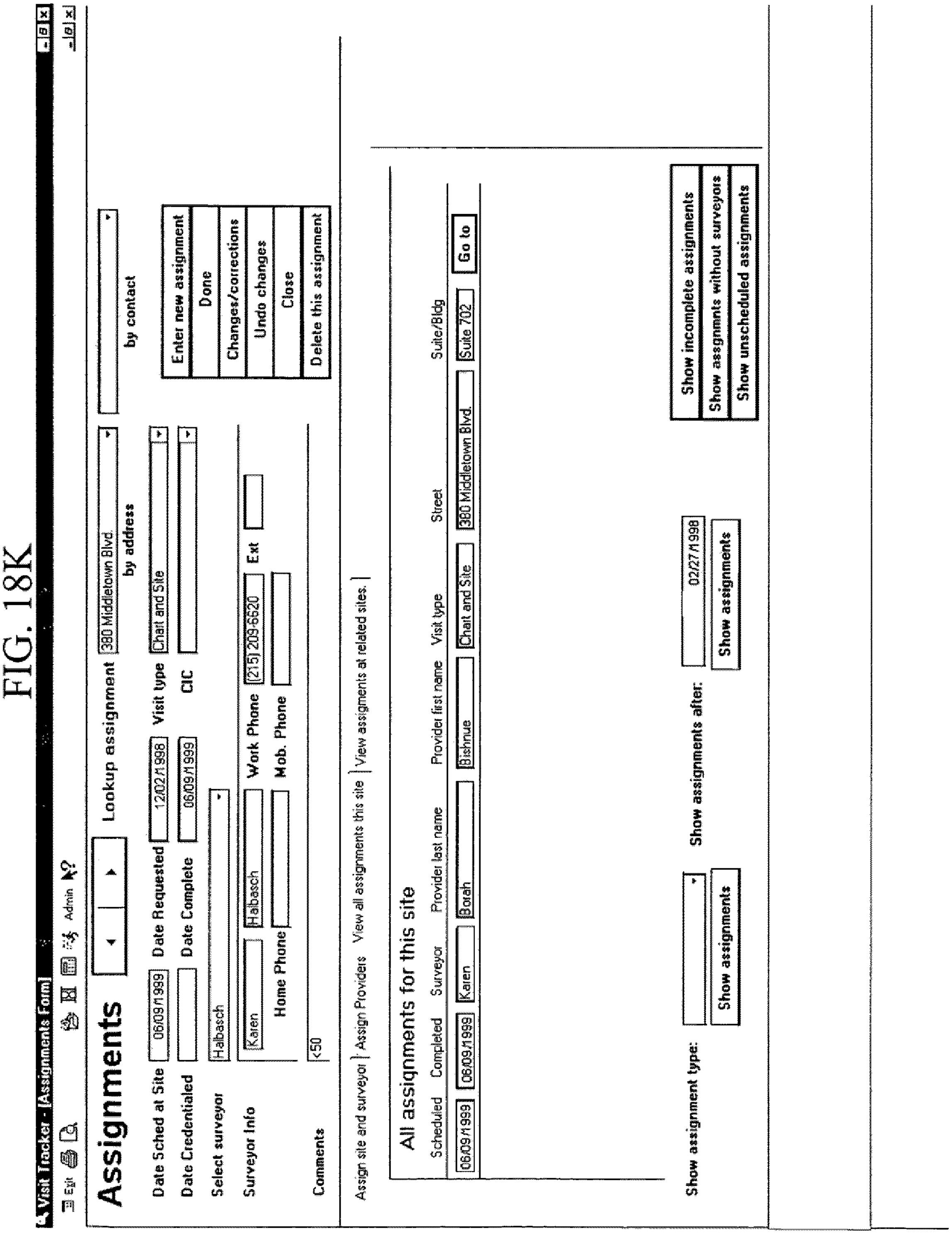

FIG. 18K

Assignments

Lookup assignment [380 Middletown Blvd] [ by address ▼ ] [ by contact ▼ ]

Date Sched at Site [06/09/1999]  Date Requested [12/02/1998]  Visit type [Chart and Site ▼]   [ Enter new assignment ]
Date Credentialed [ ]  Date Complete [06/09/1999]  CIC [ ▼ ]   [ Done ]
Select surveyor [Halbasch ▼]   [ Changes/corrections ]
Surveyor Info [Karen] [Halbasch]  Work Phone [(215) 209-6620] Ext [ ]   [ Undo changes ]
Home Phone [ ]  Mob. Phone [ ]   [ Close ]
Comments [<50]   [ Delete this assignment ]

Assign site and surveyor | Assign Providers | View all assignments this site | View assignments at related sites.

All assignments for this site

| Scheduled | Completed | Surveyor | Provider last name | Provider first name | Visit type | Street | Suite/Bldg |
|---|---|---|---|---|---|---|---|
| 06/09/1999 | 06/09/1999 | Karen | Borah | Bishnue | Chart and Site | 380 Middletown Blvd | Suite 702 | [ Go to ]

Show assignment type: [ ▼ ]  Show assignments after: [02/27/1998]   [ Show incomplete assignments ]
[ Show assignments ]  [ Show assignments ]   [ Show assignments without surveyors ]
[ Show unscheduled assignments ]

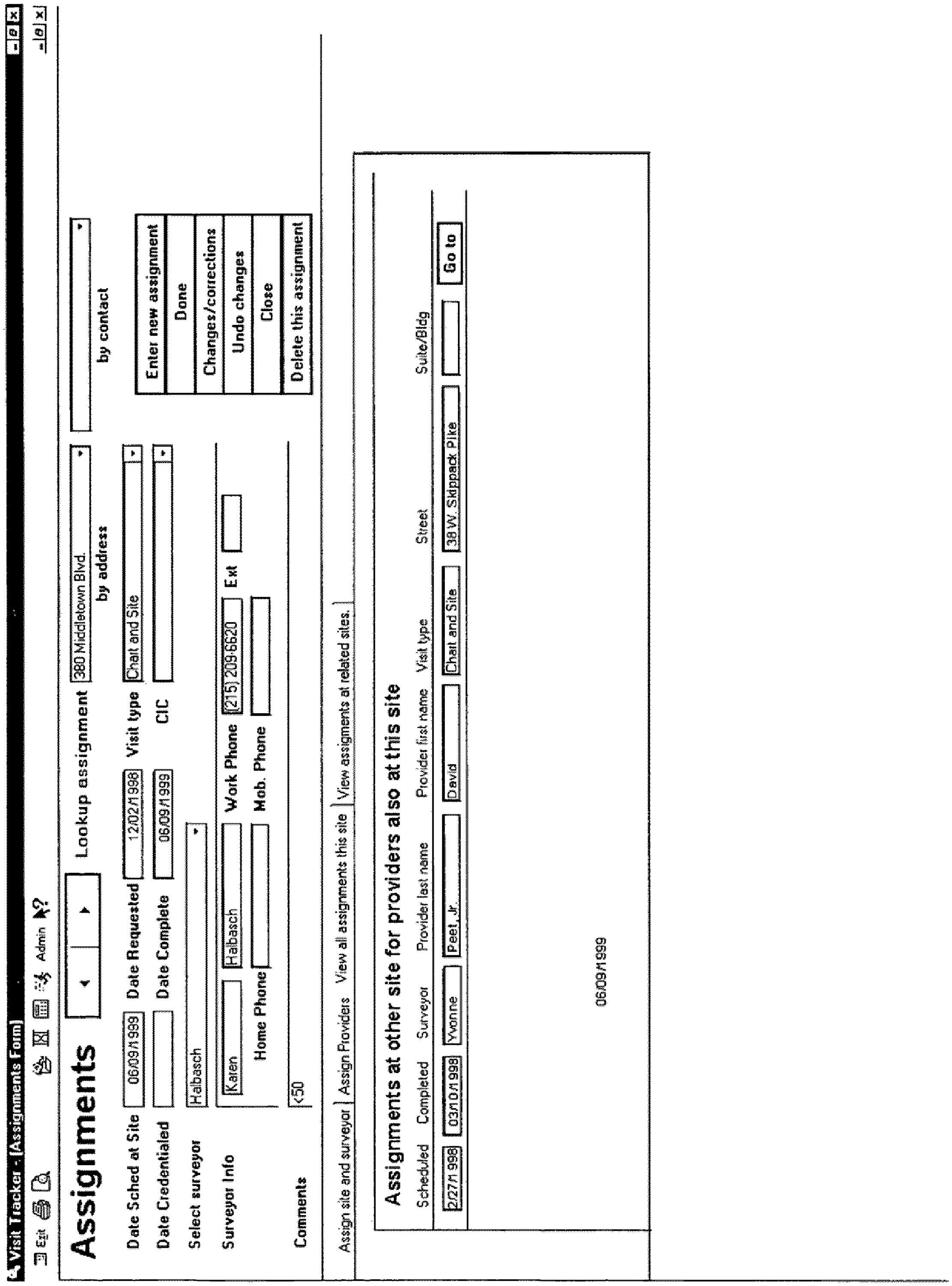

FIG. 18L

Assignments

Lookup assignment [380 Middletown Blvd.] [by address ▾] [by contact ▾]

Date Sched at Site [06/09/1999] Date Requested [12/02/1998] Visit type [Chart and Site ▾]  Enter new assignment
Date Credentialed [ ] Date Complete [06/09/1999] CIC [ ▾] Done
Select surveyor [Halbasch] Changes/corrections
Surveyor Info [Karen] [ ] Work Phone [(215) 209-6620] Ext [ ] Undo changes
 Home Phone [ ] Mob. Phone [ ] Close
Comments [<50] Delete this assignment Assign site and surveyor | Assign Providers | View all assignments this site | View assignments at related sites |

Assignments at other site for providers also at this site

| Scheduled | Completed | Surveyor | Provider last name | Provider first name | Visit type | Street | Suite/Bldg | |
|---|---|---|---|---|---|---|---|---|
| 2/27/1998 | 03/10/1998 | Yvonne | Peet, Jr. | David | Chart and Site | 38 W. Skippack Pike | | Go to |

06/09/1999

Query Provider's Assignment with Site Link

Subquery Other Assigns. Other Sites

Query Other Assigns. This Site's Group

158

GENERAL MEDICAL RECORD REVIEW

Initial (3 records) Recredential (5 records)

DATE ______

NAME of PROVIDER ______ SPECIALITY ______

162 162

*IS THE INFORMATION PRESENT & LEGIBLE?*

| I. CHART ORGANIZATION & PERSONAL DATA | YES | NO | N/A | COMMENTS |
|---|---|---|---|---|
| 160 1. The member's name or ID number visible on the outside of the chart. | | | | |
| 160 2. The contents of the chart securely attached and each member has a separate identifiable record. | | | | 164 |
| 160 3. The patient's name appears on every page of the chart. | | | | |
| 4. The presence of a demographic sheet and a clear notation of the patient's PCP. | | | | |
| 5. Documentation of whether or not an advance directive has been executed. | | | | |
| 6. Chart is legible enough to be read by someone other than the provider. | | | | |
| **TOTAL** | | | | |

| II. MEDICAL DATA | YES | NO | N/A | COMMENTS |
|---|---|---|---|---|
| 7. A list of the patient's medications (the list should include past and present medicines with the dose frequency, amount, and the date prescribed). | | | | |
| 8. A list of the patient's allergies and/or any adverse reactions prominently noted. | | | | |
| 9. The problem list includes documentation of any significantly illnesses and medical conditions (this may also be identified on a Health Maintenance Form). | | | | |
| 10. Past medical and surgical history (for patients seen 3 or more times) - for patients = to or <18 yrs. this includes: a record of birth, prenatal care, childhood illnesses, and immunizations up to date. | | | | |

HEALTH SCREENING REVIEW FOR OB/GYN

(Standards for evaluations are found in Health Care Policy #15-90, 11/14/90; Revised '92)

Initial ____ (3 records)
Recredential ____ (5 records)

| IS THE INFORMATION PRESENT & LEGIBLE? | YES | NO | N/A | COMMENTS |
|---|---|---|---|---|
| **GYN WELL CARE:** | | | | 162 |
| 1. Blood Pressure/Weight (*annually*) | | | | 164 |
| 2. Date of Last Menstrual Period | | | | |
| 3. Method of Contraception (*if sexually active*) | | | | |
| 4. Breast exam (*every year*) | | | | |
| 5. Abdominal exam (*annually*) | | | | |
| 6. Pelvic exam: external genitalia, speculum exam, bimanual Exam (*annually*) | | | | |
| 7. Rectal exam with stool for occult blood (*age 40 & older*)(*annually*) | | | | |
| 8. Pap smear, every 3 years *(ages 18-65, with hx. of normal pap)* | | | | |
| 9. Mammogram *(baseline age 40: every other year > 65: annually for ages 51-65)* | | | | |
| **PRENATAL WORK-UP:** | | | | |
| 10. Serum test for syphilis & rubella titre | | | | |
| 11. Blood type, including Rb factor and atypical antibody titre screens | | | | |
| 12. Hemoglobin and hematocrit | | | | |
| 13. UA for bacteriuria | | | | |
| 14. Hepatitus B Surface Antigen (*HbsAG*) | | | | |
| 15. Formal Assessment of risk factor (*mother & fetus*) | | | | |
| 16. Sickle cell screen for all African American and Equatorial women | | | | |
| 17. Tay Sachs screen for all Jewish women | | | | |
| 18. Maternal serum alphafetoprotein (*between 14-16 weeks*)-evidence of test offered | | | | |
| 19. Glucose tolerance test, 50gm oral (*24-28 weeks*) | | | | |
| 20. Prenatal work-up completed during first trimester or by the third prenatal visit. | | | | |
| **TOTALS** | | | | |

HEALTH SCREENING REVIEW FOR ADULTS

(Standards for evaluations are found in Health Care Policy #15-90, 11/14/90; Revised '92)

Initial ____
Recredential ____

160

| IS THE INFORMATION PRESENT & LEGIBLE? | YES | NO | N/A | COMMENTS |
|---|---|---|---|---|
| 1. Height measured once before age 60, then every 5 years | | | | 162 |
| 2. Weight measured once before age 60, then every 5 years | | | | 164 |
| 3. Blood Pressure measured at every visit | | | | |
| 4. Tetanus immunization (*every 10 yrs*) | | | | |
| 5. Cholestrol (*every 5 years*) | | | | |
| 6. Breast exam (♀) if > age 40 (*annually*) or documentation that (♀) has seen gynecology | | | | |
| 7. Mammogram (♀): *baseline age 40, every other year ages 40-50, annually between ages 50-65, every other year > age 65* | | | | |
| 8. Pap smear (♀): ages 18-65 (*every 3 yrs. with history of normal pap*) or documentation that (♀) has seen gynecology | | | | |
| 9. Prostate exam (♂) if > age 50 (*annually*) | | | | |
| 10. Hemoccult (♀&♂) if > age 50 (*annually*) | | | | |
| 11. Rectal exam (♀&♂) if > age 50 (*annually*) | | | | |
| 12. Influenza vaccine if > age 65, or history of : Chronic Asthma; Chronic Bronchitis; COPD; Diabetes Mellitus (*annually*) | | | | |
| 13. Pneumovax vaccine (*once*), if > 65, or history of: Chronic Asthma; Chronic Bronchitis; COPD; Diabetes Mellitus | | | | |
| 14. Fundoscopy for Diabetic persons > age 40 (*annually*) | | | | |
| 15. Urinalysis for Diabetic persons (*annually*) | | | | |
| **TOTALS** | | | | |

HEALTH SCREENING REVIEW FOR ADULTS

(Standards for evaluations are found in Health Care Policy #15-90,11/14/90; Revised '92)

Initial ____ (3 records)
Recredential ____ (5 records)

160 162 164

| IS THE INFORMATION PRESENT & LEGIBLE? | YES | NO | N/A | COMMENTS |
|---|---|---|---|---|
| 1. Child's age | | | | |
| 2. Growth chart | | | | |
| 3. Developmental status (*documented in history, or by separate development flow sheet*) | | | | |
| 4. Immunizations up to date | | | | |
| 5. Lot numbers & manufacturer of serum | | | | |
| 6. Physical exams at recommended intervals (*refer to Standard for Well Child Care*) | | | | |
| 7. Screening tests at recommended intervals (*refer to Standard for Well Child Care*) | | | | |
| 8. Sickle cell screen for patients "at risk" | | | | |
| 9. Lead screen for children "at risk" | | | | |
| 10. Influenza vaccine (*annually*) for Children with: Chronic Asthma; Chronic Bronchitis; Diabetes Mellitus | | | | |
| 11. Pneumovax vaccine (*once*), for children > 2: Chronic Asthma; Chronic Bronchitis; Diabetes Mellitus | | | | |
| 12. Urinalysis for Diabetic Children (*annually*) | | | | |
| **TOTALS** | | | | |

[1] All African American & Equatorial children

[2] Live/visit pre-1960 building peeling pant or planned renovation:
Sibling with PB>14:
Live with adult with jets/hobby that involves lead exposure

Children 6-36 Months Lead Exposure Questionnaire
for Use at Each Routine Check-Up

Low Risk by Questionnaire - Test at 12 Months[1]

<10 UG/DL
Retest if possible
at 24 months
(when blood levels peak)

10-14 UG/DL
Retest every 3-4 months
A 2 tests <10 UG/DL
B 2 tests <15 UG/DL
Retest in 1 year <15 UG/DL[3]
Individual case
management levels
including retesting
every 3-4 months

| | | | |
|---|---|---|---|
| | | | |
| | | | |
| | | | |
| | | | |
| | | | |
| | | | |

High Risk by Questionnaire - test at 12 Months[1]

<10 UG/DL
Rescreen every 6 months
A 2 measures <10 UG/DL
B 3 <15 UG/DL
Retest every year 10-14 UG/DL[2]
Rescreen every
3-4 months
A 2 measures <10 UG/DL
B 3 <15 UG/DL
Retest each year <15 UG/DL[3]
Individual case
management levels
including retesting
every 3-4 months

| | | | |
|---|---|---|---|
| | | | |
| | | | |
| | | | |
| | | | |
| | | | |
| | | | |

1 If 36-72 months and low risk, no screen
2 If 36-72 months and high risk ... PB < 15 retest yearly until 6 years old.
3 If 36-72 months and high risk ... PB ≥ 15 treat as above

PROVIDER NAME: ____________ REVIEWER NAME: ____________

SPECIALTY OF PROVIDER: ____________ DATE OF REVIEW: ____________

INITIAL: ________ RECREDENTIALING: ____________

164

| | | GENERAL MEDICAL REVIEW | | HEALTH SCREENING REVIEW | | | |
|---|---|---|---|---|---|---|---|
| | | ADULT | PED. | ADULT | PED. | OB | GYN |
| (A) | # OF RECORDS REVIEWED | ____ | ____ | ____ | ____ | ____ | ____ |
| (B) | # OF POSSIBLE ANSWERS: - (A) x # OF QUESTIONS | x22= ____ | x22= ____ | x15= ____ | x12= ____ | x11= ____ | x9= ____ |
| (C) | #OF N/A ANSWERS: | ____ | ____ | ____ | ____ | ____ | ____ |
| (D) | #OF APPLICABLE ANSWERS: - (B) - (C) | ____ | ____ | ____ | ____ | ____ | ____ |
| (E) | # OF YES ANSWERS: | ____ | ____ | ____ | ____ | ____ | ____ |
| (F) | SCORE - (E) / (D): | ____ | ____ | ____ | ____ | ____ | ____ |

REVISED 11/95
a:\ ssorsh.rev

MEDICAL RECORDS PARAMETERS

GAHS Content Parameter for Ambulatory Care Medical Records

A. GENERAL CONTENT CRITERIA ←190

1. Each medical record is legible and reproducible.
2. Each medical record is redealiy identifiable by patient's name and ID or record number.
3. The contents of each medical record should be fixed or contained in such a fashion that the contents do not spill out or become separated from the body of the chart.
4. If medical records contain information on more than one person, each person's specific record or medical data is readily identifiable. It is preferable that each member has an individual record established rather than establishing "family" records.
5. The patient's name and ID or medical record number should appear on all pages of the record.

B. SPECIFIC CONTENT CRITERIA

1. Medical Record Accessibility:

a. Available on request
   b. Member name (or office identification number) visible on exterior of chart 1. Medical Identifying Data:

a. Greater Atlantic Health Service ID number is clearly noted in a consistent place on the chart.
   b. Name, current address, and phone numbers are noted including home and work numbers.
   c. If the patient is a minor or under guardianship; the name, current address, and phone numbers of a responsible party are noted including home and work numbers.
   d. Sex
   e. Date of Birth
   f. Marital Status

*FIG. 25*

ACME HMO PLANS FOR HEALTH, INC. (ACME HMO) POLICY PROVIDER CREDENTIALING

Subject: *Site Visits For Initial And Recredentialing*

Purpose: *To identify those providers who require a site visit prior to initial credentialing and/or recredentialing.*

184-Policy: *Primary Care Providers (PCP) and Ob/Gyn Providers require a site evaluation prior to initial credentialing. PCP's, OB/Gyn Providers, and those Specialist identified as High Volume Providers (Cardiologists, General Surgeons and Orthopedic Surgeons with ≥ 50 patient encounters in the preceding 12 month period), require a site evaluation prior to recredentialing.*

*Each site, identified by the Providers(s) as a practice site for QualMed memebers, must undergo a structured review. Medical records will be reviewed,* * *to ensure conformance with QualMed's standards, at the site identified by the provider as the primary practice site for QualMed members.*

** If the provider is new to practice, or new to the area, and as no patient base, records may not be available. These providers will have a medical record review scheduled within one year of credentialing.*

*If a provider moves his practice site (closes office and opens new site), a site review is required. A medical record review is not required, if current or completed within the past two years.*

*On occasion a Provider may elect to change his practice status. The following outlines policy specific to each circumstance:*

"Group" to "Solo":

When a provider leaves a credentialed group practice and requests participation as a solo practitioner at a new site,a site evaluation is required. However, if the medical record review (performed when affiliated with the group) is current, completed within the past two years, a medical record review is not required.

"Group" to "Group":

(a) When a provider leaves a credentialed group practice and affiliates with another credentialed group practice, a site evaluation is not required. Medical record review is not required if current (completed within the past two years.)

XSITE98

Site Visit Tracking System - Provider Services and Quality Management 1998

| Group Name | Providers | Spec. | Site(s) | Date to QM | Provider Services/Nurse Assigned | Date Scheduled | Date Rec'd By PS | CIC | Prov. 1 Yr. Cred. | Ed Visit |
|---|---|---|---|---|---|---|---|---|---|---|
| Einstein OB/Gyn Associates | Sloan, Neil MD (K) | OB | Philadelphia Women's Center, 225 S. 15th St. 3rd Fl., 19102 (SITE ONLY) | 19-Aug-98 | | | | KM | | |
| CCA-Presbyterian Muli-Specialty Group | Luchi, Monica MD (I)<br>Maniglia, Richard MD (I) | PCP | Presbyterian Med. Ctr., 39th & Market St., 2 Myrin, 19104 | 25-Aug-98 | | | | LH | | |
| Great Valley Health | Schneeberg, Norman MD (R) | PCP | Presidential Apts., 3900 City Ave., Ste. D103, 19131 (SITE ONLY) | 01-Apr-98 | Lori Pellegrino | 20-Apr-98 | 20-Apr-98 | JG | | |
| Internal Medicine Associates | Golman, Richard MD (R)<br>Rosenberg, Frank MD (R) | PCP | Professional Building I, Ste. 300, One Medical Center Blvd., Upland | 16-Jul-98 | Mary Beth Gerone | 18-Sep-98 | 25-Sep-98 | NH | | |
| Health Access Network | Lind, Marita MD (I) | PCP | Professional Building I, Ste 305, One Medical Center Blvd., Upland | 20-Jul-98 | | | | NH | | |
| Health Access Network | Lind, Marida MD (I) | PCP | Professional Office Bldg. I, Ste 305, One Mecial Center Blvd., Upland 19013 (MEDICAL RECORDS ONLY) | 27-Apr-98 | Lori Pellegrino | 29-Jul-98 | 10-Aug-98 | NH | | |
| OB/Gyn Berwick (WV) | Coslett, Douglas, MD (I) | OB | R. 699 E. 16th Street., Berwick 18603 | 12-Jun-98 | | | | JP | | |
| HUP Division of Geriatric Medicine (CCA) | Aisner, Anita MD (I)<br>Carson, Lesley MD (I)<br>Johnson, Jerry MD (I)<br>Kavesh, William MD (I)<br>Livizzo-Mourey, Risa MD (I)<br>Pizianas, Michael MD (I)<br>Schwab, Edna MD (I)<br>Bruza, John | PCP | Ralston House Penn Ctr., 3615 Chestnut St., 19104 | 04-May-98 | Mary Beth Gerone | | | RJ | | |
| Moorestown OB/Gyn Associates | Glass, Phillip MD (R) | OB | Rancocas Hospital, Professional Bldg., East, Willingboro, NJ (SITE ONLY) | 20-Oct-98 | | | | RJ/ JP | | |
| Philadephia OB/Gyn Associates | Cleary, Steven MD (R)<br>DeFilipis, David MD (R)<br>Simon, Marc MD (R)<br>Deeney, John MD (R)<br>Diasio, Lisa MD (R)<br>Crower, Elizabeth MD (R) | OB | Red Lion & Knights Road, Ste. 230, 19114 | 08-Apr-98 | David Masi | 22-Apr-98 | 30-Apr-98 | RJ | | |
| Philadephia OB/Gyn | Simon, Marc MD (R)<br>Deeney, John MD (R)<br>Crowe, Elizabeth MD (R)<br>Cleary, Stephen MD (R) | OB | Red Lion & Knights Road, Ste. 230, 19114 | 23-Jun-98 | Mary Beth Gerone | 27-Jul-98 | 30-Jul-98 | JG | | |
| Rosetree Medical Associates | Hope, Joseph DO (I)<br>Lammendoloa-Melone, Annamarie DO (I_)<br>Bolich, Christopher DO (I) | PCP | Riddle Memorial Hosp. Outpatient Pavilion, Suite 3101, Media, 19063 | 10-Mar-98 | Lori Pelligrino | 19-Mar-98 | 20-Mar-98 | JG | | |
| Phoenixville OB/Gyn | Walters, Candace MD (I)<br>Kolter, James MD(I) | OB | Route 29 & Arcola Road | 22-Jul-98 | Mary Beth Gerone | 28-Sep-98 | 9-Oct-98 | NH | | |
| | Murray, Patrick MD (I) | PCP | Route 307, Lake Winola, 18625 | 20-Mar-98 | Barbara Coleman | 20-Mar-98 | 20-Mar-98 | RJ | | |
| CCA-Pinelands OB/Gyn Associates | Chao, Christine MD (I)<br>Desousa-Sanders, Kelly MD (I)<br>Knox, Karen MD (I)<br>Lockhart, Gordon MD (I)<br>Hashid, Parveca MD (I) | OB | Route 70 & Mainescreek Lane, Medford, 08053 | 25-Aug-98 | Mary Beth Gerone | 14-Oct-98 | | LH | | |

*FIG. 27*

SITE VISIT REQUEST FORM

Provider Demographic Information:

Group: ✓ Group Name: Tenet Physician Services

Solo: ______

Specialty: Pediatrics

Hospital Affiliation: St. Christopher's

Provider(s) Name (First and Last, Credential):

James Reynolds, MD
Alan Freedman, MD
Diane Purcell, CRNP

Site Information (Please list all sites):

1. 3550 Market St.
Phila PA 19104

Telephone Number: (215) 823-8660

Initial ____ Recred ✓ Site Only ____

Comments:

Person Requesting Site: Kaity McMonagle Date Req: 3/11/99

*FIG. 28*

Time Line for Deliverables

FIG. 29A

| Easy Implementation | Owner | Target Date | Completion Date |
|---|---|---|---|
| *Note- Implementation items (1 through 4) performed concurrently.* | | | |
| **1. Digital Questionnaire** | | | |
| a. Send paper survey forms, scoring guidelines and any support material pertaining to the questionnaire in any format. Or choose from MCR Library of materials. | CLIENT | Day1 | |
| b. Program questionnaire and any additional questions as a Smart Survey™ artificial intelligence tool on digital device. | MCR | Day1-10 | |
| c. Review Smart Survey™ and sign-off any changes **(recommend that a staff member familiar with the review process be involved - five days are allotted - should take 2 hrs. to review tool and pencil in changes requested).** | CLIENT | Day10-15 | |
| d. Make changes to Smart Survey™ as requested. | MCR | Day15-20 | |
| | | | |
| **2. Automated Data Receipt** | | | |
| a. Write up specifications for receipt of data post-MCR Quick Link™ 's synchronous reconciliation and automated algorithm filtering of assignments/surveys (should take 2hrs. to write up specs). | CLIENT | Day1 | |
| b. Configure data transmission interface according to specifications. | MCR | Day1-10 | |
| c. Verify data receipt **(recommend that management who will use data and reports be involved - five days allotted - should take 2 hrs. to verify and request any changes).** | CLIENT | Day10-15 | |
| d. Make changes to data transmission interface as requested. | MCR | Day15-20 | |
| | | | |
| **3. Logistics (User and Assignment Management)** | | | |
| a. Send the following in any format: demographic information on reviewers, providers & sites & info on records required for project. | CLIENT | Day1 | |
| b. Program all user authentication and encryption for device and user management during Quick Link™ connection and use of web site. | MCR | Day1-10 | |
| c. Preload all requested assignments for tracking, management and reporting in Visit Tracker™. | MCR | Day1-10 | |

Time Line for Deliverables

FIG. 29B

| | | | |
|---|---|---|---|
| **4. Hardware Preparation** | | | |
| a. Purchase hardware. | MCR | Day1 | |
| b. Configure, load and test hand-held devices. | MCR | Day15-20 | |
| c. Set up connectivity equipment. | MCR | Day1-19 | |
| **5. Training** | | | |
| a. Delivery of hand held devices during training | MCR | Day20 | |
| b. Train reviewers on their individually configured devices, now programmed with required specifications for entire project **(training takes 1-2 hrs. and takes place after previous implementation items completed).** | MCR | Day20 | |
| | | | |
| **Ongoing services** | **Owner** | **Target Date** | **Completion Date** |
| Deliver 24 hr. secure access to create and edit assignments from anywhere, using the desktop or hand-held web browser. | MCR | **Ongoing Services** | |
| Deliver 24 hr. secure access to add or remove reviewers. | MCR | **Ongoing Services** | |
| Deliver 24 hr. secure access to status reports on reviewers, assignments, and providers. | MCR | **Ongoing Services** | |
| Deliver 24 hr. secure access to Quick Link™ by mobile workers at any location to receive assignments and to perform synchronous reconciliation of survey data. | MCR | **Ongoing Services** | |
| Deliver 24 hr. technical support. | MCR | **Ongoing Services** | |
| Deliver 24 hr. secure access to real-time provider reports that are collated, scored and aggregated. | MCR | **Ongoing Services** | |
| Deliver raw data that has been reconciled with all previously requested assignments and filtered for errors, redundancy, and incompleteness. | MCR | **Ongoing Services** | |
| Purchase replacement hardware/Configure and deliver to mobile worker. | MCR | **Ongoing Services** | |

58

Flow Diagram for Project Schema1
100

| Microsoft Access - [Survey Question] |
| File Edit View Insert Format Records Tools Window Help |

Survey

Question

Description: ACME HMO - Chart Audit 6     ID: 66

Position in Survey: 2 of 148     Record Key: ☑

Prompt: Enter first name

Help: Tap on the keys or write in the screen at the bottom, the first name of the provider.

Name of Field: LastName

Scoring                                              Formatting

Weighted Score: 0                              Answer Type: Text ▶

Score Method: No Score ▶               Length: 20

Score Value: No Score                        Format:
              If Value Score
              If Not Value Score             GUI: Text Form ▶

Score Group:                                        Print on Rep ☐

Skipping

I. Choose skip type.                         II. Choose question:
  ⦿ No Skip                                           0 - No Skip
  ○ Skip Current Question If Question...
  ○ Skip To Question...                      III. Skip on Value:
                                                              0

IV. Skip Method:
                                                              0 - No Skip Cancel Save & Exit Choose from list.                                                                        NUM

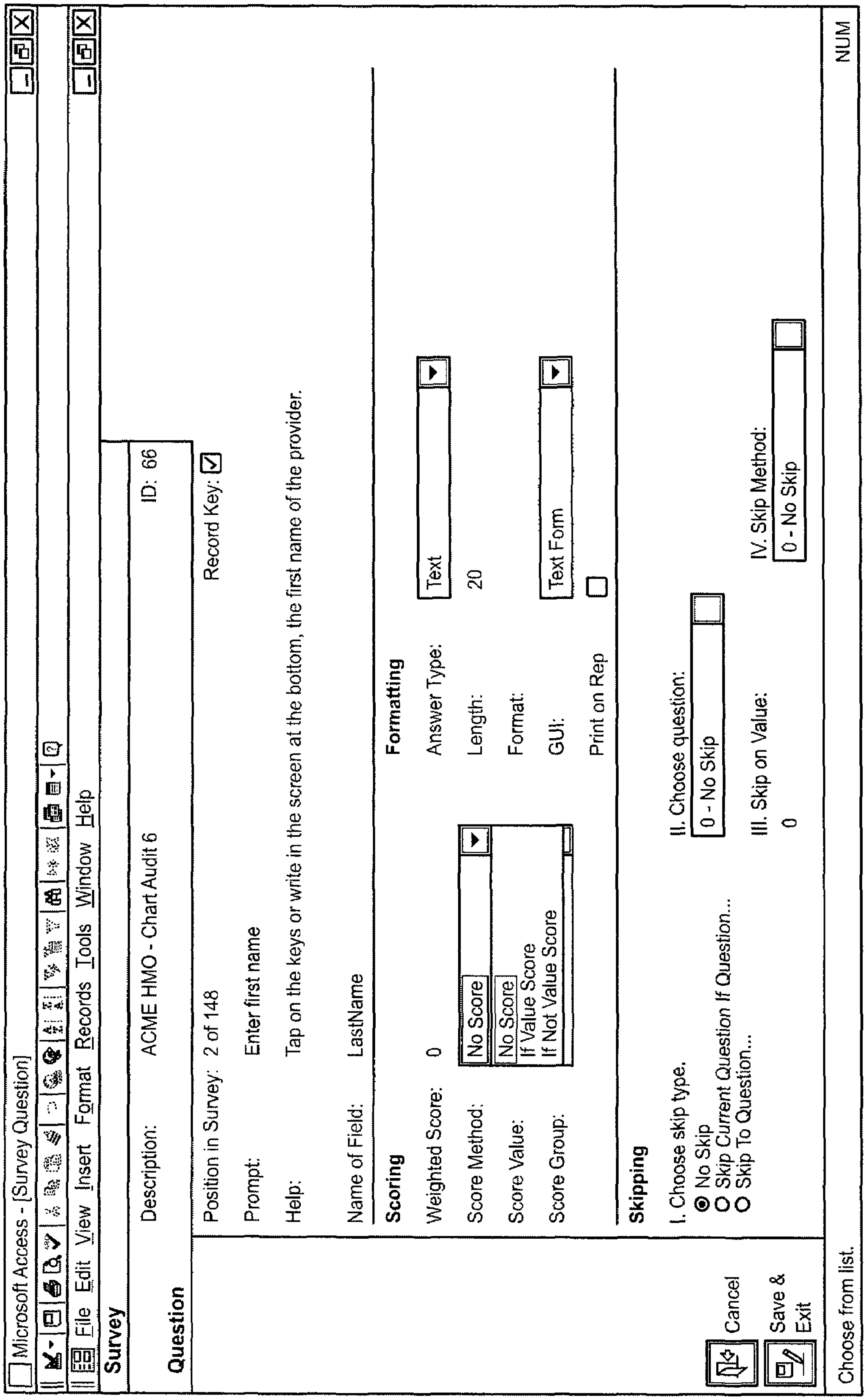

*FIG. 32A*

| Microsoft Access - [Survey Question] |
| --- |

File Edit View Insert Format Records Tools Window Help

Survey

Question

Description: ACME HMO - Chart Audit 6    ID: 66

Position in Survey: 2 of 148    Record Key: ☑

Prompt: Enter first name

Help: Tap on the keys or write in the screen at the bottom, the first name of the provider.

Name of Field: LastName

Formatting

Answer Type: Text

Length: 20

Format:

GUI: Text Form

Scoring

Weighted Score: 0

Score Method: No Score

Score Value: 0

Score Group:

| 1 - MemInfo | Member Information |
| 2 - GMRR | General Medical Record Review |
| 3 - OBScreen | OB Health Screening |
| 4 - GYNSCreen | GYN Health Screening |
| 5 - AdultScreen | Adult Health Screening |
| 6 - Adol/PesdScreen | Adolescent/Pediatric Health Screening |
| 7 - PMSGMRR | PMS/FHS General Medical Record Rev |
| 8 - FHSOB | PMS/FHS OB Health Screening |

Skipping

I. Choose skip type
- ● No Skip
- ○ Skip Current Q
- ○ Skip To Questi

III. Skip on Value: 0

IV. Skip Method: 0 - No Skip

Cancel

Save & Exit

Choose from list.    NUM

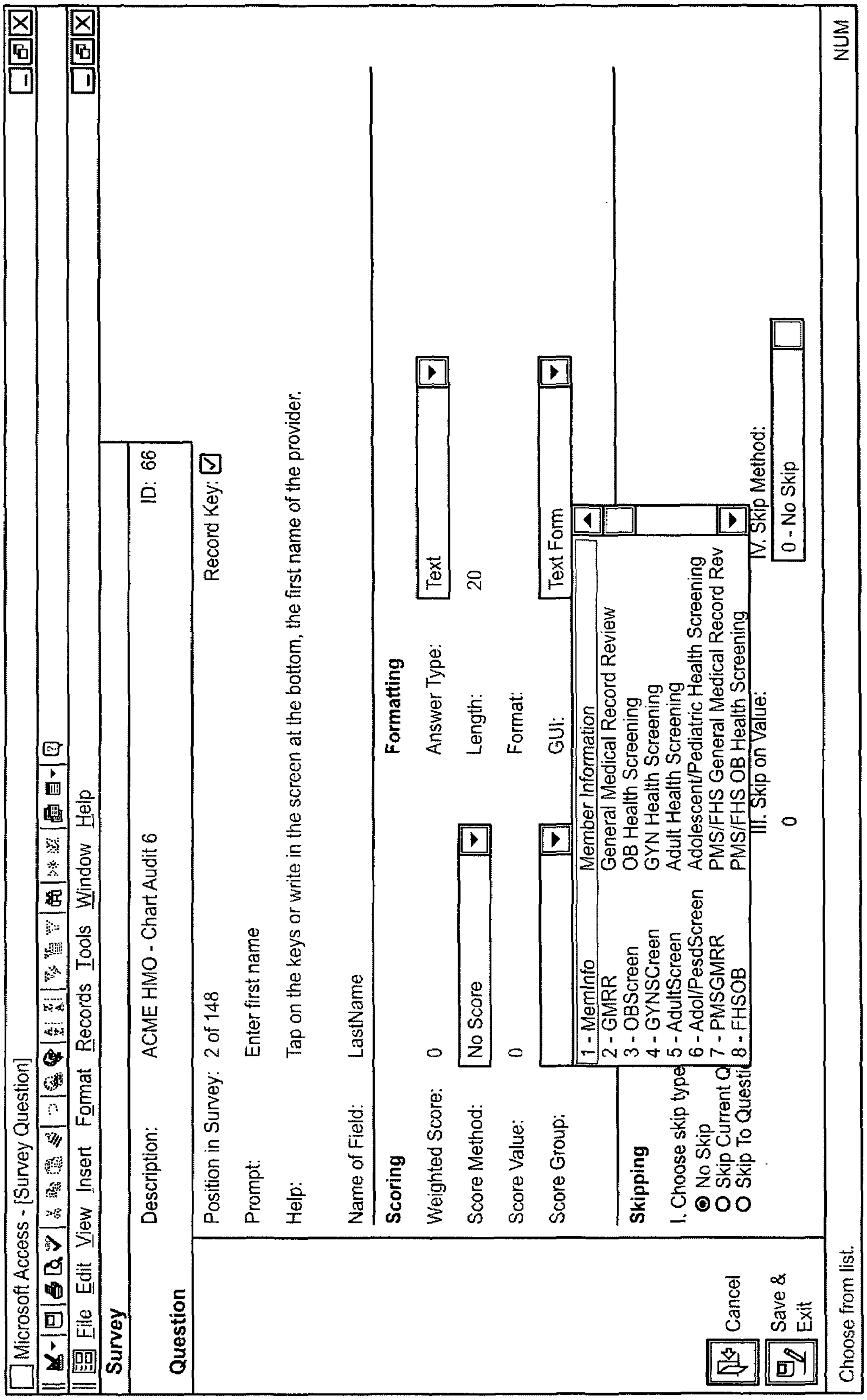

*FIG. 32B*

Microsoft Access - [Survey Question]

File Edit View Insert Format Records Tools Window Help

Survey

Question

Description: ACME HMO - Chart Audit 6          ID: 66

Position in Survey: 2 of 148

Prompt: Enter first name

Help: Tap on the keys or write in the screen at the bottom, the first name of the provider.

Name of Field: LastName                         Record Key: ☑

Scoring                                     Formatting

Weighted Score: 0                               Answer Type: Text ▶

Score Method: No Score ▶                        Length: 20

Score Value: 0                                  Format: ▶

Score Group: ▶                                  GUI: Text Form ▶
                                                     Yes/No Form
                                                     Yes/No/NA Form
                                                     Text Form
                                                     Memo Form
                                                     Date Form
                                                     List Form
                                                     Picture Form
                                                Print on Rep ☐

Skipping

I. Choose skip type.                            II. Choose question:
  ● No Skip                                     0 - No Skip
  ○ Skip Current Question If Question...
  ○ Skip To Question...                         III. Skip on Value:     IV. Skip Method:
                                                0                       0 - No Skip Cancel Save & Exit Choose from list.                               NUM

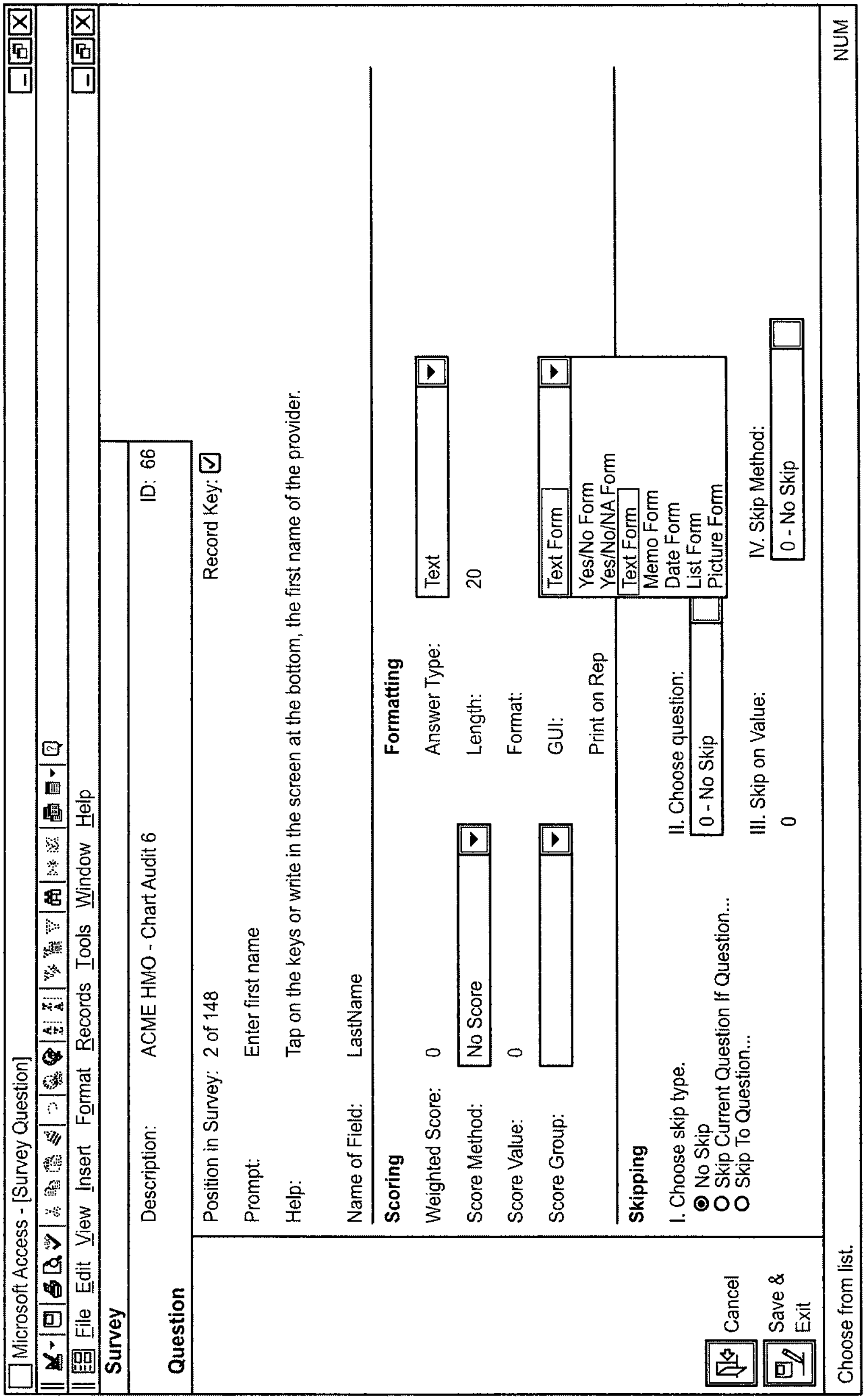

*FIG. 32D*

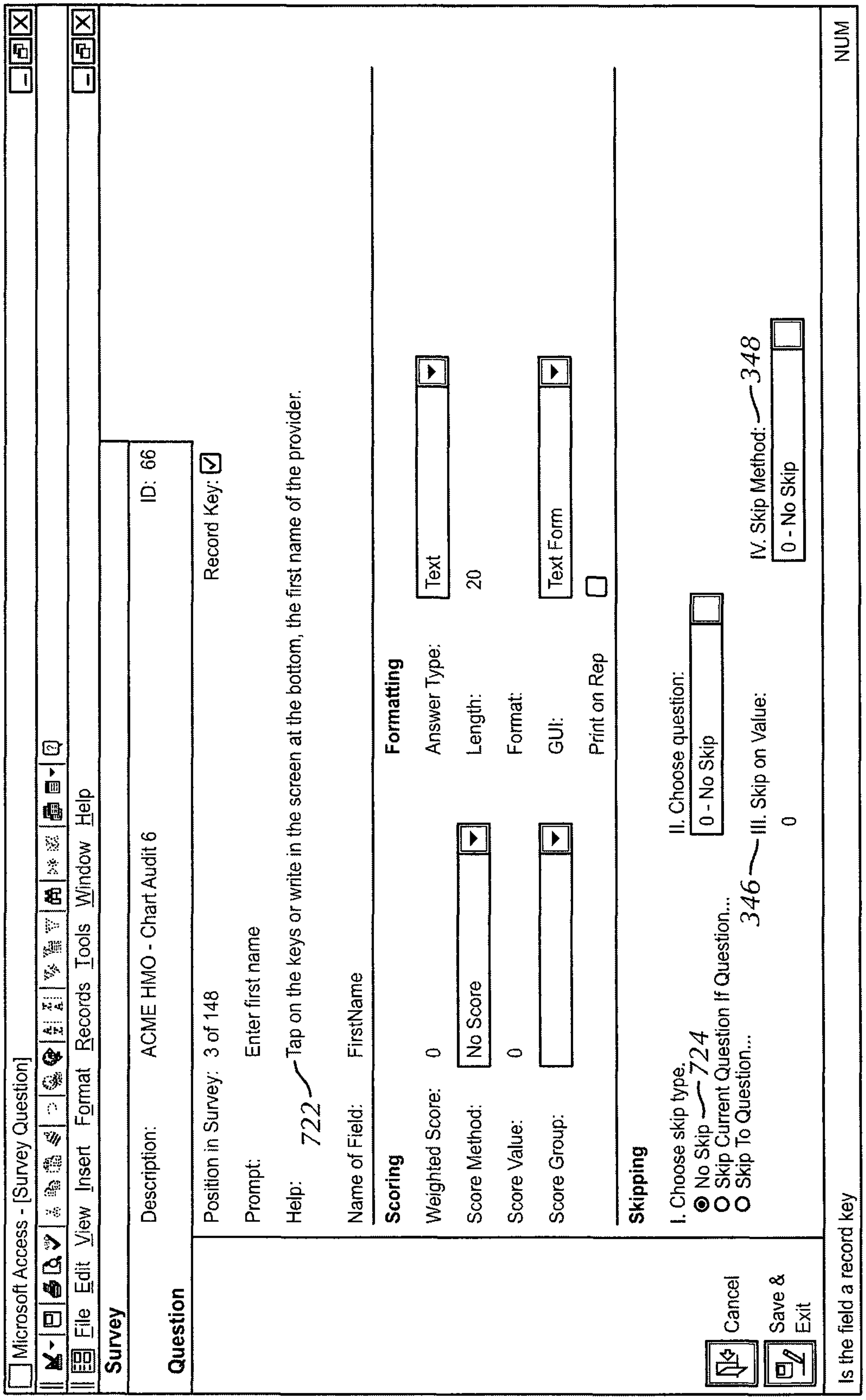

FIG. 32E

[Screen capture of a Microsoft Access "Survey Question" form for ACME HMO - Chart Audit 6]

- Microsoft Access - [Survey Question]
- File Edit View Insert Format Records Tools Window Help

Survey

Question

Description: ACME HMO - Chart Audit 6    ID: 66

Position in Survey: 3 of 148    Record Key: ☑

Prompt: Enter first name

Help: 722 — Tap on the keys or write in the screen at the bottom, the first name of the provider.

Name of Field: FirstName

Scoring

Weighted Score: 0

Score Method: No Score    724

Score Value: 0

Score Group:

Formatting

Answer Type: Text

Length: 20

Format:

GUI: Text Form

Print on Rep: ☐

Skipping

I. Choose skip type.
- ⦿ No Skip
- ○ Skip Current Question If Question...
- ○ Skip To Question...    346

II. Choose question: 0 - No Skip

III. Skip on Value: 0

IV. Skip Method: 348    0 - No Skip

Cancel

Save & Exit

Is the field a record key    NUM

*Fig. 33A*

Title: — 362 Chart Audit 6 Owner: — 330 ACME HMO·

| fldID (320) | field_name — 356 | prompt — 334 | help — 332 |
|---|---|---|---|
| 0 | Complete | Complete | Date |
| K 1 | Provider | Select the provider from the list below | Provider list |
| K 2 | LastName | Enter last name. | Tap on the keyboard or write in the screen at the bottom, the last name of the provider. |
| K 3 | FirstName | Enter first name. | Tap on the keys or write on the screen at the bottom, the first name of the provider. |
| K 4 | Site | Select the Site from the list below. | Site list |
| K 5 | StreetAddress | Enter street number and name. | This is a key question and must be completed. |
| K 6 | Suite | Enter suite number or bldg. | This is a key question that must be completed. |
| K 7 | City | Enter name of city. | This is a key field and must be completed. |
| K 8 | Zip | Enter the zipcode. | Enter the zipcode. |
| K 9 | VisitDate | Tap "SELECT" for VISIT DATE. | Highlight the date of visit on the calendar. |
| K 10 | Birthdate | Tap "SELECT " for BIRTHDATE. | Select the date of birth for this patient. |
| K 11 | Member | Enter member number or NA. | Enter the eleven digit member number or enter NA if a non member. |
| 12 | PCP | QM Member PCP documented? | A clear notation of the QualMed member PCP is present and legible. |

*Fig. 33B*

Title: Chart Audit 6 Owner: QualMed New

| fldID | field_name | prompt | help |
|---|---|---|---|
| 13 | Page | Pt name or # on every page? | Each page in the record contains the patient name or identification number. |
| 14 | BioData | Biographical/personal data? | Each record contains appropriate biographic/personal data. |
| 15 | AuthorID | All entries ID author? | Each author is identified on each entry. |
| 16 | DateEntered | All entries dated? | All entries in the chart are to be dated. |
| 17 | Legible | Record legible? | The record is legible to someone other than the writer. |
| 18 | Meds | Listing of meds? | A listing of medications should be easily found within the chart and should contain all known medications currently being used by the patient. |
| 19 | Allergies | Allergies or Nonallergic listed? | Allergies and adverse reactions to medications are prominently noted in the record. If the pt has no known allergies or hx of adverse reactions, this is noted. |
| 20 | Problems | Problem list present? | The problem list includes documentation of any significant illnesses and medical conditions(this may also be identified on a Health Maintenance Form. |
| 21 | Qvisit | At least 3 visits noted? | Certain information must be documented in the chart by no later than the 3rd visit. |
| 22 | MedHx | Past Medical history? | Is there an appropriate past medical history in the record. Recorded by no later than the 3rd visit and includes serious accidents, operations and illnesses? |
| 23 | FamilyHx | Family history present? | Family medical history done by no later than the 3rd visit is present and legible. |

Fig. 33C

Title: Chart Audit 6 Owner: QualMed New

| fldID | field_name | prompt | help |
|---|---|---|---|
| 24 | TobaccoHabits | Tobacco habits documented? | There is documentation that the provider asked about tobacco habits for members 14 and older seen 3 or more times. Or for children under 14 if appropriate. |
| 25 | AlcoholHX | History of alcohol use? | There is documentation that the provider asked about a history of alcohol use for members 14 and older seen 3 or more times. Or for children under 14, if appropriate. |
| 26 | SubsAbuse | History of substance abuse? | There is documentation that the provider asked about a history of substance abuse for members 14 and older seen 3 or more times. Or for children under 14 if appropriate. |
| 27 | HPComplaint | History and physical of complaint? | The history and physical exam identifies appropriate subjective and objective information pertinent to the patient presenting complaints. |
| 28 | LabStudies | Labs/Studies appropriate? | Labs and other studies ordered as appropriate. |
| 29 | Diagnosis | Working diagnosis? | Working diagnoses are consistent with the findings. |
| 30 | TreatmentPlan | Treatment plan? | Plans of action/treatment are consistent with the diagnosis(es). |
| 31 | Teaching | "Patient/Significant other" teaching? | There is evidence of patient/"significant other" teaching. |
| 32 | Followup | Follow-up plan or date of return? | For each encounter there is a date for return visit or other follow-up plan. |
| 33 | NoShows | No shows? | There is documentation of "No Shows" and follow-up of the "No Shows" |
| 34 | PreviousPrblms | Previous problems addressed? | Problems from previous visits are addressed. |

*Fig. 33D*

Title: Chart Audit 6 Owner: QualMed New

| fldID | field_name | prompt | help |
|---|---|---|---|
| 35 | Qstudies | Member meets criteria? | If member has received at least one of the following list: consults, studies or imagery reports, referrals, hospitalization, or ER visits, answer yes. |
| 36 | Review | Consults/studies reviewed? | Consultant summaries, lab, and imaging study results reflect primary care physician review. |
| 37 | LabsFollowup | Consults/studies follow-up? | A record of follow-up of all consultations, labs, and imagery reports are filed in the chart when indicated. |
| 38 | Referral | Referral report/results? | Results of referral reports are present and legible. |
| 39 | Hospitalization | Hospitalization data? | Presence of hospitalization data with a discharge summary and reports of invasive therapy during hospital stay. |
| 40 | EmerDept | ER department visits? | Presence of emergency department visits and an indication that the provider has reviewed the visit and provided follow-up care as necessary. |
| 41 | Consultants | Appropriate use of consultants? | There is evidence of appropriate use of consultants. |
| 42 | Continuity | Continuity and coordination? | There is evidence of continuity and coordination of care between primary and specialty care providers. |
| 43 | AppropriateCare | Care medically appropriate? | Care appears to be medically appropriate for the diagnosis/conditions. |
| 44 | Education | Documented health ED? | Documented patient health education is present and legible.(for adol on substance abuse and peers) |
| 45 | Risk | Member free from risk? | There is no evidence that the member is placed at inappropriate risk by a diagnostic or therapeutic test. |

Fig. 33E

Title: Chart Audit 6 Owner: QualMed New

| fldID | field_name | prompt | help |
| --- | --- | --- | --- |
| 46 | ImmunizRec | Completed immunization record? | There is a completed immunization record in accordance with organization practice guidelines. |
| 47 | Serum | Serum lot number? | Lot number and manufacturer of the serum is documented. |
| 48 | Preventive | Preventive Health? | Preventive health services are appropriately used. |
| 49 | AdvncDirectSick | Advance Directives or Living Will? | There is documentation of discusssions of a living will or advance directives if this patient has a life threatening condition. |
| 50 | AdvanceDirOld | Advance Directive? | Advance directive is documented for this patient, who is over 65. |
| 51 | PhoneCalls | Phone calls documented? | Phone calls to and from the patient are documented. |
| 52 | QOBGYN | Is this an OBGYN provider? | If yes OB and GYN screening questions will begin. |
| 53 | QOB | Is this an OB pt.? | OB charts are reviewed for specific criteria. |
| 54 | OBSickleCell | Hemoglobin elec./sickle cell screen? | Screening for specific target groups include women of African, Asian, Caribbean, Latin America or Mediterranean descent. |
| 55 | Rubella | Rubella Antibodies? | Screening for females of child bearing age lacking laboratory evidence of immunity. |
| 56 | Amnio | Discuss Amniocentesis? | Women who, at the time of delivery will be age 35 and older. |
| 57 | Genetic | Genetic disorder screening? | Genetic disorder screening for patients 35 years or older. |

*Fig. 33F*

Title: Chart Audit 6 Owner: QualMed New

| fldID | field_name | prompt | help |
|---|---|---|---|
| 58 | GeneticTwo | Genetic disorder screening? | Hx of chromosomal aberrration or abnormal parent; hx of sex-linked conditions; metabolism; neural tube defects; ancestry for Tay Sachs; etc. |
| 59 | OBTobaccoUse | Counseling on tobacco use? | Counseling/screening for women who continue to smoke during pregnancy. |
| 60 | OBAlcoholUse | Alcohol/other drug use? | Screening/ counseling for women with alcohol consumption/drug use during pregnancy. |
| 61 | UltrasoundCeph | Ultrasound/Cephalometry? | Uncertain menstrual hx or hypertension, renal dx, short maternal stature, low pregnancy wt, failure to gain wt, hx of fetal problems, drug/alcohol/tobacco. |
| 62 | RhAntibody | Rh(D) antibody? | Screening for unsensitized Rh negative women. |
| 63 | Gonorrhea | Gonorrhea testing? | Screen/counsel pts w/ mult sex partners, a sex partner with mult contacts, or sexl contacts of persons with culture proven gonorrhea. |
| 64 | VDRL | VDRL, RPR, or ART? | Screen/counsel pts who engage in sex with multiple partners in areas in which syphilis is prevalent, or contacts of persons with active syphilis. |
| 65 | HepB | Hep B antigen? | Screen/counsel pt who engage in high risk behavior or in whom exposure to hepatitis B during prgnancy is suspected. |
| 66 | OBHIV | HIV counseling and testing? | For women at high risk who have a nonreactive HIV test at the first prenatal visit. |
| 67 | Ultrasound | Ultrasound exam? | For women with risk factors for intrauterine growth retardation. |

Fig. 33G

Title: Chart Audit 6 Owner: QualMed New

| fldID | field_name | prompt | help |
|---|---|---|---|
| 68 | HandH | H & H documented? | A hemoglobin and hematocrit is documented. |
| 69 | UABacteriuria | UA for bacteriuria? | Urinalysis for bacteriuria is documented. |
| 70 | Alphafetoprtn | Alphafetoprotein documented? | Evidence of a maternal serum alphafetoprotein performed between the 14th and 20th week is documented. |
| 71 | GlucoseTolerance | Glucose tolerance? | A glucose tolerance test, 50mg oral at 24-28weeks is documented. |
| 72 | PrenatalWrkup | Prenatal work-up? | A prenatal workup completed during the first trimester or by the third prenatal visit is documented. |
| 73 | GYNMammogra | Is a mammogram done? | 35 and older with a family hx breast ca in a parent, sibling, grandparent at every 1-2yrs between 40-49 based on risk, annually for 50 and older. |
| 74 | GYNBreastExam | Breast exam done? | Yearly breast exams for all women over 18 or for 13 and older with hx of premenopausal breast ca in a first degree relative; pharmalogical birth control. |
| 75 | GYNPap | Pap smear done? | Pap annually for all women: who are or have been sexually active; age 19 and older; after 3 or more normal exams at least every 3 yrs based on risk. |
| 76 | GYNEstrogen | Estrogen replacement therapy discussion? | Peri-menopausal caucasian, low bone density, early menopause, slender, smoke, fam hx, steroid or thyroid use and with no contraindications. |
| 77 | GYNRectalCance | Rectal cancer screenings? | Fecal Occult blood/ colonoscopy/ sigmoid/ BE for pts w/ first degree relative with ca under 55yrs. Hx of endometrial, ovarian, breast ca or inflam bowel,'etc |

*Fig. 33H*

Title: Chart Audit 6 Owner: QualMed New

| fldID | field_name | prompt | help |
|---|---|---|---|
| 78 | GYNHIV | HIV counseling and testing? | Pts tx for STDs; IV drug use; w/hx of prostitution; w/ partners w/HIV or bi or IV drug use; hx of transfusion 78-85; in HIV area; or w/high risk occupations. |
| 79 | GYNSTD | Sexually transmitted disease (STD)? | Test is sexually active, individual with multiple sex partners or a partner with multiple contacts. |
| 80 | GYNUrin | Urinalysis? | Persons with hx of symptomatic urinary infection, diabetes, and as part of a prenatal exam. |
| 81 | Contraception | Contraception documented? | The method of contraception is documented for sexually active patients. |
| 82 | Menstrual | Last menstrual period? | The date of the members last menstrual period is documented legibly. |
| 83 | AbdominalExam | Abdominal exam? | An abdominal exam is documented annually. |
| 84 | PelvicExam | Pelvic exam? | A pelvic exam of the external genitalia, a speculum exam, a bimanual exam is documented annually. |
| 85 | GYNPressure | Blood pressure taken? | A blood pressure taken annually is documented legibly. |
| 86 | GYNWeight | Weight taken? | A weight taken annually is documented legibly. |
| 87 | Qsex | Is this patient a male? | Male patients receive specific preventive care. |
| 88 | ProstateExam | Prostate exam? | A digital rectal exam (DRE) annually for males in this age group of 40yrs and over. |
| 89 | PSA | Prostate-Specific antigen? | There is currently insufficient evidence to determine need and interval for PSA- it is left to the individual practitioner. |

Fig. 33I

Title: Chart Audit 6 Owner: QualMed New

| fldID | field_name | prompt | help |
|---|---|---|---|
| 90 | TesticularExam | Testicular exam? | Males with a hx of cryptorchidism, orchiopexy, or testicular atrophy. |
| 91 | PCPMammogram | Breast CA screen/mammogram? | 35 and older with a family hx breast ca in a parent, sibling, grandparent; every 1-2yrs between 40-49 based on risk, annually for 50 and older. |
| 92 | PCPEstrogren | Estrogen replacement therapy discussion? | Peri-menopausal caucasian, low bone density, early menopause, slender, smoke, fam hx, steroid or thyroid use and with no known contraindications. |
| 93 | PCPCBE | Breast exam documented? | Breast exams done by practitioner annually for all women over 18 and those ages 13-17 if fam hx breast ca; on pharmacologic birth control. |
| 94 | PCPCAScreen | Pap and pelvic documented? | Pap and pelvic annually for all women: who are or have been sexually active; 19 and older; after 3 or more normal exams PAP every 3 yrs based on risk. |
| 95 | Qadult | Is this patient an adult? | Adult patient charts are reviewed for specific criteria. |
| 96 | AspirinTher | Aspirin therapy discussion? | W/ risk for MI (high chol, smoking, DM, family hx of CAD, no hx of GI - cerebral hemorrhage or other bleeding problems. |
| 97 | AdltBackExer | Back conditioning exercises? | Individuals at increased risk for low back injury because of past hx, body configuration, or type of activities. |
| 98 | CarotidBruit | Auscultation for carotid bruit? | With symptoms of cerebovascular or cardiovascular dx (highBP, smoking, CAD, DM), neuro symptoms (TIA), or predisposed (hyperlipidemia). |

Fig. 33J

Title: Chart Audit 6 Owner: QualMed New

| fldID | field_name | prompt | help |
|---|---|---|---|
| 99 | AdltChol | Cholesterol measured? | Initial at 19-35yrs. Every 5 yrs if normal. Risk if hx of LDL>130, diabetics with LDL> 100, early MI (under 60yrs), BP, smoke, HDL< 35. |
| 100 | AdultECGTest | Electrocardiogram? | Perform for all adults if with two or more cardiac risk factors. If not at risk perform baseline ECG at 40. |
| 101 | AdltFastGlucose | Fasting glucose? | Perform for obese, hx of diabetes, females w/ hx of gestational, Asians, Hispanics, Native Americans. |
| 102 | PCPRectal | Rectal ca screen? | Fecal Occult/ colonoscopy/ sigmoid/ BE for pts w/ fam hx ca under 55yrs. Hx of endometrial, ovarian, breast ca or inflam bowel, polyps, ca. |
| 103 | PCPRectalEx | Rectal exam? | Rectal exam for males and females are performed annually for this patient who is over 40. |
| 104 | AdltHearing | Hearing Screening? | W/family hx of impairmnt; herpes, syphilis, rubella, cytomegalovirus, toxoplasmosis; malformed head/neck; low birth wt; meningitis, hyperbili; asphyxia, etc. |
| 105 | AdltSickleCell | Hemoglobin/sickle cell testing? | Test once if hx of anemia, or from target groups (Caribbean, Latin American, Asian, Mediterranean, African descent) or has not been tested previously. |
| 106 | AdltPCPHIV | HIV Counseling and testing? | Pt tx for STDs; homo/bi sexual; IV drugs; prostitution or mult partners; w/ partners at risk; hx of transfusion 78-85; high HIV area; or high risk job. |
| 107 | AdltoldFluVac | Influenza vaccine given? | Influenza vaccine given for this patient who is over 65. |

*Fig. 33K*

Title: Chart Audit 6 Owner: QualMed New

| fldID | field_name | prompt | help |
|---|---|---|---|
| 108 | AdltFluVac | Flu vaccine given? | Flu vaccine is given if this patient has hemodynamically unstable cardiac dx, asthma, COPD, sickle cell, DM, renal dx, or are immunocompromised or are parents or caregivers of the above. |
| 109 | AdltMeningo | Meningococcal Vaccine? | All individuals w/thalassemia, sickle cell, congenital asplenia, or surgical spleeen removal, an individuals with household or child care or school exposure. (Not effective against serogroup B) |
| 110 | AdltOralExam | Oral cavity exam? | With tobacco or excessive alcohol use, or with suspicious symptoms or lesions detected through self exam. |
| 111 | AdultoldPneumo | Pneumovax and or booster given? | Pnuemovax is given for this patient who is over 65. Booster given every 5 years if at high risk for resp. disease. |
| 112 | AdltPneumo | Pneumo Vaccine given? | Given if pt with hemodynamically unstable cardiac dx, asthma, COPD, sickle cell, DM, renal dx, spleen removed, are immunocompromised or are parents or caregivers of the above. |
| 113 | AdltPCPSTD | STD screenings? | Test if sexually active (individuals with multiple sexual partners or a sexual partner with multiple contacts). |
| 114 | AdltSkinExam | Skin exam or protection? | Skin exam and/or discussion of skin protection from ultraviolet light. W/ family hx of skin ca, or clinical evidence of precursor legions, or increased exposure. |
| 115 | AdltTBTest | Tuberculin Skin Test? | Yearly if contact w/ the dx, recent immigrant from Asia, Africa, Central and South America, Pacific Islands, resident of shelter, nursing home or with HIV. |

Fig. 33L

Title: Chart Audit 6 Owner: QualMed New

| fldID | field_name | prompt | help |
|---|---|---|---|
| 116 | AdltUrinalysis | Urinalysis performed? | Performed for persons with hx of symptomatic urinary infection, diabetes. |
| 117 | Fundoscopy | Fundoscopy performed? | Fundoscopy is performed annually for diabetic members >age40. |
| 118 | Height | Is a height measurement documented? | Height is measured once before age 60, then every 5 years afterwards. |
| 119 | PCPPressure | Blood pressure measured? | Blood pressure is measured at every visit. |
| 120 | AdltTetanus | Tetanus immunization given? | A tetanus immunization is given every 10 years at a minimum and every 5 yrs if at risk or with wounds. |
| 121 | PCPWeight | Weight is measured? | Weight is measured once before 60, then every 5 years afterwards. |
| 122 | AdolBackExer | Back conditioning exercises? | Individuals at increased risk for low back injury because of past hx, body configuration, or type of activities. |
| 123 | AdolCholesterol | Chol measured? | Hx or family hx of LDL>100, early MI (<50 yrs men or <60 women) high BP, smoke, HDL <35, obese. |
| 124 | DentalScreen | Dental Health Screening? | W/evidence of baby bottle tooth decay; not w/dentist, those not taught to floss or use flouride toothpaste. |
| 125 | AdolECGTest | Electrocardiogram? | Perform if patient with cardiac risk factors but routine screen not rec. for child/adol. |
| 126 | AdolFastGlucose | Fasting glucose? | Routine screen not rec. for asymptomatic peds/adol. Perform for obese, hx of diabetes, females w/ hx of gestational, Asians, Hispanics, Native Americans. |

*Fig. 33M*

Title: Chart Audit 6 Owner: QualMed New

| fldID | field_name | prompt | help |
|---|---|---|---|
| 127 | Flouride | Flouride supplements? | Infants, children and adol, of this age, who live in areas with inadequate water flouridation (less than 0.6 parts per million). |
| 128 | AdolHearing | Hearing Screening? | W/family hx of impairmnt; herpes, syphilis, rubella, cytomegalovirus, toxoplasmosis; malformed head/neck; low birth wt; meningitis, hyperbili; asphyxia, etc. |
| 129 | AdolSickleCell | Hemoglobin/sickle cell testing? | Test once if hx of anemia, or from target groups (Caribbean, Latin American, Asian, Mediterranean, African descent). |
| 130 | HAVSceen | Hepatitis A Virus? | Immunoprophylaxis for travel to high endemic rates of HAV infection; communities at risk; confirmed outbreak at household or child care center. |
| 131 | AdolPCPHIV | HIV Counseling and testing? | Pt tx for STDs; homo/bi sexual; IV drugs; prostitution or mult partners; w/ partners at risk; hx of transfusion 78-85; high HIV area; or high risk job. |
| 132 | AdolFluVaccine | Influenza vaccine? | W/ asthma, unstable cardiac dx, sickle cell, chronic renal, COPD, immunocompromised or parents or caregivers of above. |
| 133 | AdolMeningo | Meningococcal Vaccine? | All individuals w/thalassemia, sickle cell, congenital asplenia, or surgical spleeen removal, an individuals with household or child care or school exposure. (Not effective against serogroup B) |
| 134 | AdolOralExam | Oral Cavity exam? | For infants and toddlers who are put to bed with a bottle are at risk for tooth decay. |

*Fig. 33N*

Title: Chart Audit 6 Owner: QualMed New

| fldID | field_name | prompt | help |
|---|---|---|---|
| 135 | AdolPneumovax | Pneumovax given? | Pts w/hemodynamically unstable cardiac dx, sickle cell, chronic renal, chronic pulmonary dx, are immuno-compromised or are parents/caregivers of the above. |
| 136 | AdolPCPSTD | STD screenings? | Test if sexually active (individuals with multiple sexual partners or a sexual partner with multiple contacts). |
| 137 | AdolIVDrugSafet | Sharing needles or syringes? | Screening or counselling done for IV drug users |
| 138 | AdolSkinExam | Skin exam or protection? | Skin exam and/or discussion of skin protection from ultraviolet light. W/ family hx of skin ca, or clinical evidence of precursor legions, or increased exposure. |
| 139 | AdolTBTest | Tuberculin Skin Test? | Yearly if contact w/ the dx, recent immigrant from Asia, Africa, Central and South America, Pacific Islands, resident of shelter, nursing home or with HIV. |
| 140 | AdolUrinalysis | Urinalysis performed? | Performed for persons with hx of symptomatic urinary infection, diabetes. |
| 141 | Growthchart | Growth chart? | A growth chart is documented legibly for each child. |
| 142 | DevelopmentHx | Developmental history? | A developmental history is documented and is legible. |
| 143 | PhysicalEx | Physical exam documented? | lnght, wt, hc for 2-3wk or 6-8wk + rx iron & brst fed vit or 4m or 6m + prn rx fluoride or 9m + rx ipecac or 12m or 15m or 18m or 2yr prn; hgt, wt, bp for 3yr and above yearly. |
| 144 | Age | Peds pt age documented? | This pediatric member age is documented legibly in the chart. |

Fig. 33O

Title: Chart Audit 6 Owner: QualMed New

| fldID | field_name | prompt | help |
|---|---|---|---|
| 145 | LeadScreen | Lead screen documented? | Pb for children living in or visiting a pre 1960 bldg w/peeling paint; a sib w/Pb> 14; w/adult w/ job or hobby Pb exposure; near smelter, battery w/Pb release. |
| 146 | HHVisScreen | H/H vision screen? | H/H and vision screen are done for this patient who is 13 or older. |
| 147 | SafeSex | Safe sex and birth control questioned? | Documentation that safe sex and method of birth control are questioned (as appropriate) for this pt who is between 13 and 18. |
| 148 | PsychHx | Psychosocial history? | Psychosocial history is done for school, family and peers on this patient who is 13 to 18. |

*Project Schema 3*

FIG. 35

Title: Chart Audit 6 Owner: ACME HMO

| fldID | field_name | prompt | help |
| --- | --- | --- | --- |
| 0 | Complete | Complete | Date |
| K 1 | Provider | Select the provider from the list below | Provider list |
| K 2 | LastName | Enter last name. | Tap on the keyboard or write in the screen at the bottom, the last name of the provider. |
| K 3 | FirstName | Enter first name. | Tap on the keys or write on the screen at the bottom, the first name of the provider. |
| K 4 | Site | Select the Site from the list below. | Site list |
| K 5 | StreetAddress | Enter street number and name. | This is a key question and must be completed. |
| K 6 | Suite | Enter suite number or bldg. | This is a key question that must be completed. |
| K 7 | City | Enter name of city. | This is a key field and must be completed. |
| K 8 | Zip | Enter the zipcode. | Enter the zipcode. |
| K 9 | VisitDate | Tap "SELECT" for VISIT DATE. | Highlight the date of visit on the calendar. |
| K 10 | Birthdate | Tap "SELECT " for BIRTHDATE. | Select the date of birth for this patient. |
| K 11 | Member | Enter member number or NA. | Enter the eleven digit member number or enter NA if a non member. |
| 12 | PCP | QM Member PCP documented? | A clear notation of the QualMed member PCP is present and legible. |

320 322

Wednesday, May 26, 1999

FIG. 36

Title: Site Environment 4 Owner: ACME HMO 320 322

| fldID | field_name | prompt | help |
|---|---|---|---|
| 0 | Complete | Complete | Date |
| 1 | QSiteOnly | Is this a site only? | Only site environment questions will be answered. |
| (K) 2 | Provider | Select the provider from the list below. | Provider list |
| K 3 | LastName | Enter last name. | Tap on the keyboard or write in the screen at the bottom, the last name of the provider. |
| K 4 | FirstName | Enter first name. | Tap on the keys or write on the screen at the bottom, the first name of the provider. |
| K 5 | Site | Select the Site from the list below. | Site list |
| K 6 | StreetAddress | Enter street number and name. | This is a key question and must be completed. |
| K 7 | Suite | Enter suite number or bldg. | This is a key question and must be completed. |
| K 8 | City | Enter name of city. | This is a key field and must be completed. |
| K 9 | Zip | Enter the zipcode. | Enter the zipcode. |
| K 10 | VisitDate | Tap "SELECT" for VISIT DATE. | Highlight the date of the visit on the calendar. |
| 11 | QPCPInventory | PCP Service Inventory required? | The PCP service inventory questions will be listed if it is appropriate to perform this section of the survey. |
| 12 | Peds | Peds services? | Does the site have pediatric care services available for members ages 0 to 12? |

Thursday, February 24, 2000

Fig. 37E
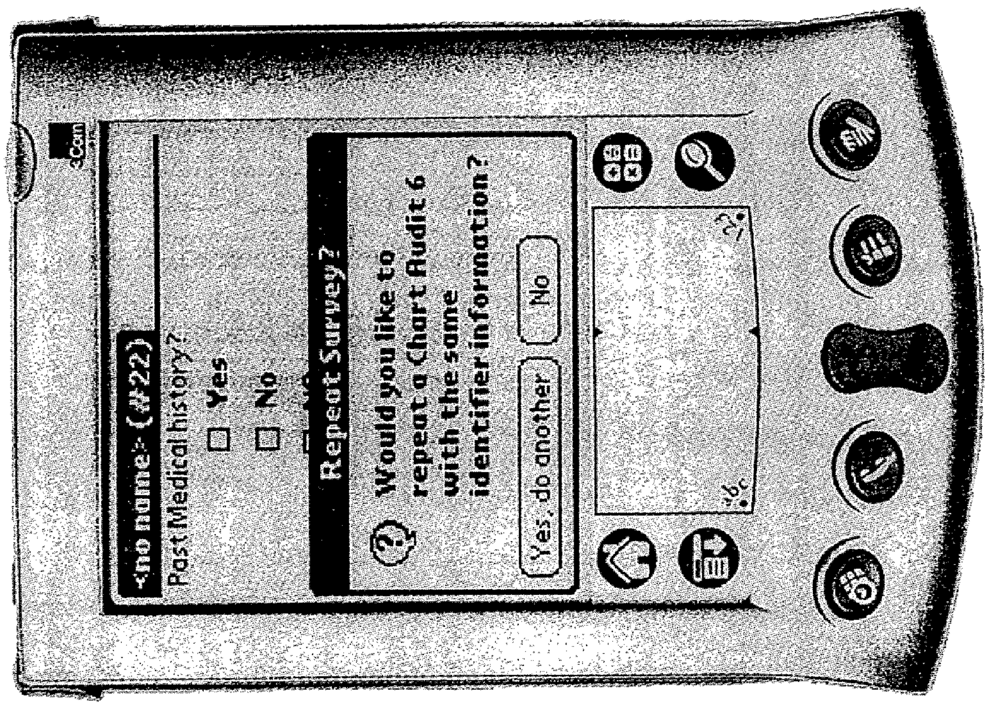
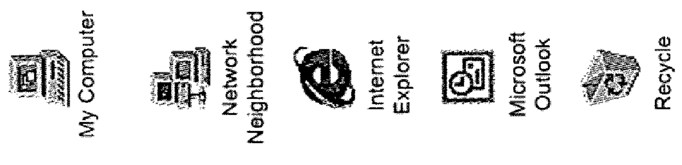

Fig. 37F
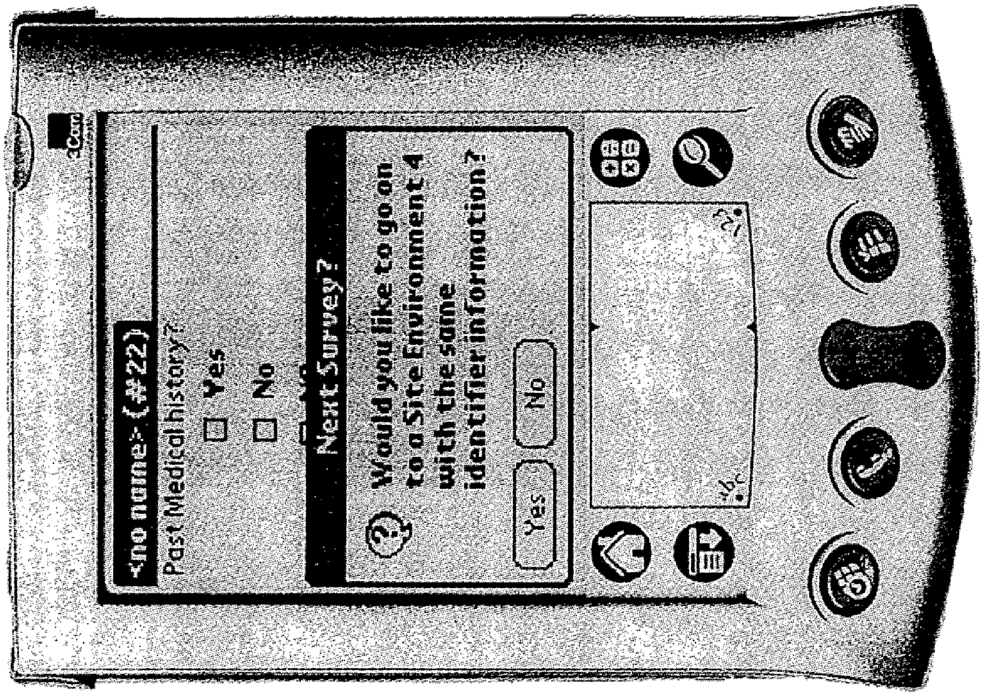
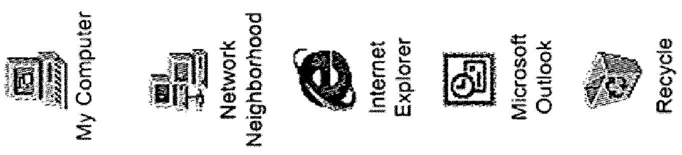

FIG. 38A

Report of Survey Results

Survey: ACME HMO - CHART AUDIT 6
Report Scope: SITES: ALL
PROVIDERS: ALL
VISIT DATES: ALL
Aggregate: GRAND TOTAL

680

Question Group: 2 - General Medical Record Review

| # Prompt | Skips | N/A | Scored | Scored % | Pos | Neg | Pos% |
|---|---|---|---|---|---|---|---|
| 12 SHC Member PCP documented? | 0 | 438 | 821 | 65.2% | 821 | 0 | 100.0% |
| 13 Pt name or # on every page? | 0 | 1 | 1258 | 99.9% | 1255 | 3 | 99.8% |
| 14 Biographical/personal data? | 0 | 0 | 1259 | 100.0% | 1257 | 2 | 99.8% |
| 15 All entries ID author? | 0 | 0 | 1259 | 100.0% | 1259 | 0 | 100.0% |
| 16 All entries dated? | 0 | 0 | 1259 | 100.0% | 1259 | 0 | 100.0% |
| 17 Record legible? | 0 | 0 | 1259 | 100.0% | 1250 | 9 | 99.3% |
| 18 Listing of meds? | 0 | 19 | 1240 | 98.5% | 1232 | 8 | 99.4% |
| 19 Allergies or Nonallergic listed? | 0 | 0 | 1259 | 100.0% | 1258 | 1 | 99.9% |
| 20 Problem list present? | 0 | 14 | 1245 | 98.9% | 1226 | 19 | 98.5% |
| 22 Past Medical history? | 72 | 0 | 1187 | 100.0% | 1185 | 2 | 99.8% |
| 23 Family history present? | 74 | 0 | 1185 | 100.0% | 1172 | 13 | 98.9% |
| 24 Tobacco habits documented? | 74 | 196 | 989 | 83.5% | 953 | 36 | 96.4% |
| 26 History of substance abuse? | 74 | 196 | 989 | 83.5% | 803 | 186 | 81.2% |
| 27 History and physical of complaint? | 0 | 4 | 1255 | 99.7% | 1253 | 2 | 99.8% |
| 29 Working diagnosis? | 0 | 1 | 1258 | 99.9% | 1258 | 0 | 100.0% |
| 30 Treatment plan? | 0 | 4 | 1255 | 99.7% | 1255 | 0 | 100.0% |
| 32 Follow-up plan or date of return? | 0 | 3 | 1256 | 99.8% | 1255 | 1 | 99.9% |
| 33 No shows? | 0 | 1157 | 102 | 8.1% | 93 | 9 | 91.2% |
| 34 Previous problems addressed? | 0 | 252 | 1007 | 80.0% | 1007 | 0 | 100.0% |
| 36 Consults/studies reviewed? | 61 | 14 | 1184 | 98.8% | 1184 | 0 | 100.0% |
| 37 Consults/studies follow-up? | 61 | 15 | 1183 | 98.7% | 1183 | 0 | 100.0% |
| 38 Referral report/results? | 62 | 650 | 547 | 45.7% | 547 | 0 | 100.0% |
| 39 Hospitalization data? | 62 | 1025 | 172 | 14.4% | 172 | 0 | 100.0% |
| 40 ER department visits? | 62 | 1095 | 102 | 8.5% | 102 | 0 | 100.0% |
| 44 Documented health ED? | 0 | 483 | 776 | 61.6% | 647 | 129 | 83.4% |
| 45 Member free from risk? | 0 | 497 | 762 | 60.5% | 762 | 0 | 100.0% |
| 46 Completed immunization record? | 0 | 574 | 685 | 54.4% | 587 | 98 | 85.7% |
| 47 Serum lot number? | 1061 | 15 | 183 | 92.4% | 177 | 6 | 96.7% |
| 49 Advance Directives or Living Will? | 245 | 991 | 23 | 2.3% | 8 | 15 | 34.8% |
| 50 Advance Directive? | 1027 | 68 | 164 | 70.7% | 28 | 136 | 17.1% |

Question Group: 2 - General Medical Record Review

| | | | | | | | |
|---|---|---|---|---|---|---|---|
| **Totals:** | | | 27123 | | 26448 | 675 | 97.5% |

*Report Generated Friday, February 25, 2000*

*ired by MCR - Philadelphia, PA*

FIG. 38B

Report of Survey Results

Survey: ACME HMO - CHART AUDIT 6
Report Scope: SITES: ALL
PROVIDERS: ALL
VISIT DATES: ALL
Aggregate: GRAND TOTAL

| | Skips | N/A | Scored | Scored % | Pos | Neg | Pos% |
|---|---|---|---|---|---|---|---|
| **Question Group: 3 - OB Health Screening** | | | | | | | |
| # Prompt | | | | | | | |
| 54 Hemoglobin elec./sickle cell screen? | 1089 | 138 | 32 | 18.8% | 32 | 0 | 100.0% |
| 55 Rubella Antibodies? | 1089 | 56 | 114 | 67.1% | 114 | 0 | 100.0% |
| 57 Genetic disorder screening? | 1230 | 7 | 22 | 75.9% | 22 | 0 | 100.0% |
| 58 Genetic disorder screening? | 1118 | 118 | 23 | 16.3% | 23 | 0 | 100.0% |
| 62 Rh(D) antibody? | 1089 | 61 | 109 | 64.1% | 109 | 0 | 100.0% |
| 64 VDRL, RPR, or ART? | 1089 | 66 | 104 | 61.2% | 104 | 0 | 100.0% |
| 65 Hep B antigen? | 1089 | 70 | 100 | 58.8% | 100 | 0 | 100.0% |
| 68 H & H documented? | 1089 | 10 | 160 | 94.1% | 160 | 0 | 100.0% |
| 69 UA for bacteriuria? | 1089 | 27 | 143 | 84.1% | 131 | 12 | 91.6% |
| 70 Alphafetoprotein documented? | 1089 | 42 | 128 | 75.3% | 128 | 0 | 100.0% |
| 72 Prenatal work-up? | 1089 | 14 | 156 | 91.8% | 156 | 0 | 100.0% |
| **Question Group: 3 - OB Health Screening** | | | | | | | |
| Totals: | | | 1091 | | 1079 | 12 | 98.9% |

Report Generated Friday, February 25, 2000 red by MCR - Philadelphia, PJ

FIG. 38C

Report of Survey Results

Survey: ACME HMO - CHART AUDIT 6
Report Scope: SITES: ALL
PROVIDERS: ALL
VISIT DATES: ALL
Aggregate: GRAND TOTAL

| | Skips | N/A | Scored | Scored % | Pos | Neg | Pos% |
|---|---|---|---|---|---|---|---|
| **Question Group:** 4 - GYN Health Screening | | | | | | | |
| # Prompt | | | | | | | |
| 73 Is a mammogram done? | 1126 | 8 | 125 | 94.0% | 120 | 5 | 96.0% |
| 74 Breast exam done? | 1076 | 1 | 182 | 99.5% | 182 | 0 | 100.0% |
| 75 Pap smear done? | 1076 | 1 | 182 | 99.5% | 182 | 0 | 100.0% |
| 77 Rectal cancer screenings? | 1153 | 52 | 54 | 50.9% | 48 | 6 | 88.9% |
| 81 Contraception documented? | 1076 | 23 | 160 | 87.4% | 160 | 0 | 100.0% |
| 82 Last menstrual period? | 1075 | 2 | 182 | 98.9% | 181 | 1 | 99.5% |
| 83 Abdominal exam? | 1075 | 0 | 184 | 100.0% | 184 | 0 | 100.0% |
| 84 Pelvic exam? | 1076 | 1 | 182 | 99.5% | 182 | 0 | 100.0% |
| 85 Blood pressure taken? | 1076 | 0 | 183 | 100.0% | 183 | 0 | 100.0% |
| 86 Weight taken? | 1076 | 0 | 183 | 100.0% | 177 | 6 | 96.7% |
| **Question Group:** 4 - GYN Health Screening | | | | | | | |
| **Totals:** | | | 1617 | | 1599 | 18 | 98.9% |

Report Generated Friday, February 25, 2000

Report of Survey Results

FIG. 38D

Survey: ACME HMO · CHART AUDIT 6
Report Scope: SITES: ALL
PROVIDERS: ALL
VISIT DATES: ALL
Aggregate: GRAND TOTAL

Question Group: 5 - Adult Health Screening

| # | Prompt | Skips | N/A | Scored | Scored % | Pos | Neg | Pos% |
|---|---|---|---|---|---|---|---|---|
| 88 | Prostate exam? | 1065 | 9 | 185 | 95.4% | 151 | 34 | 81.6% |
| 91 | Breast CA screen/mammogram? | 997 | 18 | 244 | 93.1% | 216 | 28 | 88.5% |
| 93 | Breast exam documented? | 894 | 61 | 304 | 83.3% | 270 | 34 | 88.8% |
| 94 | Pap and pelvic documented? | 890 | 99 | 270 | 73.2% | 246 | 24 | 91.1% |
| 99 | Cholesterol measured? | 706 | 52 | 501 | 90.6% | 480 | 21 | 95.8% |
| 102 | Rectal ca screen? | 818 | 304 | 137 | 31.1% | 105 | 32 | 76.6% |
| 103 | Rectal exam? | 820 | 22 | 417 | 95.0% | 334 | 83 | 80.1% |
| 105 | Hemoglobin/sickle cell testing? | 1142 | 116 | 1 | 0.9% | 1 | 0 | 100.0% |
| 107 | Influenza vaccine given? | 1050 | 60 | 149 | 71.3% | 112 | 37 | 75.2% |
| 111 | Pneumovax and or booster given? | 1051 | 102 | 106 | 51.0% | 77 | 29 | 72.6% |
| 113 | STD screenings? | 706 | 544 | 9 | 1.6% | 9 | 0 | 100.0% |
| 116 | Urinalysis performed? | 706 | 468 | 85 | 15.4% | 80 | 5 | 94.1% |
| 117 | Fundoscopy performed? | 818 | 398 | 43 | 9.8% | 28 | 15 | 65.1% |
| 118 | Is a height measurement documented? | 706 | 1 | 552 | 99.8% | 493 | 59 | 89.3% |
| 119 | Blood pressure measured? | 706 | 0 | 553 | 100.0% | 549 | 4 | 99.3% |
| 120 | Tetanus immunization given? | 706 | 66 | 487 | 88.1% | 95 | 392 | 19.5% |
| 121 | Weight is measured? | 706 | 0 | 553 | 100.0% | 550 | 3 | 99.5% |

Question Group: 5 - Adult Health Screening

| | | | | | | | | |
|---|---|---|---|---|---|---|---|---|
| **Totals:** | | | | 4596 | | 3796 | 800 | 82.6% |

*Report Generated Friday, February 25, 2000* *ıred by MCR - Philadelphia, P*

FIG. 38E

Report of Survey Results

Survey: ACME HMO - CHART AUDIT 6
Report Scope: SITES: ALL
PROVIDERS: ALL
VISIT DATES: ALL
Aggregate: GRAND TOTAL

| | | Skips | N/A | Scored | Scored % | Pos | Neg | Pos% |
|---|---|---|---|---|---|---|---|---|
| **Question Group:** | **6 - Adolescent/Pediatric Health Screening** | | | | | | | |
| # Prompt | | | | | | | | |
| 129 | Hemoglobin/sickle cell testing? | 906 | 287 | 66 | 18.7% | 66 | 0 | 100.0% |
| 132 | Influenza vaccine? | 915 | 340 | 4 | 1.2% | 3 | 1 | 75.0% |
| 135 | Pneumovax given? | 942 | 317 | 0 | 0.0% | no responses | | |
| 136 | STD screenings? | 1027 | 229 | 3 | 1.3% | 3 | 0 | 100.0% |
| 140 | Urinalysis performed? | 906 | 318 | 35 | 9.9% | 35 | 0 | 100.0% |
| 141 | Growth chart? | 1061 | 3 | 195 | 98.5% | 171 | 24 | 87.7% |
| 142 | Developmental history? | 906 | 59 | 294 | 83.3% | 286 | 8 | 97.3% |
| 143 | Physical exam documented? | 906 | 2 | 351 | 99.4% | 350 | 1 | 99.7% |
| 144 | Peds pt age documented? | 1053 | 1 | 205 | 99.5% | 205 | 0 | 100.0% |
| 145 | Lead screen documented? | 1049 | 105 | 105 | 50.0% | 77 | 28 | 73.3% |
| 146 | H/H vision screen? | 1050 | 205 | 4 | 1.9% | 4 | 0 | 100.0% |
| 147 | Safe sex and birth control questioned? | 1111 | 11 | 137 | 92.6% | 69 | 68 | 50.4% |
| 148 | Psychosocial history? | 1111 | 5 | 143 | 96.6% | 118 | 25 | 82.5% |
| **Question Group:** | **6 - Adolescent/Pediatric Health Screening** | | | | | | | |
| **Totals:** | | | | 1542 | | 1387 | 155 | 89.9% |

*Report Generated Friday, February 25, 2000*     *ired by MCR - Philadelphia, P*

Report of Survey Results

FIG. 38F

Survey: ACME HMO - CHART AUDIT 6

Report Scope: SITES: ALL
PROVIDERS: ALL
VISIT DATES: ALL

Aggregate: GRAND TOTAL

680

Question Group: 7 - PMS/FHS General Medical Record Review

| # Prompt | Skips | N/A | Scored | Scored % | Pos | Neg | Pos% |
|---|---|---|---|---|---|---|---|
| 25 History of alcohol use? | 74 | 196 | 989 | 83.5% | 948 | 41 | 95.9% |
| 28 Labs/Studies appropriate? | 0 | 245 | 1014 | 80.5% | 1014 | 0 | 100.0% |
| 31 Patient/Significant other teaching? | 0 | 700 | 559 | 44.4% | 431 | 128 | 77.1% |
| 41 Appropriate use of consultants? | 0 | 316 | 943 | 74.9% | 943 | 0 | 100.0% |
| 42 Continuity and coordination? | 0 | 309 | 950 | 75.5% | 950 | 0 | 100.0% |
| 43 Care medically appropriate? | 0 | 282 | 977 | 77.6% | 977 | 0 | 100.0% |
| 48 Preventive Health? | 0 | 556 | 703 | 55.8% | 681 | 22 | 96.9% |
| 51 Phone calls documented? | 0 | 777 | 482 | 38.3% | 482 | 0 | 100.0% |
| **Question Group:** 7 - PMS/FHS General Medical Record Review | | | | | | | |
| **Totals:** | | | 6617 | | 6426 | 191 | 97.1% |

*Report Generated Friday, February 25, 2000* *ıred by MCR - Philadelphia, P*

Report of Survey Results

Survey: ACME HMO -CHART AUDIT 6
Report Scope: SITES: ALL
PROVIDERS: ALL
VISIT DATES: ALL
Aggregate: GRAND TOTAL

FIG. 38G

| | Skips | N/A | Scored | Scored % | Pos | Neg | Pos% |
|---|---|---|---|---|---|---|---|
| **Question Group: 8 - PMS/FHS OB Health Screening** | | | | | | | |
| # Prompt | | | | | | | |
| 56 Discuss Amniocentesis? | 1203 | 28 | 28 | 50.0% | 28 | 0 | 100.0% |
| 59 Counseling on tobacco use? | 1089 | 145 | 25 | 14.7% | 18 | 7 | 72.0% |
| 60 Alcohol/other drug use? | 1089 | 161 | 9 | 5.3% | 9 | 0 | 100.0% |
| 61 Ultrasound/Cephalometry? | 1089 | 158 | 12 | 7.1% | 12 | 0 | 100.0% |
| 63 Gonorrhea testing? | 1089 | 133 | 37 | 21.8% | 37 | 0 | 100.0% |
| 66 HIV counseling and testing? | 1089 | 86 | 84 | 49.4% | 83 | 1 | 98.8% |
| 67 Ultrasound exam? | 1089 | 48 | 122 | 71.8% | 122 | 0 | 100.0% |
| **Question Group: 8 - PMS/FHS OB Health Screening** | | | | | | | |
| Totals: | | | 317 | | 309 | 8 | 97.5% |

Report Generated Friday, February 25, 2000 red by MCR - Philadelphia, PJ

FIG. 38H

Report of Survey Results

Survey: ACME HMO - CHART AUDIT 6

Report Scope: SITES: ALL
PROVIDERS: ALL
VISIT DATES: ALL

Aggregate: GRAND TOTAL

| # Prompt | Skips | N/A | Scored | Scored % | Pos | Neg | Pos% |
|---|---|---|---|---|---|---|---|
| **Question Group:** 9 - PMS/FHS GYN Health Screening | | | | | | | |
| 76 Estrogen replacement therapy discussion? | 1153 | 43 | 63 | 59.4% | 63 | 0 | 100.0% |
| 78 HIV counseling and testing? | 1076 | 174 | 9 | 4.9% | 9 | 0 | 100.0% |
| 79 Sexually transmitted disease (STD)? | 1076 | 172 | 11 | 6.0% | 11 | 0 | 100.0% |
| 80 Urinalysis? | 1076 | 153 | 30 | 16.4% | 30 | 0 | 100.0% |
| **Question Group:** 9 - PMS/FHS GYN Health Screening **Totals:** | | | 113 | | 113 | 0 | 100.0% |

*Report Generated Friday, February 25, 2000* *ıred by MCR - Philadelphia, P*

Report of Survey Results

Survey: ACME HMO - CHART AUDIT 6

Report Scope: SITES: ALL
PROVIDERS: ALL
VISIT DATES: ALL

Aggregate: GRAND TOTAL

FIG. 38I

| # Prompt | Skips | N/A | Scored | Scored % | Pos | Neg | Pos% |
|---|---|---|---|---|---|---|---|
| **Question Group:** 10 - PMS/FHS Adult Health Screening | | | | | | | |
| 89 Prostate-Specific antigen? | 1106 | 13 | 140 | 91.5% | 133 | 7 | 95.0% |
| 90 Testicular exam? | 826 | 344 | 89 | 20.6% | 81 | 8 | 91.0% |
| 92 Estrogen replacement therapy discussion? | 1019 | 140 | 100 | 41.7% | 100 | 0 | 100.0% |
| 96 Aspirin therapy discussion? | 821 | 382 | 56 | 12.8% | 45 | 11 | 80.4% |
| 97 Back conditioning exercises? | 705 | 503 | 51 | 9.2% | 44 | 7 | 86.3% |
| 98 Auscultation for carotid bruit? | 819 | 345 | 95 | 21.6% | 89 | 6 | 93.7% |
| 100 Electrocardiogram? | 709 | 113 | 437 | 79.5% | 417 | 20 | 95.4% |
| 101 Fasting glucose? | 706 | 482 | 71 | 12.8% | 70 | 1 | 98.6% |
| 104 Hearing Screening? | 706 | 535 | 18 | 3.3% | 18 | 0 | 100.0% |
| 106 HIV Counseling and testing? | 706 | 533 | 20 | 3.6% | 20 | 0 | 100.0% |
| 108 Flu vaccine given? | 914 | 319 | 26 | 7.5% | 17 | 9 | 65.4% |
| 109 Meningococcal Vaccine? | 706 | 553 | 0 | 0.0% | no responses | | |
| 110 Oral cavity exam? | 706 | 550 | 3 | 0.5% | 3 | 0 | 100.0% |
| 112 Pneumo Vaccine given? | 914 | 319 | 26 | 7.5% | 14 | 12 | 53.8% |
| 114 Skin exam or protection? | 706 | 530 | 23 | 4.2% | 23 | 0 | 100.0% |
| 115 Tuberculin Skin Test? | 706 | 544 | 9 | 1.6% | 4 | 5 | 44.4% |
| **Question Group:** 10 - PMS/FHS Adult Health Screening | | | | | | | |
| Totals: | | | 1164 | | 1078 | 86 | 92.6% |

Report Generated Friday, February 25, 2000 ired by MCR - Philadelphia, PJ

Report of Survey Results

Survey: ACME HMO - CHART AUDIT 6

Report Scope: SITES: ALL
PROVIDERS: ALL
VISIT DATES: ALL

Aggregate: GRAND TOTAL

FIG. 38J

| | Skips | N/A | Scored | Scored % | Pos | Neg | Pos% |
|---|---|---|---|---|---|---|---|
| **Question Group: 11 - PMS/FHS Adolescent/Pediatric Health Screening** | | | | | | | |
| # Prompt | | | | | | | |
| 122 Back conditioning exercises? | 1108 | 146 | 5 | 3.3% | 5 | 0 | 100.0% |
| 123 Chol measured? | 942 | 289 | 28 | 8.8% | 28 | 0 | 100.0% |
| 124 Dental Health Screening? | 906 | 320 | 33 | 9.3% | 33 | 0 | 100.0% |
| 125 Electrocardiogram? | 1101 | 152 | 6 | 3.8% | 6 | 0 | 100.0% |
| 126 Fasting glucose? | 1101 | 153 | 5 | 3.2% | 5 | 0 | 100.0% |
| 127 Flouride supplements? | 917 | 340 | 2 | 0.6% | 2 | 0 | 100.0% |
| 128 Hearing Screening? | 906 | 301 | 52 | 14.7% | 52 | 0 | 100.0% |
| 130 Hepatitis A Virus? | 942 | 315 | 2 | 0.6% | 1 | 1 | 50.0% |
| 131 HIV Counseling and testing? | 1112 | 144 | 3 | 2.0% | 3 | 0 | 100.0% |
| 133 Meningococcal Vaccine? | 942 | 317 | 0 | 0.0% | no responses | | |
| 134 Oral Cavity exam? | 915 | 308 | 36 | 10.5% | 36 | 0 | 100.0% |
| 137 Sharing needles or syringes? | 1111 | 143 | 5 | 3.4% | 4 | 1 | 80.0% |
| 138 Skin exam or protection? | 1027 | 197 | 35 | 15.1% | 35 | 0 | 100.0% |
| 139 Tuberculin Skin Test? | 906 | 316 | 37 | 10.5% | 37 | 0 | 100.0% |
| **Question Group: 11 - PMS/FHS Adolescent/Pediatric Health Screening** | | | | | | | |
| Totals: | | | 249 | | 247 | 2 | 99.2% |

*Report Generated Friday, February 25, 2000*

*ired by MCR - Philadelphia, P*

Report of Survey Results

Survey: ACME HMO - CHART AUDIT 6

Report Scope: SITES: ALL
PROVIDERS: ALL
VISIT DATES: ALL

Aggregate: GRAND TOTAL

| | Skips | N/A | Scored | Scored % | Pos | Neg | Pos% |
|---|---|---|---|---|---|---|---|
| Aggregate: GRAND TOTAL | | | | | | | |
| Totals: | | | 44429 | | 42482 | 1947 | 95.6% |

Surveyor's Initials: ___________

Key

- Skips - Questions left blank during survey or skipped by the software.
- N/A - Questions not skipped, but not answered or scored.
- Scored - Questions answered and scored.
- Scored % - Scored / (Scored + N/A). Excludes skipped questions.
- Pos - Questions answered and scored that matched the positive score value.
- Neg - Questions answered and scored that matched the negative score value.
- Pos % - Pos / (Pos + Neg). Percent of those scored and answered that matched the positive score value.

*Report Generated Friday, February 25, 2000* *powered by MCR - Philadelphia, PA*

FIG. 38K

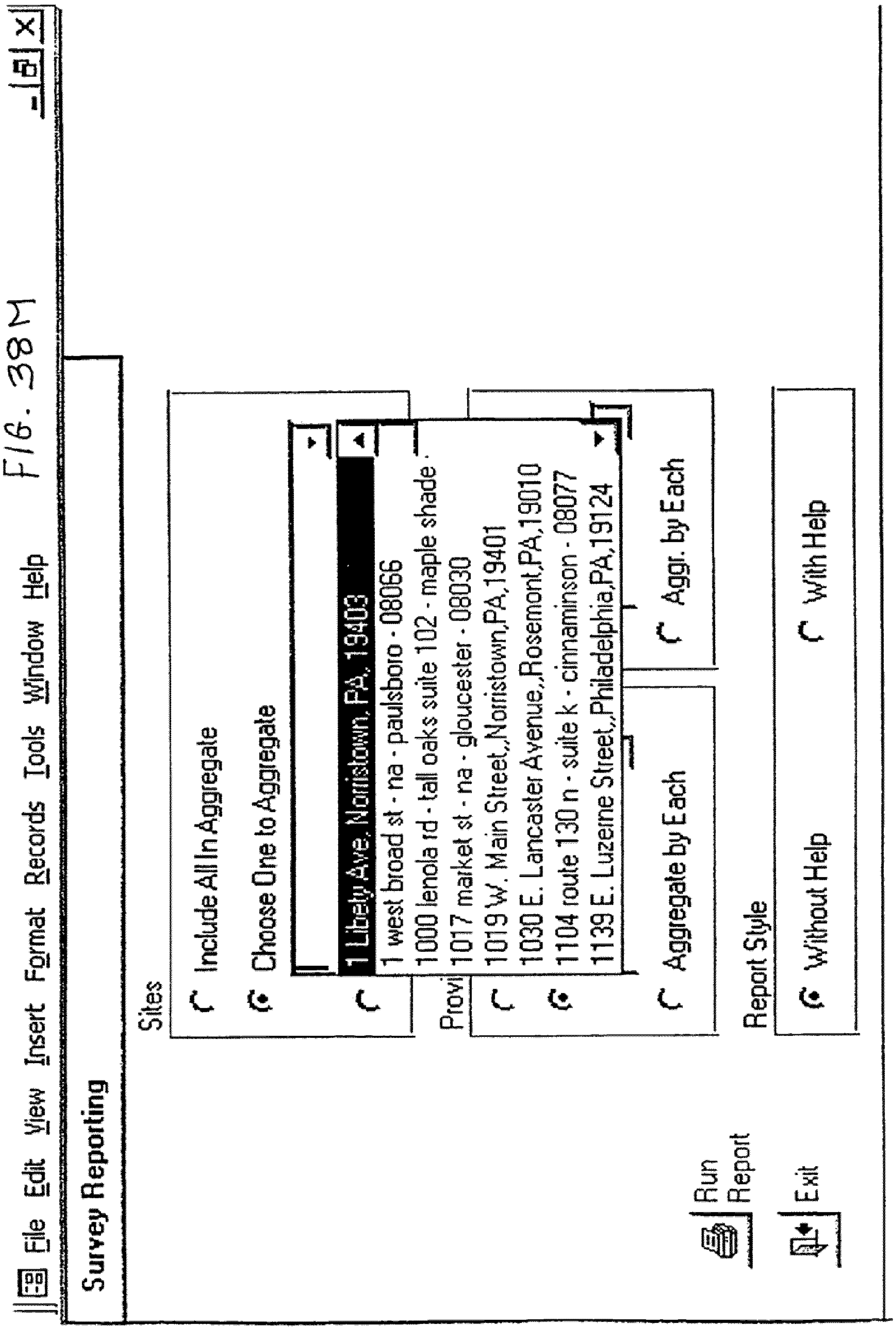

FIG. 38M

Survey Reporting

Sites
- Include All In Aggregate
- Choose One to Aggregate

  | 1 Liberty Ave. Norristown, PA. 19403 |
  | 1 west broad st - na - paulsboro - 08066 |
  | 1000 lenola rd - tall oaks suite 102 - maple shade |
  | 1017 market st - na - gloucester - 08030 |
  | 1019 W. Main Street.,Norristown,PA,19401 |
  | 1030 E. Lancaster Avenue.,Rosemont,PA,19010 |
  | 1104 route 130 n - suite k - cinnaminson - 08077 |
  | 1139 E. Luzerne Street.,Philadelphia,PA,19124 |

Provi
- Aggregate by Each
- (selected)
- Aggr. by Each

Report Style
- Without Help
- With Help

Run Report
Exit

VISUALIZATION OF DATA RELATIONSHIPS BETWEEN COMPONENTS OF A PROJECT

CROSS-REFERENCE TO RELATED APPLICATIONS

This application is a continuation of copending U.S. application Ser. No. 11/017,519 filed Dec. 20, 2004, which, in turn, is a continuation of U.S. application Ser. No. 09/724,541 filed Nov. 27, 2000. The entire disclosures of both applications are incorporated herein by reference.

This application claims the benefit of U.S. Provisional Application No. 60/192,094 filed Mar. 24, 2000.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The present invention relates to a system for portable digital data capture and data distribution. More particularly, the present invention is related to an object-oriented computerized data capture and data distribution system that is employed to construct a portable digital data capture project from component objects and the like, to forward subsets of the project for the purpose of registering transactions, and to persistently save, recall, reconcile, and share the project. A real-world digital data capture and distribution project consists of four major components. First is the definition of the project: what data is to be captured, how input is to be made, what are the protocols for acceptable input, and how it is to be captured. Second is the logistics management of the project. This includes the functions and relationships for information such as: users with access to the project, user assignment details, forwarding project components to the field, managing changes and additions to the project, report distribution, and the like. Third is the capture of the data, which is conducted mostly by mobile personnel. Fourth is the design, development and distribution of reports on the data collected.

2. Background

A typical data capture and data distribution system employed in healthcare industry contexts uses a piecemeal software approach with many steps, each of which involves complex, redundant, and subjective human interaction on many trivial aspects of the process. In the definition stage of the project, text based forms for data entry are manually designed, developed and distributed in the field. The content of the forms and criteria for each data field in the forms are designed and then developed into a template, using software (word processor, spreadsheet, form maker, etc.). These forms may or may not have individual field restrictions for data entry. The software determines the format of these templates. The software with which the template was developed and the template itself are e-mailed or hand delivered and then loaded onto a device with memory and an operating system. In the data capture stage, a human completes the work according to their interpretation of the data collection criteria and protocol. The human then enters input into the text-based forms as a response. After a user makes input into the template, saves it with a file name, then distributes it by hand delivery, mail, e-mail or fax machine, responses are separately gathered from the field workers and data is entered into a database for storage, analysis, and development into reports. Reports on these responses are then separately designed, developed and distributed. These reports are distributed by hand delivery, mail, e-mail or fax machine. The text-based forms and the resulting response data are generally stored in any combination of the following: word-processing documents, spreadsheet documents, e-mails, and paper files, which may or may not have links to external databases. These external databases supply some data that the human user refers to when entering data into the text-based form. During each step of the data capture and distribution project using this system, many components of the project involve the management of logistics. Text-based forms are organized, copied and distributed, distribution of and changes to forms are tracked and the return of forms is managed. In addition, a manager checks for correctness of input by users; requests, manages, distributes and tracks what specific materials are to be reviewed or measured; distributes information on where these materials are located; etc. Even though some software and technology has been applied to data capture and data distribution, there are many opportunities for human error because the conventional system requires numerous human interactions with the project. Such errors include but are not limited to a loss of forms, distribution of out of date forms and then the collection of data with these forms, redundancies of assignments, misfiling, and data entry errors.

An important component of data capture and data distribution of the present invention is managing the logistics of data collection assignments. Logistics include but are not limited to the definition of an assignment, the tracking and managing of form creation/distribution, organizing the deployment of personnel and materials involved in a data capture project and distribution of assignments. Currently, a system for managing the logistics uses a separate piecemeal software approach to the problem as well. Logistics data is generally stored in any combination of the following: word-processing documents, spreadsheet documents, e-mails, and paper files, which may or may not have links to external databases. These external databases supply lists that are used for different components of logistics, such as assignments. The content of an assignment is predetermined. However, the format of assignments is determined by the software used (word processor, spreadsheet, form maker, etc.). E-mail or hand-delivery distributes the software with which the assignment format was developed, along with the assignment data. Managers who input and track assignment data access the software. Investigators in the field are distributed assignment data that pertains to them and refer to the assignment data, which is input in the data collection template. Any management or tracking of reports on the status of work assigned or the field workers assigned are separately developed, aggregated and then distributed by hand delivery, e-mail or fax machine as well.

To understand the conventional system and to visualize how a computerized system of the present invention has tremendous commercial value, an example of a pharmaceutical company's data capture and data distribution project is presented for the purposes of explanation. A pharmaceutical company (also referred to herein as "pharma") designs the templates and the protocols for input on each item that is to be measured or reviewed by clinical trial investigators during real-world data capture and data distribution in a Phase IV clinical trial. A data collection template that requires design, development, and distribution consists of the following items: question text; spaces to input responses; blanks for entry of demographic information about the review assignment (investigator name, address of the review, medical record number of the record being reviewed, date of the review, etc.) and directions about how to complete and save the template. To create a template, all of these components are developed into a word processing software or spreadsheet software template for data entry. Investigators receive the platform-dependent software from which the template was developed by hand delivery or e-mail. This software is loaded onto a specific hardware platform with memory, such as a laptop computer. In addition to the software, investigators receive by e-mail, mail, fax or hand delivery, and the text-based template for input of responses. Investigators also receive a separate list of medical record numbers of patients whose data is collected for the trial, along with a list of the doctors' names and addresses, whose patient records are to be reviewed as a part of this clinical trial. The data on these lists, which comes from external databases, are data entered by the investigator into the template as text response. When the investigator makes all inputs, the template is saved with a file name, then mailed, e-mailed, hand-delivered or faxed to pharma headquarters. At pharma headquarters, input is data entered into an external database and reports on these inputs are designed, developed and distributed by mail, e-mail, hand-delivery or fax.

In the example of a Phase IV clinical trial, assignment data consists of numerous items that all require definition, organization, management and tracking. These items include but are not limited to the name of the person requesting the review and the date of the request; the type of template to be used; the name of the doctor(s) and/or patient(s) record(s); and the complete demographic data, including suite number. Additional items include the investigator assigned and the date scheduled for the review; the completion date; and investigator or manager comments. To manage assignments, a template is developed for data entry of these items into word processing software or spreadsheet software. Investigators receive by hand-delivery or e-mail, the platform-dependent software from which the assignment templates were developed. This software is loaded onto a specific hardware platform with memory such as a laptop. Investigators refer to the assignment data that pertains to them and input part of the assignment data as a response in the data capture template. Investigators may also receive separate lists of medical record numbers along with separate lists of the doctors' names and addresses. The data on these lists are to be input into the templates as a separate response. When all inputs are made, the investigator inputs the date of completion into the assignment template, saves it with a file name, then e-mails, hand-delivers or faxes to pharma headquarters. At pharma headquarters, assignment data is removed from the template and entered into an external database. Mail, e-mail, hand-delivery or fax distributes management and tracking reports, prepared separately.

Such an approach has the advantage of supporting uniformity of data capture and assignment templates among users who are given the same templates. The software automates the scoring process, thus eliminating calculation errors. Also, additional data entry can be eliminated if responses can be imported from the software with which they were developed into an external database. In a system implemented with great attention to hardware and software version compatibility, data files created with one version of the software can be viewed by other versions of the software regardless of the hardware platform. This approach works well if questions, response choices, scoring, users, hardware, and assignments rarely change and quality assurance is performed on each of the data files. Quality assurance will ensure that data entered in responses are in accordance with predetermined criteria and that data entered from information on lists from external databases have been copied exactly, eliminating what appears as a duplicate entry but is actually not a duplicate entry.

A system such as described above lacks the speed, sophistication and flexibility to distribute, track, organize and manage changes or additions made to any or all of the components of the data capture/data distribution process at the same time without disturbing any aspect of the process. Components of a data capture and distribution process, such as logistics information management and data capture templates, are modified and added often, in order to fulfill complex data capture and data distribution needs. For example, during a clinical trial, investigators' inputs into templates may reveal that a change in the protocols for the templates is required. These changes to templates must be developed and then distributed quickly to all staff as required. Furthermore, multi-platform multi-software, and multi-version software support is a serious burden for the producer of the templates, the manager of the project logistics, the investigators making inputs, the staff creating and distributing reports, and the individuals to which the reports are distributed. All required reports are designed and developed as a separate component to the project.

To properly conduct data capture and data distribution, in healthcare or otherwise, a CDCDS must not just present separate templates for data entry of text responses and text assignment requests, which can be imported into external databases. Developing templates for each change to a data capture and distribution project is costly, time consuming, and labor intensive. Managing the logistics of distributing changes to data capture templates and assignment data to the appropriate personnel done with the above system is replete with errors and redundancies. Developing and distributing reports on the data collected is labor intensive, time intensive and programming intensive.

Data capture and distribution must be considered as a whole, from the design and development of project definition, to the data capture and the management of logistics for the project, and all the way through to distribution of reports. The data structures and the flow of information must support all of these components together and must remove redundant and trivial tasks, thereby streamlining and automating the process. There must be a complete representation of the relationships between all the components of the project. For example, the system used during a data capture and distribution project must incorporate the protocols for how input is made, what data is referenced as part of the inputs, what reports are needed, and what parts of the project are to be distributed to whom. In conjunction with these needs, there must be a complete representation and visualization of the relationships between the logistics components of the project. This would help prevent overlap in a situation where a site audit is being conducted. For example, if the manager can see that there are two doctors at the same site, then there is no need to do a site review of both doctors who share the site. In the conventional system, items are entered into a database separately without the ability to visualize other relationships between items in the database. Doctor A at 123 Main St. of the "Temple Medical Practice" will not be seen as grouped with Doctor B at 123 Main St. of "Temple Medicine." All of the project components and any changes/addition to the project components during the completion of a data capture and distribution project need to be speedily communicated to all designated parties. However, the most efficient strategy for organizing and storing data for capture and distribution does not just relate to the text alone but also relates to the properties, relationships, functions of and message with each of the components and to any of the parties involved.

The data types expressed in data capture and data distribution with the conventional piece-meal software approach vary widely between software (spreadsheets, word processing, file maker, etc). Therefore, it is not practical to express all of the possible combinations of data types within the software programs that are part of this system. Data from differing software may be simultaneously required in arbitrary combinations by a user. Therefore, multiple unrelated software specific tools cannot be employed. Human interaction is required to manually review and match the project requirements with staffing, information, and reporting needs.

CDCDS Requirements

A CDCDS must solve the problems described above by providing flexible programming tools that allow a user, having domain-specific expertise to develop programs and data structures into "schemas" relevant to any such domain data capture and data distribution project requirements. For example, in a phase IV clinical trial of a diabetic medication, certain programmed domain-specific components ("objects") will be integrated in a schema to capture information on dates of medication orders, and the information on test results. If a phase IV clinical trial were to be conducted on a biomedical device, different objects would be developed whereby the objects representing barcode data capture or device specific data from biomedical hardware can be integrated into a project. A user of the CDCDS employs one or more such schemas that can be combined and integrated in arbitrary combinations in conjunction with a single project. The users must be able to customize the combination of objects and their relationships and functions without additional programming. A user with project expertise is responsible for the identification of the objects and the relationship to other objects in an environment. A CDCDS must provide the ability to mark objects with certain functions specific to the project and mark the messages that will be passed between objects. A CDCDS must also reveal to users a visual representation of relationships in the project, in order to fully manage the flow of information and automate the organization and management of the logistics of a project. For example, in a Phase IV trial, investigators will receive a project subset forwarded to them for data input. The input made by investigators in this project subset is then reconciled with the project. During reconciliation, the investigator's project subset will be changed, reflecting updates made to the project by other users. An example of an update would be a change in protocols for the clinical trial. This, in turn, will affect changes in the data capture project as a whole, and these changes need to be forwarded to other users.

To accomplish such goals, the CDCDS must address the following concerns:

a. Data Portability and Longevity

In large organizations, groups involved in portable data capture and data/report distribution often work on multiple different types of mixed hardware and operating system configurations ("platforms"). Moreover, the life cycles of a project will often exceed the lifetime of one or more of such platforms. Accordingly, it is essential that CDCDS data that originates on one platform be useable on any other platform without translation. As a result, the CDCDS does not constrain the otherwise natural progression to the most cost effective computer systems. Furthermore, a project defined by such CDCDS data can be archived and reactivated years later on a new platform without any loss of integrity. Similarly, the type, the meaning, and the flow of the information in a project can change dramatically throughout the project life cycle. For example, the project has been changed to include signature capture during the data capture and distribution project because changes in industry regulations now requires this type of data capture. Or a question response type needs to be changed from a yes/no response choice to a yes/no/NA response choice because investigators reported the need for the additional response category after initial data capture in the field. It must therefore be possible to refine and revise the schemas that are used by the project (i.e., allow for "schema evolution") without jeopardizing the integrity of the previously created CDCDS data.

b. Data Integrity

A CDCDS stores valuable information. However, the value of the information can only be secure if the data capture and distribution project created by the program is standardized, reliable and accessible. To ensure that the data in a CDCDS project maintains internal consistency, it is necessary that such data always be accessed and modified by the same schemas that defined and created the project. It is therefore essential that schemas be easily accessed and ubiquitous with respect to the CDCDS project. Moreover, a CDCDS must minimize the need to produce and distribute copies of the CDCDS project. When multiple copies of the same project exist, any individual copy stands a greater chance of being rendered partially or wholly obsolete. For example, many investigators will access a data capture project, such as a phase IV clinical trial to input data at a remote site, during a review of medical records. In addition, managers will be adding assignment requests to the project and researchers will be modifying project protocols for the clinical trial. These changes need to be made without interrupting the workflow or the flow of information for any of the users. Another example of the need to ensure data integrity is when assignment requests from managers need to be forwarded to the appropriate investigators during the clinical trial. This data needs to be forwarded as part of a project subset. Simply supplying investigators with a blank field for data entry of assignment demographics and an assignment list does not guarantee that the data is consistent for the manager requesting assignments and for the investigator inputting data several different times at a remote site. Errors are rampant when a human user copies input between components of a project. When a report on this data is supplied, these data entry errors skew project results.

c. Data Accuracy

A CDCDS aids in the capture and distribution of data, whose accuracy is very important to an organization. For example, in a clinical trial, the Federal Drug Administration (FDA) monitors data very closely for correct or missing input. In order to reduce input error and thus ensure greater compliance with input protocols, a CDCDS must allow the researcher to incorporate a level of "intelligence", including the complex logic of protocols, within a project. This intelligence will restrict the user from inputting data that is not in accordance with protocols, or will prompt the user to choose a correct input. The logic programmed into a project may even supply input in response to prior input. Such complex logic in a project must go beyond the conventional systems' ability to restrict data entry by programming a field-input mask. A CDCDS must allow users to customize the design and development of projects that will advance to, skip over and complete input according to the protocols that have been programmed in the project, without further investigator input. For example, in the clinical trial, when the patient birth date is entered, the CDCDS-generated project will automatically input N/A wherever input does not pertain to that age range. Multiple protocols must be able to be developed into a tool and changes to protocols must be distributed easily. In addition, a CDCDS must guard against users twice entering what appears to be duplicate data to the user, yet is not an exact duplicate. For example, 123 Main St. is not a duplicate of 123 Main St (no period after St). In a clinical trial, patient records from these two addresses will not be collated together. Thus, repetitive information will be included in the project, making the project results inaccurate.

d. Large and Complex Data Sets

The size of a typical CDCDS project can be quite large and complex and the project is often accessed using mobile hardware, which may have limited memory capacity. For example, a clinical trial project may require hundreds of inputs. The protocols programmed into a project may be complicated. In addition, complex logic that streamlines the workflow during data capture must be developed into the project. Additional inputs may be required based on previous input; inputs may be automatically repeated based on prior inputs; or an entirely new set of inputs must be made because of the previous input. The CDCDS must handle such large and complex projects efficiently and forward to the investigators only that subset of the project the investigator is working with. Investigators depend on the ability to access the project quickly and input the data quickly. The amount of information in a data capture project cannot be limited in a preset manner.

e. Aggregate Data Across Different Projects

Data captured by users on different real-world projects must be aggregated for the purpose of complex analysis of the data. For example, a tool that is used to capture data for a clinical trial of an asthma medication may contain data that must be referred to for a clinical trial of a cardiac medication. These clinical trial projects are often managed and performed by different users. In addition, the projects may refer to different schema programs. For example, one project captures specific data types, text, and bar code data while another project captures signatures. These very different projects need to be able to refer to each other. However, the user may not know the relationship between projects when a project is designed. The organization of the components of the projects and the data must allow for sharing between projects without the need for complex forensic analysis of the data tables and additional database programming to incorporate the two projects or share data between projects.

f. Many Simultaneous Users

A CDCDS project is typically shared simultaneously by many users within an organization. In a Phase IV clinical trial, the managers, staff development, investigators, and medical directors will be involved in a shared CDCDS project. Some users require access for querying and inspecting inputs only, but others need access to add to or modify the project. Accordingly, the CDCDS must ensure that changes to the project are properly coordinated and that the project is kept in a consistent state at all times.

g. Many Simultaneous Schemas

Data capture and data distribution projects typically involve collaboration among several disciplines, each being represented by one or more schemas. A CDCDS is expected to facilitate the integration of the information created by each of the departments to allow easy and consistent access to users in other departments. Therefore, a CDCDS must store and manipulate information defined by multiple schemas simultaneously. Further, it must be possible for one schema to reference information defined in and maintained by another schema within the data capture and distribution project.

h. Flexibility and Extensibility

A programmer, with the help of a project designer, typically refines a CDCDS to meet the changing needs of the user. Additionally, a CDCDS is refined by the end user to include user-defined extensions. Since every user has different requirements, the ability to customize the system "in the field" is essential. Project components change often and rapidly. A CDCDS must accommodate the user in making rapid changes to the project while tracking and managing the new project information so as to make it immediately accessible to the users in the field. In addition, as project components are added and manipulated by the users, the CDCDS must allow for the cross-referencing between project components for the purpose of viewing the evolution of the project and for viewing relationships between data capture and distribution projects. For example, in a clinical trial, the scoring methods, protocols and the response choices may change from project to project. It is valuable to track statistical similarities and the validity of data captured as part of a particular project.

i. Performance

Data capture and data distribution projects are characterized by complicated data sets that are accessible by users who are away from the office. Yet users demand speed and convenience when accessing a project. A CDCDS must be able to organize and store data such that access time to the data is optimized. For example, users at remote locations need access to changes in protocols without returning to the office and without interruptions in their data capture.

j. Ease of Use

A CDCDS user is presumed to be expert in a particular type of data capture. For example, in a diabetes project for Phase IV clinical trials, the user is knowledgeable about the disease state of diabetes and the design and development of this type of project. However, she is not necessarily a sophisticated computer user and is not likely to be willing to invest valuable time in extensive training. Furthermore, since multiple users from different departments will employ the same CDCDS, the expertise of the users will vary widely. Accordingly, use of a CDCDS must be simple, intuitive and familiar.

CDCDS Implementation

A successful CDCDS must incorporate a robust environment for programmers to implement schemas, must provide an easy-to-use environment for users to employ those schemas on real-world data capture and distribution projects, and must be easy to use in the field. Accordingly, the CDCDS implementation must include at least the following elements:

a. Schema Environment

Schemas must contain all necessary information to display, manipulate, revise, and query any data capture and distribution project. There cannot be any application-specific expertise built into the schema itself. Schemas must be portable so they can execute on any platform that the CDCDS can execute. Schemas must also be inseparable from the project, must be flexible and expandable without requiring the original source code for recompilation, and must execute efficiently. Due to the size of hand-held hardware (the optimal choice for users working in the field) and the complexity of a project, the routines that process this information must do so in an efficient manner. Schemas must also be able to evolve over time such that they can be revised and extended as new requirements arise.

b. Application Framework

In order to manipulate the schema objects for the development of a project, the objects must be presented to the user in a familiar and easy-to-use environment, or "application framework." The user interface programs must be portable across all platforms on which the CDCDS runs so those users can choose among appropriate platforms. However, the application framework itself must interact with the Native Operating System on which the framework executes. Such interaction must be transparent to the user.

c. Visualization of Data Relationships

In order to get the efficiency, speed and standardization of a CDCDS and reduce the amount of data capture needed to accomplish the goals of a project, the user must be able to visualize the relationships between all components of a project. Users must be able to easily visualize the overlap, redundancies and duplication in the project. This will prevent error, in a data capture project and thus increase the speed of the project. For example, in the phase IV clinical trial, a data capture tool has been accessed and input made during a medical record review for Doctor Marcus Welby at 123 Main Street, Small Town USA. A different staff member already completed a review for Marcus Welby MD at 123 Main Street, Small Town USA. Ordinarily, without visualization of the relationship between these two assignments, the second review for this doctor would be performed. There would be no way to visualize the redundancy because his name appears as a different name. The only way a user would verify a similarity is to look up the data by doctor and by site and compare these two entries. With relationships between data tables and queries organized to visually reveal all relationships in an assignment, a manager requesting the assignment will immediately see the redundancy and can take steps to correct it. Additional efficiencies, other than detecting the above error, can be experienced with the ability to visualize relationships. For example, in the same clinical trial, a review is completed for Doctor Welby that includes capturing data on compliance with facility safety regulations. On a different date, the same review is to be performed for a different doctor at the same facility. Ordinarily, without visualization of the relationship between these two assignments, which reveals overlap of the review of the facility, a new assignment would be requested and duplicate data will be captured. Additional problems may occur for the project. For example, a duplicate review for the same facility conducted by a different staff member may result in a different score for this facility. Although duplicate reviews are sometimes conducted for inter-rater reliability (work comparisons) between reviewers, an unknown duplicate review with a different score will foul the entire clinical trial. With the ability to visualize the duplication of assignments, a manager can choose to accept the duplication or not.

d. Distributed Components

To help prevent data obsolescence, a CDCDS must allow for having a certain subset of the project distributed out to users in the field. At the same time, a "live connection" to the distributed portion must be maintained in each project subset where it is referenced.

e. Tool Persistence

State information for project components must be maintained across editing sessions. Accordingly, objects must be dynamically reinstated each time the CDCDS is used to forward, view or manipulate the project.

f. Synchronous Data Reconciliation

When an object in a project is changed, other objects in the project may change as a result. A CDCDS must reveal relationships between objects so that those changes to objects downstream may be executed. If these changes result in an invalid or inconsistent project, the changes do not affect the data that has been captured. Multiple users throughout the life of a project access a CDCDS project on a real-time basis. Time delays must not be caused by the requirement to perform reconciliation between differing data sets that have been created by users. Certain sets of users access the CDCDS project to modify design and integration or to change other components of the project, such as logistics data. Other users access the project to input data. Each set of users will need to be updated with only the specific changes that affect their aspect of work in the project. The project will have changed many times and users in the field will need to receive these updates without having their workflow interrupted and without having to return to a central location for synchronization. This reconciliation of data in a CDCDS project must occur while other users access the project. Users, who are accessing and changing the design of the project, must be able to reconcile with users in the field so that all users have access to the latest changes without complex file naming conventions or without distribution of multiple versions of a CDCDS project. For example, in the clinical trial, certain users will be accessing the CDCDS project to input data, while other users access the CDCDS project to make changes in the criteria. Both users must be able to perform their tasks without loss of data or version control problems.

g. CDCDS Logic

A CDCDS project needs to aid users in the capture of data that is very important to an organization. These users have domain specific expertise, and they usually access a CDCDS project that pertains to their expertise. For example, in a clinical trial, nursing staff will input nursing data, while pharmacists will input pharmaceutical data. In certain cases, a machine such, as a medical device, will input body temperature readings. Users often need to remember input protocols, and protocols change often. For example in a clinical trial, specific protocols require an input if a patient is an adolescent. In addition, other protocols will require an input if an adolescent is a patient between the ages of 13-17. In order for inputs to be made correctly, an investigator must view the birth date of the patient, calculate the age of the patient, recall the protocol requirements and then make the appropriate input. A CDCDS project must aid the user by automatically referencing the designated protocol for input, then input automatically (i.e. enter a value automatically) and then reveal only the remaining input requirements. This complex logic in a CDCDS project needs to be flexible enough to change as the protocol changes. Since the CDCDS project automatically enters input, the user moves more quickly through the work and incorrect inputs are reduced. In addition, a data capture project may contain specific process protocols. For example, in a clinical trial, skipped input is not accepted. Input must be chosen from a limited list of choices. These process protocols must be programmed as part of the CDCDS project, which must be flexible and extensible enough to include changes to the process protocols that are immediately accessible to the users.

h. Project Management

A CDCDS must maintain the integrity of all project components. Accordingly, mechanisms are required to: lock portions of the components to regulate multi-user access; control revision access; create and manage parallel development to the same project; and prompt users who access the project to follow the logical requirements of a data capture project. In addition, changes from multiple users on the same project need to merge. A permanent identification of specific versions of constituent projects as contributing to a particular state of the project is required, and access to the database according to graduated security levels needs to be regulated.

The present invention comprises a computerized data capture and distribution system ("CDCDS") that electronically organizes all the components of a data capture and distribution project for design, analysis, manipulation, simulation, visualization, integration, decomposition, storage, retrieval and reporting. The present invention is highly suited for any environment where data is captured and distributed from/ between remote locations or by mobile workers and reports are generated from the data. This invention would be useful in projects such as clinical trials, and pharmaceutical "detailing"; sales management; auditing sites, records, or inventory; conducting surveys; enrollment; and inputting and surveying data in medical records.

To address the requirements discussed above, the preferred embodiment of the present invention includes an object-oriented schema implementation programming language, a compiler, a linker, a run-time system, an object-oriented data transport schema, and a project database with data tables in specific relationships. The programming language is based on C++(although Java and XML objects can be used) and is employed to write schema programs that are compiled using the compiler. The output of the compiler is an object file. The linker combines a group of object files into an executable program that is portable across many platforms, where each platform has a run-time environment tailored to that platform. The run-time environment contains only the absolute necessities to execute the application on that platform. Each program may also be a shared library. If so, the program exports references to these classes, functions, and variables. Other programs can have references to these classes, functions, and variables resolved at run-time. A program may both import and export references. That is, the program may use other shared libraries and may serve as a shared library for other clients. The object-oriented data transport schema is based on C++(although Java, XML or other object-code can be used) programming language. The transport schema implements the various objects that are integrated into a data capture project, their functions, and how these objects are to function under specific transport circumstances. Specific relationships between tables in the project database are employed to allow visualization of data redundancy, overlap and errors. In addition, these table relationships are employed to visualize the shared commonality between items in any tables.

The present invention includes schemas for computerized creation, management, distribution and reporting of a portable data capture and data/report distribution project. The present invention also includes schemas for forwarding project subsets to workers in the field. During said transport, the versions of the project that are created or changed by users in the field are reconciled with the project database. In addition, specific data table relationships allow visualization of data that is entered and accessed for the creation, organization, tracking, management, and reporting of the logistics of a data capture and distribution project, along with any additional components.

The schema programs, the transport programs, and the specific data table relationships create, manage, distribute and report project components for a predetermined domain. Such domains include pharmaceutical, healthcare, insurance and other industries. The schemas represented by the schema programs represent multiple classes. Each defines a data type that can be placed in a CDCDS project, and defines how that object will interact with or affect other objects of the project. Objects or instances are created from each class as each object is placed in the project, marked for a specific use in the project, and marked for a specific type of reconciliation during data transport. This includes specifying the data variables, and the program code used to manipulate the variables.

Objects are stored in one or more repositories or "stores." Related stores are grouped into a "data capture and distribution" project which relates to a real-world project in healthcare or a real-world project in other industries. The CDCDS manages and stores any or all projects in a project database, on a networked server, with dial-up access so that multiple users both in the office at a desk and out in the field with mobile hardware can be given concurrent access.

First, all objects, their functions and how they will relate in a data capture and distribution project are added to the project database. The project database lists all the objects that are currently programmed in schemas, and which can be integrated as a project. The user then starts a session for the purpose of creating a data capture and data distribution project. The user will choose objects to integrate into a project and mark those objects with their functions and how these objects will relate to other objects. In addition, the user will mark how the functions of objects will relate to the functions of other objects. The following explanation describes how a user without programming skills, but who understands the nature of data capture and distribution projects in healthcare, creates a "project." The user accesses a set of forms, queries and macros written in Visual Basic language in the project database. These forms and queries restrict data entry in tables in a specific order and within certain parameters so that the project created in this manner meets the requirements of a real-world data capture and distribution project. Since a real-world project includes the management of users and differing levels of user access to the project, these forms, queries and macros help the user, who is creating the project, to set up the access requirements. The initial user, in addition to setting up access permissions, designates a second set of users—the field workers—to receive a forwarded project database. This allows the user who creates the CDCDS to mark objects for integration into a project and then to create entirely new projects by simply changing the relatedness of the objects. This eliminates the need to build entirely new projects from scratch.

Secondly, the users in the field begin a user session by executing a query of the project database to extract the subset of the project (for example, a number of related objects marked for their use) from the project database into a local database. The format of objects in the project database and in the local database is often different, so translation is necessary. This extraction is a long-term transaction to the project database. The user will have no further interaction with the project database during the user session. Changes or additions can be made to the project objects during an editing session by the first user, as well as by the field workers. These changes and additions can be posted to the project database at the end of a user session. Conflicts are reconciled by the transport schema that has been given designated functions and is carried out when users communicate with the project database at the end of a session.

Objects in a project database are defined and interpreted by the combination of instance data and class methods. Therefore, instance data cannot be interpreted without the related schema that corresponds to it. To maintain integrity of the project data, it must never be possible to encounter any instance without the corresponding schema. Due to this constraint, the CDCDS treats the programs that comprise a schema as a component of the project database, as with the instance data and the project components. In this manner, whenever an instance of a class is created in a project database, the schema of that created instance is also copied into the database. Thus, whenever instances of the class are extracted in future sessions, the schema is loaded into memory from the project database. The architecture is modular so that new data types can be easily added by modifying the field type object. Because the CDCDS is object-based, information can also be shared with other object-based programs by publishing appropriate interfaces. These facts are important since many programs across an organization refer to data captured and distributed during a real-world project. In addition, specifically arranging data in tables in the project database visually reveals relationships between items in the database that ordinarily seem unrelated. This visualization allows the users to instantly see the components of a project in their relationship to other components. A user can see information that helps them make decisions about the project management. These specific relationships between data in tables can be used by any database format.

BRIEF SUMMARY OF THE INVENTION

A computer system and method for mobile Internet (portable) digital data capture and data distribution, where the computer system has a storage device, first and second platforms, a portable digital data capture and data/report distribution project, a means to forward a project subset during synchronous reconciliation between the first and second platform, and a first and second platform independent computerized data capture/distribution system (CDCDS). These systems and methods automate the definition, design, creation, manipulation, tracking, visualizing and distribution of a data capture and distribution project. Each platform is interfaced to the storage device and provides system-dependent services. The first platform has a first type of operating system and a first type of computer hardware including a first memory, and the second platform has a second type of operating system and a second type of hardware including a second memory. The digital data capture and distribution project resides in the storage device in a platform independent format and includes persistent component objects. The first CDCDS resides in the first platform memory and the second platform dependent CDCDS resides in the second platform memory. Each CDCDS provides CDCDS services that include: retrieving the digital data capture and data/report distribution project from the storage device; manipulating the project; changing the project by adding, redefining and removing persistent objects; marking the project for forwarding to the first platform; persistently saving the project to the storage device and reconciling versions; and marking the project for distribution on the Internet.

The present invention includes the following steps in a data capture and distribution project:

1. Write object-oriented code that defines data types, function, methods, and logistics of a data capture and data distribution project.
2. Integrate the objects into a group of objects, which represents a real-world project and define the function of and logistics of objects in the group.
3. Query a subset of these objects from the project database for the purpose of forwarding the subset to users or devices, which will perform transactions or view reports on this subset.
4. Perform transactions using this subset of objects.
5. Query the project database for the purpose of forwarding and synchronizing any changes made to the subset by any user or device.
6. Visualize and manage the logistics of the project.
7. Write new objects code and make the objects available for integration into any current or new project.
8. Write new visual interfaces and add to the project framework to automate additional functions.

BRIEF DESCRIPTION OF THE DRAWINGS

The above summary, as well as the following detailed description of a preferred embodiment of the invention, will be better understood when read in conjunction with the following drawings. For the purpose of illustrating the invention, there is shown in the drawings an embodiment that is presently preferred, and an example of how the invention is used in a real-world project. It should be understood that the invention is not limited to the precise arrangements and instrumentalities shown. In the drawings:

FIG. 1B is a legend that illustrates the items in FIG. 1A for easy reference;

FIG. 8D illustrates the use and storage of choice tables;

FIGS. 17A-17H illustrate the relationships between the objects that are present in the preferred embodiment of the present invention;

FIGS. 18A-R deal with the logistics component of the CDCDS wherein FIGS. 18A-18L are screen shots of the logistics manager, FIGS. 18Q-18R are diagrams of the relationships visualized through the logistics manager;

FIGS. 19-28 are paper forms used in the conventional system for data capture and distribution;

FIGS. 29A and 29B are examples of a time-line outlining the steps for the preferred embodiment of the present invention;

FIGS. 32A-32E are screen shots of the project creator/report generator pertaining to field input forms;

FIGS. 33A-33*o* is a printed report of the field input forms as they appear on a survey;

FIG. 35 is a printed report of the field input forms for a chart audit 6 with the fields marked as key;

FIG. 36 is a printed report of the field input forms for a site environment 4 with fields marked as key;

FIGS. 37A-37G are screen shots of the second platform hardware of various field input forms;

FIGS. 38A-38K is a printed report based on the real world project; and

FIGS. 38L-38N are the screen shots from the project creator/report generator.

DETAILED DESCRIPTION OF THE INVENTION

Figure 1A:
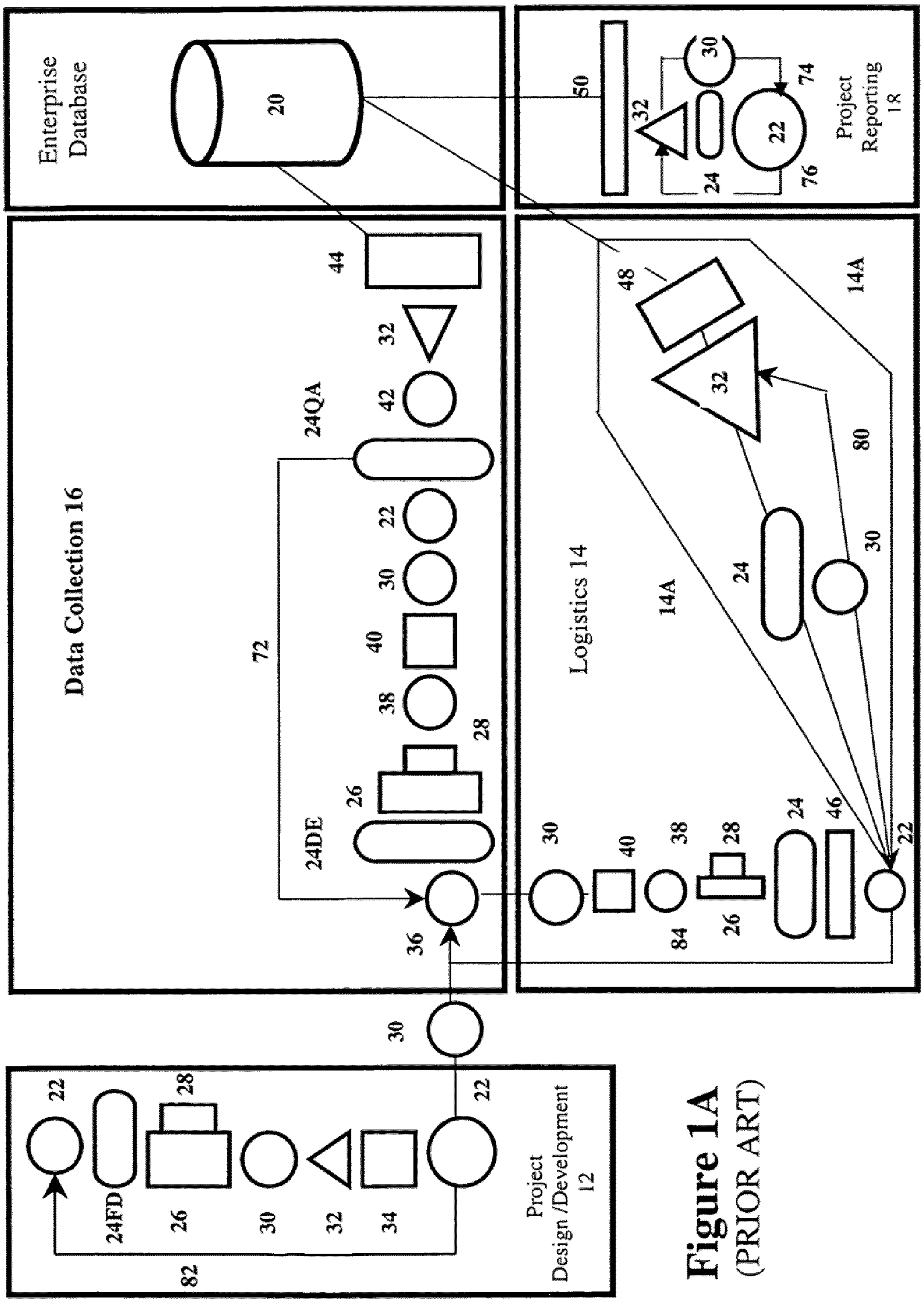
FIG. 1A is a diagram of the conventional (prior art) process workflow for a data capture and data distribution process.

Certain terminology is used herein for convenience only and is not to be taken as a limitation on the present invention. In the drawings, the same reference letters are employed for designating the same elements throughout the several figures.

1. Overview of Present Invention

One of the novel concepts of the present invention is the use of objects which have the specific purpose of capturing data. Therefore, most of the objects used in the present invention may be referred to as "data capture objects" since they are used in one or more capacities to capture data. Table structures define the relationship between the data capture objects.

The present invention provides a data capture system having a project database which comprises a plurality of the data capture objects that are relevant to the project, and the table structures. The project database includes a plurality of project subsets. Each project subset is defined by a specific subset of the data capture objects which are required to perform the project subset.

In one embodiment of the present invention, the system includes a remote data capture input device (e.g., a handheld computer such as a Palm V organizer) and a central data capture management device. A subset of the plurality of data capture objects is downloaded from the central data capture management device into the remote data capture input device.

The central data capture management device uses shared libraries. However, neither the shared libraries nor their code are downloaded to the remote data capture input device. Thus, the project subset in the remote data capture input device implements the data capture process without a shared libraries or their code.

Shared libraries define the functions and some properties of objects. However, the data capture objects used in the present invention are defined by the project that they are located in. Thus, the use of shared libraries would not allow for the flexibility that data capture objects need to move from project to project. By avoiding the use of shared libraries with data capture objects, new projects can be created without having to change the code to define and reference more objects.

All of the properties of the data capture objects are not defined at the object's creation. Some of the properties of the data capture objects are not defined until they are placed into a project (i.e., marked for use in a project subset). The data capture objects have to be encapsulated with their respective relationships so that they can be moved into or shared with other projects without carrying the shared libraries or the entire database with them. Some necessary properties of the data capture objects include ownership, placement, transport between hardware, and a way to track them.

In sum, the present invention performs the following data capture process:

(1) A project database is created which includes a plurality of data capture objects that are relevant to the project. The properties of the data capture objects within the project database are partially defined.

(2) One or more project subsets are defined from a specific subset of the data capture objects. Additional properties of the data capture objects are defined as part of the project subset creation process. The additional properties may be different depending upon the project subset that the data capture objects are associated with. The additional properties define how the data capture objects are supposed to function in the project subset (e.g., which users of the input device are entitled to use the data capture objects, and which programs should receive the data capture objects). The additional properties provide the information which is normally obtained from shared libraries.

(3) The data capture objects of the project subset (s) are provided to a data capture input device, such as by being downloaded from the project database. No shared libraries or their code which exist in the project database need to be loaded into the input device.

(4) The input device executes the project subset using the downloaded data capture objects, and without needing any shared libraries or their code.

(5) After the appropriate data is collected, the input device is placed in communication with the project database and the data is forwarded to the project database for storage and analysis. One or more new project subsets may then be loaded into the input device.

2. Detailed Disclosure of Present Invention

FIG. 1A is a diagrammatic representation of the workflow and responsibilities for a conventional (prior art) system 10 data capture and data distribution. As can be seen in the drawing, the conventional system 10 includes several main components or sub-processes: project design/development 12, logistics 14, data collection 16, and project reporting 18, each which interfaces with an enterprise's main database 20. FIG. 1B is a listing of the items for ease of reference to FIG. 1A. FIG. 1A is a graphic representation of the involvement of non-technical staff (circles); technical staff (triangles); computer equipment, e.g., hardware, software, data template files (squares); logic (curved rectangles); and interfaces. Circles represent non-technical staff of varying skill levels that include managers 22, couriers 30, field workers 36, printer admin 38, and data entry 42. Triangles represent programmers 32 of varying skill levels. Squares represent template software 26, templates 28, mobile hardware 34, and printers 40. Curved rectangles represent logic 24, quality assurance logic 24QA, data entry logic 24DE, and form design logic 24FD that is performed by staff, for example, requesting an assignment based on skill level or territory, choosing what forms to complete for an assignment, or choosing answer types. Rectangles represent data entry interface 44 to the main database 20, logistics reports interface 48 to the main database 20, and report interface 50 to the main database 20, as well as lookup for work due 46.

Every transfer between a circle and a square in FIG. 1A takes time and money and introduces the potential for communication errors. Capturing and distributing data and reports is a vital part of the ever-changing enterprise. Therefore, changes to every aspect of data capture and data/report distribution are made frequently. Any changes must be tracked and organized so that old designs and old report parameters are removed from circulation before implementation of the new ones. The new design and new report parameters need to be distributed to appropriate parties. All staff involved in the conventional system 10 must be trained and retrained with each change. Data capture and data/report distribution occurs nearly everywhere in the health care industry and in other industries where the organization depends on getting information from workers and sharing that information across the enterprise. As mobile hardware and telecommunications services are more widely used, the enterprise needs to take full advantage of the hardware and services available for data capture and data/report distribution. The errors, redundancy, and lack of efficiency that is self evident in the conventional system 10 depicted in FIG. 1A are costly. In healthcare, 30 cents of every dollar of the 1.4 trillion dollars spent on healthcare in the United States are attributable to administrative activities. The preferred embodiment of the present invention can significantly reduce administrative costs and medical errors.

The following is a detailed discussion of the steps involved in the conventional system 10 of data capture and data/report distribution. For the sub-process project design/development 12, there exist numerous steps beginning at the top of the box. A manager 22 performing form design logic 24FD chooses template software 26 and develops a template 28, which will be used for data entry by field workers 36 in the sub-process data collection 16. In project design and development 12, a courier 30 takes the template to a programmer 32 who loads the template software 26 and the template 28 onto a hardware 34 which is returned to the manager 22 and is then delivered by courier 30 to a field worker 36 seen in data collection 16. In the sub-process of project design/development 12, every time a manager 22 needs or wants to make a change to the template software 26 or template 28, the entire sub-process experiences a design/development redo loop 82. Tracking all changes to the template software 26 and templates 28, recalling them from field workers 36 in data collection 16 and verifying that changes have been implemented require an additional sub-process (not shown) that is time consuming, costly, and has tremendous potential for errors. For example, errors may occur if field workers 36 are not using the most recent templates 28 and template software 26. One suitable hardware 34 is a handheld computer such as a Palm V organizer, manufactured by Palm, Inc., Santa Clara, Calif. The embodiment of the present invention described herein uses the Palm V. Other Palm models, and other brands and types of handheld computers may also be used.

For the sub-process logistics 14, there are numerous steps to managing, tracking, and organizing logistics. Since data capture and data/report distribution are time sensitive and affect other departments, errors and slow-up due to multiple steps may mean that other departments in an organization experience work stoppage and errors as well. Coordination of efforts and tracking that updates and changes are made appropriately throughout the system requires a tremendous amount of time and effort on the part of the managerial staff, if it can be accomplished at all. In logistics 14, a manager 22 does a lookup for work due 46, performs logic 24 about which field workers 36 in data collection 16 should receive which assignments based on territory, skill level, etc. The manager 22 enters the assignments into a different template 28, which was developed in accordance with a different template software 26 from those used in project design and development 12. Then, a printer admin 38 pulls an assignment printout from the printer 40, which a courier 30 then delivers to a field worker 36 in data collection 16. In order to organize, track, and manage assignments, a manager 22 in the sub-process of logistics 14 is involved in a sub-sub-process of logistics reporting 14*a*. The manager 22 must perform additional logic 24 about what logistics reports she needs to request from a programmer 32 who builds a logistics report interface 48 with which the programmer 32 can print a report. This report is brought to the manager 22 by a courier 30 and will reveal the status of assignments to the manager 22. With the conventional system 10, every time a programmer 32 is asked to change report parameters, a modification logistics report request 80 occurs. Every transfer and communication between parties creates an opportunity for errors and tremendous time lag, which causes further errors. For example, if the field worker's 36 templates 28 have not been input into the data entry interface 44 by data entry 42 staff in a timely fashion, then the manager 22 of logistics 14 will be unable to use a logistics reports interface 48 to verify that the assignment was completed. Thus a redo of assignment request 84 will occur with a different field worker 36 who then performs duplicate data collection. Duplicate assignments increase errors. In healthcare, data entry errors create an additional work loop for a redo of an assignment request 84. This increases assignment workload for field worker 36 by 20-30%, which is costly and time consuming.

In the sub-process data collection 16, a field worker 36 has received assignment information on what work is due and when it is due by courier 30 from a manager 22 of the sub-process logistics 14. The field worker 36 has also received templates 28 and template software 26 by courier 30 from a manager 22 of the sub-process project design/development 12. The field worker 36 must organize and track all of this information; perform data entry logic 24DE on what templates 28 and template software 26 should be used for each assignment; decide what questions should be completed during an assignment; decide what data entry should be made for each question; and decide how to save the template to a file. After the field worker 36 enters input into a template 28, a printer admin 38 gets a printout of the template 28 from a printer 40, which is given to a courier 30 for delivery to a manager 22. The manager 22 of the sub-process data collection 16 performs quality assurance logic 24QA by checking whether the template 28 is filled out completely, appropriately, and within the time frame allotted, whether errors are present, etc. If errors are present, which is the case in 20-30% of the work, a redo of data collection loop 72 is ordered to collect the correct data. These errors in information in the healthcare industry account for billions of dollars in hospitalizations, morbidity, lost wages, loss in employee productivity, and deaths. Templates 28 that meet a certain level of quality undergo data entry 42 into a data entry interface 44 that has been developed by a programmer 32. Every time that a change is made to the template 28 and template software 26 used by the field worker 36, the programmer 32 must rebuild a new data entry interface 44 to accommodate the change.

In the sub-process reporting 18, a manager 22 performs logic 24 to decide what needs to be reported on as a result of the data collection 16. For example, what items should be included in a report, what items in a report should be aggregated, to whom are reports distributed, how often are they requested, etc. The manager 22 relays these requests to a programmer 32 who then programs a report interface 50 to the main database 20. A delivery of reports loop 74 occurs each time the programmer 32 requests that a courier 30 deliver the report to the manager 22. Every time a change is needed on a report, a redo of a report request 76 occurs. With the current shortage of programmers 32, the constant requests for reports are often ignored. Programmers constantly perform logic (not shown) on triaging work in the order of importance. Reporting may not appear to be mission critical, yet the trend of increasing medical errors may belie that thinking.

Figure 2:
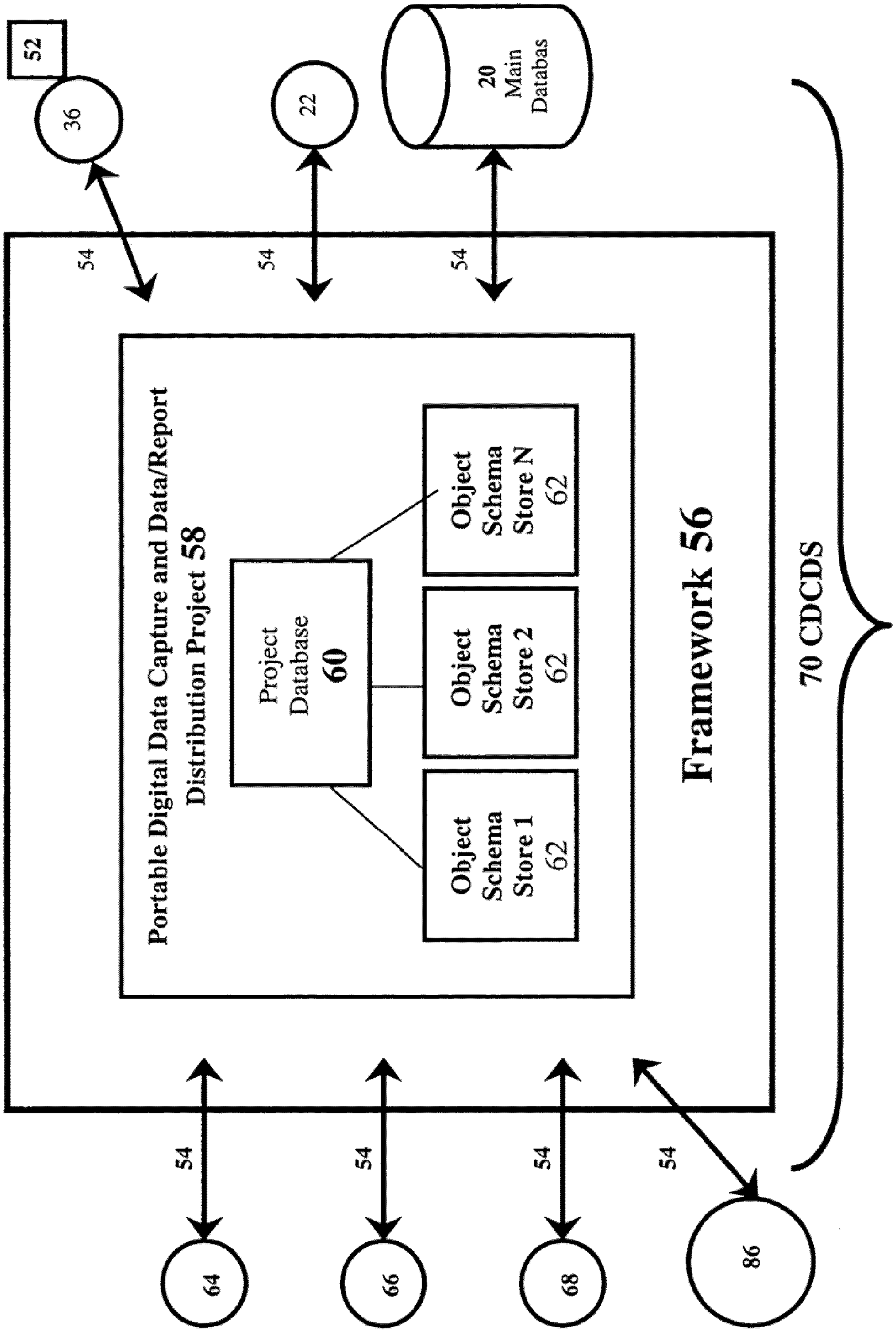
FIG. 2 is a diagram representing the process workflow using the preferred embodiment of the present invention.

FIG. 2 is a diagrammatic representation of the workflow and responsibilities for the CDCDS 70 of the preferred embodiment of the present invention. A CDCDS 70, shown in FIG. 2, allows field workers 36 or a device capable of measuring and inputting data 52, managers 22, a main database 20, other enterprises 64, healthcare providers 66, consumers 68, and others 86 to share and access a portable digital data capture and data/report distribution project 58 through a customizable interaction 54 that is part of the framework 56 of the CDCDS 70. The framework 56 performs project design logic, passes messages between project components and/or individuals, manages project interactions, reconciles project versions, forwards project changes, tracks and organizes project logistics, etc. In essence, the framework 56 automates certain tasks in order to free users to perform higher level tasks, remove redundancies and errors from the system, reduce time and costs, and produce better quality information. The CDCDS 70 of FIG. 2 does not require many of the tasks and requisite staff in the conventional system 10 of data capture and data/report distribution of FIG. 1A. Specifically, the CDCDS 70, does not need programmers 32 to build, modify and upgrade a data entry interface 44, logistics report interface 48, and report interface 50 to the main database 20. There is no need for attendant couriers 30, printer admin 38, data entry 42, template software 26, templates 28, logic 24, or lookup for work due 46. In addition, modification reports request 80, delivery of reports loop 74, redo of report request 76, redo of data collection 72, design/development redo loop 82, and redo of an assignment request 84 are eliminated. All of these are required by conventional system 10 of data capture and data/report distribution. These staff and tasks are not present in FIG. 2 because of the resulting automation accomplished by the preferred embodiment of the present invention. The functions that are automated and the subsequent staff and tasks that are eliminated will be described below as they impact programmers 32, managers 22, and field workers 36.

In the preferred embodiment of the present invention, the CDCDS 70 seen in FIG. 2 eliminates the ongoing need for skilled programmers 32 to develop, update, modify and track version control of the data entry interface 44, logistics report interface 48, and report interface 50 of FIG. 1A. As shown in FIG. 2, a CDCDS 70 user that has minimal technical training can access the framework 56 to access the object schema store 62 in the project database 60. This process eliminates some managers 22 who perform logic 24 about managerial functions, modification report request 80, redo of project report request 76, and delivery of reports loop 74, that routinely recur related to programmers 32, along with attendant couriers 30 and data entry 42 as seen in FIG. 1A.

The CDCDS 70 of FIG. 2 eliminates the need for numerous managers 22 that perform logic 24 in the sub-process of logistics 14, quality assurance logic 24QA in the sub-process of data collection 16, and form design logic 24FD in the sub-process of design/development 12 of the conventional system 10 of FIG. 1A. Managerial functions, such as the design/development redo loop 82 and redo of an assignment request 84 of FIG. 1A, are eliminated, along with the attendant couriers 30, printer admin 38 and field workers 36. As shown in FIG. 2, the framework 56 of a CDCDS 70 is set to perform these tasks automatically and eliminate the trivial and repetitive work (see FIG. 1A) of logic 24, quality assurance logic 24QA and form design logic 24FD. This automation occurs as a result of the CDCDS 70 user integrating specific items in object schema store 62 already available in the project database 60 to be forwarded as part of a project subset 116 to field workers 36 and others. In a CDCDS 70, for example, managers 22, are able to design a project, request all report parameters at the time of project design, view various reports on input from field workers 36, connect with a main database 20 to verify data against input from the field, etc. The CDCDS 70 gives users the scalability to ramp up or ramp down a project as well as add new projects without the geometric increase in work.

The CDCDS 70 of FIG. 2 eliminates the need for numerous field workers 36. Since a CDCDS user has designated a portable digital data capture and data/report distribution project 58, field workers are forwarded what is appropriate to each individual field worker 36. Thus, input is made in the portable digital data capture and data/report distribution project 58 directly by field workers 36 responsible for the work, eliminating double data entry and the errors associated with data entry. The framework 56 allows approved input only, restricts entry, reveals items for input based on the input in prior fields, pre-loads data, and prompts the user if incorrect input has been chosen. In the preferred embodiment of the present invention, the CDCDS 70 performs the data entry logic 24DE of FIG. 1A conducted by field workers 36, thus eliminating redo of data collection loop 72 that routinely recurs related to errors found during quality assurance logic 24QA, as well as attendant couriers 30, managers 22, printer admin 38, template 28 and data entry 42 in FIG. 1A.

Figure 3:
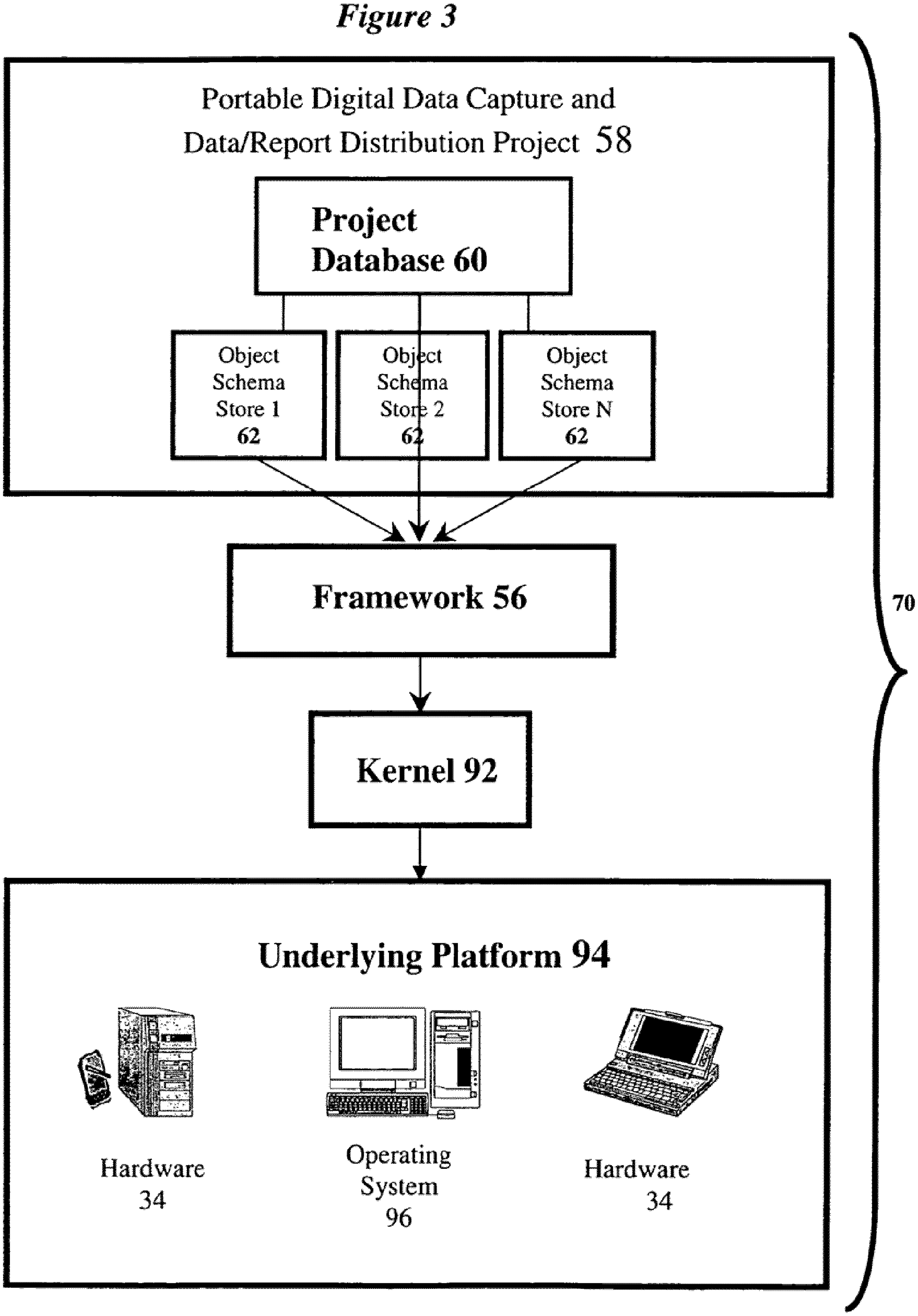
FIG. 3 is a diagram of the overall architecture of a CDCDS in accordance with a preferred embodiment of the present invention.

Referring to FIG. 3 the preferred embodiment of the present invention includes a CDCDS 70 having an architecture of layers that include a portable digital data capture and data/report distribution project 58 consisting of object schema store 62 of a project database 60, a dynamic framework 56, and a kernel 92 connected to the underlying platform 94. These layers are each made with different tools and are meant to perform different functions. It is the architecture that allows the portability and the flexibility to expand, add functionality, and add increasing automation to the CDCDS 70. The kernel 92 provides the services necessary to load/execute the higher levels and to provide an interface to the system-dependent services of the underlying platform 94 which consists of the operating system 96 and the hardware 34. The hardware 34 has memory, such as RAM, in which the kernel 92, the framework 56 and a portion of the portable digital data capture and data/report distribution project 58 reside at run-time. There is at least one storage device, such as a hard drive, in which the portable digital data capture and data/report distribution project 58 is stored. For this preferred embodiment of the invention, the kernel 92 is written in C++ which is a well-known programming language that is compiled using vendor tools that are appropriate to that platform 94, and is thus platform specific for each of several platforms. The kernel 92 may be written on other programming languages, if desired. Using a function call-based programmer interface ("API"), the kernel 92 performs services for the higher levels. The API's native code functions are accessed via direct calls from the framework 56. The kernel 92 is not portable but can be extended by loading additional modules with associated DSL files.

Figure 4:
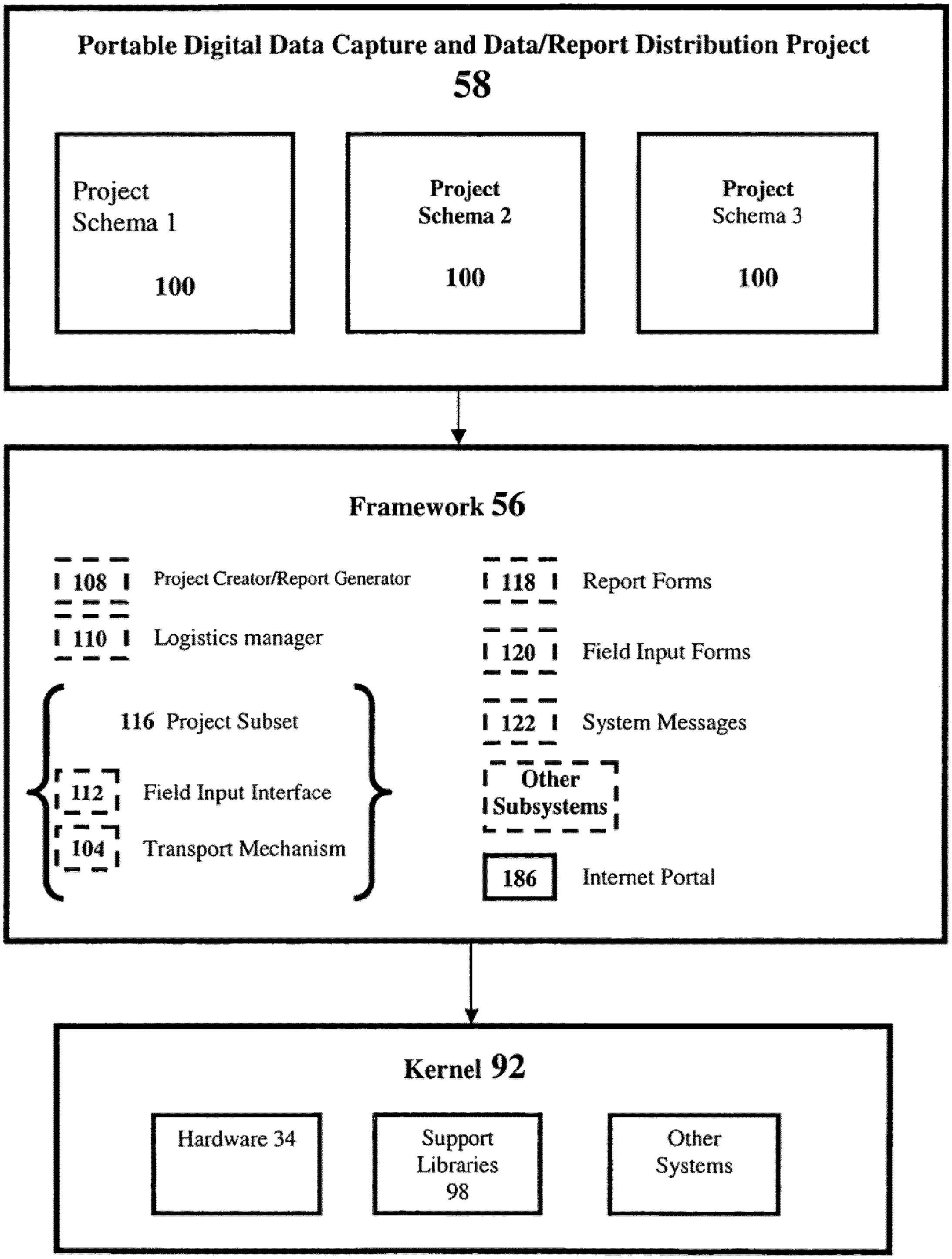
FIG. 4 is a more detailed block diagram showing elements included and or accessed by the framework and kernel of FIG. 3.

Referring to FIG. 4, the kernel 92 consists of the support libraries 98 that are necessary for the CDCDS programs. These include libraries for file and resource I/O, configuration management, memory management and diagnostics, etc. These support libraries can be changed when the platform of choice for the project is changed. The kernel 92 manages part of the transport of objects when connections are made to the field. The framework 56 provides the visual interfaces between the CDCDS and the CDCDS users. The framework 56 consists of the internet portal 186, project creator/report generator 108, report forms 118, logistics manager 110, system messages 122, and the project subset that includes the transport mechanism 104, field input interface 112, and field input forms 120, along with other subsystems. The framework 56 provides access and incorporates the necessary CDCDS logic to the project and to the project subset 116 forwarded to the hardware 34. The project subset 116 is designated as a specific field input interface 112 referenced to the project schema 100 of the portable digital data capture and data/report distribution project 58. This project subset 116 is named by the CDCDS user to be forwarded by the transport mechanism 104 to a specific hardware 34. The framework 56 is written in C, C++, Visual Basic, and HTML (the framework need not be limited to these languages) for maintainability and extensibility, although Java and XML could be implemented at any time. The framework 56 is not necessarily portable and may perform differently on different platforms 94.

Figure 5:
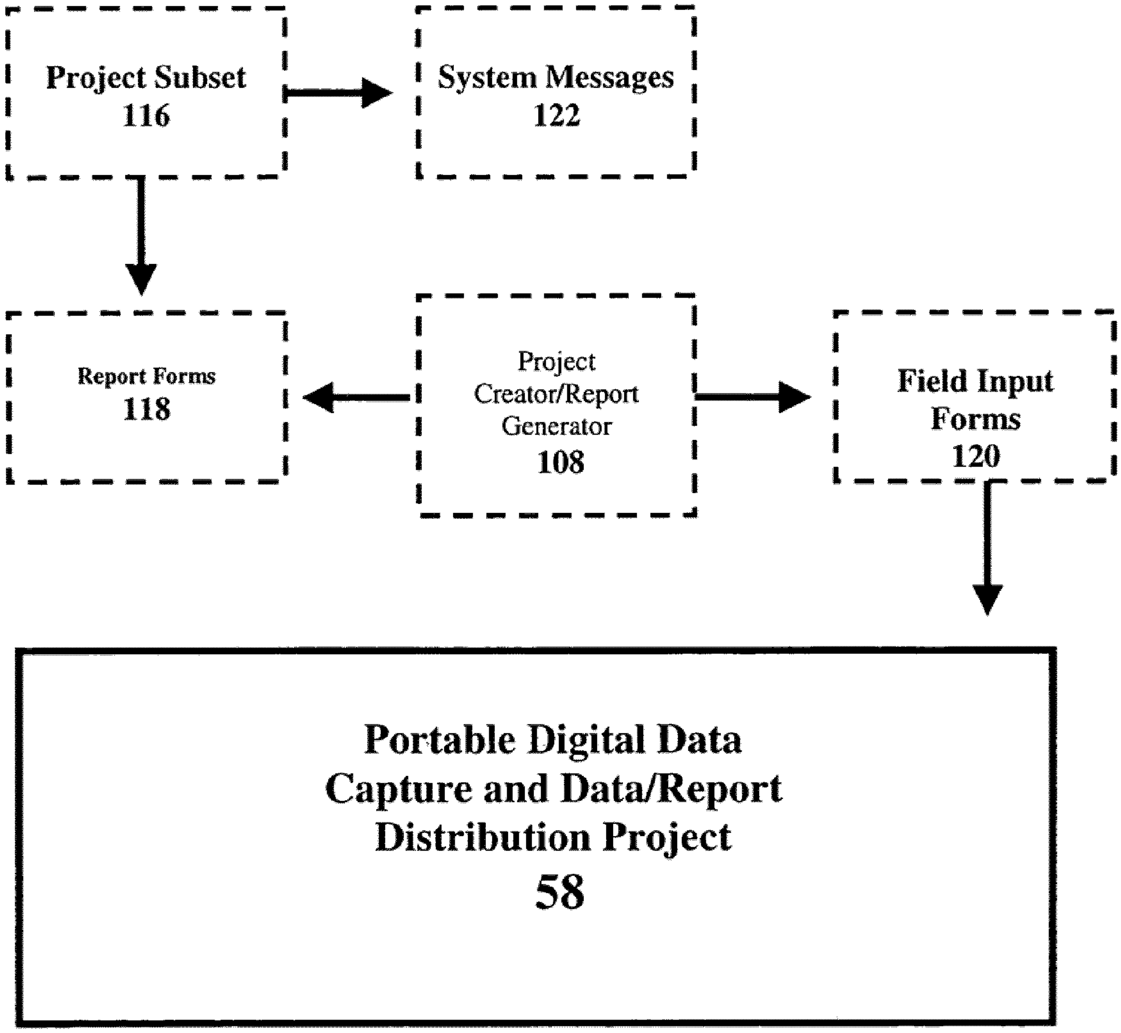
FIG. 5 is a diagram showing elements that are included and/or accessed by the project creator of the framework.

Referring to FIG. 5, the project subset 116 is where the framework 56 queries to access the current state of the project. The project subset 116 references the project schema as seen in FIG. 4. The project subset 116 is created as part of the initialization of the framework 56. Report forms 118 and field-input forms 120 are employed as the interface between the user and the CDCDS 70. Field-input forms 120 and report forms 118 are implemented using the services of the API of the kernel 92 and are notified when an event occurs either as a result of input or as a result of other program events. Report forms 118 receive input from CDCDS users during the initial design or when changes are made to a CDCDS portable digital data capture and data/report distribution project 58 and changes are available immediately throughout the project. Logic has been programmed into the project creator/report generator 108 to remove the burden of logic from human users. The project creator/report generator 108 returns various system messages 122 to the user such as a reminder that a particular object is unable to be integrated into a project without including the object's functions.

The process of creating or manipulating objects in a project requires a series of actions that precipitate visual feedback, confirmation and qualification of inputs. Therefore, the "state information" must be maintained while a user is making changes to the project. The project creator/report generator 108 controls the process of manipulating the portable digital data capture and data/report distribution project 58 by a set of queries (not shown). The project creator/report generator 108 has an expected set of inputs, which bring about predictable results. In a CDCDS 70 of the preferred embodiment of the present invention, it is important to implement one input over another. For example, changes are being made to protocols at the same time as other users are being forwarded the project subset 116 by the transport mechanism 104 of the framework 56 seen in FIG. 4. However, these different inputs will likely conflict with one another. It is necessary to mark which input will overwrite other input and under what circumstances this should occur. In order to accomplish this, the CDCDS 70 allows users with specific permissions to mark and integrate the functions of objects that are part of the field input forms 120 to respond in a particular ordered fashion in the portable digital data capture and data/report distribution project 58. It is because of this process that the CDCDS 70 of the present embodiment allows the user access through the project creator/report generator 108. The project creator/report generator 108 exhibits a system message 122 to the CDCDS user that input has been accepted, or why it has not been accepted and then reveals the result of the input. If the CDCDS user is not satisfied with the result of the input, then the CDCDS user is able to make additional input to change the results.

Figure 6:
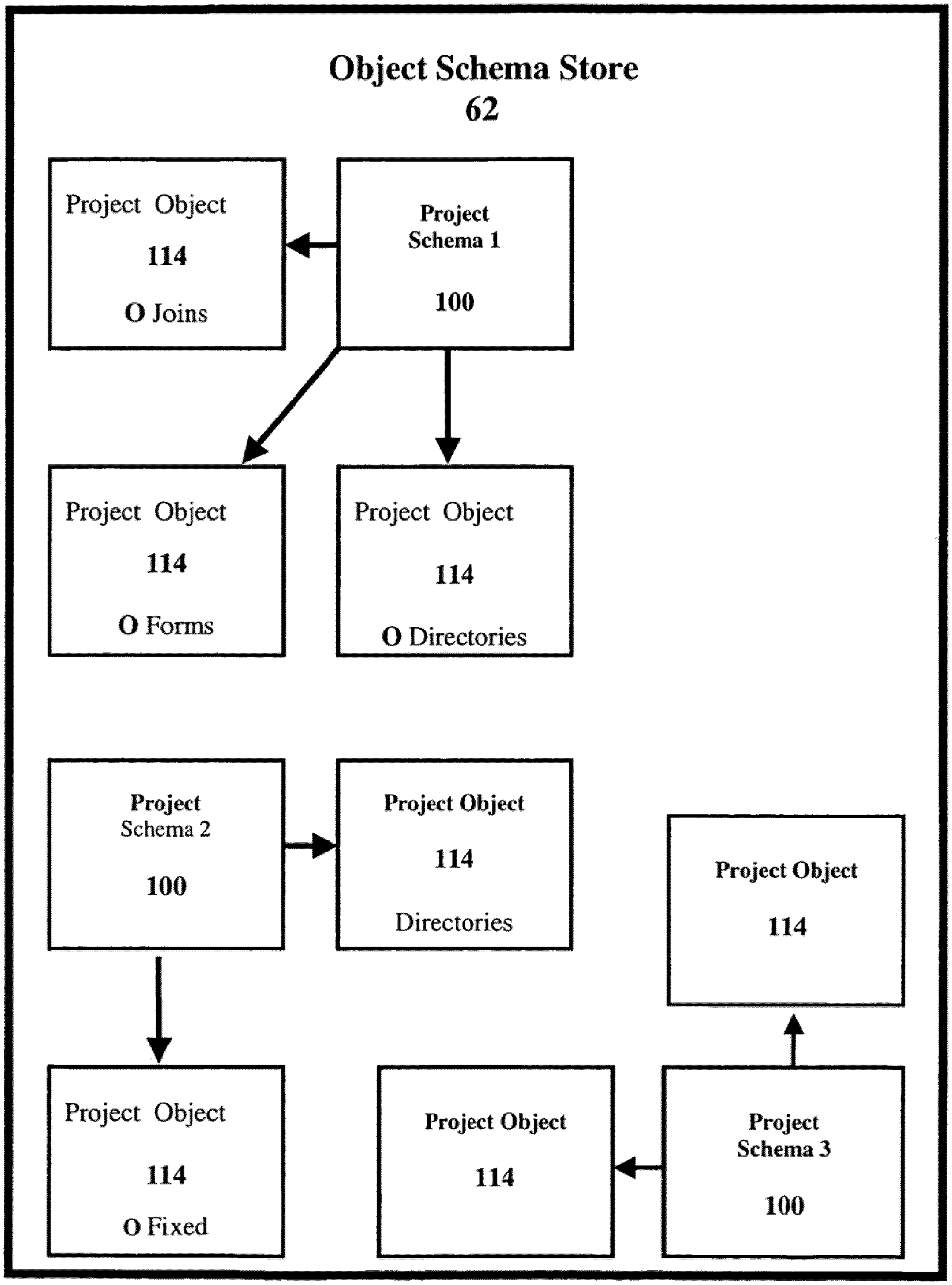
FIG. 6 is a diagram showing how objects are part of a project schema and how project schemas are part of the CDCDS project.

As seen in FIG. 4, the portable digital data capture and data/report distribution project 58 consists of one or more project schemas 100, or any other domain specific schemas. FIG. 6 shows that in the preferred embodiment of the present invention, a project schema 100 consists of a set of project objects 114 that are relevant to a particular project or to a particular discipline existing in an object schema store 62. Multiple objects 114 integrated into multiple project schemas 100 as part of the object schema store 62 can be combined to form a portable digital data capture and data/report distribution project 58 as seen in FIG. 4. FIG. 6 shows these multiple project schemas 100 made of multiple project objects 114 located in an object schema store 62 where it is necessary to have the project objects 114 and the project schemas 100 available together for the purposes of consistency. Additional objects 114 can be built by programmers and made available in an object schema store 62 for the CDCDS user to integrate into new project schema 100 or existing project schema 100. This allows for easy expansion of the capabilities of the CDCDS and the portable digital data capture and data/report distribution project 58 (of FIG. 4) without requiring a programmer to retool all of the already in use project schemas 100.

Figure 7A:
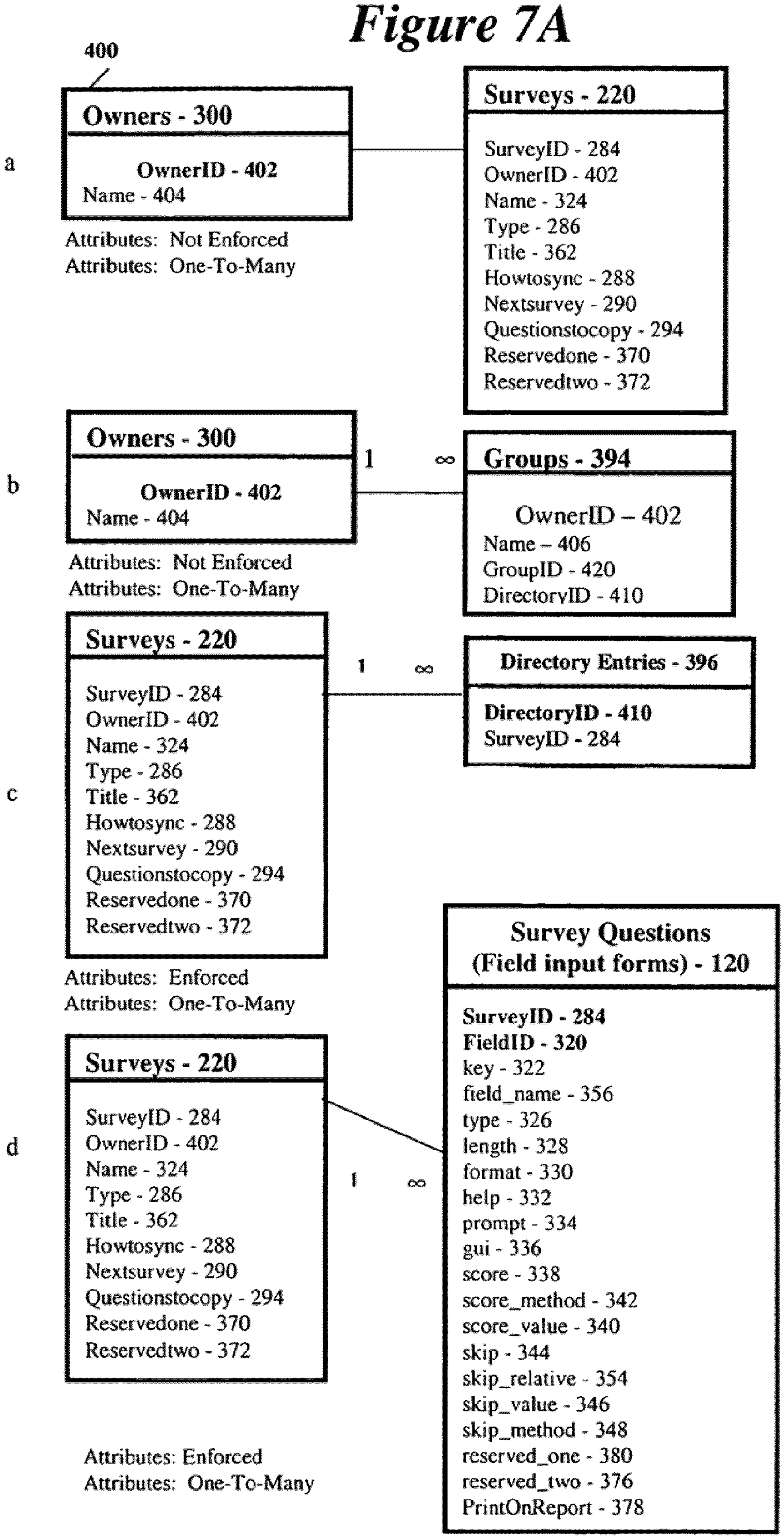
FIGS. 7A and 7B illustrate the tables and the relationships between the objects that reside in the database of the preferred embodiment of the present invention.
Figure 7B:
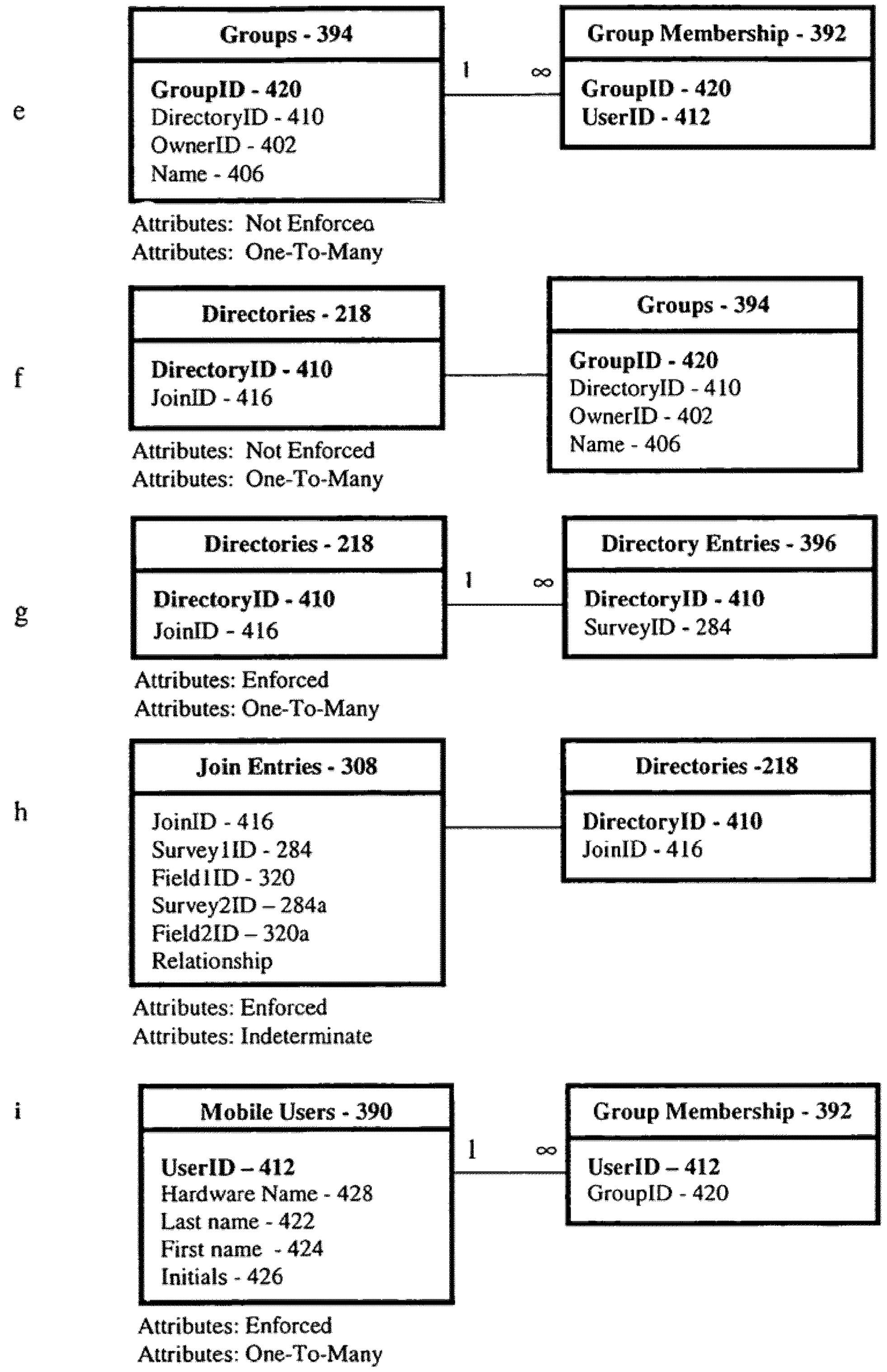

FIGS. 7A-7B is an entity relationship diagram showing all the tables 400 with their structures and the attributes of each of the tables 400 that are part of the object schema store 62 in FIG. 6. The tables 400 in FIGS. 7A-7B show all that is available for integrating into project schema 100 of FIG. 6. The relationships of the tables 400 and their items shown in FIGS. 7A-7B is a configuration of the present invention so that when a CDCDS user opens the project creator/report generator 108 in the framework 56, the user can simply choose items shown in the project creator/report generator 108 to be part of a specific project schema 100 and the present invention will automatically manage the relationships of the items in the project schema 100. This management of relationships between items is a component of what is referred to as the logistics. Logistics in the present invention is the management of getting the correct information to the correct people on time, without overlap or omissions (i.e., the organization of who gets what and when). For example, the CDCDS user names the owner 300 and the objects 114, field types 114A, field settings 114B, and methods/functions 114C that are designated for this owner 300 in each of the appropriate tables.

As seen in FIG. 7A section a, owner 300 consists of a unique ownerID 402 (an automatically assigned number) and a name 404 (a short text description that signifies the CDCDS user or group 394 of users). Section a also includes the related survey 220 which consists of the SurveyID 284, OwnerID 402 a name 324 (a short text description that describes the set of field input forms 120), type 286 (either a FormDB 208 or a fixed 214), title 362 (a short text as it appears on the field input interface 112 on the hardware), howtosync 288 (signifies the way the data from this survey 220 is transported between the field and the server), nextsurvey 290 (signifies and identifies the survey 220 that is to follow this one), questionstocopy 294 (signifies all the field input form 120 marked key 322 whose input should be copied to the next instance of this survey 220), reservedone 370 (signifies the score group of the report that this survey 220 is part of), reserved two 372 (signifies the report group this survey 220 is part of for aggregation) in a not enforced, One-To-Many relationship.

Section b has owner 300 (same as in section a) related to groups 394 which consists of ownerID 402, name 406 (a short text description that signifies the set of users that will be performing the specific type of data collection for an owner 300), groupID 420, and directoryID 410 in a not enforced, One-To-Many relationship.

Section c has surveys 220 (same as in section a) related to directory entries 396 which consists of directoryID 410 (an automatically assigned number) and surveyID 284 in an enforced, One-To-Many relationship.

Section d has surveys 220 (same as in section a) related to survey questions (known as field input forms 120) which consists of surveyID 284, FieldID 320 (a unique number assigned by the CDCDS user), Key 322 (set by the CDCDS user to designate status of the field), fieldname 356 (short text description of an individual field input form 120 that are referenced by other projects to aggregate normative information-unique for each field input form 120 that is part of a survey 220 but not unique across surveys 220), type 326 (signifies the nature of the field-input forms 120 referring to an example of a field types 114A supported), length 328 (denotes the number of character length for a text field-input form 120), format 330 (nature of field-input forms 120 that uses specific parameters) help 332 (denotes a section of the field-input form 120 that describes in some detail reference material shown on the screen for the field worker 36 to more easily make a decision on what input should be chosen), prompt 334 (a short text description of the input that is required in the field-input form 120), GUI 336 (denotes the design of the screen revealed to the user as field input form 120), Score 338 (signifies a weighted score value, signed byte), Score_value 340 (signifies the value needed for a Score 338), Score_method 342 (signifies under what circumstance an input is scored) Skip 344 (denotes the field-input form 120 to move to in a project schema 100), Skip_value 346 (signifies truth-value to skip), Skip_method 348 (signifies how the skip 344 is performed), Skip_relative 354 (what field input form 120 the skip method 348 will reveal as the next appropriate one), Reserved_one 380 (where in a report of the input collected with this field input form 120 should this appear), Reserved_two 376 (in what group in a report of the input collected with this field-input form 120 should be aggregated), PrintOnReport 378 (as it appears). These tables are in an enforced, One-To-Many relationship.

Section e of FIG. 7B has group 394 (as seen in section b) related to group membership 392 which consists of groupID 420 (as seen in section b) and a unique userID 412 (an assigned number that signifies a particular hardware) in a not enforced, One-To-Many relationship.

Section f has directories 218 which consists of a directoryID 410 (as seen in section b) and a unique joinID 416 (an assigned number that signifies a connection between two items). This is related to group 394 (as seen in section b) in a not enforced, One-To-Many relationship.

Section g has directories 218 (as seen in section f) and directory entries 396, which consists of directoryID 410 and surveyID 284 in an enforced, One-To-Many relationship.

Section h has join entries 308 which consists of JoinID 416 (as seen in section f), survey1ID 284*b* (signifies the first survey 220 that will be connected to the second survey 220), field1ID 320*b* (signifies the connection point of the second survey 220), survey2ID 284*a* (signifies the second survey 220 that is connected), field2ID 320*a* (signifies the connection point of the second survey 220) related to directories 218 in an indeterminate relationship.

Section i has mobile users 390 which consists of a userID 412 (as seen in section e) hardware name 428 (signifies the nature of a hardware 34 that will be connecting through the framework 56 into the project database 60), last name 422 (the surname of the field worker 36 that will be using this hardware 34), first name 424 (the field worker 36 first name), initials 426 of the field worker 36) related to group membership 392 (as seen in section e) in an enforced, One-To-Many relationship. Each of the items in the tables in FIGS. 7A and 7B are referenced in the project database 60 by the programming language 124 of FIG. 8A.

Figure 8A:
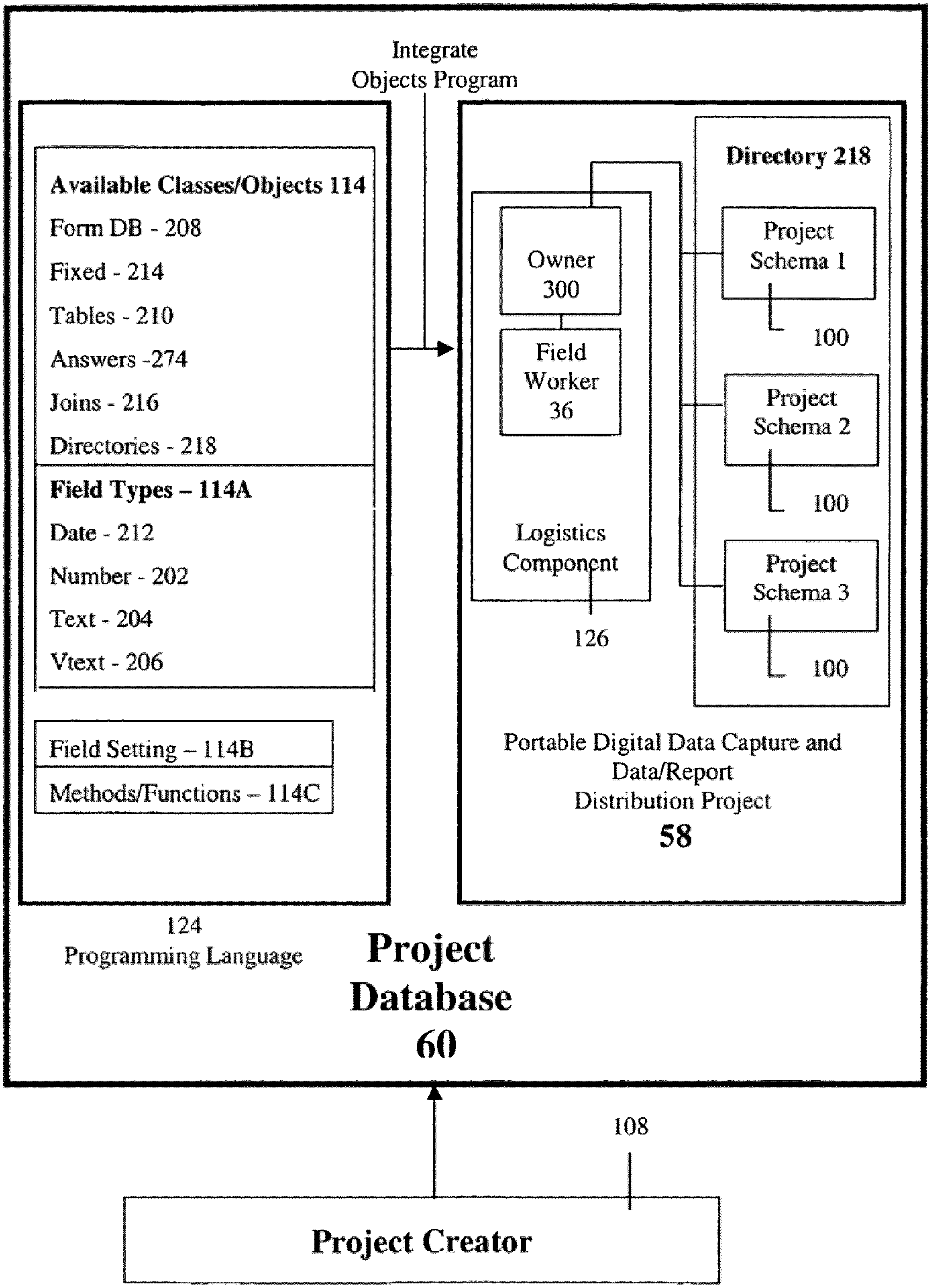
FIG. 8A is a view of the project database and the relationship between the objects with in the database and relationship of the project creator to the database.

FIG. 8A illustrates the CDCDS user entering the project database 60 through the project creator/report generator 108 of the framework 56 to first designate necessary aspects of the logistics component 126. As seen in FIG. 8A, the logistics component consists of the designation for the owner 300 and field worker 36 related to particular project schema 100 that are part of the project. In the present invention, FIG. 8A shows a CDCDS user integrating objects 114 in the project database 60, by using the programming language 124 of the present invention. This allows the user to design, develop, and manipulate project schema 100, and then relate the owner 300 and field worker 36 to each project schema 100 in FIG. 8A. Relating the field worker 36 and the owner 300 is part of the logistics component 126 of the portable digital data capture and data/report distribution project 58.

Figure 8B:
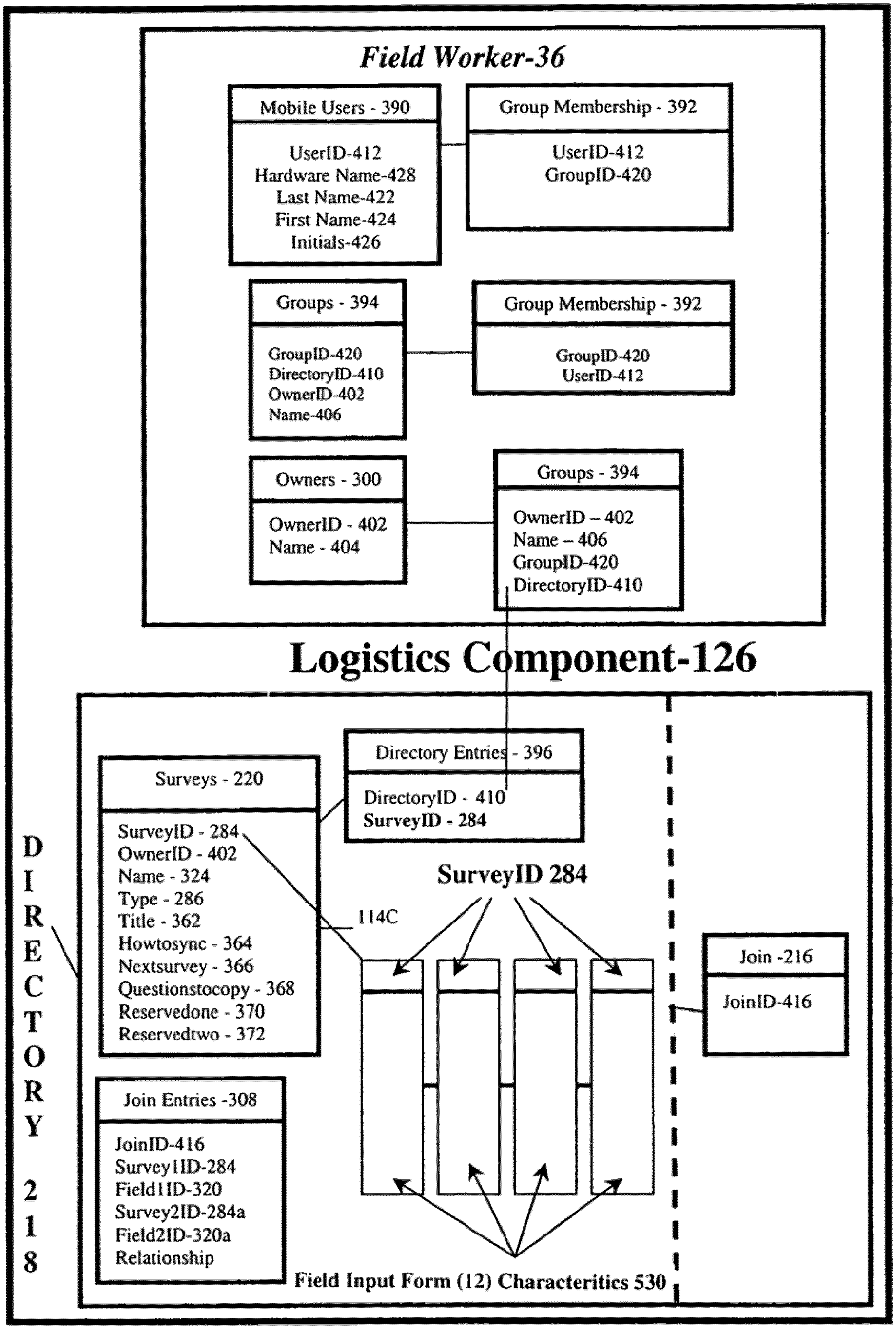
FIG. 8B is a diagram of the logistics component showing the relationship between a directory and its components and a field worker and its components.
Figure 9:
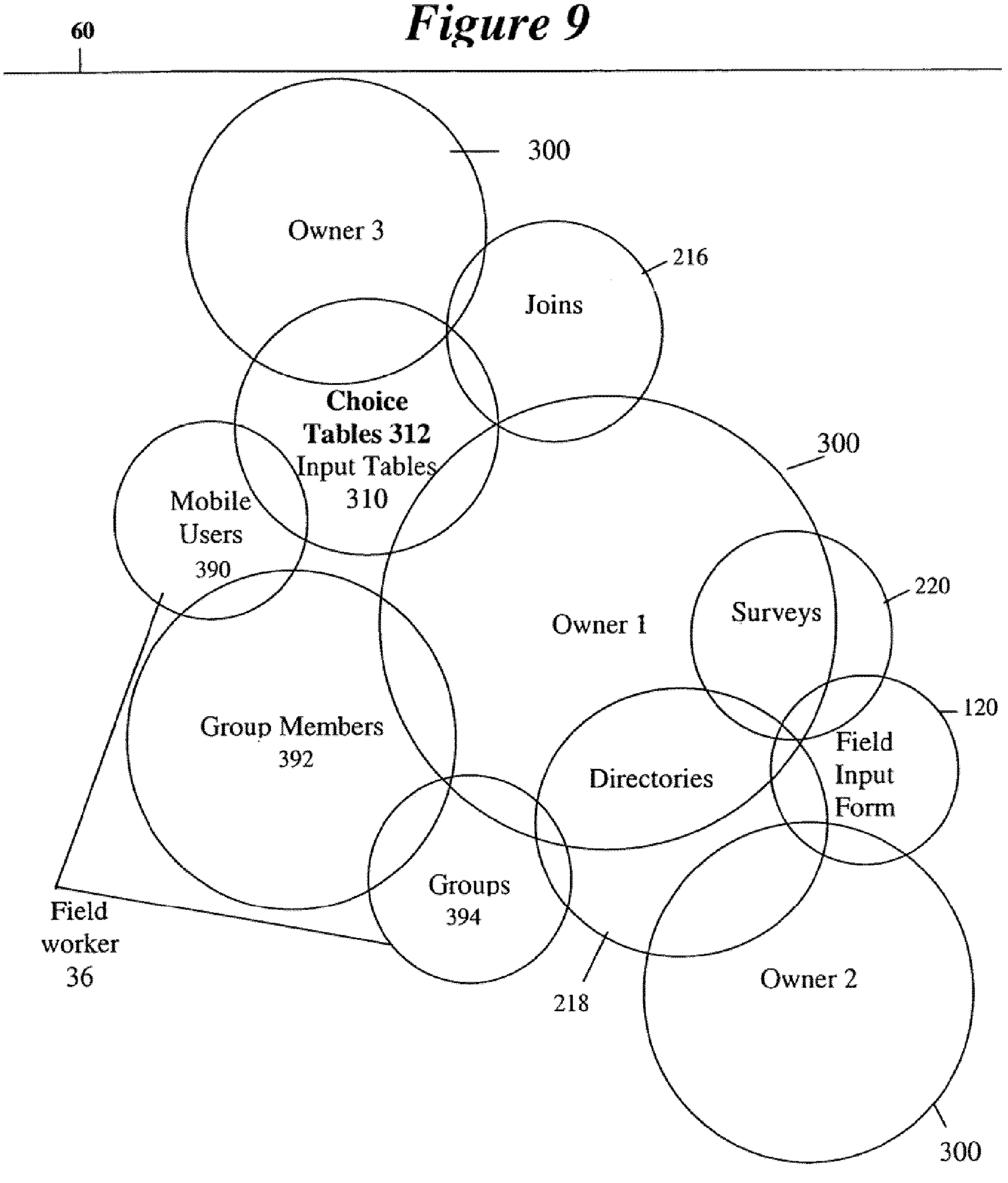
FIG. 9 is a relationship diagram illustrating the preferred embodiment of the present invention.
Figure 10:
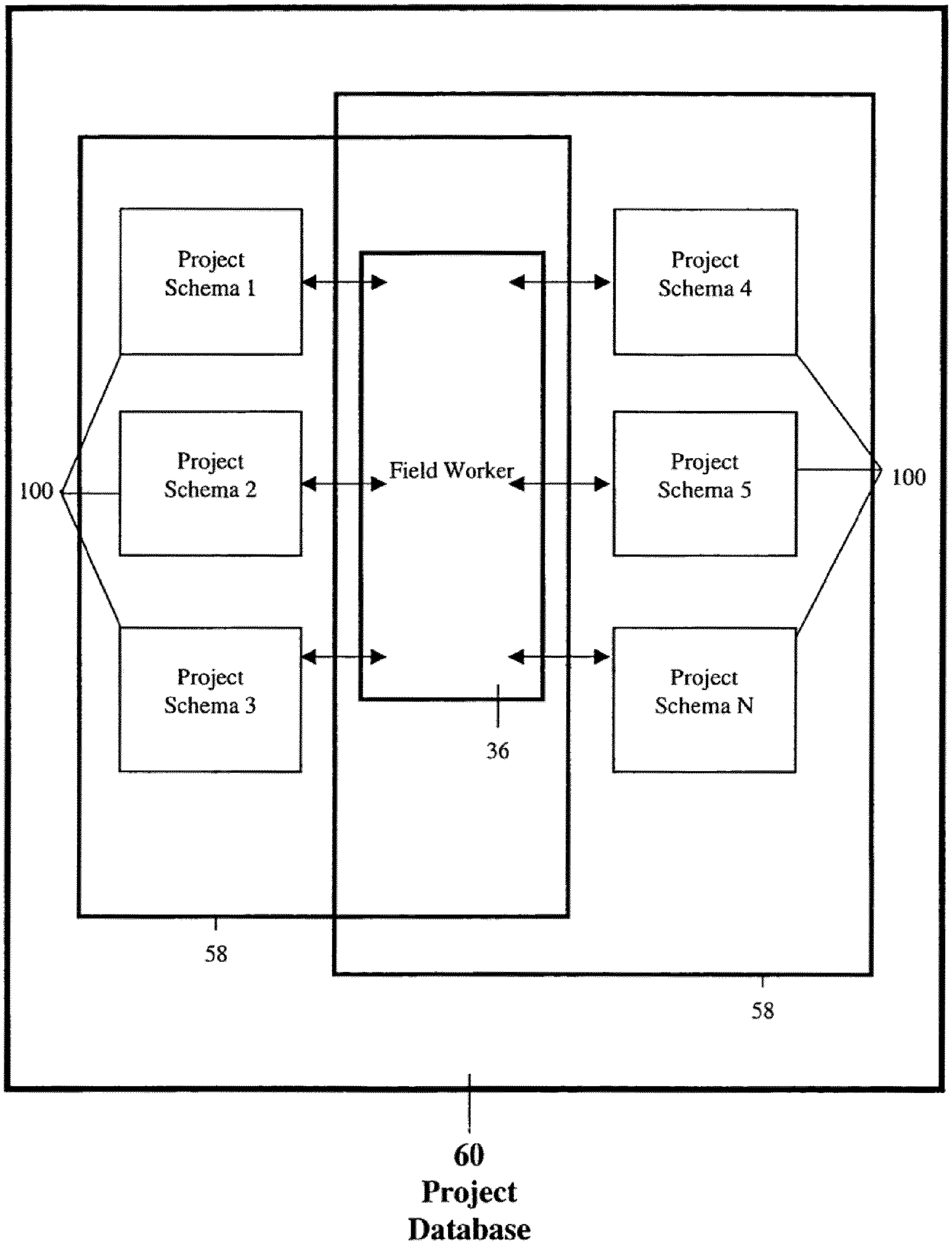
FIG. 10 is an illustration of the encapsulation of a field worker and how project schema can share that field worker.

FIG. 8B illustrates the logistics component 126 in more detail. In FIG. 8B, a field worker 36 is partially represented as a mobile user 390 which is a combination of a userID 412, specific hardware 34, staff member last name 422, first name 424, and initials 426 (as in FIG. 7B section i). The present invention is arranged this way so that hardware 34 can be easily replaced if loss or breakage occur without interruption in the job of the field worker 36. The field worker 36 would continue to connect to the project database 60 without interruption. A field worker 36 is also represented with a group membership 392, which is a combination of the userID 412 and groupID 420. A staff member having a particular group membership 392 allows a CDCDS user to connect the staff member to a group 394 which consists of a directoryID 410 (directory 218 of project schema 100) for one or more owners 300. This allows the field worker 36 to be connected to the project schema 100 in several portable digital data capture and data/report distribution projects 58, as shown in the block diagram FIG. 10. A field worker 36 may also be connected to directories 218 of project schema 100 that are related to several different owners 300 as seen in the Venn diagram of FIG. 9. For example, as seen in FIG. 10, a nurse (field worker 36) can perform work related to several different project schema 100, e.g., the schema for auditing charts and the schema for auditing medical facilities. As seen in FIG. 9, a nurse (field worker 36) can also work on several different projects (belong to a group 394 which is related to a directory 218 used by two owners 300) in the same organization or in different organizations. It is necessary for the CDCDS user to designate a field worker 36 with these three sets of characteristics and then relate them to owners 300 who are then related to the survey 220 that are part of a project schema 100 as seen in FIG. 8B because of the need to organize and manage the logistics of assigning skilled workers to particular tasks. The present invention prompts the CDCDS user to designate and relate each item that is necessary to the logistics component 126 of a project as seen in FIG. 8A. The present invention allows the CDCDS user to change the logistics component 126 of a project at any time during the life of a project without interrupting any aspect of the project.

The Programming Language 124

In order to accomplish the integration of objects 114 into project schemas 100 shown in FIG. 6, the preferred embodiment of the present invention includes an object-oriented programming language 124 shown in FIG. 8A. This programming language 124 references the tables shown in FIGS. 7A and 7B that are part of the project database 60 of FIG. 8A. A CDCDS user defines certain characteristics of the project, and based on these designations, the logistics of a project is managed. The present invention manages the logistics of report distribution since the program creates data tables in the project database 60 to store input from field workers 36, which will be distributed as designated by the CDCDS user in the initial design and development of the project. The present invention also manages the logistics of updated information sent to field workers 36 since the program creates data tables in the project database 60 to store input sent to field workers 36, which will be distributed as designated by the CDCDS user in the initial design and development of the project. These data tables created by the program will be discussed at length in the next section. The use of the programming language 124 of the present invention seen in FIG. 8A solves a number of problems: a) the shortage of programmers, b) the constant changing of program requirements by users, c) the need for expanding program capabilities, and d) the expanding infrastructure that needs to take advantage of Internet and wireless hardware. A detailed explanation of how the preferred embodiment of the present invention solves each of these problems is outlined below.

a. The Shortage of Programmers

The availability of object oriented program sections have created the opportunity for programmers to incorporate these program portions in many different programs, making programming more efficient. However, a programmer must ensure that all required program portions are included appropriately in each program. To ease the burden on programmers, the preferred embodiment of the present invention includes a programming language 124 that requires created program portions to be stored with the databases that the program portions create. These stored program portions are formatted in a manner known to the kernel 92 of FIG. 3 and are thus executable on all platforms 94 for which a kernel 92 has been supplied. This makes the software needed to manipulate data always available so that a programmer is not needed each time a project is invoked or if a current project is changed.

b. The Ongoing Changes to Program Requirements by Users

Data capture and distribution projects often change based on the information needs of the enterprise. As information needs change, so do the requirements of the enterprise's programs. Some programs must remain "consistent" as changes are made to a project. Other programs must respond to the request for a change so that the new requirement is implemented appropriately to each program. Typically, when data is written to a file and read back, all of the strings and numeric data are read back appropriately but the complex relationships among the data may be lost. It takes a tremendous effort on the part of programmers to maintain these complex relationships. However, in the present embodiment, the logistics manager 110 of the framework 56 (see FIG. 5), provides a mechanism to maintain complex relationships across user sessions, making program portions usable together even though the portions were developed independently. Program portions and data need to be encapsulated as much as possible and provide functionality to other program portions. This means that as much as possible, information is to be hidden and accessed programmatically, and not by direct reference. This allows independent program portion evolution and error isolation.

c. The Need for Expanding Program Capabilities

As seen in FIG. 8A, the CDCDS user enters the project database 60 through the project creator/report generator 108 to integrate current objects 114 and their field types 114A, field settings 114B, and methods/functions 114C. (Hereafter, 114, 114A, 114B and 114C are referred to as "current objects 114, etc.) A programmer can write additional C++ code, expanding the choices for the CDCDS user to reference in the project database 60 and integrate into a project schema 100. Any existing portions or projects must be able to employ the new project objects 114, etc. without making additional programming changes. It is also important to be able to create a new type of project object 114, etc that is a specialized version of an existing project object 114, etc. It can be assumed that any method that operates on the existing object 114 can also operate on the new type of object 114, yet the new type of object 114 has some additional characteristics. In addition, as the projects increase in size, the project database 60 where the objects 114, etc are stored needs to be able to accommodate the increase in the size of the project. All program portions must refer to standard database industry procedures in order to accommodate the changes in the program capabilities.

d. The Expanding Infrastructure Needs to Take Advantage of Internet and Wireless Hardware Created program portions and data must be moveable from platform 94 to platform 94 without portability issues arising. The program portions and the data must operate in the same manner regardless of the particular configuration, operating system 96, software and hardware 34 of the platform 94. The CDCDS user must be able to copy the program portions for use on another platform 94. Preferably, the CDCDS 70 of the preferred embodiment of the present invention must be organized into shared libraries that implement methods and functionality so that the public interface to a class can be limited to the small scope of a shared library.

FIG. 8A is a block diagram showing the key language features of the preferred embodiment of the present invention that support object-oriented programming and allow a user to access the project database 60 and add, remove, integrate and declare objects 114 into schemas. The CDCDS user can also designate the field types 114A, field settings 114B, and their methods/functions 114C and how these items should be represented in a report. Using the programming language 124 includes making designations of reporting requirements as part of the project schema 100. The preferred embodiment of the present invention allows a CDCDS user to configure the entire portable digital data capture and data/report distribution project 58 starting with the design of the data elements to be captured through to what completed reports on the data collected are being distributed and where. This includes the logistics component 126 of the project, i.e., what elements in a project are being forwarded to owners 300 and field workers 36, to what hardware 34 are they being forwarded, and how do owners 300 and field workers 36 relate to a directory 218 as seen in FIG. 8B.

The programming language 124 coupled with the logistics component 126 (distribution of reports and information correctly) is of tremendous value in the health care industry and in other industries. It is of particular importance because the present invention allows a CDCDS user to make changes to any aspect of a project without having to program each element in a project or to program a new project each time an element changes. Also a programmer can add objects 114, etc. to the project database 60 without needing to reprogram all the current ongoing projects. This includes the ability to designate the changes to report requirements for a project at the same time. The following is an example of the value of this process in healthcare.

A portable digital data capture and data/report distribution project 58 will: 1) collect specific input from the heart monitor attached to the chest of an infant at 123 Main street on a continual basis; 2) distribute a subset of the input, e.g., heart rate 50 (dangerously low) and the location of the infant in a report to the fire rescue station that serves the 123 Main Street area; and 3) distribute the low heart rate, along with the infant's current medications, as a report to Doctor Jones who is the infant's cardiologist and forward a report to the hospital to which the infant is being transported. The result of this project is that before the mother of the infant wakes up enough to hear the alarm on the heart monitor sounding a low heart rate, the fire rescue is at the front door of the house with the doctor and hospital waiting for the infant's arrival. In the present invention, none of the complex communications between parties requires human interaction that has a potential for communication error and time lag. The entire project is developed and designed at the beginning by the CDCDS users with designations made on the type of data requested from in the field and the nature of and logistics of reports distributed. A CDCDS user with permissions can make a change to this project at any time even when the project is in session, and the fire rescue, doctor, and hospital, as well as the mother, immediately get the changes and are now notified when the captured heart rate of the infant is below 70, not below 50.

FIG. 8A is a block diagram that shows the programming language 124 which defines and describes the actions of all the objects 114, etc that are integrated into a portable digital data capture and data/report distribution project 58. A CDCDS user is given access to the project database 60 through the project creator/report generator 108. The portable digital data capture and data/report distribution project 58 is programmed by the CDCDS user to consist of one or more project schemas 100 as part of a directory 218 that is related to owners 300 and field workers 36. The key features of the programming language 124 include but are not limited to: classes/objects 114, field types 114A, field settings 114B, GUI 336, and methods/functions 114C i.e., record find methods, record access methods, and miscellaneous record functions. Architecture is modular and new items can be easily added by modifying the existing or programming additional objects 114, etc. All data is actually stored in a FormDB 208 and fixed 214. Objects 114 include but are not limited to: oaTable 210—abstract base class for all table data; oDirectory 218—directory of all tables—builds maintains, and destroys all objects; oFormDB 208—contains all user entered data; oFixed 214—used for building and referencing lists of items in data tables; oJoins 216—objects list of all joins 216; and oAnswer 274—returned data or choices made in the oFormDB 208. The code should avoid using many (if any) defines and the calling code module would want only the directory 218 to be declared as a global. Included below is more detailed information about the objects 114, field types 114A, field settings 114B, methods/functions 114C that make up the programming language 124 of the present invention. Some examples of the actual code are included that illustrate the items being discussed. Actual code documentation is included as well. Interspersed are some comments that are an additional explanation on a section of the code, but are not part of the code. It is important to note that most of the explanations and illustrations make reference to the field input interface 112 of the framework 56 in FIG. 4 that is accessed by the field workers 36. However, the programming language 124 of FIG. 8A allows the CDCDS user to define reports and designate the logistics management of report distribution. A CDCDS user is allowed to mark input for aggregation in input tables 310, mark input by key 322 field input forms 120 for aggregating scores, and deliver an aggregate report to an appropriate owner 300. Whereas the conventional system 10 requires the programming of reports separately every time a new project is established, the present invention does not require that a CDCDS user build a different report each time new request for input is made or field input forms 120 marked key 322 are changed, etc. The CDCDS user has been allowed to create a report that will be distributed as a project subset 116 to an owner 300 (see FIG. 16) just as a field input interface 112 is created by the CDCDS and marked for delivery as a particular project subset 116 to a field worker 36 (see FIG. 14). The report is built and distributed as it was designated by the CDCDS user at the time of creation of the project.

Below are definitions of items that are seen in the code, followed by sample code with further explanation.

Field types 114A supported (seen in FIG. 8A):

date 212—DateTimeType This represents any date related field types 114A which are an important part of a project.

number 202—signed integer value (2 bytes—SWord) includes yesno, yesnona, etc. It is important for ease of use by field workers 36 that these answer choices items appear as simple check boxes on the screen of a small device.

text 204—fixed length string (1 byte/char+1 byte null) includes any text entry and can be designated with a particular length. Although text entry is not optimal during a project, this field may be used for a signature capture, which can be thought of as a large text object.

vtext 206—variable length string (ID field linking to oVText). This results in a list of answer choices in a project that requires this. A CDCDS user designates the items on the list and designates the logistics requirements, e.g., is this list supplied through a query of other data sources or from data entered through the internet portal 186 of the framework 56.

New field types 114A can be easily added by modifying the field type 114A object, (e.g., truefalse, bar code, signature capture) and then making them available in the project database 60 for the CDCDS user to integrate into a project.

Figure 31A:
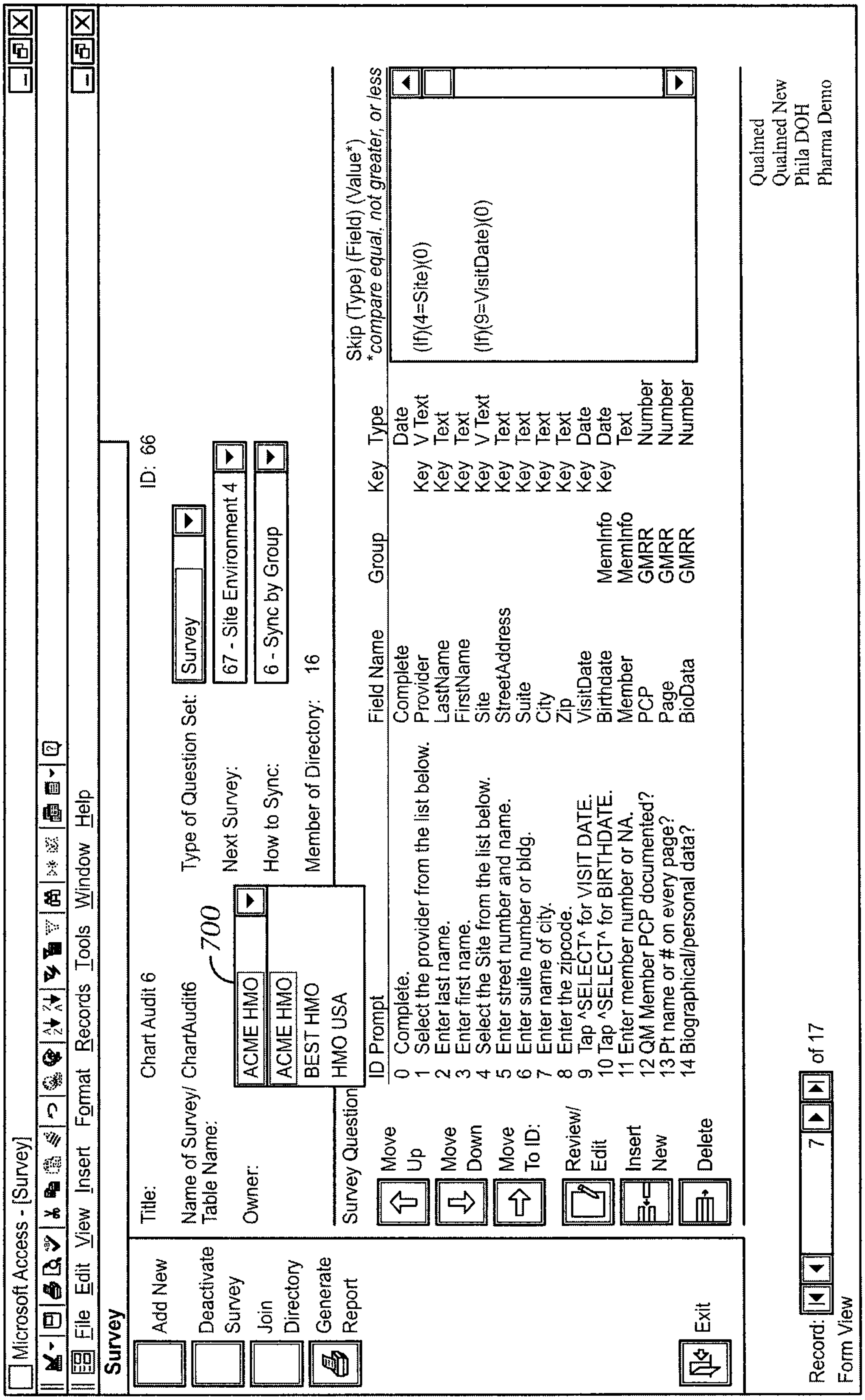
FIGS. 31A-31E are various screen shots of the project creator/report generator.
Figure 31B:
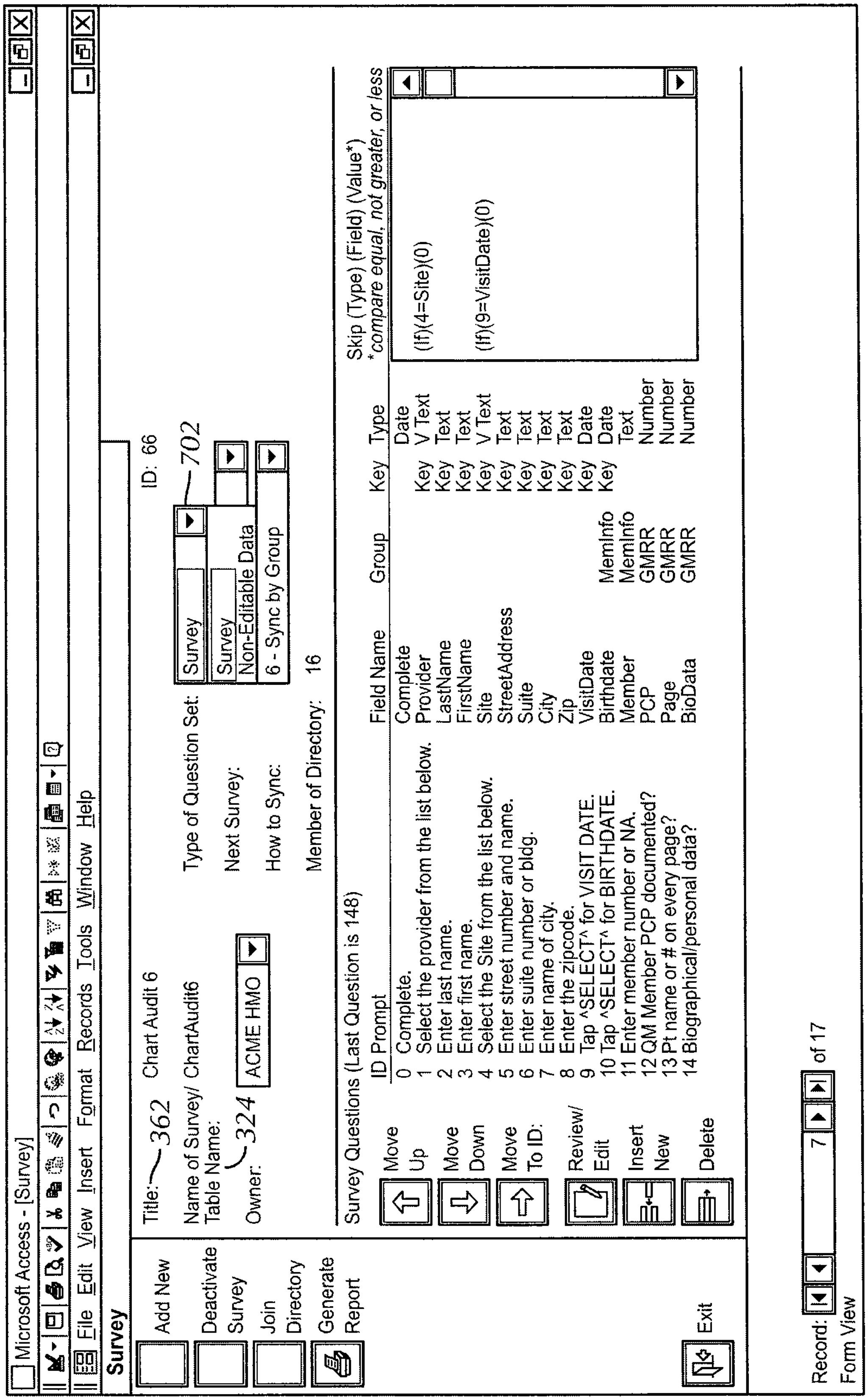
Figure 31C:
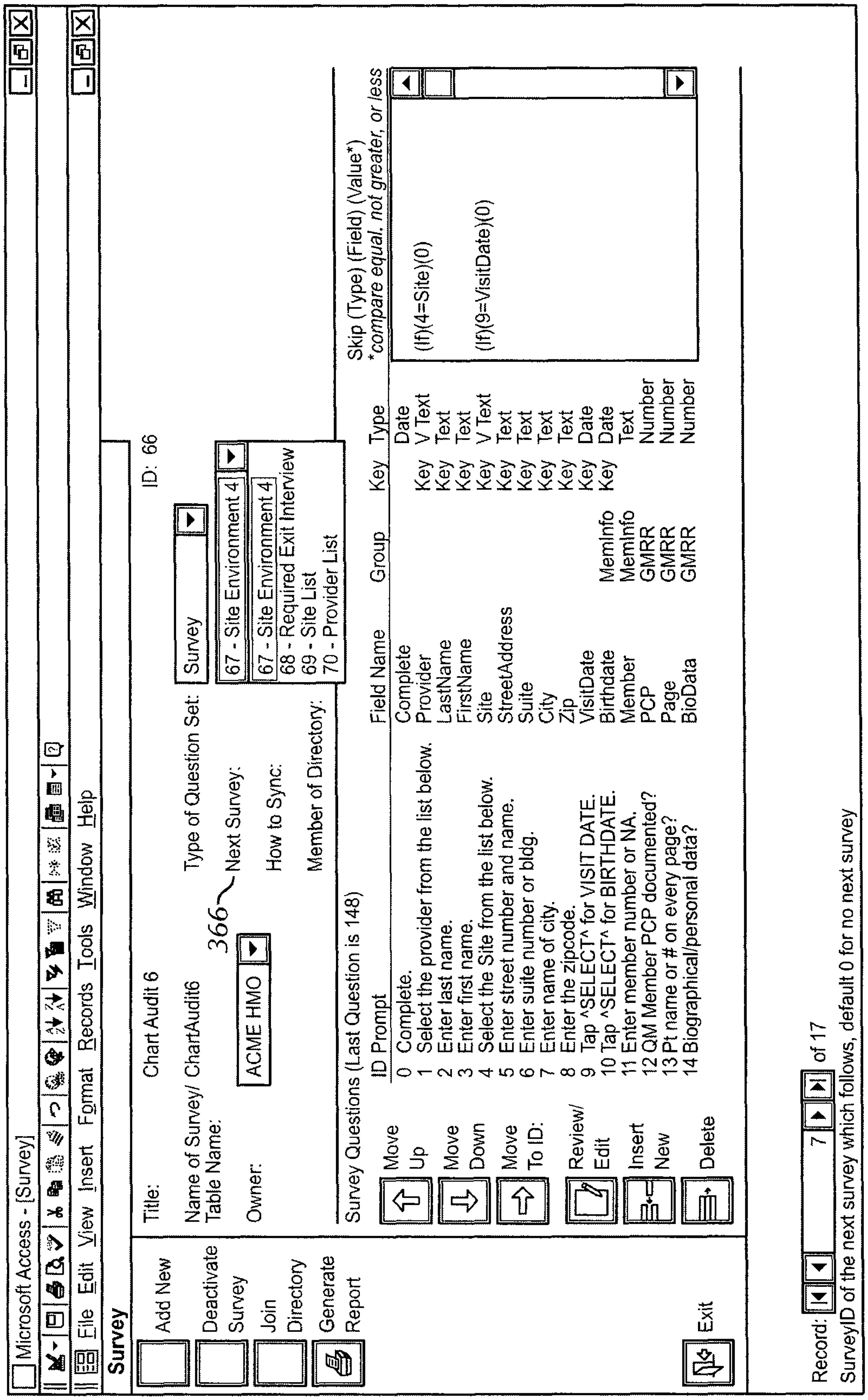

Field settings 114B shown in the entity relationship diagram seen in FIG. 7A section d, which depicts how each of the field settings 114B are used and how they relate to other items in the project. FIGS. 31A-31C is a similar entity relationship diagram that shows how all of the items relate to each other as part of the project schema 100 for the example project for ACME HMO.

Field settings 114B (seen in FIG. 7A section d):

Name Type

Field_name 356—a short text description of an individual field input form 120 that is referenced by other projects to aggregate normative information. Field name 356 is unique for each field input form 120 that is part of a survey 220 but not unique for a project schema 100. CDCDS users and field workers 36 can quickly identify items by the field_name 356, which appears in the field, input interface 112. Certain text are restricted from use as a field_name 356, e.g., date since the C++ code would reference that text as part of the code when it is not code.

FldID 320—number—or fieldID 320 are unique to each project schema 100 so that data integrity is maintained. However, fieldID 320 are not unique across the entire portable digital data capture and data/report distribution project(s) 58. A CDCDS user can organize input into categories using the fieldID 320 and then be able to aggregate and track data across projects. In healthcare and in many other industries, normative information is usually unavailable. Many different software requirements and many different types of paper forms have made it nearly impossible to standardize data capture without an act of congress. Using the fieldID 320 and/or the field_name 356 for tracking, allows a CDCDS user to implement numerous different projects yet have a way to aggregate data across projects. In addition, when a project is changed, as seen in FIG. 35, the CDCDS 70 can track the changes made to a field input forms 120 individually, or as they exist as part of a project schema 100 (see FIGS. 31A-31C.

Key 322—yesno—This allows a CDCDS user to mark a field-input form 120 as key 322. Field-input form 120 marked as key 322 can then be given various functions in a project schema 100, e.g., aggregate reports by key 322 field-input form 120, copy set of key 322 field-input form between records 500, survey 220, joined project schema 100, etc.

Type 326—number—signifies the nature of the field-input form 120 referring to field types 114A supported. For example, for a type 326 designated with 0 the field-input form 120 is a yesno, yesnona, etc; for a 1 the field-input form 120 is a date; for a 2 the field-input form 120 is a float_number i.e. decimal points are accepted; for a 3 the field-input form 120 is a text that can accept text entries; and for a 4 the field-input form 120 is a vtext, i.e., a list of items. Additional types 326 can be added as needed and made available for the CDCDS user to integrate as part of a project.

Length 328—number—denotes the number of character length for a text field-input form 120. If number field-input form 120 and 1 signifies byte length, otherwise Word length.

Format 330—text—nature of field-input form 120 that uses specific parameters.

Help 332—vtext—denotes a section of the field-input form 120 that describes in some detail reference material shown on the screen for the field worker 36 to more easily make a decision on what input should be chosen for a particular field input form 120.

Prompt 334—vtext—a short text description of the input that is required in the field-input form 120.

GUI 336—number—denotes the nature of the screen revealed to the user as field input form 120. For example, for a GUI 336 0 the field input form 120 would reveal no GUI; for a GUI 336 1 the field input form 120 would reveal a yesnoform; for a GUI 336 2 the field input form 120 would reveal a yesnonaform, among others. Referring to GUI 336 supported: number is an integer value from −32,768 to +32,768; text is a fixed length text string; and yesno is a Boolean value true/false. GUI 336 can be easily added and then made available to the CDCDS user for integration in a project.

Score 338—number—signifies a weighted score value, signed byte. In projects that a Score 338 is measured based on input, this defines what point amount should be assigned. For example, input can be assigned a Score 338 of 1. To calculate the actual meaning of this number in a project, the following items score_value 340 and score_method 342 must be considered as well.

Score_value 340—number—signifies the value needed for a Score 338. This denotes what particular input will result in a weighted score. For example if the field-input form 120 has been designated with a score 338 of 1 and a score value 340 of 4 (denoting the input thorough), when the input 4 is made, a score 338 is recorded. If any other input is made e.g., 5 (denoting the input adequate), then a score 338 is not recorded. This gives the CDCDS user flexibility in signifying score 338 based on differing input.

Score_method 342—number—signifies under what circumstance an input is scored. For example, if a CDCDS user designates the score_method 342 0 then a noscore is performed; if the user designates the score_method 342 1 then an if_value_score is performed; and 2 is an if_not_value_score. When integrating objects 114 into a project schema 100, the CDCDS user is allowed to designate values to these three field settings 114B, resulting in complex scoring capabilities. For example, if an input of 1 is made, this input can be read in conjunction with the above field settings 114B in order to designate a score for input. These three field settings 114B designated in combination together give the CDCDS user the ability to meet project-scoring requirements. Additional field settings 114B may be easily added as required.

Skip 344—number—denotes the field-input form 120 to move to in a project schema 100. This field setting 114B and the following two field settings 114B give the CDCDS user the ability to program project protocols 516 into a project schema 100.

Skip_value 346—number—signifies truth-value to skip. This signifies what value of input would require a skip 344. This can be done for numeric values. However, if text were assigned a numeric value, a skip 344 can be assigned to text as well.

Skip_method 348—number—signifies how the skip 344 is performed. For example, if a CDCDS user designates the skip_method 348 0 then noskip is performed; if 1 then if_value_skip is performed; if 2 then if_not_value_skip is performed; if 3 then a special_skip is performed; if 4 then if_value_skip_over is performed; if 5 then if_not_value_skip_over is performed; if 6 if_not_value_skip_to_end; among others.

Skip_relative 354—text—what field input form 120 the skip method 348 will reveal as the next appropriate one.

Reserved_one 380—numeric—where in a report form 118 of the input collected with this field input form 120 should this appear.

Reserved_two 376—numeric—in what group section in a report form 118 of the input collected with this field input form 120 should be aggregated.

Figure 14:
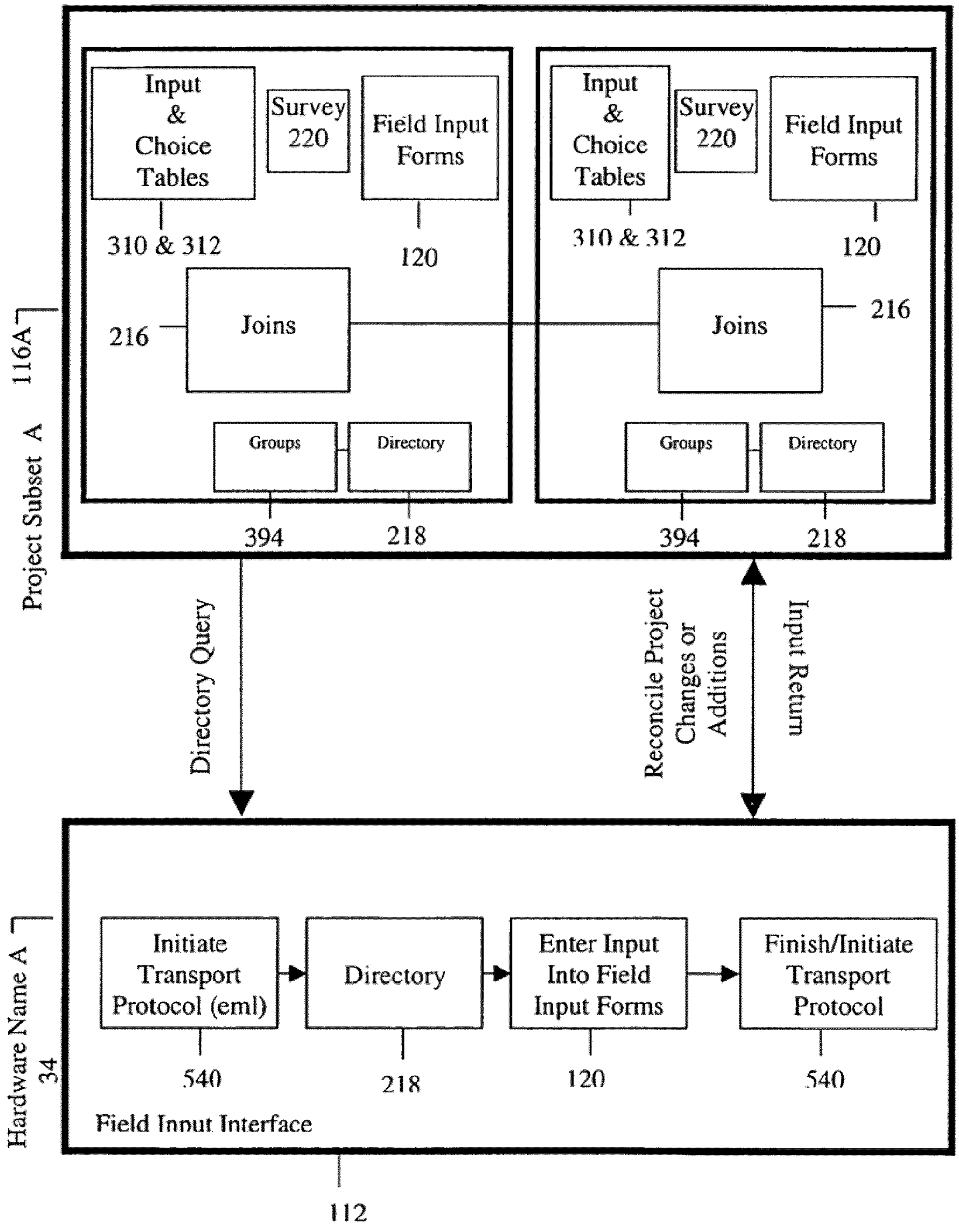
FIG. 14 is a block diagram showing the movement of information between the project database and the field input interface and its consequent relationships.

Additional skip settings can be added as needed and made available in the project database 60 for CDCDS users to designate values to input that will allow a complex set of protocol 516 (see FIGS. 30E and 30F) to be part of the field input interface 112. FIG. 14 shows the field input interface 112 as part of the directory 218 so that the individual field worker 36 will receive it as part of the project subset 116 on the hardware 34 that is designated for them only. The field-input interface 112 of FIG. 14 is set specifically for the exact piece of hardware 34 connecting to the project database 60. The CDCDS user accesses the programming language 124 through the project creator/report generator 108 to build the project schema 100 and mark them with a specific field worker 36 of a specific owner 300 as seen in the logistics component 126 of the portable digital data capture and data/report distribution project 58. The above three skip field settings 114B integrated in combination for each field input form 120 allow the CDCDS user to program protocol 516 and criteria logic that will allow the field input interface 112 to reveal only field input forms 120 according to programmed criteria, an example of which is seen in FIG. 30E and FIG. 30F. For example, a protocol 516 can be programmed by the CDCDS user that commands the field input interface 112 to not reveal to the field worker 36 field input form 120 #4-7 (Is prostate exam done?, Is testicular exam done?, Do male patients over 40 yrs receive rectal exams?) if a field worker 36 inputs "yes" in field input form #3 (Is this patient female). The logic programmed in each field input interface 112 and in each field input form 120 depends on how the CDCDS user organizes the above skip field settings 114B at the design and development of the project or during manipulation of the project. The present invention must allow the CDCDS user to have the ability to organize each of the three field settings 114B that relate to moving over or past field input forms 120 for criteria that require decisions to be made by the field worker 36. For example, a protocol 516 can be programmed to reveal the field input forms 120 relating to questions about an adolescent even if the field input form 120 for birth date is input with an adult birth date. Perhaps a field worker 36 has received an assignment to review care that was performed on adolescents who are now young adults. These complex protocol 516 are maintained each time that a field worker 36 connects to the project database 60 to be forwarded the project subset 116 that was designated specifically for them shown in FIG. 14. As seen in FIG. 8A, any project schema 100 changed by a CDCDS user will have the changes forwarded to the field worker 36. As long as the survey 220 is part of the directory 218 that is related to a field worker 36, as seen in FIG. 8B, changes in a survey 220 are immediately made available to the field worker 36 without any loss of integrity of the project.

GUI types—related to GUI 336:

Number—integer value from −32,768 to +32,768

Text—fixed length text string yesno—boolean value true/false. Additional GUI 336 can be added by modifying the GUI 336 and making any additions available in the project database 60. The following are methods/functions 114C that are available for programming a field-input interface 112 of FIG. 14.

Figure 8C:
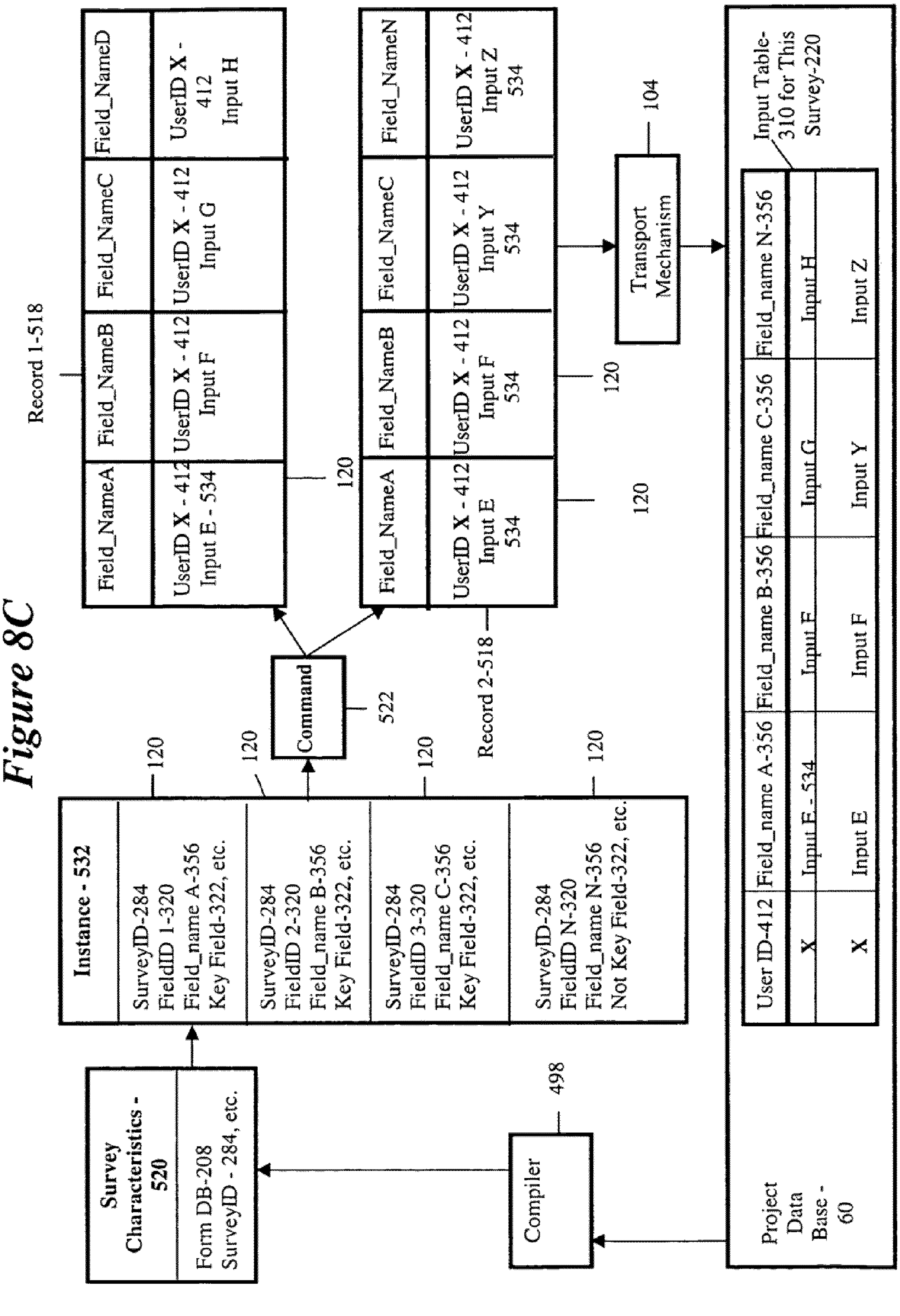
FIG. 8C is a block diagram that illustrates the input and storage of data.

Methods and Functions 114C:

FIG. 8C is a diagrammatic illustration of how the programming language 124 of FIG. 8A handles particular methods/functions 114C. All of the necessary objects 114, field types 114A, field settings 114B, and methods/functions 114C have been designated and described by the CDCDS user in the project database 60, using the programming language of FIG. 8A. In FIG. 8C, the compiler 498 references the project database 60 and loads the necessary program portions so that, as seen in FIG. 8C, an instance of a survey 220 with a very particular set of survey characteristics 520 (FIG. 14 will illustrate a diagram of how particular survey characteristics 520 are part of a project subset 116 forwarded to a hardware 34) is generated by the program. The survey 220 consists of a set of field-input form 120 that is generated on the hardware 34 by the program portions. When the field worker 36 initiates a method/function 114C by selecting a command 522 (e.g., new), an instance of a set of field input forms 120 constituting a record 518 is generated by the program. The record 518 is named according to the fieldID 320 or set of fieldID 320 that have been designated as key 322 by the CDCDS user in the project database 60. This allows the CDCDS user to set the naming conventions for a record 518, thus eliminating naming issues for each record 518 on the part of each field worker 36. By doing this, the present invention eliminates the file naming version control of the conventional system 10. These record 518 also appear on the hardware 34 of the field worker 36 as an instance of a record 518 with the file name designated by the input that the field worker 36 has made into the fields input forms 120 marked key 322. The records 518 are placed in the order in which they were generated by the field worker 36, since on a small screen, all field input form 120 marked key 322 are not visible to the field worker 36. Allowing more of the key 322 to be revealed on the screen of the field worker 36 can solve this problem.

The fact that the present invention has solved the naming convention is also extremely important for the integrity of the reports that are immediately accessible when data is returned to the project database 60. The naming of fields using key 322, the ability of the present invention to copy fields marked as key 322 between records 518 as designated by the CDCDS user, and the creation of input tables 310 by the present invention, ensures that data made available in reports is valid and that correct report parameters set by the CDCDS user at the beginning of the project are followed through the entire project. As can be seen in FIG. 8C, the input table 310 contains both record 1 518 and record 2 518 of input from the instance of the field-input forms 120 generated with the command 522 "new" by the field worker 36. This ensures that there is no additional programming needed to query by fields marked as key 322. A record 518 is set with the correct name automatically, and the report is simply referencing the correct records 518. This also guarantees the accurate management of the logistics of report distribution since the same fields marked as key 322 are referenced for report distribution. FIG. 8C illustrates that a record 518 of input 524 in each of the field input form 120 is transported back where a table is created in the project database 60. This input table 310 is created by the program to store an instance of the record 518 with only the field_name 356, the userID 412 and the registered input from this field worker 36. This record 518 is immediately available in the project database 60 to an owner 300 who accesses the report forms 118 of the project creator/report generator 108 of the framework 56 seen in FIG. 4 without additional querying of the project database.

An example of Record 518 find methods available in the program are:

```
Word FindFirst Record (Byte fldID, CharPtr s) ;
Word FindFirst Record       (Byte fldID, Word n) ;
Word FindNext Record (Byte fldID, CharPtr s) ;
Word FindNext Record        (Byte fldID, Word n) ;
```

An example of Record 518 access methods available in the program are:

```
        virtual        Uint        RecordNew ( ) ; //two entry points for records
        virtual        void        RecordOpen (Uint recID)
        virtual        CharPtr            SetRecord (Byte fldID, CharPtr s) ; //returns null if
fails
```

-continued

```
virtual   Word      SetRecord (Byte fldID, Word n) ; //returns null if fails
virtual   Byte      SetRecord (Byte fldID, Byte n) ;
virtual   DateTimeType   *SetRecord(Byte fldID, DateTimeType *pdate);
virtual   CharPtr   GetRecord(Byte fldID, CharPtr s);
virtual   Word      GetRecord(Byte fldID);
virtual   ULong          ulGetRecordFieldSize(Byte fldID);
virtual   DateTimeType *GetRecord(Byte fldID, DateTimeType *pdate);
virtual   Byte      NextField(Byte fldID);//calculates what next fieldID 320
should be revealed based on the combination of programmed protocol 516 i.e. skip__value 346,
skip 344, and skip__method 348 in a combination designated by the CDCDS user of the present
invention.
virtual   Err       eRecordClose( );
virtual   inline    UInt uiNumRecords( );
     //Miscellaneous Record Functions
virtual Err    eRecordDelete(UInt recID);
virtual Err    eRecordDuplicate(UInt recID);
virtual Byte   RecordScore(UInt recID); //returns percentage between 1 and 100(high)
virtual void   RecordScore(UInt recID, WordPtr raw, WordPtr raw__max); //calculates
raw score
virtual UInt   NewDerivedRecord(oaTable *db,UInt recID, Byte fldnum);
virtual UInt   NewDerivedRecord(UInt recID, Byte fldnum);
     //Public field methods
virtual Byte NewField(Byte fldID, Boolean key, CharPtr field__name,
field__type type, Byte length, CharPtr format, CharPtr help, CharPtr prompt,
gui__type gui, SByte score, score__method__type score__method, Word score__value, Byte
skip,
Word skip__value, skip__method__type skip__method); //returns fldID, NULL means error
virtual Byte        bNumFields( );
virtual Boolean     Key(Byte fldID);
virtual field__type Type(Byte fldID);
virtual Byte        Length(Byte fldID);
virtual CharPtr          Format(Byte fldID); //allocates memory, must be deleted
by caller
virtual VoidHand    Help(Byte fldID); //allocates memory via handle, must be freed
by caller
virtual VoidHand    Prompt(Byte fldID); //allocates memory, must be freed by caller
virtual gui__type   Gui(Byte fldID);
virtual CharPtr     Name(Byte fldID);
};
```

Additional methods/functions 114C can be easily added by a programmer and made available for use in the project schema 100. The present invention allows a great degree of flexibility in making additions and adding functionality.

The following is an example of the classes/objects 114 available for use.

Classes/objects 114 as seen in FIG. 8A:

Class: oFormDB 208

Type: Derived class from oaTable 210

Description: All databases with which the user interacts are instances of this class.

Fields are variable based on CDCDS user designation. This is how the field-input forms 120 will accept input from field workers 36. This can be expanded to accept inputs automatically without the interaction of human user, e.g., as when a device measuring and inputting data 52 is made part of a project.

Class: oFixed 214

Type: Derived class from oaTable 210

Description: All databases, which are unchangeable, are of this type. An unchangeable table in the present invention is a designated choice table 312 that appears in the field input form 120 as a list of choices. The list will be designated by the CDCDS user to appear in a particular field-input form 120 as a function of the joins 216, which is shown in FIG. 8D. For example, this fixed 214, designated to be revealed in the second field input form 120 in a field-input interface 112 has been joined to the survey 220 of this interface 112. This object 114 can be referenced to any table of choices. For example, the logistics manager 110 of the framework 56 of the present invention manages the assignment request made by the CDCDS user for particular doctors to be audited by a particular field worker 36. The resultant table of field worker 36 assignments is designated as the choice table 312 joined to the correctly designated field input form 120. The joins 216 are explained in more detail below and illustrated diagrammatically in FIG. 8D.

Class: oJoins 216

Type: Derived class from oaTable 210

Description: Table of all the connections between tables, which must be separate from other tables 400 in the project database 60 since they occur between tables. A join 216 is how the CDCDS user designates where a choice table 312 from the fixed 214 mentioned above would appear in a particular field input form that is part of a particular field input interface 112. A field worker 36 accessing a field-input form 120 cannot alter a field-input form 120 of a formDB 208 with a join 216 to a fixed 214. This is one of the ways that integrity of the data is kept throughout the system from the point of access by a CDCDS user for the purpose of logistics management to the point of a field worker 36 choosing an input from a choice table 312. An example of how the joins 216 is illustrated in FIG. 8D. Referring back to FIG. 8B, the CDCDS user has designated the directory 218 to have a join 216 related to the subsequent join entries 308. The first survey 1 220 is connected to survey 2 220 by the join 216. In the join entries 308, the CDCDS user has designated that in the fieldID 320 (or for the purposes of the illustration, field input form 1 120 of survey 1 220), should appear the field input form 2 120 of survey 2 220. Survey 2 220 will be generated by the program just as survey 1 220 was generated by the program, as shown in FIG. 8C. The difference with survey 2 220 in FIG. 8D is that one of the designated characteristics is that it is a fixed 214 and thus inaccessible by the field worker 36. Instead, the program will create a choice table 312 for survey 2 220 in the project database. This choice table 312 will appear as field input form 120 #1 in survey 1 220. Subsequently, the input chosen by the user will appear in the input table 310 in the first column of the record 518. The present invention allows a CDCDS user access to the choice table 312 in the project database where a list of accurate items are made available to the field worker 36 as a choice in the field input form 120. The present invention solves one of the issues of data integrity by allowing the field worker 36 to make an input from the choice table 312, as well as solving a logistics issue of ensuring that the correct field worker 36 (designated by user ID) receives the correct set of choices. In the conventional system 10 of FIG. 1A, human interaction with the data to verify and cross check the input made solves very few errors in the data.

The explanation above of FIG. 8D is set forth in code as follows:

*Referential integrity is enforced.

*Only one join 216 per field.

Fields

| Name | Type | Length Description |
|---|---|---|
| table1 | number | taID of first table |
| field1 | number | fiID of first table |
| table2 | number | taID of second table |
| field2 | number | fiID of first table |
| relationship | number | enumerated relationship btw 1 and 2 |

Class: oDirectory 218

Type: Derived class from oaTable 210

Description: The index for all the tables used by the library.

The following is a list of fields that allow the CDCDS user to designate a particular set of survey 220 characteristics 520 that denote the functionality of the survey 220 in a directory 218 for a particular project. A survey 220 is part of the directory 218 which consists of directory entries 374 of one or more survey 220 and their field input forms 120 as shown in FIG. 7B for one or more project schema 100 that are related to owner 300 and field worker 36 in the project logistics component 126 shown in FIG. 7A. As seen in FIG. 7B, a directory 218 consists of all tables referenced by the library. This includes the survey 220, the field input forms 120, the directory entries 396, and any join entries 308 that are included because of a designated join 216. FIG. 7B also shows that this particular directory 218 may have numerous surveys 220 with numerous field-input forms 120 and numerous join entries 308. The characteristics of a survey 220 are what the present invention references for the project schema 100. Below are a number of characteristics 520 of a survey 220. Additional characteristics may be added by a programmer without disturbing any of the project already designated by a CDCDS user.

Fields:

| Name | Type | Length Description |
|---|---|---|
| Name 324 | text 20 | Name of existing table of table |
| Type 286 | number | Type (int enumeration) |
| TaID 284 | number | IDta number of table Byte |
| Title 362 | text 23 | Title of Database |
| howtosync 288 | number | How table should be synced |
| nextsurvey 290 | number | number of next survey |
| nextfirst 294 | number | first question of nextsurvey (questions to copy 294) |
| reservedone 370 | number | report group |
| reservedtwo 372 | number | report group for aggregate scoring |

The following is a partial list of defines for the programming language of the present invention.

```
Defines:
    #define MAX__TABLES          15
    #define MAX__OFFSETS         512
    #define MAX__KEYS 15
    const ULong DataTypeID = 0x44617461L;//'Data'
    const ULong VLengthTypeID = 0x566C656EL;//'Vlen'
    const ULong FieldTypeID = 0x46696C64L;//'Fild'
    #define PDB__DB__NAME__SIZE          32   //31 chars+null max
    #define PDB__USER__NAME__SIZE        64   //63 chars+null max
    #define FLDID__SIZE          (sizeof(Byte))
    #define FLDID__OS            0
    #define KEY__SIZE            (sizeof(Boolean))
    #define KEY__OS                      (FLDID__OS+FLDID__SIZE)
    #define TYPE__SIZE           (sizeof(Byte))
    #define TYPE__OS                     (KEY__OS+KEY__SIZE)
    #defineLENGTH__SIZE                  (sizeof(Byte))
    #defineLENGTH__OS            (TYPE__OS+TYPE__SIZE)
    #define SCORE__SIZE                  (sizeof(SByte))
    #define SCORE__OS            (LENGTH__OS+LENGTH__SIZE)
    #define GUI__SIZE            (sizeof(Byte))
    #define GUI__OS                      (SCORE__OS+SCORE__SIZE)
    #define HELP__SIZE           (sizeof(Word))
    #define HELP__OS                     (GUI__OS+GUI__SIZE)
    #define PROMPT__SIZE                 (sizeof(Word))
    #define PROMPT__OS                   (HELP__OS+HELP__SIZE)
    #define FORMAT__SIZE                 (22)
    #define FORMAT__OS                   (PROMPT__OS+PROMPT__SIZE)
    #define FIELD__NAME__SIZE            (20)
    #define FIELD__NAME__OS      (FORMAT__OS+FORMAT__SIZE)
    #define SCORE__VALUE__SIZE (sizeof(Word))
    #define SCORE__VALUE__OS             (FIELD__NAME__OS+FIELD__NAME__SIZE)
```

-continued

```
#define SCORE__METHOD__SIZE          (sizeof(Byte))
#define SCORE__METHOD__OS            (SCORE__VALUE__OS+SCORE__VALUE__SIZE)
#define SKIP__SIZE          (sizeof(Byte))
#define SKIP__OS
(SCORE__METHOD__OS+SCORE__METHOD__SIZE)
#define SKIP__VALUE__SIZE(sizeof(Word))
#define SKIP__VALUE__OS          (SKIP__OS+SKIP__SIZE)
#define SKIP__METHOD__SIZE            (sizeof(Byte))
#define SKIP__METHOD__OS(SKIP__VALUE__OS+SKIP__VALUE__SIZE)
#define RESERVED__ONE__SIZE          (sizeof(Word))
#define RESERVED__ONE__OS            (SKIP__METHOD__OS+SKIP__METHOD__SIZE)
#define RESERVED__TWO__SIZE          (sizeof(Word))
#define PDB__DIR__NAME__OS                          0
#define PDB__DIR__NAME__SIZE                        (sizeof(char)*20)
#define PDB__DIR__TYPE__OS
(PDB__DIR__NAME__OS+PDB__DIR__NAME__SIZE)
#define PDB__DIR__TYPE__SIZE                        (sizeof(Word))
#define PDB__DIR__SURVEYID__OS                      (PDB__DIR__TYPE__OS +
PDB__DIR__TYPE__SIZE)
#define PDB__DIR__SURVEYID__SIZE                    (sizeof(Word))
#define PDB__DIR__TITLE__OS                         (PDB__DIR__SURVEYID__OS +
PDB__DIR__SURVEYID__SIZE)
#define PDB__DIR__TITLE__SIZE                       (sizeof(char)*23)
#define PDB__DIR__HOWTOSYNC__OS                     (PDB__DIR__TITLE__OS +
PDB__DIR__TITLE__SIZE)
#define PDB__DIR__HOWTOSYNC__SIZE                   (sizeof(Word))
#define PDB__DIR__NEXTSURVEY__OS                    (PDB__DIR__HOWTOSYNC__OS +
PDB__DIR__HOWTOSYNC__SIZE)
#define PDB__DIR__NEXTSURVEY__SIZE                  (sizeof(Word))
#define PDB__DIR__NEXTFIRSTQUESTION__OS             (PDB__DIR__NEXTSURVEY__OS +
PDB__DIR__NEXTSURVEY__SIZE)
#define PDB__DIR__NEXTFIRSTQUESTION__SIZE(sizeof(Word))
#define PDB__DIR__RESERVEDONE__OS
(PDB__DIR__NEXTFIRSTQUESTION__OS +
PDB__DIR__NEXTFIRSTQUESTION__SIZE)
#define PDB__JOIN__TABLE1__OS                       0
#define PDB__JOIN__TABLE1__SIZE       (sizeof(Word))
#define PDB__JOIN__FIELD1__OS
(PDB__JOIN__TABLE1__OS+PDB__JOIN__TABLE1__SIZE)
#define PDB__JOIN__FIELD1__SIZE       (sizeof(Word))
#define PDB__JOIN__TABLE2__OS
(PDB__JOIN__FIELD1__OS+PDB__JOIN__FIELD1__SIZE)
#define PDB__JOIN__TABLE2__SIZE       (sizeof(Word))
#define PDB__JOIN__FIELD2__OS
(PDB__JOIN__TABLE2__OS+PDB__JOIN__TABLE2__SIZE)
#define PDB__JOIN__FIELD2__SIZE       (sizeof(Word))
#define PDB__JOIN__RELATIONSHIP__OS
(PDB__JOIN__FIELD2__OS+PDB__JOIN__FIELD2__SIZE)
#define PDB__JOIN__RELATIONSHIP__SIZE               (sizeof(Word))
#define PDB__JOIN__SIZE
(PDB__JOIN__RELATIONSHIP__OS+PDB__JOIN__RELATIONSHIP__SIZE)
//enums are stored as bytes on Palm hardware 34, but are ints(16bit/32bit) on
//windoze--must use defines on desktop to compensate.
//Palm: enum field__type{number =0; date, float__number, text, vtext};
#define PDB__NUMBER                   ((Byte)0)
#define PDB__DATE                ((Byte)1u)
#define PDB__FLOAT__NUMBER       ((Byte)2u)
#define PDB__TEXT                ((Byte)3u)
#define PDB__VTEXT               ((Byte)4u)
//Palm enum sync__type {no__sync =0, palm__to__desktop__by__user,
palm__to__desktop__by__group, sync__by__user, sync__by__group};
#define PDB__NO__SYNC                               ((Byte)0)
#define PDB__PALM__TO__DESKTOP__BY__USER        ((Byte)1)
#define PDB__PALM__TO__DESKTOP__BY__GROUP       ((Byte)2)
#define PDB__SYNC__BY__USER                     ((Byte)3)
#define PDB__SYNC__BY__GROUP                    ((Byte)4)
#define PDB__DESKTOP__TO__PALM__BY__USER        ((Byte)5)
#define PDB__DESKTOP__TO__PALM__BY__GROUP       ((Byte)6)
```

A programming tool can be made part of the framework 56 of the present invention to allow a programmer to more quickly add and define new objects 114, data types 114A, field settings 114B, methods/functions 114C, GUI 336, among others. The following are an example of the internal structures that are referenced in the code.

Internal Structures:

```
union broken__date {
        char c[sizeof(DateTimeType)];
        DateTimeType dt;
};
union broken__field{
        Byte c[2];
        field__type   e;
};
union broken__gui{
        Byte c[2];
        gui__type     e;
};
union broken__score{
        Byte c[2];
        score__method__type  e;
};
union broken__skip{
        Byte c[2];
        skip__method__type   e;
};
Word awOffsets[MAX__OFFSETS];
Word awTableOffsets[MAX__TABLES];
```

Below are descriptive details for some of the methods/functions 114C in the preferred embodiment of the present invention to illustrate how the programming language 124 is used to designate the methods/functions 114C of a portable digital data capture and data/report distribution project 58. Sample code for some are included for illustrative purposes.

oaTable::oaTable 210

Constructor method for oaTable 210 to load an existing table or create one if needed as discussed for FIGS. 8C and 8D.

Arguments:

| name | type | description |
|---|---|---|
| tmpname | CharPtr | Name of table to be loaded or created. |

oaTable::~oaTable

Deconstructor method for oaTable to close a table.

oaTable::uiNumRecords

Returns number of fields, which correspond to individual field-input forms 120 that are part of the field-input interface 112 of a project subset 116.

```
****************************************/
//sort function
        Int comparebyword( void *p1, void *p2,Int,SortRecordInfoPtr,
                SortRecordInfoPtr,VoidHand);
        Int comparebyword( void *p1, void *p2,Int,SortRecordInfoPtr,
                SortRecordInfoPtr,VoidHand)
        {
        if(*((Word *)p1) < *((Word *)p2))
                return -1;
        if(*((Word *)p1) > *((Word *)p2))
                return true;
```

-continued

```
        return 0;
        }
void oaTable::Setup( )
{
        DmQuickSort(dbRvlength,&comparebyword,0);
}
```

Retrieves information that was input by a field worker 36 into a field input form 120. It is just the input that is retrieved not the forms or any other part or requirement of the greater project. The retrieval of only the marked data is important because of the size of the object 114. Since this system is designed for remote use, it is important to consider the time it would take for a data object to travel. As this is applied to wireless technology, the less time the actual transfer of data takes place, the less chance of error and wear on the equipment, e.g., batteries. When the information that was input arrives at the project database 60, it is then correlated to the correct tables in relation to the project subset 116 of the portable digital data capture and data/report distribution project 58.

```
/****************************************
oaTable::uiNumRecords
Returns number of fields.
****************************************/
inline UInt oaTable::uiNumRecords( )
{
        return DmNumRecords(dbRdata);
}
```

Retrieves and stores the number of field input forms 120, which correspond to the number of fields in a project schema 100, in specified tables.

```
/****************************************
oaTable::bNumFields
Returns number of fields.
****************************************/
inline Byte oaTable::bNumFields( )
{
        return (Byte)DmNumRecords(dbRfields);
}
```

Retrieves and stores the number of input in the field input forms 120 of the survey 220. This function combined with the previous function of the program is essential because they allow the field input forms 120 of the survey 220 and data to be stored, moved, and joined separately.

```
/****************************************
oaTable::ulFieldSize
Calculates the size of a field
****************************************/
inline ULong oaTable::ulFieldSize(Byte fldID)
{
```

-continued

```
            return awOffsets[awTableOffsets[Table-
Number]+fldID+1] −awOffsets[awTableOffsets[TableNumber]+fldID];
        }
        /*****************************************
        oaTable::CalculateOffsets
```

Calculates the size of a record 518. A record 518 as listed here is defined as a collection of field input forms 120 that are part of a particular survey 220 that are generated by the program for the purpose of receiving input from field workers 36 as part of a particular schema 100 in a project. Questions as listed below are field-input forms 120.

```
    *****************************************/
    void oaTable::CalculateOffsets( )
    {
        Word firstquestion, lastquestion;//the index of the questions
        Byte b = bNumFields( );
        Word shift = 0, x;
        if(b==0){
            return;
            }
        if(TableNumber == 0){ //directory is table
            firstquestion = 0;
            if(awTableOffsets[1] && awTableOffsets[1] < (b+1))
{//need to make room for more entries in 0 table
                lastquestion = b−1;
                //need to shift data down
                shift = (b+1)−awTableOffsets[1];
                }
            else if(!awTableOffsets[1]){
                lastquestion = b − 1;
                awTableOffsets[1] = b+1;
                }
            else    //
                lastquestion = b−1;
            }
        else if(awTableOffsets[TableNumber+1] == 0){ //last table
            firstquestion = awTableOffsets[TableNumber];
            lastquestion = b + firstquestion − 1;
            awTableOffsets[TableNumber+1] = b+firstquestion+1;
            }
        else { //middle table
            //need to move everything over to make room
            firstquestion = awTableOffsets[TableNumber];
            lastquestion = firstquestion + b −1;
            shift = (awTableOffsets[TableNumber]+b+1)−
awTableOffsets[TableNumber+1];
            }
        if(shift > 0){/
            for(x = MAX_OFFSETS−shift−1; x>lastquestion ;x−−)
            //shift awOffsets
                awOffsets[x+shift] = awOffsets[x];
            for(x = (TableNumber ==0) ? 1 : TableNumber+1;
awTableOffsets[x];x++) //shift awTableOffsets
                awTableOffsets[x] +=shift;
            }
        awOffsets[firstquestion] = 0;
        for(x = firstquestion; x<=lastquestion;x++){
            switch(Type(x−firstquestion)){
                case number:
                case vtext:
                    awOffsets[x+1] = awOffsets[x]+sizeof(Word);
                    break;
                case float_number:
                    awOffsets[x+1] = awOffsets[x]+sizeof(Long);
                    break;
                case text:
                    awOffsets[x+1] = awOffsets[x] + Length(x−firstquestion) *
sizeof(Byte);
```

-continued

```
                    break;
                case date:
                    awOffsets[x+1] = awOffsets[x] + sizeof(DateTimeType);
                    break;
            default:
                ErrNonFatalDisplayIf(true, "Invalid field type");
                break;
            }
        }
}
/*****************************************
oaTable::RecordNew
Creates a new record
*****************************************/
UInt oaTable::RecordNew( )
{
    Byte n = bNumFields( );
    ErrNonFatalDisplayIf(hCurrentRecord != NULL, "not closed");
    uiCurrentRecordID = (UInt)0xFFFF;
    ULong offset;
    hCurrentRecord = DmNewRecord (dbRdata, &uiCurrentRecordID,
    OFFSET(n));
    ErrNonFatalDisplayIf(hCurrentRecord == NULL, "couldn't open");
    VoidPtr vp = MemHandleLock(hCurrentRecord);
    for(Byte x=0; x<n;x++){ //init record to default
        offset= OFFSET(x);
        switch(Type(x)){
            case number:
            case vtext:
                DmSet(vp,offset,2, (Byte)0xFF);
                break;
            case float_number:
                DmSet(vp,offset,4, (Byte)0xFF);
                break;
            case text:
                DmSet(vp,offset,1, (Byte)'\0');
                break;
            case date:
                DmSet(vp,offset,2, (Byte)0xFF);
                break;
        }
    }
/*****************************************
oaTable::RecordOpen
Opens a selected record.
*****************************************/
/*****************************************
oaTable::SetRecord
Sets the field of a record for text fields, word fields, byte fields, date
fields, etc.
*****************************************/
/*****************************************
oaTable::GetRecord
Returns value of a text field, word or byte field, date field, etc.
s must be long enough to hold result, use
GetRecordFieldSize
*****************************************/
/*****************************************
oaTable::ulGetRecordFieldSize
Returns the memory use of a field in currentRecord
*****************************************/
/*****************************************
oaTable::NextField
```

Calculates what next field-input form 120 should be revealed to the field worker 36 based on the CDCDS user designating a particular skip 344, skip_value 346, and skip_method 348 that is referenced in the project database 60. Based on protocols 516 designated by a CDCDS user during the creation of a portable digital data capture and data/report distribution project 58, the code supports revealing certain field input forms 120 if a field worker 36 chooses an item on a choice list with a join 216 to the survey 220 of this field input form 120. For example, if a field worker 36 selects input from the choice table 312 for the doctor's last and first name, then the field input form 120 "enter last name of doctor" and the field input form 120 "enter first name of doctor" will not be revealed to the field worker 36. However, if the doctor's name is not one of the choices in the choice table 312, then the field worker 36 can select *Not on List 1* which is set by the program to add to each choice table 312. It is important to allow the field worker 36 this level of flexibility. The code inthe section below illustrates how the present invention calculates what is the next field input form 120 to be revealed to the field worker 36 based on the input made and the protocol 516 programmed into each field input form 120.

```
******************************************/
inline Byte oaTable::NextField(Byte fldID)       //returns null if fails
{
   Word skip__fldID;
   skip__method__type method;
   ErrNonFatalDisplayIf(hCurrentRecord == NULL, "record");
   if(fldID == (Byte)0xFF)
      return fldID;
   Byte bn = bNumFields( );
   DateTimeType dt;
   ULong secToday,secRecordDate;
   ErrNonFatalDisplayIf(fldID> bn, "field");
   switch(SkipMethod(fldID)){
      case if__value__skip:
         if(GetRecord(fldID)== SkipValue(fldID))
            fldID = Skip(fldID);
         else
            fldID++;
         break;
      case if__not__value__skip:
         if(GetRecord(fldID)== SkipValue(fldID))
            fldID++;
         else
            fldID = Skip(fldID);
         break;
      case special__skip:
         ErrNonFatalDisplayIf(Type(fldID)!= vtext, "type");
         CharPtr c =
(CharPtr)MemPtrNew(ulGetRecordFieldSize(fldID)+1);
         GetRecord(fldID, c);
         int z, m;
         int number;
         const char *index = "*Not On List*"+z;
         const char *counter = "*Not On List*"+m;
         while(number > 0){
            for(z = 0; z < number; z++){
               //for(m = 0; m < number; m++)
               if(!StrCompare(c, index) || !StrCompare(c, counter))
         /*if(!StrCompare(c, "*Not On List10*") || !StrCompare(c, "*Not
On List9*") || !StrCompare(c, "*Not On List8*") ||
!StrCompare(c, "*Not On List7*") ||
            !StrCompare(c, "*Not On List6*") || !StrCompare(c, "*Not
On List5*") || !StrCompare(c, "*Not On List4*") ||
!StrCompare(c, "*Not On List3*") ||
            !StrCompare(c, "*Not On List2*") || !StrCompare(c, "*Not
On List1*"))*/
                  fldID++;
               else
                  fldID = Skip(fldID);
            }
         }
         MemPtrFree(c);
         break;
      case skip__to__end:
         return 0xFF;
      case if__greater__skip:
         if(Type(fldID) == date){
            GetRecord(fldID, &dt);
            secToday= TimGetSeconds( );
            secRecordDate = TimDateTimeToSeconds (&dt);
            if(((secToday−secRecordDate)> ((ULong)SkipValue(fldID)
* SEC__IN__DAY)) && secToday>secRecordDate)
               fldID = Skip(fldID);
            else
               fldID++;
            break;
            }
```

-continued

```
         if(GetRecord(fldID) > SkipValue(fldID))
            fldID = Skip(fldID);
         else
            fldID++;
         break;
      case if__less__skip:
         if(Type(fldID) == date){
            GetRecord(fldID, &dt);
            secToday= TimGetSeconds( );
            secRecordDate = TimDateTimeToSeconds (&dt);
            if(((secToday−secRecordDate)< ((ULong)SkipValue(fldID)
* SEC__IN__DAY)) || secToday<secRecordDate)
               fldID = Skip(fldID);
            else
               fldID++;
            break;
            }
         if(GetRecord(fldID) < SkipValue(fldID))
            fldID = Skip(fldID);
         else
            fldID++;
         break;
      default:
         ++fldID;
         break;
   }
   Boolean cont = true;
   while(cont){
      if(fldID>=bn)
         return 0xFF;
      skip__fldID = Skip(fldID);
      method = SkipMethod(fldID);
      if(if__value__skip__over == method){
         if(GetRecord(skip__fldID) == SkipValue(fldID))
            fldID++;
         else
            cont = false;
      }
      else if(method == if__not__value__skip__over){
         if(GetRecord(skip__fldID) != SkipValue(fldID))
            fldID++;
         else
            cont = false;
      }
      else if(method == if__greater__skip__over){
         if(Type(skip__fldID) == date){
            GetRecord(skip__fldID, &dt);
            secToday= TimGetSeconds( );
            secRecordDate = TimDateTimeToSeconds (&dt);
            if(((secToday−secRecordDate)> ((ULong)SkipValue(fldID)
* SEC__IN__DAY)) && secToday>secRecordDate)
               fldID++;
            else
               cont = false;
            }
         else if(GetRecord(skip__fldID) > SkipValue(fldID))
            fldID++;
         else
            cont = false;
      }
      else if(method == if__less__skip__over){
         if(Type(skip__fldID) == date){
            GetRecord(skip__fldID, &dt);
            secToday = TimGetSeconds( );
            secRecordDate = TimDateTimeToSeconds (&dt);
            if(((secToday−secRecordDate)< ((ULong)SkipValue(fldID)
* SEC__IN__DAY)) || secToday<secRecordDate)
               fldID++;
            else
               cont = false;
            }
         else if(GetRecord(skip__fldID) < SkipValue(fldID))
            fldID++;
```

-continued

```
        else
            cont = false;
        }
    else
        cont = false;
    }
  return fldID;
}
```

Skip functions need to be efficient, since, as will be shown in the real world project section in FIG. 30E and FIG. 30F, the last field input form 120 may be referencing the input made in the first field input form 120 to calculate what is the next field input form 120 to be revealed to the field worker 36. The skip function allows for several methods of immediately moving around in the field input interface 112. The skip function is programmed in such a way that a skip can be based on a value or field name 356. The values used can be either positive or negative. The results can link the user to a previous or upcoming question. This function saves time and prevents error in documentation. The user does not need to search through pages or menus to find the next question (field input form 120). The next field-input form 120 automatically appears based on the response of the skip function. With this function, there is no danger of answering the wrong question since only questions programmed according to protocol 516 are revealed to the field worker 36.

```
/******************************************
oaTable::eRecordClose
Closes currentRecord.
******************************************/
/******************************************
oaTable::eRecordDelete
Deletes a record.
******************************************/
******************************************
oaTable::eRecordDuplicate
Deletes a record.
******************************************/
```

This part of the code deletes duplicate field input preventing the results from being skewed and keeps the integrity of the data.

```
/******************************************
oaTable::strGetVL
Returns Pointer to a variable length string
******************************************/
/******************************************
oaTable::wSetVL
Sets a variable length string, recalcs
size if needed, and creates new if needed
******************************************/
/******************************************
oaTable::DeleteVL
Deletes a variable length string
******************************************/
/******************************************
oaTable::LengthVL
Returns Pointer to a variable length string
******************************************/
/******************************************
oaTable::NewField
Creates New Field
******************************************/
```

This part of the code allows the system to grow without disturbing other field-input forms 120 or records 518. New information can be stored in a new field. This helps keep the integrity of current and past projects.

```
/******************************************
oaTable::DeleteField
Deletes a Field.
******************************************/
/******************************************
oaTable::Key
******************************************/
Boolean oaTable::Key(Byte fldID)
/******************************************
oaTable::Type
******************************************/
field__type oaTable::Type(Byte fldID)
/******************************************
oaTable::Length
******************************************/
Byte oaTable::Length(Byte fldID)
/******************************************
oaTable::Name
******************************************/
CharPtr oaTable::Name(Byte fldID)
/******************************************
oaTable::Format
******************************************/
CharPtr oaTable::Format(Byte fldID)
/******************************************
oaTable::Help
******************************************/
VoidHand oaTable::Help(Byte fldID)
```

Creating a table for help 332 assists the field worker 36 with the overall project. It allows them to have access to information that can clarify and explain not only the technical aspects of the system, but also the medical and organizational aspects of a particular assignment of a field worker 36.

```
/******************************************
oaTable::Prompt
******************************************/
VoidHand oaTable::Prompt(Byte fldID)
/******************************************
oaTable::Gui
******************************************/
gui__type      oaTable::Gui(Byte fldID)
Translates code to display on hardware 34.
/******************************************
oaTable::smtScoreMethod
method weighting.
******************************************/
score__method__type    oaTable::smtScoreMethod(Byte fldID)
```

This section of code is for aggregating results. It can allocate a value for an "if" case or an "if not" case.

```
/******************************************
oaTable::sbScore
weighted score value.
******************************************/
SByte oaTable::sbScore(Byte fldID)
Score ranges from 126 to -126 based on length of project specifications.
/******************************************
oaTable::Skip
******************************************/
Byte    oaTable::Skip(Byte fldID)
This function stores the information on what skips are to be performed/
******************************************
oaTable::SkipValue
******************************************/
Word oaTable::SkipValue(Byte fldID)
```

-continued

```
/*****************************************
oaTable::SkipMethod
*****************************************/
skip__method__type    oaTable::SkipMethod(Byte fldID)
/*****************************************
oaTable::RecordScore
returns a percentage between 1 and 100
*****************************************/
Byte oaTable::RecordScore(UInt recID)
```

This translates the score value 340 to a percentage which the user can apply however necessary.

```
/*****************************************
oaTable::RecordScore
Calculates raw score
*****************************************/
void oaTable::RecordScore(UInt recID, WordPtr raw, WordPtr raw__max)
Actually calculates the score based on the pre designated values to
answers.
/*****************************************
oaTable::NewDerivedRecord
Same as new record function, but uses an
existing record as the base. Leaves new record open.
Cross-table version.
*****************************************/
```

UInt oaTable::NewDerivedRecord(oaTable *source,UInt recID, Byte fldnum)

This part of the code of the present invention allows field input forms 120 designated by the CDCDS user as key 322 to be copied and used in a completely different field input form 120 for a different survey 220 marked with the characteristic of following this survey 220. A key 322 is unique to an individual field input form 120 but not across surveys 220. Each key 322 is independent within the survey 220 and can be inserted into any applicable survey 220 that is designated with this survey characteristic 520. This function in combination with the questiontocopy 368, allows the CDCDS user to mark only certain field input forms 120 for copying to a new record 518. The present invention allows the user to mark non key 322 in among the key 322, yet only the key 322 are copied bringing the field worker 36 to the next appropriate field input form 120 in the next record 518. In addition, it is not necessary to mark all that are key 322 to be copied. The example shown in the real world project will illustrate how this allows considerable flexibility when programming a project schema 100. The field-input forms 120 can then be aggregated in relation to any field-input form 120 where the CDCDS user marks the key 322. Allowing unique fields in this way lets a CDCDS user track changes to projects or compare project input with other project input.

```
/*****************************************
oaTable::NewDerivedRecord
Same as new record function, but uses an
existing record as the base.
Leaves new record open.
Single table version.
*****************************************/
```

This function allows information to be added to an existing table. This creates two separate tables allowing reference to old data as well as the new.

```
/*****************************************
oDirectory
Constructor method.
Sets up needed fields. Creates Joins 216 object.
*****************************************/
oDirectory::oDirectory(CharPtr s)
```

This part of the code provides links between various project schemas 100 that can be joined. Based on how the project directory 218 is designated and how the field worker 36 relates to the owner 300 of a project is what project subset 116 which includes the directory entries 396 and join entries 308 that a field worker 36 will be forwarded by the transport mechanism 104.

```
/*****************************************
~oDirectory
Deconstructor method.
Closes all open databases.
*****************************************/
oDirectory::~oDirectory( )
{
delete Joins; //joins removes connected table
//need to catch errors
```

This method systematically closes the open databases to keep the integrity of the data bases and tables. Only the project owner 300 can clear items to be put at the field workers 36 disposal.

```
/*****************************************
eAdd
oDirectory public method
Adds a new entry into the directory 218.
*****************************************/
```

This function can only be performed with particular permissions. This allows a project owner 300 to better control the information or study.

```
/*****************************************
GetFormDB
Returns a FormDB 208 object.
Null if fails.
*****************************************/
oFormDB *oDirectory::GetFormDB(Word taID)
{//taID must start at 1, not 0
```

Usually marked for transfer from the database to the field worker 36 field-input forms 120 from the database could be retrieved using this function.

```
/*****************************************
GetFixed
Returns a Fixed 214 object.
Null if fails.
*****************************************/
oFixed *oDirectory::GetFixed(Word joinID)
```

This part of the code retrieves objects from the database of objects.

```
/*****************************************
GetJoins
Returns a Joins 216 object.
Null if fails.
*****************************************/
oJoins *oDirectory::GetJoins( )
```

This retrieve function gets data that has been joined with other data in a preset fashion.

```
/*****************************************
oFormDB
Constructor method.
*****************************************/
oFormDB::oFormDB(CharPtr table__name, Word table__number):
oaTable(table__name
```

This function creates a new table to store forms from the database.

```
/*****************************************
oFormDB::eSort
Sorts a record by key or by date
*****************************************/
```

This allows for different methods of aggregating data. It can be sorted and moved by any selected key 322 filed input forms 120 or by date.

```
/*****************************************
oFormDB::RecordStamp
Stamps the first field with current time
*****************************************/
```

Automatically stamps the document with the time as soon as the first field input form is accessed.

```
/*****************************************
oFormDB::RecordUnstamp
RecordUnstamp
Removes the time stamp from a record.
*****************************************/
Err oFormDB::eRecordUnstamp( )
/*****************************************
oFormDB::GetRecordKey
GetRecordKey
```

Returns a string of the record 518 name for display to the field worker 36.

```
*****************************************/
Err oFormDB::eGetRecordKey(UInt recID,CharPtr s, UInt len)
```

This function allows the time stamp to be displayed.

```
/*****************************************
oFormDB::IsStamp
```

-continued

```
IsStamp
Removes the time stamp from a record.
*****************************************/
Boolean oFormDB::IsStamp(UInt recID)
/*****************************************
oFormDB::KeyViolation
returns true if key violation
*****************************************/
Boolean oFormDB::KeyViolation(UInt recID)
```

This function lets the user know if a record has been copied and all key 322 are the same, thus a violation of the unique nature of key 322 field input form 120 in a record 518. This helps the data uniformity and integrity.

```
/*****************************************
oFixed
Constructor method.
*****************************************/
oFixed::oFixed(CharPtr table__name, Byte linkfldID,
Word table__number): oaTable(table__name, table__number)
{
lfldID = linkfldID;
return;
}
```

This part of the code allows tables to be set up for fixed 214. These fields cannot be edited except by CDCDS users with permission.

```
/*****************************************
GetDisplayValue
Returns an unlocked handle to a non-editable
possible value.
needs to access handle with a +2 offset.
length is StrLen
*****************************************/
not editable except by CDCDS users with permission.
```

Allows whoever is responsible for the project to stay in control of the project. Field workers 36 cannot make changes to the field-input forms 120 or list of responses from the choice table 312 without proper authority.

```
/*****************************************
GetLinkID
Returns a value(linkID) for storage link
*****************************************/
Word oFixed::GetLinkID(Word num)
/*****************************************
GetLinkNum
Returns the number of a record, given linkID
*****************************************/
Word oFixed::GetLinkNum(Word linkID)
/*****************************************
oJoins
Constructor method.
Sets up needed fields.
*****************************************/
oJoins::oJoins(CharPtr s, Word table__number)
:oaTable(s, table__number)
Enters data from joins 216 to tables 400 as needed.
/*****************************************
oJoins::Add
Adds a new join 216 to the database.
*****************************************/
Word oJoins::Add(Word table1ID,Byte fld1ID, Word table2ID,
```

-continued

```
Byte fld2ID, relationship__type relationship)
{
/*****************************************
oJoins::Delete
Removes a join 216 from the database.
*****************************************/
Err oJoins::eDelete(Word joinID)
{
return eRecordDelete(joinID);
}
/*****************************************
oJoins::IsJoin
Returns the nature of join 216 that a record 518 shares in.
*****************************************/
```

This section of code specifies the relationship between two tables and the objects 114 stored in them. The relationship can be chosen to relate one object 114 to many or many objects 114 to one. This is illustrated in FIG. 8D where it is shown that survey 220 has a connection through a join 216 to survey 220*a*. In addition, it is shown that because the CDCDS user has marked the join entries 308 in the project database 60 to connect survey 220 to survey 220*a* at the field input form 1 120. The choice tables 312 are marked by the CDCDS user for sending updates of the hardware 34 by field worker 36.

```
/*****************************************
oJoins::GetJoinID
Returns the joinID 416 of a join 216.
dynamically rotates a join 216 if needed.
Must call IsJoin first to check if there is a join 216.
*****************************************/
```

This section of code retrieves a joined object after making sure the object was created.

```
/*****************************************
oJoins::IsValid
Returns true if joinID 416 is valid
*****************************************/
inline Boolean oJoins::IsValid(Word joinID)
{
return (DmNumRecords(dbRdata)>joinID)? true: false;
}
```

This function is to ensure the joins 216 requested are valid.

```
/*****************************************
oJoins::Table1ID
*****************************************/
inline Word oJoins::Table1ID(Word joinID)
```

This function marks the first table to be joined.

```
/*****************************************
oJoins::Fld1ID
*****************************************/
inline Byte oJoins::Fld1ID(Word joinID)
```

This marks the first field input form 120 marked as key 322, which is part of the first table, to be joined.

```
/*****************************************
oJoins::Table2ID
*****************************************/
inline Word oJoins::Table2ID(Word joinID)
```

This marks the second table (survey 220) to be joined with the first table (survey 220).

```
/*****************************************
oJoins::Fld2ID
*****************************************/
```

This marks the second field (field input form 120) to be joined with the first field (field input form 120).

```
/*****************************************
oJoins::Relationship
*****************************************/
inline relationship_type oJoins::Relationship(Word joinID)
```

This part of the code specifies the relationship between the two joined objects.

```
/************************************************************
* FUNCTION:  vpGetObjectPtr
*
* DESCRIPTION: This routine returns a pointer to an object in the
*        current form.
*
* PARAMETERS: formId - id of the form to display
*
* RETURNED:  VoidPtr
*
************************************************************/
```

This retrieves a changeable object and displays it in its current form.

```
/************************************************************
*
* FUNCTION:  CompleteDialog
*
* DESCRIPTION: Display dialog asking if survey 220 (the instance
or record 518 of this survey 220) should be marked complete
*
*
*PARAMETERS: none
*
* RETURNED:  returns button hit
*
************************************************************/
```

This is an important function because it highlights the concept of the programmed skip protocol 516. The programmed skip protocol 516 allow ease of use for the field worker 36 as well as supplying a quality control function for the CDCDS user. This function is mostly for quality control to insure that all field-input forms 120 receive the appropriate input. This function helps reduce input that is not viable. Records 518 that are not complete can be designated to be refused by the project database 60.

```
/************************************************************
 *
 * FUNCTION:   NextQuestion
 *
 * DESCRIPTION: Loads up the form for next question
 *
 *PARAMETERS: none
 *
 * RETURNED:   nothing
 *
 ************************************************************/
```

Loads next question (field input form 120) based on response from previous question (field input form 120).

```
/************************************************************
 *
 * FUNCTION: PreviousQuestion
 *
 * DESCRIPTION: Loads up the next form (field input form 120) for
previous question (field input form 120)
 *
```

-continued

```
 *
 * PARAMETERS: none
 *
 * RETURNED: nothing
 ************************************************************/
```

Loads up the previous question (field input form 120) and voids the answer to this question (field input form 120) so it must be completed to move on to the next question (field input form 120).

```
/************************************************************
 *
 * FUNCTION:   DatabaseInfo
 *
 * DESCRIPTION: Display database info dialog
 *
 * PARAMETERS:
 *
 * RETURNED:   nothing
 ************************************************************/
```

This function retrieves the database and displays how many surveys 220, how many records 518, and how much memeory is available for this particualr project schema 100. Records in this case are an instance of a set of field input from 120 that have been generated by the program as a result of selecting the command 522 "new". This allows the field worker 36 to see the progress of the overall project.

```
/************************************************************
 *
 * FUNCTION:   SurveyInfo
 *
 * DESCRIPTION: Displays a dialog with survey info
 *
 * PARAMETERS:
 *
 * RETURNED:   nothing
 ************************************************************/
```

If the user wanted to check on the status of a particular input, this function would be used to display the status of the records 518 for that survey 220. It communicates which field input forms 120 are answered and which field input forms 120 remain to be answered. It will also tell the field worker 36 when the input was begun in the field input forms 120.

```
/**********************************************************************
 *
 * FUNCTION: DefaultQuestionHandleEvent
 *
 * DESCRIPTION: This is the handler all question handlers call by default
 *
 *
 * PARAMETERS: eventP - a pointer to an EventType structure
 *
 * RETURNED: true if the event has handle and should not be passed
 *          to a higher level handler.
 **********************************************************************/
```

Boolean DefaultQuestionHandleEvent(EventPtr eventP);

This part of the code is responsible for picking the next question (field input form 120) to load. If there is no skip function programmed by the CDCDS user for this field input form 120, it automatically goes to this handler and the handler passes it around until it finds the next question (field input form 120).

```
/************************************************************
 *
 * FUNCTION:   JumpDialogFormInit
 *
 * DESCRIPTION: This routine initializes the JumpDialogForm form.
 *
 * PARAMETERS:   frm - pointer to the JumpDialogForm form.
 *
 * RETURNED: nothing
 ************************************************************/
```

static void JumpDialogFormInit(FormPtr pFrm)

This initializes the Jump forms. Uses a pointer to reference the choices of answers. The jump will be based on the answer. This allows the field worker 36 to move to a specific field input form 120 without moving through each of the field input form 120 prior.

```
/*************************************************************
 *
 * FUNCTION:   JumpDialogFormHandleEvent
 *
 * DESCRIPTION: This routine is the event handler for the
 *           "JumpDialogForm" of this application.
 *
 * PARAMETERS: eventP - a pointer to an EventType structure
 *
 * RETURNED:   true if the event has handle and should not be passed
 *           to a higher level handler.
 ************************************************************/
Boolean JumpDialogFormHandleEvent(EventPtr eventP);
Boolean JumpDialogFormHandleEvent(EventPtr eventP)
```

This is the way the jump is executed. A pointer is assigned and the jump is linked with the question field input form 120 and the pointer passes the information of the input (answer) and the jump is made based on this input.

```
/*************************************************************
 *
 * FUNCTION:   MemoQuestionFormInit
 *
 * DESCRIPTION: This routine initializes the MemoQuestionForm form.
 *
 * PARAMETERS: frm - pointer to the MemoQuestionForm form.
 *
 * RETURNED:   nothing
 ************************************************************/
static void MemoQuestionFormInit(FormPtr)
//Setup MainTableTable
}
```

This sets up a table for the field input form 120 that is designated to be a memo field type 114A where input is to be stored. A pointer is assigned so the table information can be changed and the current information can be accessed through the pointer.

```
/*************************************************************
 *
 * FUNCTION:   MemoQuestionFormHandleEvent
 *
 * DESCRIPTION: This routine is the event handler for the
 *           "MemoQuestionForm" of this application.
 *
 * PARAMETERS: eventP - a pointer to an EventType structure
 *
 * RETURNED:   true if the event has handle and should not be passed
 *           to a higher level handler.
 *
*************************************************************/
static Boolean MemoQuestionFormHandleEvent(EventPtr)
{
        return true;
}
```

This function is the pointer accessing the current information that resides in the memo field input form 120 table. As this is applied to the memo format, the same programming logic is applied to the other types of field input forms 120 with field types 114A such as date, number, text, yes/no, yes/no/na, or any other specified answer group.

```
/*************************************************************
 *
 * FUNCTION:   SelectFormInit
 *
 * DESCRIPTION: This routine initializes the SelectForm form.
 *
 * PARAMETERS: frm - pointer to the SelectForm form.
 *
 * RETURNED:   nothing
 ************************************************************/
static void SelectFormInit(FormPtr frm)
```

This initiates the select form function. It is similar to the field input form 120 process but in this instance the function is actually selecting an instance of a survey 220 which contains field input forms 120.

```
/*************************************************************
 *
 * FUNCTION:   SelectFormHandleEvent
 *
 * DESCRIPTION: This routine is the event handler for the
 *           "SelectForm" of this application.
 *
 * PARAMETERS: eventP - a pointer to an EventType structure
 *
 * RETURNED:   true if the event has handle and should not be passed
 *           to a higher level handler.
 ************************************************************/
static Boolean SelectFormHandleEvent(EventPtr eventP)
```

This event is preformed through a pointer function. This ensures the latest directory 218 gets to the field worker 36.

```
/*************************************************************
*
* FUNCTION:   MainFormTableSetValues
*
* DESCRIPTION: Sets the check boxes for the first column
*
* PARAMETERS: none
*
* RETURNED:   nothing
*************************************************************/
static Err MainFormTableSetValues( )
```

After the instance of a survey 220 is selected this sets up the physical field input form 120 of the survey 220 by displaying the appropriate place to enter input.

```
/*************************************************************
*
* FUNCTION:   MainFormInit
*
* DESCRIPTION: This routine initializes the MainForm form.
*
* PARAMETERS: frm - pointer to the MainForm form.
*
* RETURNED:   nothing
************************************************************/
static void MainFormInit(FormPtr pFrm)
```

This initializes the field input form 120 so that it can be put into use.

```
************************************************************
*
* FUNCTION:    MainFormHandleEvent
*
* DESCRIPTION: This routine is the event handler for the
*          "MainForm" of this application.
*
* PARAMETERS: eventP - a pointer to an EventType structure
*
* RETURNED:    true if the event has handle and should not be passed
*          to a higher level handler.
************************************************************/
static Boolean MainFormHandleEvent(EventPtr eventP)
```

This event is responsible for getting the most recent version of the instance of a survey 220 with correct field input forms 120 in order for the field worker 36 to enter input.

```
/************************************************************
*
* FUNCTION:    AppHandleEvent
*
* DESCRIPTION: This routine loads an instance of a survey 220
*          resources and set the event handler for the instance of the survey
*          220 loaded.
* PARAMETERS: event - a pointer to an EventType structure
*
* RETURNED:    true if the event has handle and should not be passed
*          to a higher level handler.
************************************************************/
static Boolean AppHandleEvent( EventPtr eventP)
```

The above section references the part of the code that is responsible for loading a particular instance of a survey 220 for a field worker.

```
/************************************************************
*
* FUNCTION:    AppStart
*
* DESCRIPTION: Get the current application's preferences.
*
* PARAMETERS:  nothing
*
* RETURNED:    Err value 0 if nothing went wrong
************************************************************/
static Err AppStart(void)
```

This part gives the user a custom directory 218 based on the preferences that are specified by the owner 300 of the project subset 116.

```
/************************************************************
*
* FUNCTION:    AppStop
*
* DESCRIPTION: Save the current state of the application.
*
* PARAMETERS:  nothing
*
* RETURNED:    nothing
************************************************************/
static void AppStop(void)
```

This function actually saves the changes made to the application at the time it is stopped. For example, if a field worker 36 comes to the last field input form 120 in a record 518, a file is automatically created and the new data from the record 518 is saved. When the field worker 36 returns to the project, the record 518 is as it was left by the field worker 36.

```
/************************************************************
*
* FUNCTION:    StarterPilotMain
*
* DESCRIPTION: This is the main entry point for the application.
* PARAMETERS: cmd - word value specifying the launch code.
*          cmdPB - pointer to a structure that is associated with the launch
*          code.
*          launchFlags - word value providing extra information about the
*          launch.
* RETURNED:    Result of launch
************************************************************/
DWord PilotMain(Word cmd, Ptr, Word)
```

This part of the code allows the project subset 116 to be forwarded to the specific hardware of the field worker 36 and be functional.

```
oaTable::oaTable
Constructor method for oaTable 210 to load an existing table or create
one if needed.
Arguments:
name        type        description
tmpname     CharPtr     Name of table to be loaded or created.
oaTable::~oaTable
Deconstructor method for oaTable 210 to close a table.
oaTable::uiNumRecords
```

Returns number of fields that correspond to individual field input forms 120 that are part of the field-input interface 112 of a project subset 116.

```
    ****************************************/
    //sort function
        Int comparebyword( void *p1, void *p2,Int,SortRecordInfoPtr,
            SortRecordInfoPtr,VoidHand);
        Int comparebyword( void *p1, void *p2,Int,SortRecordInfoPtr,
            SortRecordInfoPtr,VoidHand)
        {
        if(*((Word *)p1) < *((Word *)p2))
            return -1;
        if(*((Word *)p1) > *((Word *)p2))
            return true;
        return 0;
        }
    void oaTable::Setup( )
    {
        DmQuickSort(dbRvlength,&comparebyword,0);
    }
    /****************************************
    oaTable::uiNumRecords
    Returns number of fields.
    ****************************************/
    inline UInt oaTable::uiNumRecords( )
    {
        return DmNumRecords(dbRdata);
    }
    /****************************************
    oaTable::bNumFields
    Returns number of fields.
    ****************************************/
    inline Byte oaTable::bNumFields( )
    {
        return (Byte)DmNumRecords(dbRfields);
    }
```

-continued

```
/*****************************************
oaTable::ulFieldSize
Calculates the size of a field
*****************************************/
inline ULong oaTable::ulFieldSize(Byte fldID)
{
    return awOffsets[awTableOffsets[TableNumber]+fldID+1] −
awOffsets[awTableOffsets[TableNumber]+fldID];
}
/*****************************************
oaTable::CalculateOffsets
```

Calculates the size of a record 518. A record as listed here is defined as a collection of field input forms 120 that are an instance of a survey 220 that may or may not include input made by a field worker 36. Questions are the field-input forms 120 in a record 518.

```
/*****************************************
void oaTable::CalculateOffsets( )
{
    Word firstquestion, lastquestion;//the index of the questions
    Byte b = bNumFields( );
    Word shift = 0, x;
    if(b==0){
        return;
        }
    if(TableNumber == 0){ //directory is table
            firstquestion = 0;
            if(awTableOffsets[1] && awTableOffsets[1] < (b+1))
{//need to make room for more entries in 0 table
                lastquestion = b−1;
                //need to shift data down
                shift = (b+1)−awTableOffsets[1];
                }
            else if(!awTableOffsets[1]){
                lastquestion = b − 1;
                awTableOffsets[1] = b+1;
                }
            else    //don't bother to compact array
                lastquestion = b−1;
            }
        else if(awTableOffsets[TableNumber+1] == 0){ //last table
            firstquestion = awTableOffsets[TableNumber];
            lastquestion = b + firstquestion − 1;
            awTableOffsets[TableNumber+1] = b+firstquestion+1;
            }
        else { //middle table
            //need to move everything over to make room
            firstquestion = awTableOffsets[TableNumber];
            lastquestion = firstquestion + b −1;
            shift = (awTableOffsets[TableNumber]+b+1)−
awTableOffsets[TableNumber+1];
            }
        if(shift > 0){//don't bother to compact array
            for(x = MAX_OFFSETS−shift−1; x>lastquestion ;x−−)
            //shift awOffsets
                awOffsets[x+shift] = awOffsets[x];
            for(x = (TableNumber ==0) ? 1 : TableNumber+1;
awTableOffsets[x];x++) //shift awTableOffsets
                awTableOffsets[x] +=shift;
            }
        awOffsets[firstquestion] = 0;
        for(x = firstquestion; x<=lastquestion;x++){
            switch(Type(x−firstquestion)){
                case number:
                case vtext:
                    awOffsets[x+1] = awOffsets[x]+sizeof(Word);
                    break;
                case float_number:
                    awOffsets[x+1] = awOffsets[x]+sizeof(Long);
                    break;
                case text:
                    awOffsets[x+1] = awOffsets[x] +
Length(x−firstquestion) * sizeof(Byte);
```

-continued

```
                    break;
                case date:
                    awOffsets[x+1] = awOffsets[x] +
                    sizeof(DateTimeType);
                    break;
                default:
                    ErrNonFatalDisplayIf(true, "Invalid field type");
                    break;
                }
            }
}
/*****************************************
oaTable::RecordNew
Creates a new record
*****************************************/
UInt oaTable::RecordNew( )
{
Byte n = bNumFields( );
ErrNonFatalDisplayIf(hCurrentRecord != NULL, "not closed");
uiCurrentRecordID = (UInt)0xFFFF;
ULong offset;
hCurrentRecord = DmNewRecord (dbRdata, &uiCurrentRecordID,
OFFSET(n));
ErrNonFatalDisplayIf(hCurrentRecord == NULL, "couldn't open");
VoidPtr vp = MemHandleLock(hCurrentRecord);
for(Byte x=0; x<n;x++){ //init record to default
    offset= OFFSET(x);
    switch(Type(x)){
        case number:
        case vtext:
            DmSet(vp,offset,2, (Byte)0xFF);
            break;
        case float_number:
            DmSet(vp,offset,4, (Byte)0xFF);
            break;
        case text:
            DmSet(vp,offset,1, (Byte)'\0');
            break;
        case date:
            DmSet(vp,offset,2, (Byte)0xFF);
            break;
    }
}
/*****************************************
oaTable::RecordOpen
Opens a selected record.
*****************************************/
/*****************************************
oaTable::SetRecord
```

Sets the field of a record 518 for text fields type 114A field input forms 120, word field type 114A field input forms 120, byte field type 114A field input forms 120, date field type 114A field input forms 120, etc.

```
*****************************************/
/*****************************************
oaTable::GetRecord
Returns value of a text field, word or byte field, date field, etc.
s must be long enough to hold result, use
GetRecordFieldSize
*****************************************/
/*****************************************
oaTable::ulGetRecordFieldSize
Returns the memory use of a field in currentRecord
*****************************************/
/*****************************************
oaTable::NextField
calculates what next field input forms 120 should be based on skip
protocol 516
*****************************************/
```

This ends the section on the programming language 124 of the present invention.

In order to explain an important functionality of the present invention, refer to FIG. 8A which illustrates that the directory 218 of a portable digital data capture and data/report distribution project 58 contains the project schema 100 #1, 2, and 3. As is shown, the programmed project schema 100 is related to the owner 300 of the project and the field workers 36 as part of the logistics component 126 of the project in the project database 60. FIG. 8B illustrates the logistics component 126 in more detail, and the directory 218 in more detail, showing how field workers 36 are designated by the CDCDS user to have a particular hardware 428 and userID 412 as a mobile user. The field worker 36 will also have groupID 420 as part of the membership 392. The field worker's 36 groupID 420 is part of a group 394 that is shared by a particular ownerID 402. Both the particular ownerID 402 and worker's groupID 420 appear in the same group 394 with a particular directoryID 410. All of these designations together define the complex nature of a field worker 36. The field worker 36 defined by the CDCDS user in this manner allows the present invention to relate the nature of the field worker 36 in conjunction with the particular ownerID 402 and the particular directoryID 410 shown in the groups 394. The directoryID 410 in groups 394 is seen in the directory entries 396 table which connect it to a survey 220 with a one or more particular surveyID 284 which consist of one or more field input form 120, each with their own particular set of characteristics 520 for this surveyID 284. In addition, FIG. 8B illustrates a join 216 for a particular joinID 416 which will connect several of the survey 220 if a project requires joins 216. SurveyID 284 and surveyID 284*a* are shown to share the same joinID 416 in the join entries 308 table. SurveyID 284 is designated to connect to surveyID 284*a* at a particular fieldID 320 which designates a particular field input form 120 in each of the survey 220. This diagram does not show the connection between field input forms 120 in several different surveys 220. An illustration of this can be seen in FIG. 8D. A directory 218 may or may not include a join 216 or may include several particular joinID 416.

FIG. 8C is a detailed illustration of how one record 518 or more (record 1 518 and record 2 518) are created as a previously programmed instance 532 of all field input form 120 with this surveyID 284 as they appear in fieldID 320 order. The CDCDS user in the project database 60 had designated survey characteristics 520, e.g., formDB 208, join entries 308, etc., for surveyID 284. The compiler builds surveyID 284 based on these designated characteristics 520 and an instance 532 of surveyID 284 consists of more than one field input forms 120 and placed in the order of fieldID 320. The field worker 36 seen here as the userID 412 is given the option by the program to place a command 522 to generate record 1 518 for the user 412 to make input 534 using the field input form 120 corresponding to the field_name 356. The transport mechanism 104 is activated, either by the user 412, or as a function of the survey characteristics 520 (e.g., characteristics 520 consist of "when input 534 is made in the last field input form 120 in record 1 518, generate the transport mechanism 104"). When the connection is made to the project database 60, an input table 310 is created for surveyID 284. The instance of the record 518 for this user 412 that is simply the field_name 356 and the input 534 is the structure and data of the input table 310. The name of the record is designated by the user 412 when she enters input 534 into the field_name 356 that are marked as key 322 by the CDCDS user in the project database 60. This solves the issue of a naming convention for a record 518. When the user 412 completes a record 518, if it has been designated by the CDCDS user in the design of the project, the field worker 36 is given the option to repeat that instance of a record 518 with the field input forms 120 designated as key 322 to be copied. This can be seen in the input table 310 and the record 1 518 and record 2 518, where field_name A—356 and field_name B—356 has the same input 534.

Figure 8E:
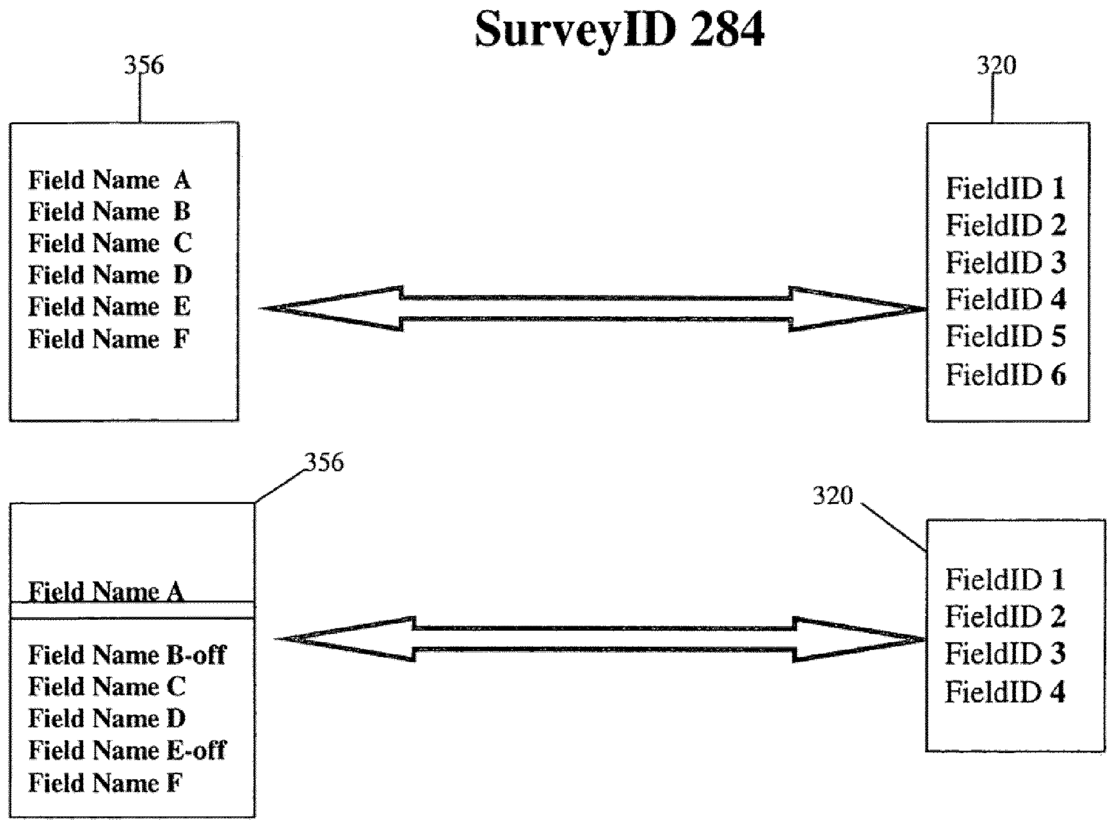
FIG. 8E illustrates changes made to a survey and the results.

FIG. 8D is a diagram similar to 8C, except that it illustrates the use of a join 416 in a project schema 100 (seen in FIG. 8A). FIG. 8D illustrates surveyID 284 that belongs to a directory 218 with join entries 308 (see FIG. 8B) and has a joinID 416. SurveyID 284*a* belongs to the same directory 218 with join entries 308 and has the same joinID 416. Like in FIG. 8C, an instance 532 is built by the compiler 498 for surveyID 284, and an instance 532*a* is generated for surveyID 284 which consists of fieldID 1 320*a* only in FIG. 8D. In FIG. 8D, surveyID 284*a* has the characteristics of a fixed 214 and not a formDB 208. No field input form 120 is available for this field_name 320 but it is revealed in the fieldID 1 320 in record 1 518 which is generated by the command 522. The field input form 120 for record 1 518—field_name A is revealed to the user 412 as a list of choices. The choice table 312 was created in the project database 60 by the program. However, this surveyID 284*a* was given the characteristic howtosync 288 that will allow the items in the table to be forwarded to the hardware 34 for userID X 412, field input form 120 with field_name Aa 356 as a list of choices. This choice table 312 is part of the logistics management for the assignments of field workers 36 that will be discussed in the logistics visualization section. This choice table 312 with a current set of input 534 is available in the project database 60, making it available for this userID 412. The field worker 36 can be given the option to have a choice in the choice table 312 include a * Not on List 1 * which will allow the field input form 120 to be revealed that allows the field worker 36 to enter input instead of choosing from a list. The illustrations in diagram 8B and 8C are a detailed illustration of a field worker 36 making input into records 518. FIG. 8E is an illustration of how an instance 532 with survey characteristics 520 that is generated by the compiler shown in FIG. 8C can be changed without disrupting the project. Changes to the project can be programmed in numerous ways. For example, as seen in FIG. 8B, a surveyID 284 can be removed from the directory 218 and a new surveyID 284*a* added. During the connection to the project database 60 a field worker 36 will only have the directory 218 with the new surveyID 284*a* as part of the project schema 100 (see FIG. 8A). FIG. 8E illustrates that when a CDCDS user marks the field_name 356 in surveyID 284 with toggle off, the next time a field worker 36 connects to the project database 60, the fieldID 320 marked with the toggle off are removed from the record 518. Numerous ways of making changes to the project can be implemented because of the encapsulation of the program portions, without disturbing the project. The following figures will explain in more detail the encapsulation of the program portions and how this allows the CDCDS user to automate the logistics management of a portion of the portable digital data capture and data/report distribution project 58.

FIG. 9 is a Venn diagram that shows some of the major elements that are part of a portable digital data capture and data/report distribution project 58. Elements have not been included for the management of assignment logistics, which will be discussed in detail in the logistics visualization section. In FIG. 9, the logistics of assignments includes the choice tables 312, a portion of the input tables 310, the owner 300, the mobile user 390, and the surveys 220, all of which will be discussed later. FIG. 9 is visualization of how each of the items for an owner 300 of a project in the tables in the project database 60 relates to other owner 300 items. Projects can be very complex and may include numerous combinations of project schemas 100, owners 300 and field workers 36 as mobile users 390 with their group 394 and group membership 392 characteristics as they relate to each other. Although a project schema 100 is not shown in FIG. 9, the project schema 100 is signified by any combination of one or more survey 220, field input forms 120, belonging to a particular directory 218, with designated directory entries 396, and/or joins 216 with accompanying join entries 308. The project schemas 100 for any owner 300 will also have input tables 310 and/or choice tables 312. These complex sets of relationships in the project database 60 allow the CDCDS user to take full advantage of encapsulation for the field worker 36. In healthcare, as in other industries, it is likely that an individual worker will be involved in more than one project. However, if the same field worker 36 is entered in the database multiple times for multiple projects, errors can occur and tracking the data associated with each separate field worker will take hours of analysis.

FIG. 10 is a block diagram illustrating the ability of the present invention to define field workers 36 to be related to numerous project schema 100. FIG. 10 also illustrates the encapsulation of project schema 100 which can reference different sets of field workers 36. When a CDCDS user designates that a field worker 36 is related to not just one but several different project schemas 100 in the project database, this connects the field worker 36 to a project but does not require information on the field worker 36 to be reprogrammed if they take part in a different project. The value of this in healthcare and in other industries is that field workers 36 with highly specialized skills can be part of a project where their skills apply, yet not receive work materials for a project that does not need their skill set. The CDCDS of the present invention allows for better logistics management of field worker 36 skills, without interrupting the flow of a project. The CDCDS of the present invention allows for the logistics of the CDCDS forwarding the project schema 100 that relate to specific field workers 36. Because project schema 100 is built once and available for use in numerous projects, any upgrades that improve the performance of the project schema 100 are made available to any field worker 36 for any project. This maintains the integrity of the system and allows the CDCDS 70 of the present invention to deliver increasing efficiencies without disrupting the project. Each of the items in FIG. 9 is referenced to objects 114 that are available in the object schema store 62 as seen in FIG. 6 and can be integrated by a CDCDS user into a project schema 100 of the project database 60 as seen in FIG. 8A. Due to the encapsulation of the project schemas 100, the field workers 36, and the owners 300, each of the elements of a portable digital data capture and data/report distribution process 58 can be part of other projects or take part in other projects. A data structure that relate these items or remove the relationships between these items allow information to flow in an efficient manner and reduces the need for management logic implemented appropriately each time a project is implemented or a project is changed.

Figure 11:
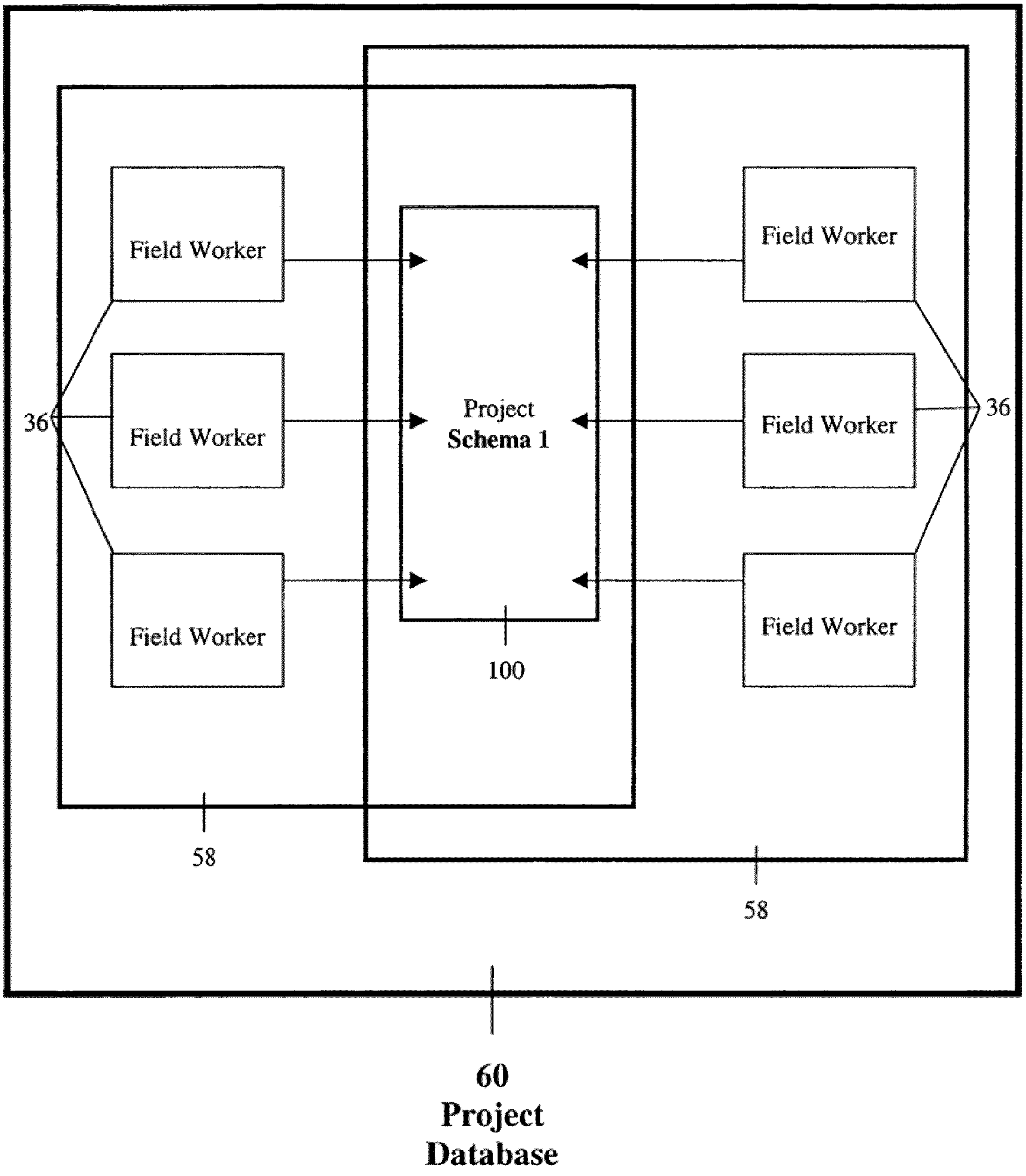
FIG. 11 is an illustration of the encapsulation of a project schema and how many field workers can share that schema.
Figure 12:
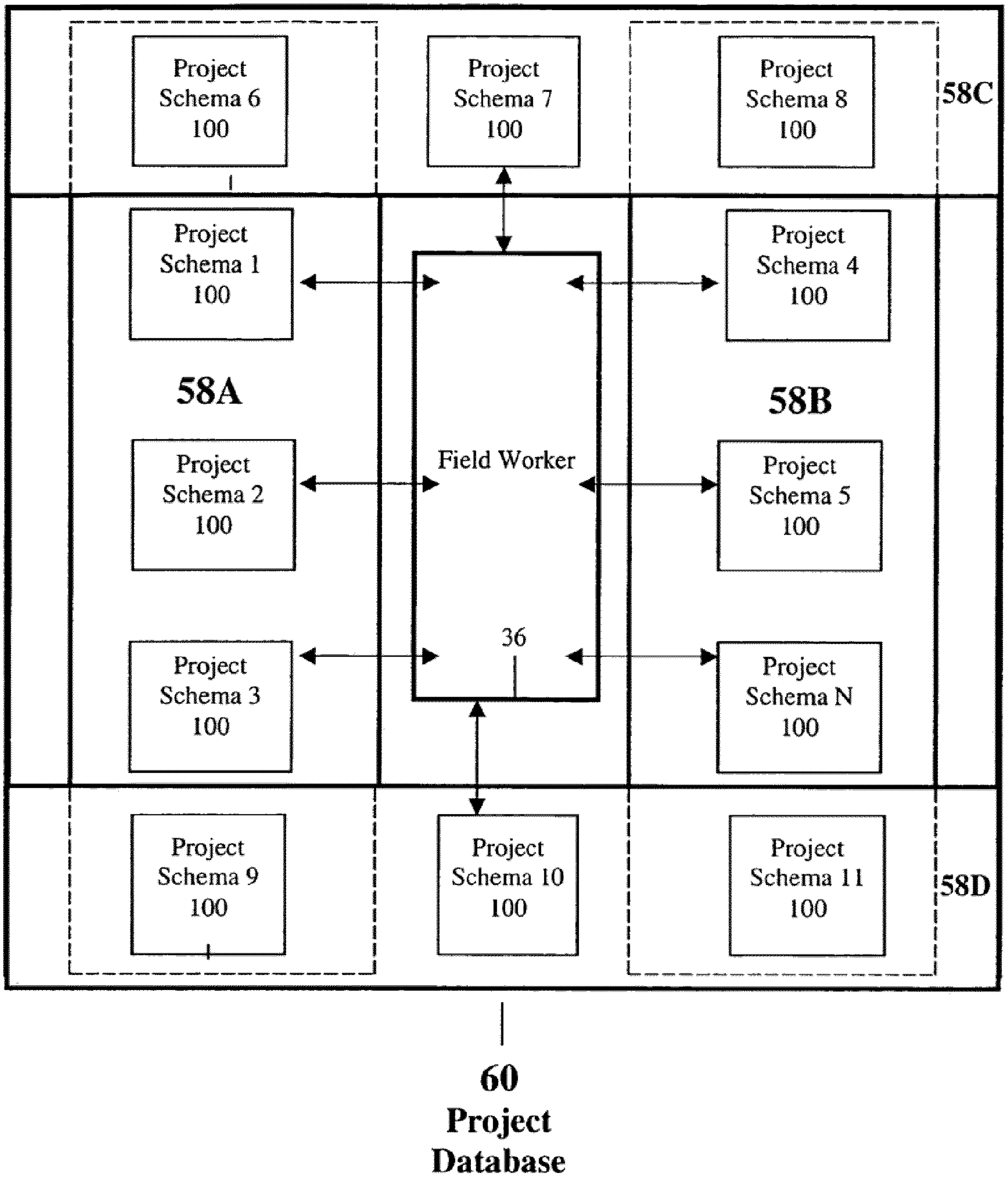
FIG. 12 is an illustration of the encapsulation of a project and how the schema and field workers can share parts of projects.

FIG. 10 is an illustration of the field worker 36 referencing multiple project schema 100 in multiple portable digital data capture and data/report distribution project 58. FIG. 11 is another illustration of the encapsulation used in the present invention. In FIG. 11, project schema 100 is available, apart from their relationship to field workers 36, to other portable digital data capture and data/report distribution project 58. FIG. 12 illustrates that project schema 100, field worker 36 and portable digital data capture and data/report distribution project 58 can each reference different items in the project database and be referenced by different items as well. The invention allows a CDCDS user to build a project or set of projects and then reference the items in a project in a similar fashion to a library of code objects can be referenced and shared by different programs. The invention allows the CDCDS user to continually add items to the project database and make these items available for any project. The table structures and the object-oriented design in the present invention allow the CDCDS user to manipulate the objects for integration into projects or for a change in a project. With this ability to reference the numerous items in the project database 60 for any project, it is necessary that the CDCDS user designate a project subset 116 from the project database 60 to be forwarded to the field worker 36 as is designated by the relationships in the tables 400 seen in FIGS. 7A-7B.

FIG. 14 is a flow diagram showing the project subset 116 that is forwarded during connection with the hardware A 34. The CDCDS user designates the initial project design by signifying items in the groups 394 table (for logistics management) and designates items included in the directory 218 (information of what project schema 100 is included). The user will designate in the directory 218 details on the survey 220 (field input forms 120 not shown), the creation of the input tables 310 and choice tables 312, and the joins 216 (if included in the project). These designations made in the tables will be forwarded to the hardware A 34 by a query of the directory in the project subset A 116. A field worker 36 with a particular mobile user designation of a last name 422 and hardware name 428 (not shown) will connect to the project database 60 with certain hardware 34. The field worker 36 with this hardware 34 during the connection will be recognized by what group membership 392 is associated with this hardware 34 making it possible for the hardware 34 to be forwarded the appropriate project subset 116 of this field worker 36. The present invention uses ODBC with the transport mechanism 104 (see FIG. 4), and based on the designations group membership 392 and mobile user 390 (see FIG. 7A) related to owner 300 in a group 394, the appropriate project subset 116 is forwarded to the field worker 36. During the connection between the two, any manipulation of the project is reconciled between versions of the project. The hardware A 34 will have initiated the transport protocol 540 at, which time the very specific directory 218 for this hardware A 34 will be available for a long term transaction, disconnected from the project database 60. The present invention allows this system of a queried directory available on the hardware 34 for the purpose of a long term transaction, since staying connected to the project database 60 may not be feasible with current hardware and data communication services. However, the present invention manages the reconciliation between the project database 60 and the project subset 116 regardless of the hardware 34 or how a user has changed the specifics of the project subset 116. As seen in FIG. 14, the field-input interface 112 is what appears on the hardware 34. Data is entered into the field-input forms 120 and then the transport protocol 540 is initiated.

During connection to the project database 60 changes between the project subset 116 and the field input interface 112 is reconciled as requested by the CDCDS user. The field-input interface 112 is designed to reveal one field-input form 120 per screen with a limited but adequate number of input choices on that same screen. When the field worker 36 makes the input into the field-input form 120 the data is temporarily stored and a new field-input form 120 appears on the screen. If necessary, the logic is already programmed into the field input interface 112 so there is no chance of omitting a response or inputting a frivolous response. Once the fieldwork is complete, the data is ready to be returned to the project database 60 through whatever transport mechanism 104 needed. Again, there is no need for the field worker 36 to make special commands during the transport, since all necessary work is performed by the present invention for the field worker 36. It is important to realize that only the input is being transmitted to the project database 60 because the field-input interface 112 is still stored in the hardware 34.

Figure 15:
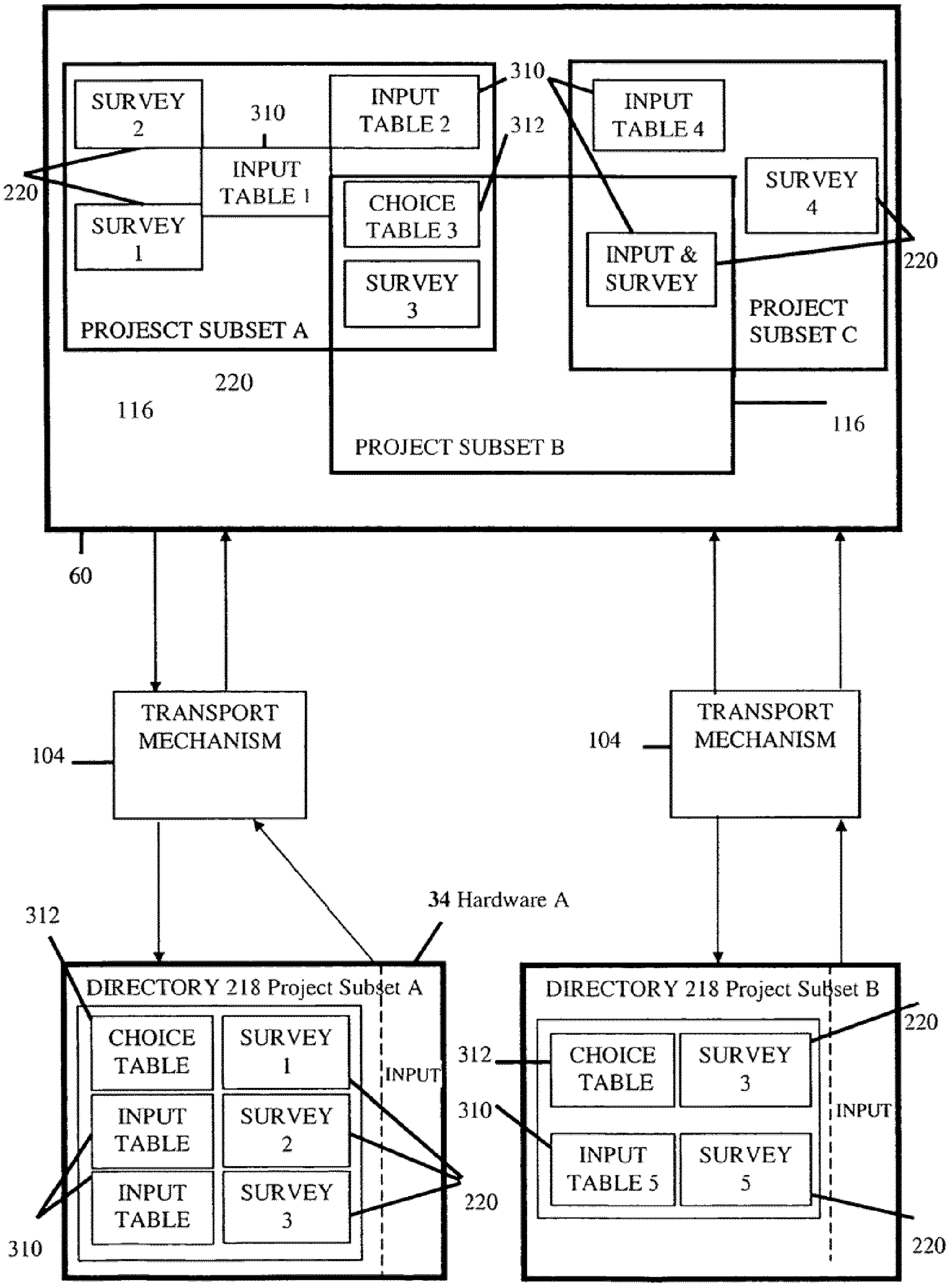
FIG. 15 is a block diagram illustrating a cycle of information flow from the project subset to the hardware and back to the project subset.

FIG. 15 is a block diagram providing more detail on the present invention as it forwards a project subset 116 from the project database 60 for transport to the specific hardware 34 of the field worker 36. This illustration shows the CDCDS user has designated the forwarding of a project subset 116 as the CDCDS user programmed it. Should the CDCDS user program the project subset 116 and its items differently, then the project would behave differently. An average project subset 116 consists of one or more schema 100. FIGS. 8C and 8D are examples of different project schema 100. A project schema 100 is built with the programming language 124 as shown in FIG. 8A and consists of at least one owner 300 and one field worker 36. As seen in 8C, a project schema 100 also includes at least one survey 220 with all survey characteristics 520 designated and this survey 220 is related to an instance 532 of field input forms 120 with all of their characteristics designated. In addition, the project schema 100 includes at least one accompanying input table 310. The project schema 100 may or may not include joins 216, which will need one or more accompanying join entries 308, and one or more choice tables 312 as seen in the illustration of a project schema 100 with a joinID 416 in FIG. 8D.

FIG. 8B shows all these items that are part of the project schema 100 are designated in the project database 60 in a directory 218 that relates through the logistics component 126 to at least one field worker 36. The field worker 36 is represented as a userID 412 having group membership 394 in a group 392 which is designated as related to a particular directory 218 by relating to an owner 300 having the same directory 218 as seen in FIG. 8B. All of these designated relationships set up a particular project subset 116 for forwarding by the transport mechanism 104 when hardware 34 connects to the project database 60 as seen in FIG. 14. As can be seen in FIG. 14, the project subset A 116 consists of survey 1 220 with its input table 1 310, survey 2 220 with its input table 2, survey 3 220 with its choice table 3 312. As is seen in FIG. 14, the survey 220, the accompanying input tables 310, and the accompanying choice tables 312 that are in the project database 60 are available as project subset A, B, and C 116 with some overlap among the project subset. However, when the transport mechanism 104 is activated, whoever has hardware A 34 will have the directory 218 for subset A 116. If hardware A 34 was already used to capture data for the project, then several things will happen during a connection to the project database 60. The input made into the hardware A 34 will be reconciled with the project database 60 input tables 310 that coincide with project subset A 116. Any changes or additions to the data in the choice tables 312 in the project database 60 will be forwarded to hardware A 34 along with any changes or additions to any other aspect of project subset A 116, e.g., changes in survey 220 or field input forms 120, etc. The direction for the transport of each of the items in the project subset A 116 has been designated by the CDCDS user according to the design of the project.

Figure 16:
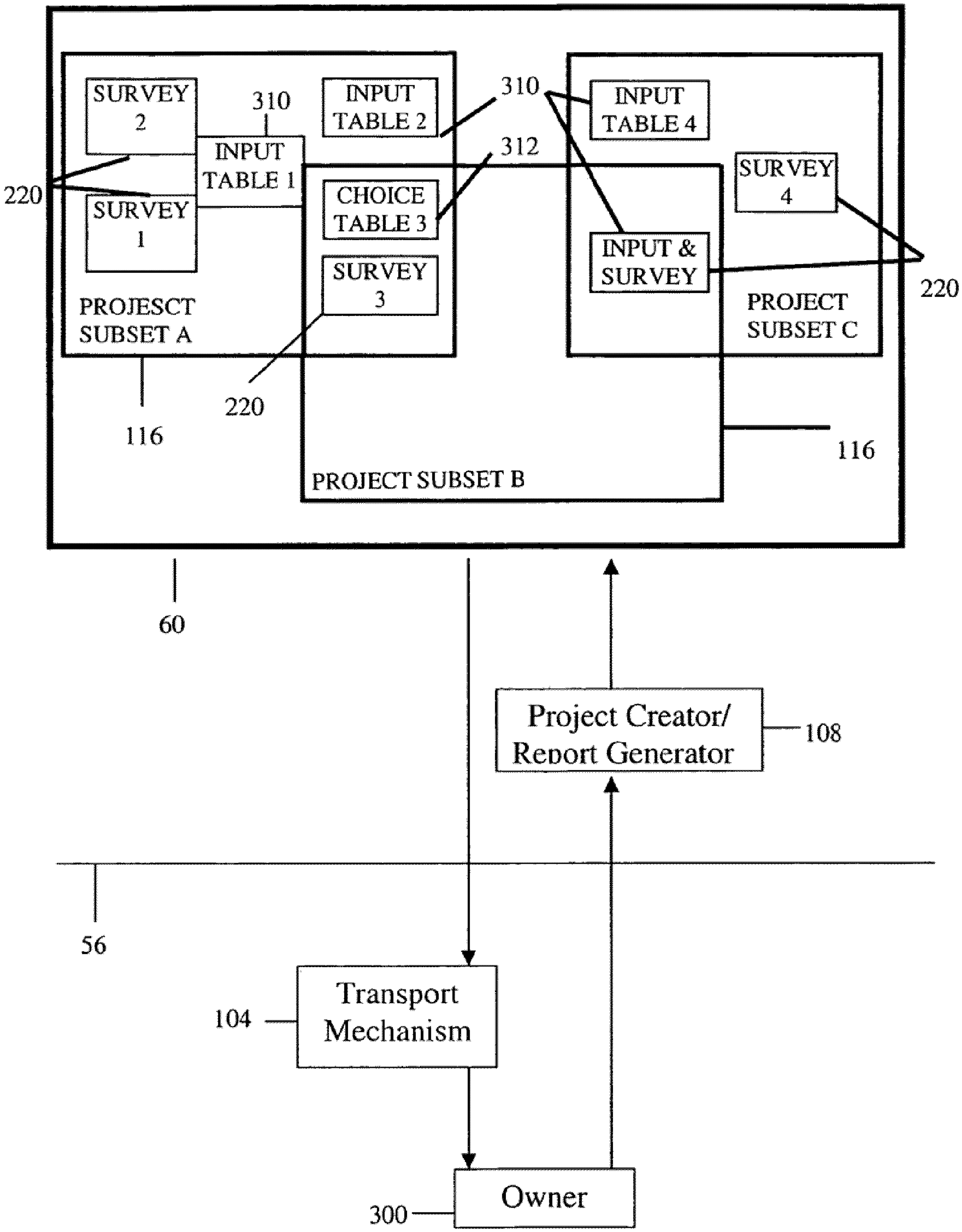
FIG. 16 illustrates a report query in relation to a project subset.

After the input is transferred back to the input table 310 of project database 60, the returned input is aggregated in the manner specified by the owner 300 when programming the project schema 100 with the programming language 124 (seen in 8A) into the database. At this time, there are no decisions that must be made by the owner 300. This information is ready to be accessed at any time by the owner 300. The owner 300 can enter the database at any time to retrieve the reports. It is also possible to present the reports on the Internet portal 186 or directly to the owner 300 via electronic mail or paging. FIG. 16 illustrates a project subset 116 being transported to an owner 300 for the purpose of accessing the project subset 60 through the report generator 108. The mechanics of the process is similar except there is no ability to make changes to the reports. The reports may only be viewed.

The preferred embodiment of the present invention has incorporated automating the design and building of dynamic intelligent forms that are designed to deliver data that is needed for analysis rather than attempting to extract useable information from available data. The report component of the process is included in the process from the beginning, making additional programming of reports unnecessary, but more importantly, making the reports available immediately upon receipt of the data from the field.

A key component of the preferred embodiment of the present invention has been to include the application of logistics to data capture and report distribution and the utilization of data structures to economically facilitate efficient logistics with the visualization of indirect relationships in the project. This next section will discuss the visualization of indirect relationships and explain how it is incorporated into the overall portable digital data capture and data/report distribution project.

The Visualization of Assignment Logistics Management

The logistics for data capture are very important. The integrity of any project is heavily based in the logistics as is seen in FIGS. 8A and 8B. The correct project subset 116 must get to the correct people on time without overlap or omissions. The owner 300 must assign fieldworkers 36 to tasks, the correct set of data must get to the field workers 36, the field workers 36 must complete the task with the correct data and that data must be returned to the project database 60 and aggregated accordingly. FIG. 16 shows the report forms 118 based on this data must contain only the pertinent information related to the owner 300. During the course of a portable digital data capture and data/report distribution project 58, the owner 300 must be able to monitor the flow and make changes to any of the items in the project. This needs to be accomplished without adversely affecting other aspects of the project or without needing to retool or reprogram portions of the project, which as seen in the previous sections is accomplished by the present invention.

The assignment information management needs of today's enterprise are constantly changing and workers return less and less to the enterprise where there is access to a myriad of programmers and support staff all keeping track (or trying to keep track) of current workflow and changes and additions to workflow. Therefore, the preferred embodiment of the present invention includes assignment logistics for a project as an integral part of the invention. Assignment logistics are tracked, organized, managed, and reported on just as it is necessary to track package delivery. Assignment logistics is complex for any industry and is extremely complex as part of a portable digital data capture and data/report distribution project 58 in the example of clinical trial investigators. For example, investigators (field workers 36) may have several sites where they see patients in a clinical trial. These same physicians may be part of several group practices, which manage the business of one or more of these sites in combination. However, all the physicians in a group practice, may not see clinical trial patients, or just not see clinical trial patients at each of the group sites but only at a few of the group sites. To complicate matters, a physician may contract with several different pharmaceutical companies for clinical trials and therefore need to meet the requirements of several different pharmaceutical companies clinical trails with which they contract. In addition, the patients that are part of a clinical trial may see different physicians or may be seen at different sites that are part of a clinical trial. The present invention can offer efficiency during a clinical trial as long as there is consistency in the reporting of data on the clinical trial.

The present invention allows the CDCDS user to organize one or more projects (clinical trials) for one or several owners 300 (pharmaceutical companies). Numerous field workers 36 may be partaking in the clinical trial project. The present invention has the flexibility and scalability to allow the CDCDS user to set up a portable digital data capture and data/report distribution project 58 that involves the investigators as field workers 36 and the logistics management for clinical trials with patients. However, the following diagrams, both for this section, and for the real world project section, is an illustration of providers 512 (physicians) in FIG. 17A as the subject of data capture by field workers 36 (surveyors 516 in FIG. 17B). The data capture project consists of field workers 36 completing questionnaires to evaluate providers 512 and sites 542 (see FIG. 17D). The providers 512 may or may not belong to a group 536 (see FIG. 17D) which is comprised of affiliated providers 512 at one or more groups' sites 800. Before beginning assignment logistics management with the present invention, the CDCDS user first accesses the project database 60 through the project creator 108 in the framework 56 (see FIG. 4) to integrate project objects 114 and the like into project schema 100, and the owner 300 and the fieldworker 36 are set for the project as well (see FIG. 8B).

Afterward, the project creator 108 will prompt the CDCDS user that the project is ready to accept input in the logistics manager 110 where additional details can be added or changed in the project database 60 with regard to the workflow of assignments as part of a portable digital data capture and data/report distribution project 58 in the project database 60. Assignment workflow data is connected directly to the project by supplying data to the choice tables 312 for a particular project subset 116 (as seen in FIG. 14). The logistics manager 110 organizes the aspect of assignment 500 (see FIG. 17A) logistics for a project and can be seen in FIG. 4 as part of the framework of the preferred embodiment of the present invention. The logistics manager 110 allows the CDCDS user access to the project database 60 through a set of forms (seen in FIGS. 18A-18L). These forms in the framework 56 allow the owner 300 of the project to enter the project database 60 and set, for the purposes of this health care example, assignment data in the tables seen in the entity relationship diagram of FIGS. 17A-17G. The assignment aspect of logistics includes assigning tasks to a particular surveyorID 508, periodically monitoring and reporting on the flow of assignment 500 completion, and verifying that an assignment 500 has a date completed 560. In this example, a particular surveyorID 508 which is understood as a field worker 36 will travel to one or more specified siteID 506 to perform a particular visit type 518. The owner 300 of the project has specified beforehand what a visit type 518 will consist of, e.g., which project schema 100, etc. as in FIG. 8A will be considered a visit type 518.

The CDCDS user will also establish what set of providers 512, sites 542, groups 536, and surveyors 516 are related to the owner 300 of this project. The logistics manager 110, as a result of the data structures shown in the entity relationship diagrams in FIGS. 17A-17G and the data queries discussed below, allows the CDCDS user to simply choose a providerID 514 to attach to an assignmentID 502. The logistics manager 110 will reveal on the computer screen of the CDCDS user any indirect relationships to this providerID 514 or assignmentID 502 so that any assignments 500 that are redundant or which have omissions can be immediately corrected. The present invention addresses the time and cost concern present in any data capture assignment when two people are inadvertently requested to review the same site 542, or an assignment is incomplete due to missing assignment details. The conventional systems 10 require cross-referencing and cross checking of all files for indirect relationships of assignment data in order to omit redundancies and errors in a project. The healthcare industry reports that medical errors account for 98,000 deaths yearly and billions of dollars in cost. In the process for data capture for one project, the industry reports that 40% of assignments are redundant or completed erroneously because of assignment information management mishaps.

Figure 17F:
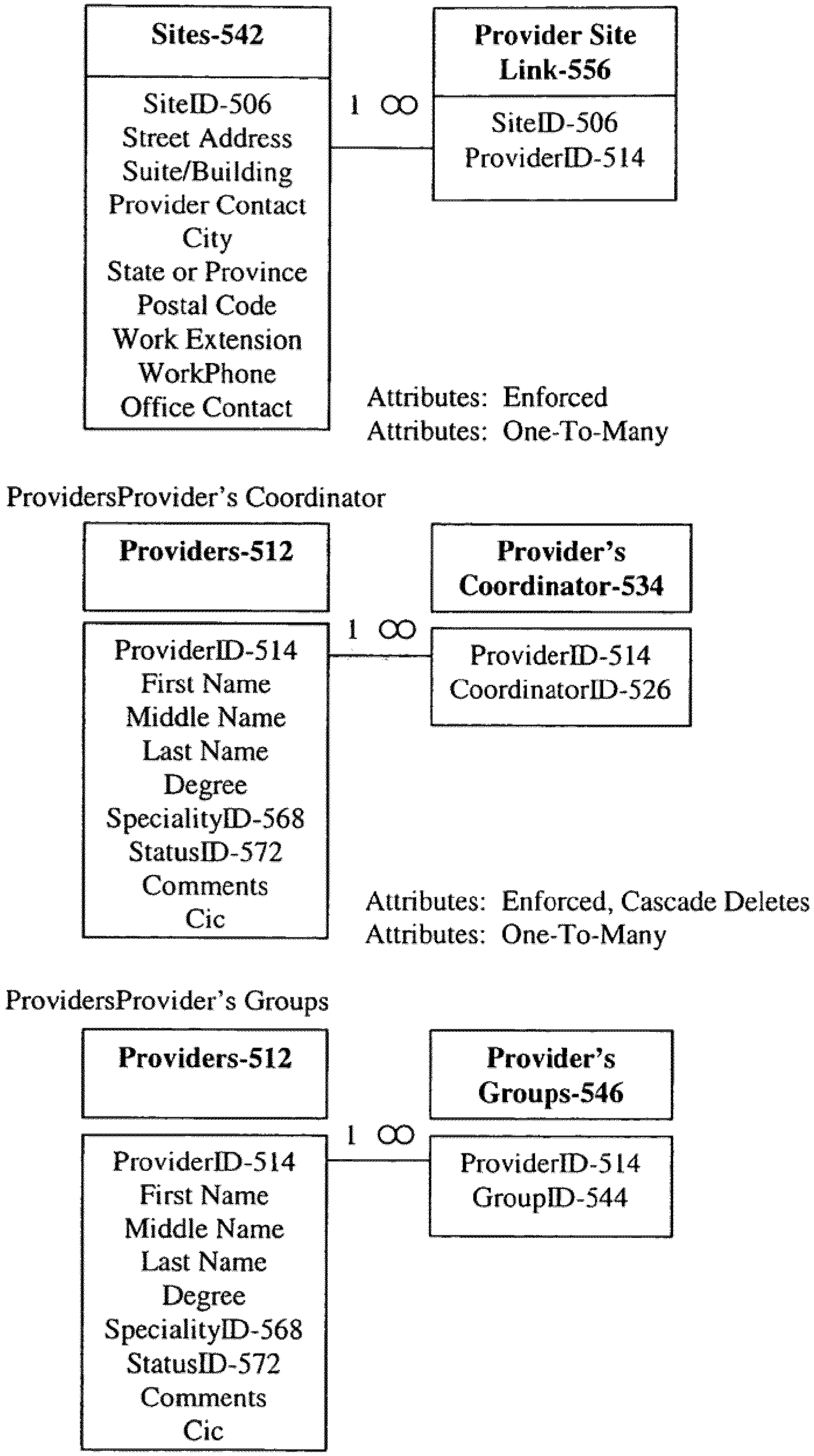

To manage the assignment logistics for a project, the logistics manager 110 must reference the tables seen in FIGS. 17A-17G. As is shown, the table names and the field names that are pertinent to this project, (e.g., providers 512 being audited by surveyors 516 during certain visit types 518, etc.) are set in each table. However, the present invention can be set to allow the CDCDS user to reference additional tables where the CDCDS user is able to assign a different table name and the field name (e.g., patients instead of providers 512 in a clinical trial visit type 518) where investigators, instead of surveyors 516, capture medical data in a project. The present invention can also reveal to the CDCDS user that there are particular fields, referenced by and referencing the project subset 116 as part of the design of a project. For example, in the assignment table 500 of FIG. 17A, the surveyorID 508 of surveyors 516 (FIG. 17B) references the userID 412 of the mobile users 390 table in FIG. 7B section i. These mobile users 390 or surveyorID 508 are the approved field workers 36 for the project of a particular ownerID 402 (see 8B) as set forth by the CDCDS user. There are other places where the referencing occurs and the CDCDS user can set the references as a function of the development of a portable digital data capture and data/report distribution project 58. Another example is that the report forms 108 can reference providers 512 table in FIG. 17A so that a project subset 116 shown in FIG. 16 can be forwarded to a providerID 514 (see FIG. 17A) which represents the first name and the last name of a particular physician. The present invention allows the CDCDS user to set for distribution the report forms 108 that only relate to a particular physician as it relates to the owner 300 of the project. In FIG. 17A, assignment 500 contains the field Date Completed, which can be referenced by the field-input form 120 (see FIG. 8C) capturing the visit date for the project.

The assignmentID 502 in FIG. 17A is the most common and most useful to reference to the project logistics since it greatly improves the integrity of the data during a project and verifies the validity of the main database 20. For example, the assignmentID 502 relates to the ProviderID 514 which relates to the providers 512 that consist of the first name and last name of the physician being audited during the project. This data is usually set by a CDCDS user to be referenced by the choice table 312 in a project. As seen in FIG. 8D, a choice table 312 is designated by the CDCDS user to be revealed a list of physician names in the first field input form 120. With the user 412 selecting the physician name from a list, there is no possibility of data entry error. Completing additional records 220 (see FIG. 8C) and copying the "incorrect data" to other records 518 can compound any data entry error. By making the reference between the provider 512 table and the choice table 312, the user 412 is given the opportunity to verify the correctness of the data in the list, and is then given an additional field input form 120 to make a correction. In the example of healthcare, errors in the main database 20 can often be more dangerous to leave unchecked than simply a physician name. A field worker 36 may be able to verify the correct medication allergies for a patient by verifying it in the medical record against the main database 20. The key aspect of the assignment logistics management for the field worker 36 is that once the owner 300 requests an assignment and either through the established territories logic, assigns a field worker 36 to a particular siteID 506, the field worker 36 receives a designated portion of the information. The designated information is available to the field worker 36 in the choice table 312 of the project database 60 so that it is forwarded as part of the project subset 116 using the transport mechanism 104. The field worker 36 is now only required to make input as directed by the field input interface 112 which appears for the field worker 36 without any additional commands. The hardware 34 is identified by the first platform where the project database 60 resides. Only the directory 218 pertaining to that field worker 36 and the appropriate assignments 500 are forwarded. The field worker 36 will be more efficient and will not require any further logic about what work is due.

Figure 17H:
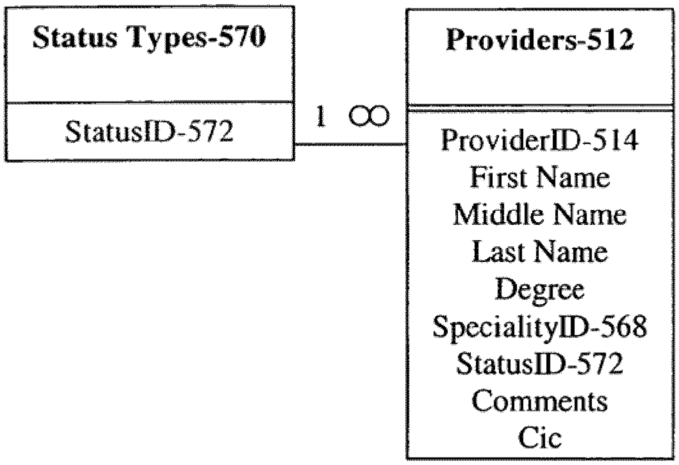

In order for the present invention to accomplish the complex process of assignment logistics management and visualization, the CDCDS user must access the logistics manager 110 of the framework 56 as seen in FIG. 4, which gives her access to the project database 60. To see an illustration of how the logistics manager 110 of the present invention allows the CDCDS user to organize, track, report on, and manage assignment logistics, refer to FIG. 18A-18L, which are screen shots of the logistics manager 110. The CDCDS user can begin the assignment logistics in one of two ways. The project owner 300 can begin by importing into the data tables of the project database 60 seen in FIGS. 17A-17H all the data from the enterprise main database 20 that corresponds to the field names in the tables of the logistics manager 110. Or, the owner 300 can data enter the information about the field workers 36, the people, places and things that are going to be inspected or audited by the field workers 36. For example, the main database might supply the logistic manager 110 with the data in the provider 512 table (see FIG. 17A) which consists of the first, last and middle name, degree, specialty (referencing a specialty table for the specialtyID 568), and status (referencing a status table of contract status for the statusID 572 in FIG. 17H). In addition, the main database 20 might supply the logistics manager with the data in the sites 542 table (see FIG. 17D). The groupings of items in the tables seen in FIGS. 17A-17H can refer to any grouping of items as will be discussed below.

Figure 18A:
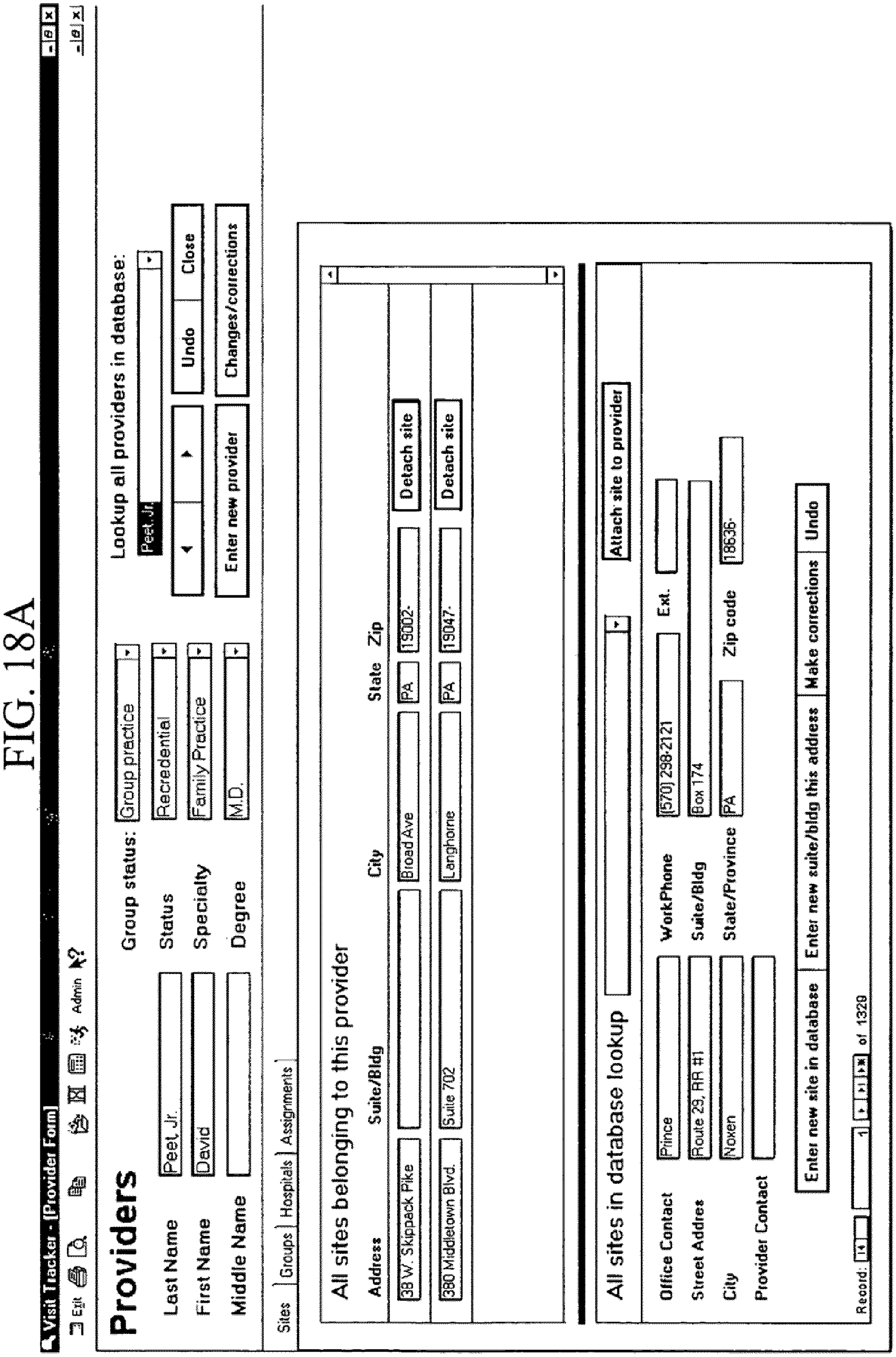

The assignment logistics for a project is organized by the present invention to consider all the sites 542 as a whole in direct conjunction with the field workers 36 who will be capturing data, and the distribution of reports. For example, the site 542 is the key factor in an assignment. In many industries where logistics information management is involved, an enterprise has contracts with remote sites. For example, a supplies distributor has a group of contracted locations where the supplies are delivered. It may be that during the life of a project, the responsible party at the site may change, or the type of supplies delivered may change. However, the site 542 itself is generally stable. This is even more the case with the healthcare industry where clinics, hospitals and medical offices usually remain at a particular address, but doctors, patients, equipment, is constantly changing. With the sites 542 all made available in the project database 60, the project owner 300 can attach or detach a site 542 to a provider 512, as seen in FIG. 18A which establishes a provider site link 556 of FIG. 17F. If the data is being imported from the main database 20 into the project database 60, then this provider site link 556 will allow the CDCDS user to see all the sites 542 attached to a provider 512. Sites 542 can be added to the project database 60, and sites 542 can be corrected in the project database 60 using the logistics manager 110.

Figure 18C:
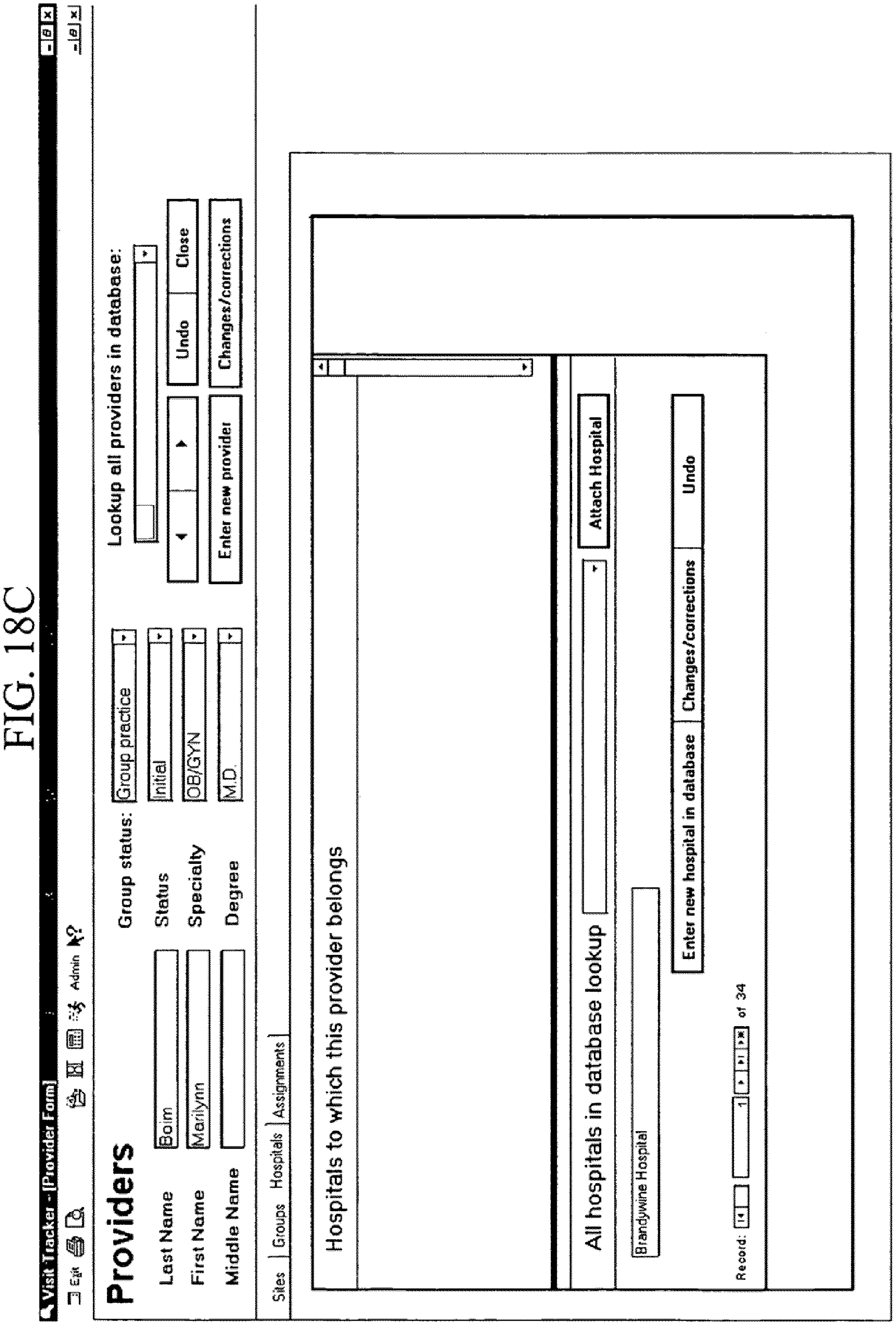
Figure 18D:
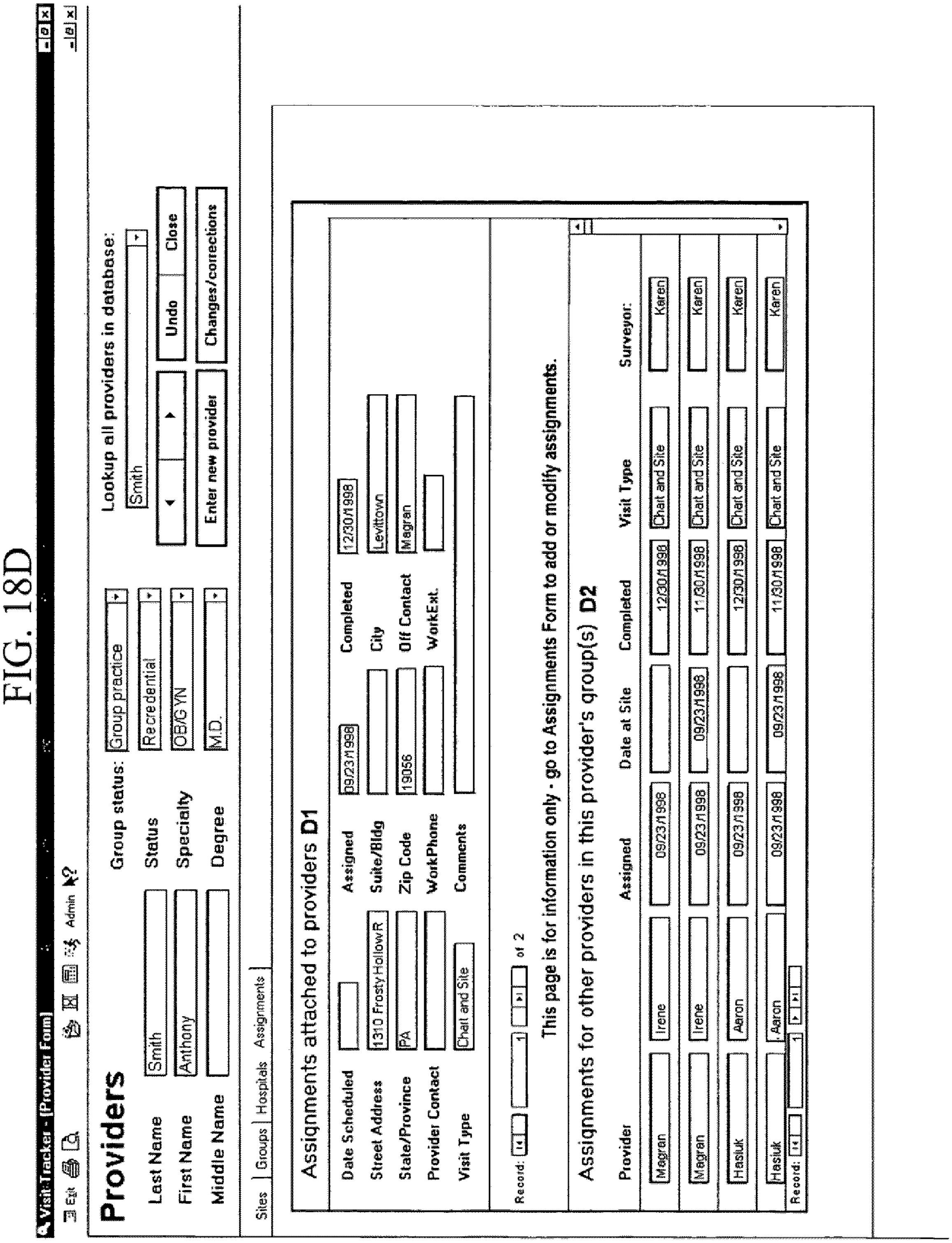
Figure 18E:
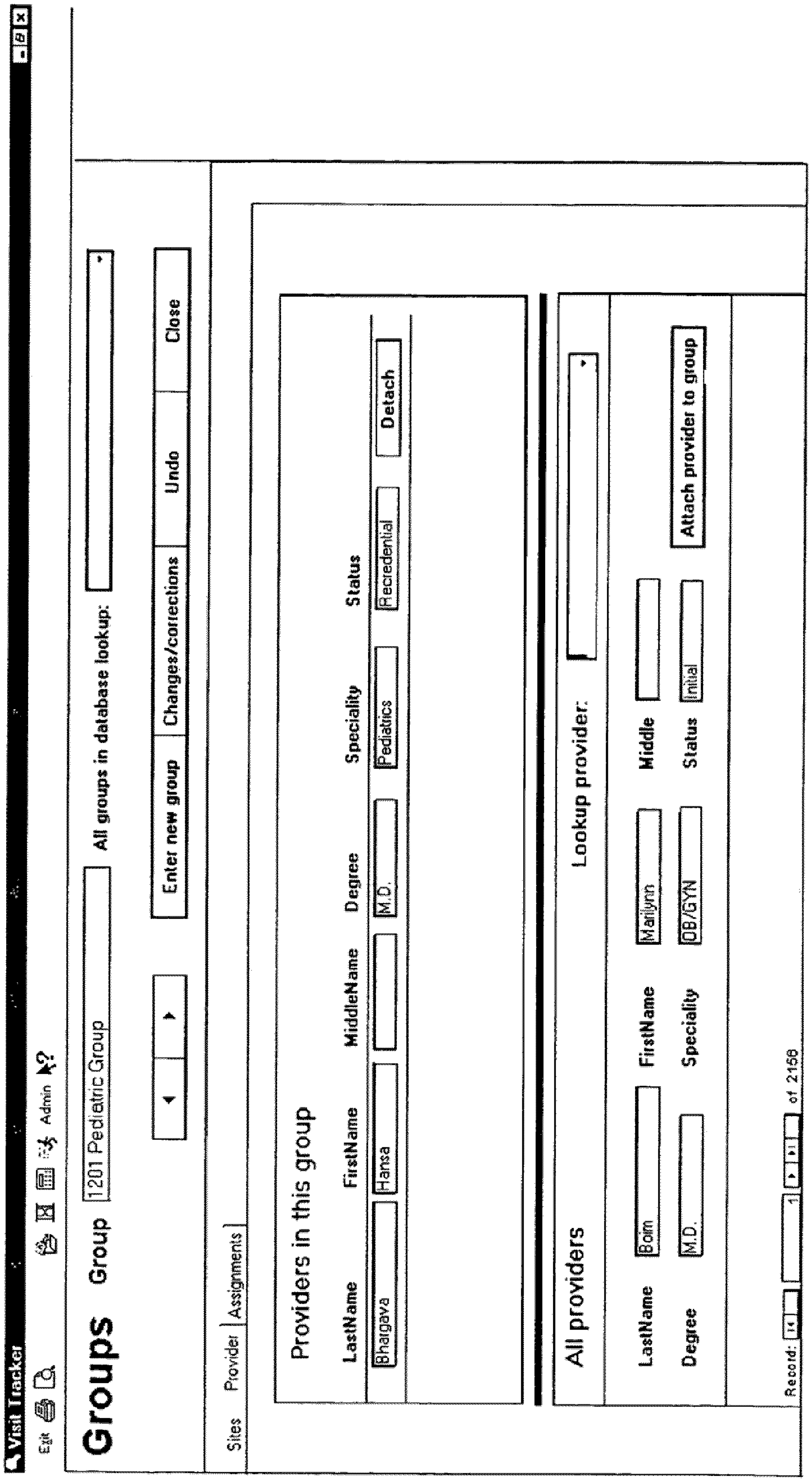
Figure 18F:
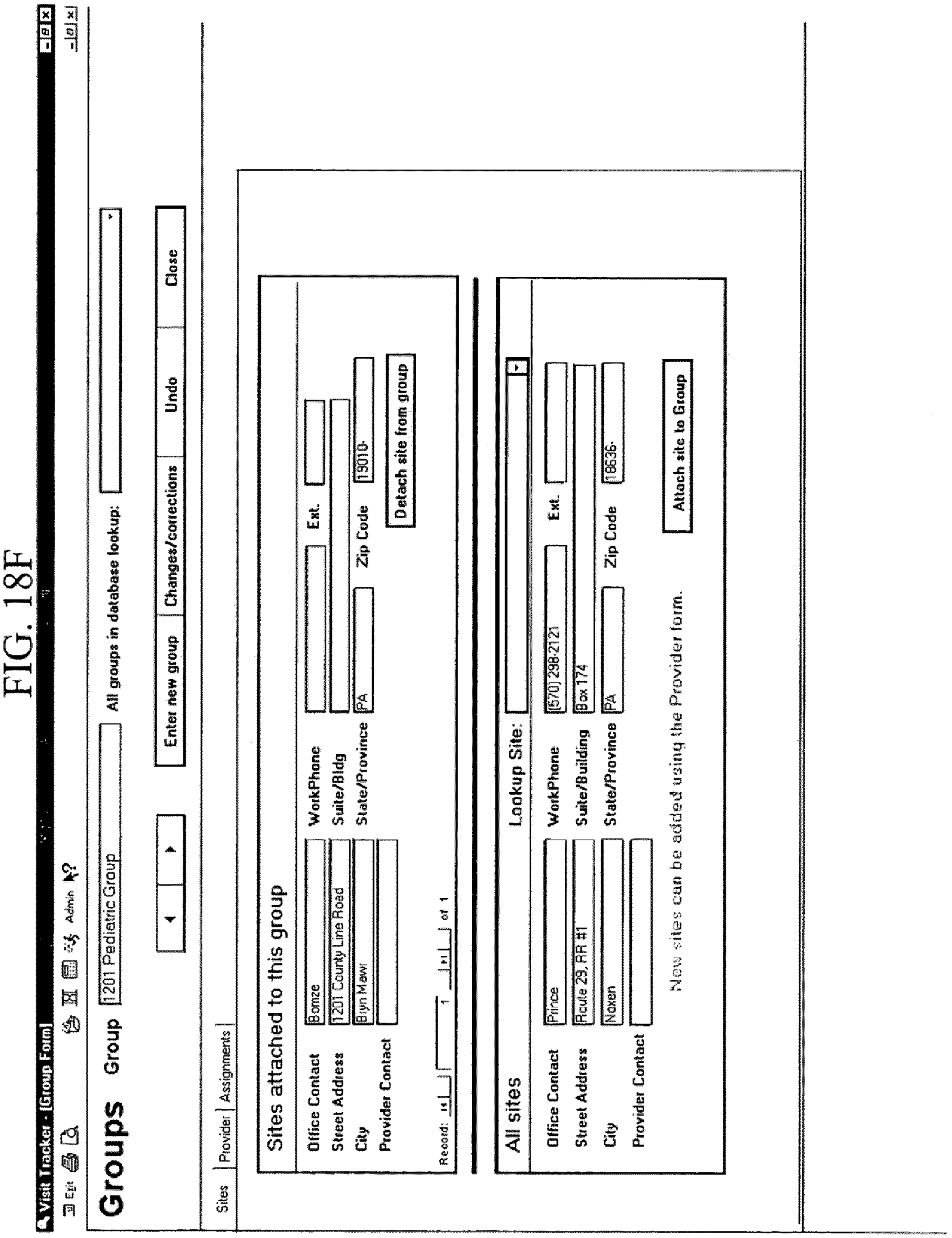

The groups and the hospitals can be manipulated in the same fashion as seen in FIGS. 18B and 18C. Managing the assignment logistics in this way cuts out the inefficiency of data entering a new address for a physician or a new group, each time the physician changes addresses or joins another group practice. In addition, this reduces the problems of data entry error in the assignment logistics. By simply attaching and detaching items, inconsistent data entry can be more quickly discovered and corrected for other physicians in the project database 60. FIG. 18D illustrates that the project owner 300 can view assignments attached to providers 18D1 and assignments for other providers in this providers group 18D2. While viewing this information, the assignments of the related providers are also listed, thereby giving the owner 300 another chance to check for overlap and omissions. However, no changes or additions can be made in this form. Changes must be made from the assignment form of FIGS. 18H-18L. FIGS. 18A-18D are provider screen shots from the logistics manager that allow you to view all other sites related to the provider in FIG. 18A, all other groups in FIG. 18B, all other hospitals in FIG. 18C they belong to, and all assignments for the provider.

Figure 18G:
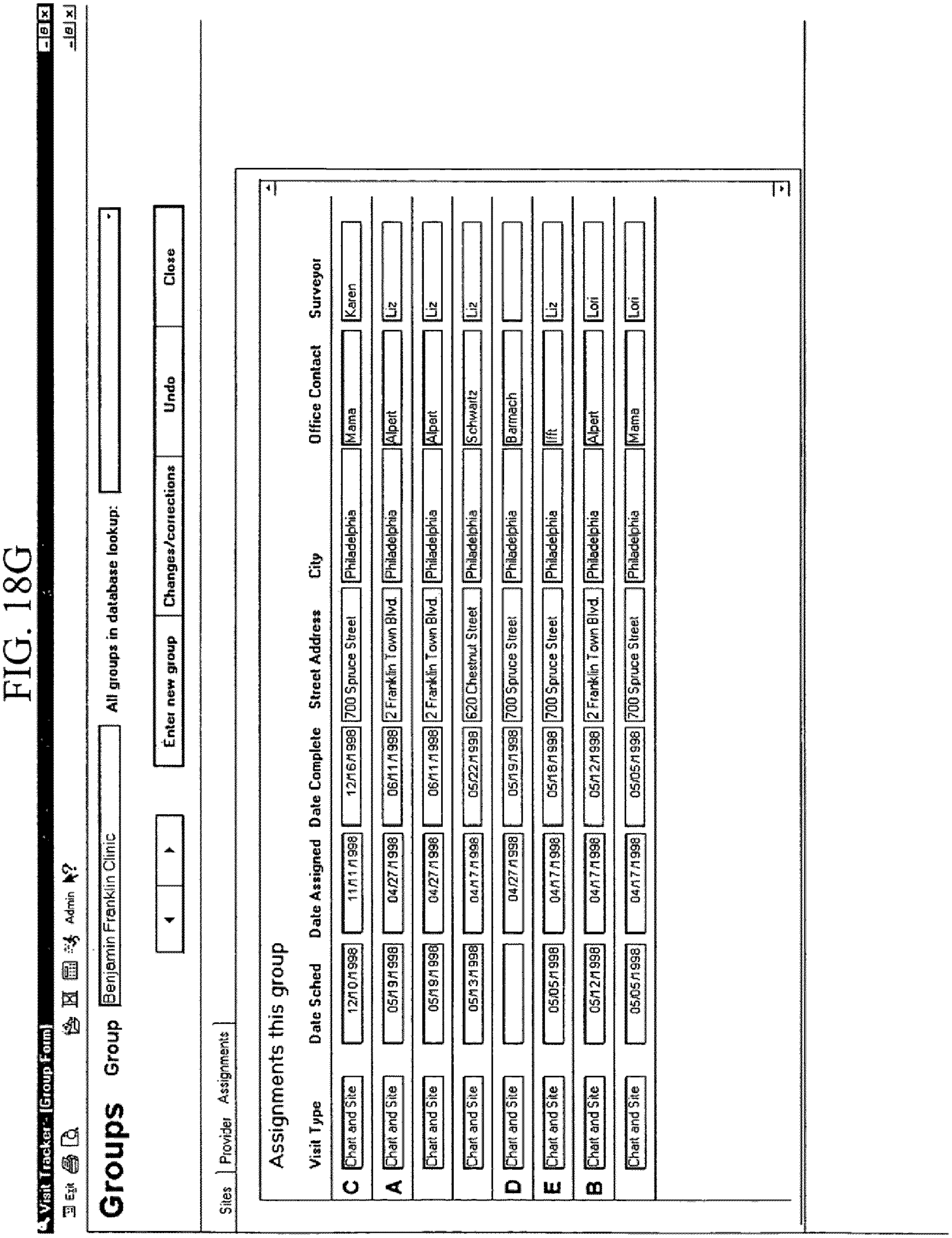

FIG. 18G, which is a screen shot of the group form, illustrates the redundancies and waste of manpower that can be avoided by the CDCDS user with the present invention. FIG. 18G shows assignments managed and tracked by the conventional system 10 for assignment management. Assignments requested and tracked with the conventional system 10 were data entered into the logistics manager 110 of the present invention. In FIG. 18G, on the line marked A, it is revealed on the screen for the CDCDS user that the visit type chart and site at the address 2 Franklin Town Blvd has a Date Complete of Jun. 11, 1998 by Surveyor Liz, while on line B it is revealed that exact same visit type is being performed at the same address by Surveyor Lori. Two different field workers 36 (surveyors) completed the once yearly-required assignment only a month apart. These types of redundancies become obvious because all the information on this group's assignments is shown. If the owner 300 of the project had used the present invention, they would have been able to very quickly decide if the two assignments were appropriate. If not, they could delete the assignment for one of the field workers 36 who will then have the assignment request deleted from the hardware 34 during the forwarding of the project subset 116 as seen in FIG. 15.

FIG. 18G illustrates another common error that can skew the results of a project. Line C, D, and E reveal a visit type: chart and site for the address: 700 Spruce Street with surveyor: Karen on line C, Liz on line E and Blank on line D. This is another actual example of a real project that did not want these extra assignments made. With all these redundancies revealed to the CDCDS user, workflow can be managed better. In addition, based on the nature of the project, a CDCDS user might be able to decide if the visit type done in line A would make the visit type in line C unnecessary because even though these represent two different sites, the policy for the project is to make one visit only. With an example like this, it is easily seen that redundancies and errors account for nearly a doubling of the workload in a project.

Figure 18H:
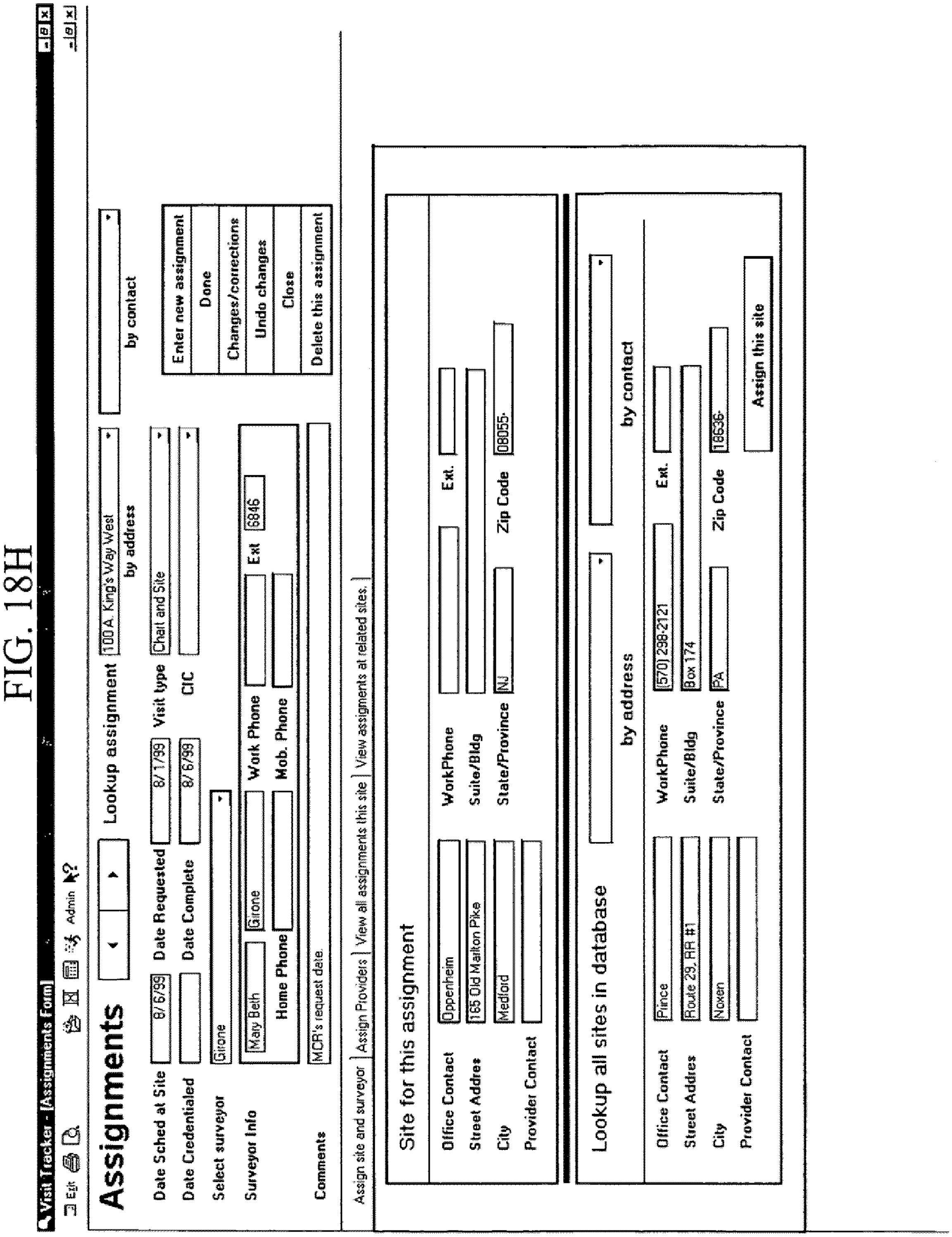

FIG. 18H is a screen shot showing how the CDCDS user requests an assignment with the logistics manager 110 of the present invention. (The web enabled assignment transaction forms that reference the project database 60 will be illustrated later.) In order to reduce the data entry errors for the CDCDS users, FIG. 18H shows the tab on the lower half of the screen labeled "Assign Site". This allows the CDCDS user access to all the approved contracted sites in the project database 60 seen on the lowest third of the screen. By clicking on the button "Assign this site" in the lower right hand corner of the screen, an assignmentID 502 has been generated in the assignment 550 table (see FIG. 17A). Errors are reduced by using the present invention because instead of being required to data enter a site address every time an assignment is requested, and thereby increasing the chance for errors, a site is simply attached to the assignment. FIG. 18I shows a similar process for the second tab Assign Providers in the lower half of the screen. This example shows one provider attached to this assignment. The CDCDS user can quickly see all providers at this site and make a decision about what other providers should be made part of this assignment. The top of FIG. 18I reveals the information about the surveyor that is chosen for this assignment. Once this data is entered in the logistics manager 110 depicted here, the data is available in the project database 60 for forwarding to this particular field worker 36 during the connection of her hardware 34 with the project database 60. This information will appear on field input form 120 #2, which she can select. With no additional data entry on her part, data integrity is maintained. In addition, when this field worker 36 arrives at the site 542, if the provider's name or address are different from what is on her list, several additional field input forms 120 have been made available as part of the original project design. This field worker 36 can input a response that the information on the list is incorrect, and then data enter in an additional field input form 120 the correct information. This information can quickly be reported as designated during the design of the project and the correction to the data made in the main database 20, thus verifying the quality of data.

Figure 18J:
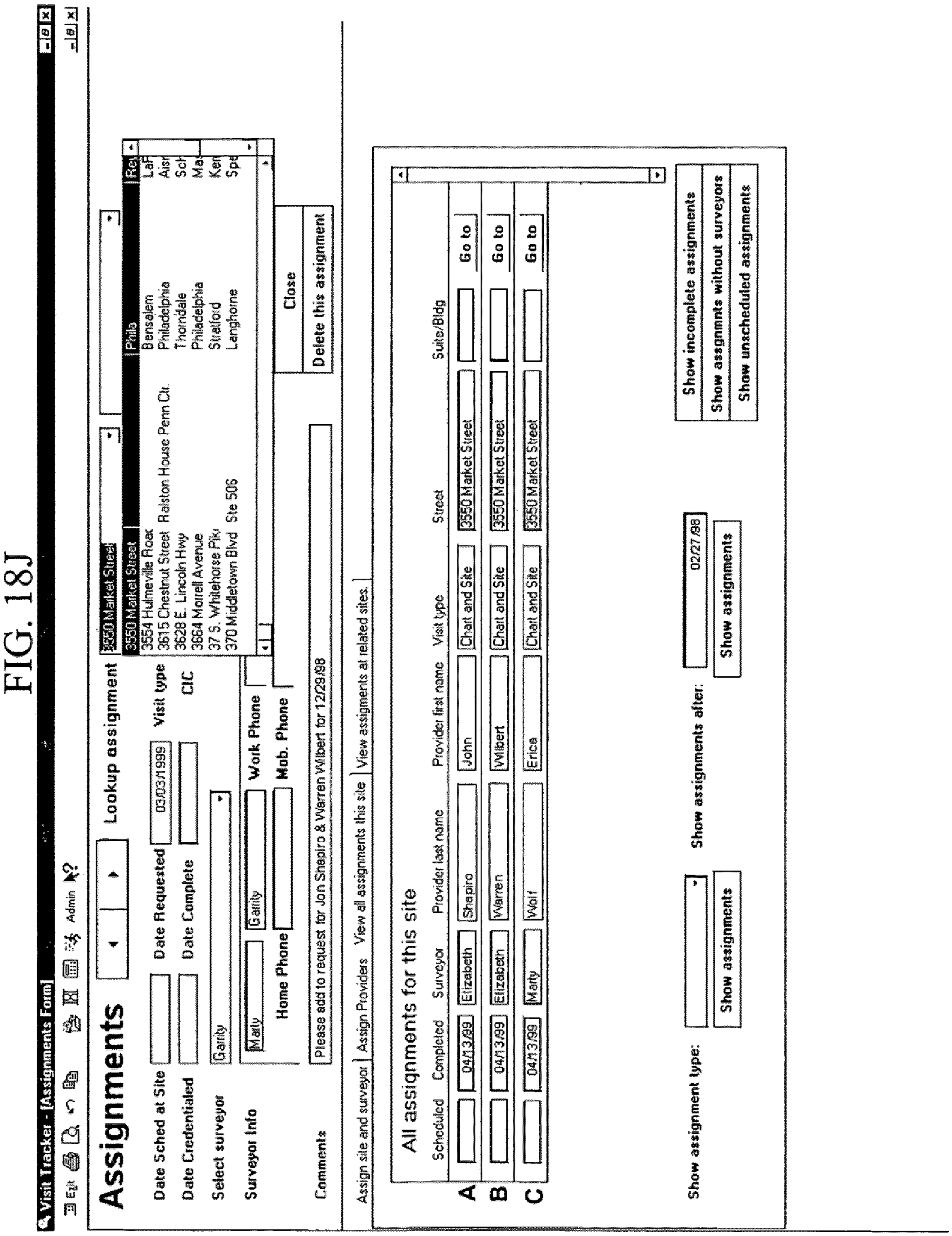

FIG. 18J reveals three assignments for the address listed. Line A shows Completed: Apr. 13, 1999 by surveyor: Elizabeth for provider: Shapiro at street: 3550 Market Street. Line B is similar except that Provider: Warren is listed. The CDCDS user can quickly see that these two separate assignments have been done by the same surveyor on the same date, which is appropriate and according to policy. However, line C shows another surveyor: Marty requested to perform an assignment. With the ability to visualize the commonality between all assignments at this site, a CDCDS user can quickly make decisions about whether the assignment conducted on Apr. 13, 1999 can be used for this provider: Wolf on line C. In addition to the ability to visualize the redundancies or cross-referencing of indirect relationships is the ability to instantly report this information as well.

FIGS. 18K and 18L illustrates the importance of the present invention in allowing the visualization of indirect relationships in the items in the project database 60. To check or make assignments for a particular site, the owner 300 can access the assignment screen of the logistics manager 110 and look up the site by either address or office contact. In this example, the address 380 Middletown Blvd. was selected. There is only one provider listed at this site and she does not belong to a group. Everything is assigned correctly as far as this provider and site are concerned. If the owner 300 clicks on the "view assignments at related sites" (see FIG. 18L) she can see that a different provider at a different address belonging to an unrelated group appears. The relationship between these two sites is not obvious. However, if the provider David Peet Jr. on FIG. 18L is looked up under the provider screen, it shows two sites listed for Dr. Peet, one of which is 380 Middletown Blvd., Suite 702. This is the same building and suite as provider Dr. Borah seen in FIG. 18K. These sites are related via the two providers who happen to be in private practice and share an office. They are not a part of a group, but if these providers shared medical records, an assignment for an audit of a chart for Dr Peet would be acceptable for Dr Borah. Other information might be revealed with this visualization as well (not shown is the score for each of the audits, which can be compared for the two providers who share a practice). It could potentially save time and money for this information to be revealed to a CDCDS user. More importantly, if this information were tracking the rapid delivery of emergency medical supplies to a provider, the delivery might be made at this unrelated site and thus be immediately available to both providers. The logistics manager 110 allows the owner 300 to visualize on the screen, all the direct and indirect relationships between all assignment logistic aspects of the project so that a decision can be quickly made about managing the workflow of the project. All work that a field worker 36 has completed, is made available to the CDCDS user immediately, eliminating the possibility of work because one can easily see that work is completed. With the present invention, each of the CDCDS users access the same project database 60 so that information is available to all parties related to the project.

The example listed here relates to healthcare because of the very complex nature of providers in relationship to different group practices and different sites. The examples above are all based on audits that health insurance companies perform on the providers and groups. However, this technology may be applied to other fields, such as sales. An example of this would be a company similar to Avon cosmetics that would be the owner 300. The majority of sales are not in stores, but rather selling from people's homes. The owner 300 Avon, using the present invention, could give out their field workers 36 a simple hand held hardware 34 that could be forwarded a project subset 116 (see FIG. 15) for a project that consisted of project schema 100 with integrated objects 114 representing the sales forms. This field input interface 112 used by the field workers 36 would free them from carrying around stacks of heavy paper along with the samples they bring in. This would also give the corporate and local offices immediate information in the main database 20 on a real-time basis about what is happening in the field, what is the productivity of the field workers 36 and any other information collected into the project database 60. With the logistics manager 110, the owner 300 (managers) would be able to view geographical areas in relation to sales people, what products are sold, where in a geographical area products are being sold and to whom they are being sold on a real-time basis. In addition the owner 300 can immediately make changes to any sales forms, or send field workers 36 (sales people) any new sales leads that have been entered into the project database through the logistics manager 110. For the logistics manager 110, the customers would be the providers 512, and the territories would be the groups 536. Since the project is still related to remote sites, the siteID 506 remains the same.

Reports forwarded to this owner 300 can show where there are too many sales people, which areas in the territories are not being covered, and even what product people are buying. The order forms can be programmed as project schema 100, thus automated with logic programmed into the field-input forms 120 to bring up points of sale. For example, if an Avon customer purchased a fragrance, as soon as that fragrance order was entered into the field input form 120, the preset logic would remind the sales person to ask if the customer wanted a matching body lotion. The idea of a specific set of field input forms 120 and logic going to a specific field worker 36 who is a salesman can be very helpful to sales as well. Since this sales person is in this territory, going to this site, and speaking with this customer, the information of past sales will already be in her field-input interface 112 as it was forwarded by the present invention. When the customer orders a fragrance, the sales person can offer the same color eye shadow that the customer had purchased six months ago. The orders that are put into the field input interface 112 can be used to distribute the product, and can also be used to track sales and trends. The corporate office can have the orders aggregated to keep track of sales purchases and patterns, sales people, customers, and products without further data collection.

A key feature of the logistics manager is the ability to allow the CDCDS user to visualize on the screen, any indirect relationships between the items in the tables in the project database. In the previous discussion, the screen shots in FIGS. 18A-18L showed that with the relationships revealed to the CDCDS user, decisions can more quickly be made with regard to assignment request and workflow. In addition, redundancies or errors are quickly seen and can be corrected. Current relational database technology has made it possible to analyze and study relationships between the data in the database. However, a programmer would be required to write programs to search for the relationships and report on them. With the present invention, the logistics manager runs complex queries based on logic that present the information needed on the screen with the related item, making it easier for the user to make decisions. Taking the process further, the ability to automatically perform decisions for the user based on programmed logic can be built into the system. For example, in FIG. 18J, line C is a redundant request for a second surveyor to perform a chart and Site audit at 3550 Market Street for Provider: Warren. With the ability to visualize the redundancies, it is also easier to program additional logic in the logistics manager 110. A CDCDS user can be given the ability to set the present invention to automatically aggregate the additional provider as part of the first assignment and the surveyor would receive this information as part of her forwarded project subset 116 of FIG. 15. However, currently, the CDCDS user can simply move to the "assign Providers" tab on this screen (see FIG. 18I) and attach the provider to the assignment. The purpose of this part of the present invention is to remove the burden of additional programming queries, eliminate additional database searches, and immediately visualize indirect relationships that help the CDCDS user make business decisions.

The logistics manager accomplishes these things partially based on the logic in a set of queries that allow the CDCDS user to view the indirect relationships between items in the data tables in FIGS. 17A-17H. These queries, coupled with the structures of the tables, allow the logistics manager to report the indirect relationships. The logistics manager 110 designs of each form to allow the CDCDS user to visualize the relationships for the item that was searched in the project database 60. The tables in FIGS. 17A-17H reveal the relationships between these tables in the project database 60. These same tables will be accessed as part of the reporting function of the present invention. All input that is returned from the field workers 36 by means of the transport mechanism 104 seen in FIG. 15 is reconciled with these data tables. This allows the logistics manager 110 and the CDCDS user that enters the project database 60 for the purpose of assignment logistics to immediately see the information on work completed in the field. Because all of the tables are referencing the same project database 60, the assignments that are received as completed input by the field worker 36 will be deleted from the choice table 312 forwarded to other field workers 36 in FIG. 15. The same information is also available to owners 300 for the purpose of reporting during the transport mechanism 104 in FIG. 16.

Additional queries are written (not shown) that will make reporting on workflow simple. The complete relationship of the assignments that can be visualized by the CDCDS user in logistics manager 110 can be seen in FIGS. 18M-18P which are diagrams of the written queries set forth below. As shown in FIGS. 17A, 17B and 17C the assignment 500 table is linked to several other tables. FIG. 17B shows that one surveyorID 508 can have many assignmentID 502. The assignment is linked to the surveyor through the surveyorID 508. The surveyorID 508 consists of a first name 424 and a last name 422. Just as a SurveyorID 508 can have many assignmentID 502 so can a visit type 518 have many assignmentID 502. It is key to the logistics manager to make these data tables available in the project database 60 and that these tables consist of the fields as presented in these entity relationship diagrams. It is also key to have these tables relate to the other tables in the diagrams as shown. For example, FIG. 17B shows the visit type 518. The visit type ID 504 is related to the project schema 100 that are designated by the CDCDS user to be part of this specific project. These schema 100 represent the visit types 518 as a grouping of the various combinations of surveys 220 that will be generated for a particular assignment. For example, the visitID 504 chart and site that has been seen in FIG. 18I and others, is understood by the CDCDS user to represent the schema 100 that consists of a chartaudit6 followed by a siteenvironment4 and a requiredexit, along with the accompanying choice tables 312 and the input tables 310 as seen in FIG. 8D. These can be seen in the real world project section where the Acme HMO example is presented. For the Avon example discussed in a previous section but not presented as the real world project, the assignment 500 table is the sale table and the surveyor 516 table is sales associates and so forth. The relationships for these two examples remain the same. However, it is possible to change these relationships depending on the goals of the project. The idea of setting tables and relationships based on the project schema 100 allows this CDCDS to be extremely versatile.

Figure 18M:
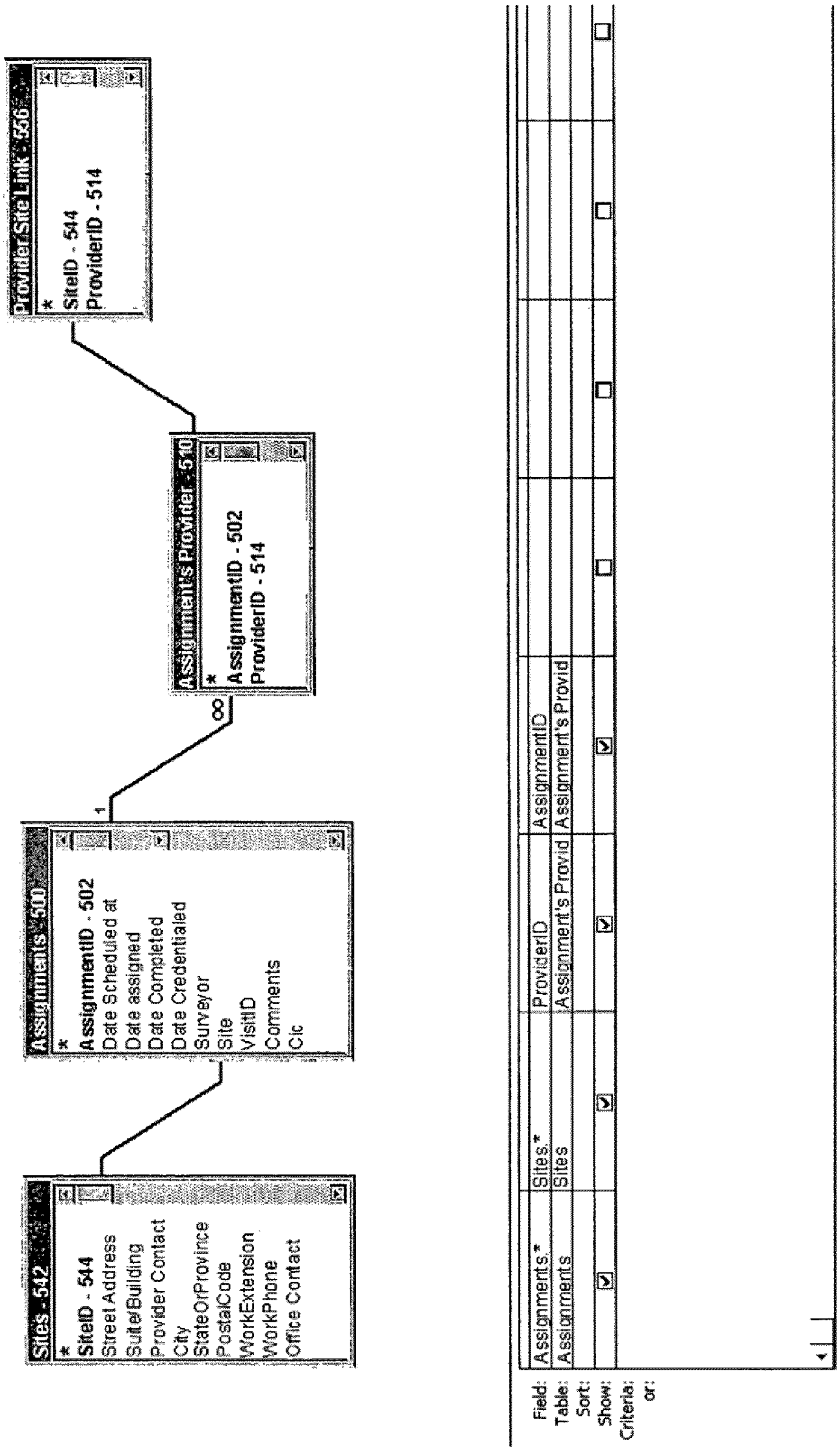
FIGS. 18M-18P are screen shots of queries in the logistics manager.

FIG. 18M illustrates the table structures for the query discussed which is a SQL query for provider's assignments with sites. The query is named "Provider's assignments with site link" for the purpose of understanding where it is referenced by the forms seen on the screen of the logistics manager 110. A key feature of the logistics manager is not simply the nature of the query, but that it is revealed in the logistics manager 110 screens where a CDCDS user has immediate access to the information that this query reports. The query in FIG. 18M shows the provider site link 556 joining the siteID 544 to the provider through the assignmentID 502. As seen in the code for this query, the site ID 506 links the site table 542 to the assignment table 500. The assignment table 500 is then linked to the assignment's provider table 510 through the assignmentID 502. This link shows that it is possible to have many providers matched to each assignmentID 502 with one to many join from assignment 500 to provider 512. The present invention organizes the query in this way since it is reasonable for one provider 512 to have many assignments 500, yet it is also reasonable for one assignment 500 to have many providers 512. In ordinary relational database technology, it is deleterious to have many-to-many relationship and loose referential integrity, yet in real life, the many-to-many exist. The logistics manager has used the tables and their structures together with the queries to solve this problem. This is all done through the logistics manager 110 and gives the owner 300 a visual representation of this relationship without having to perform the logic.

```
SELECT Assignments.*, Sites.*, [Assignment's Provider].ProviderID,
[Assignment's Provider].AssignmentID
FROM (Sites INNER JOIN Assignments ON Sites.SiteID =
Assignments.Site) INNER JOIN
([Assignment's Provider] INNER JOIN [Provider Site Link] ON
[Assignment's Provider].ProviderID = [Provider Site Link].ProviderID)
ON Assignments.AssignmentID = [Assignment's
Provider].AssignmentID;
```

Figure 18N:
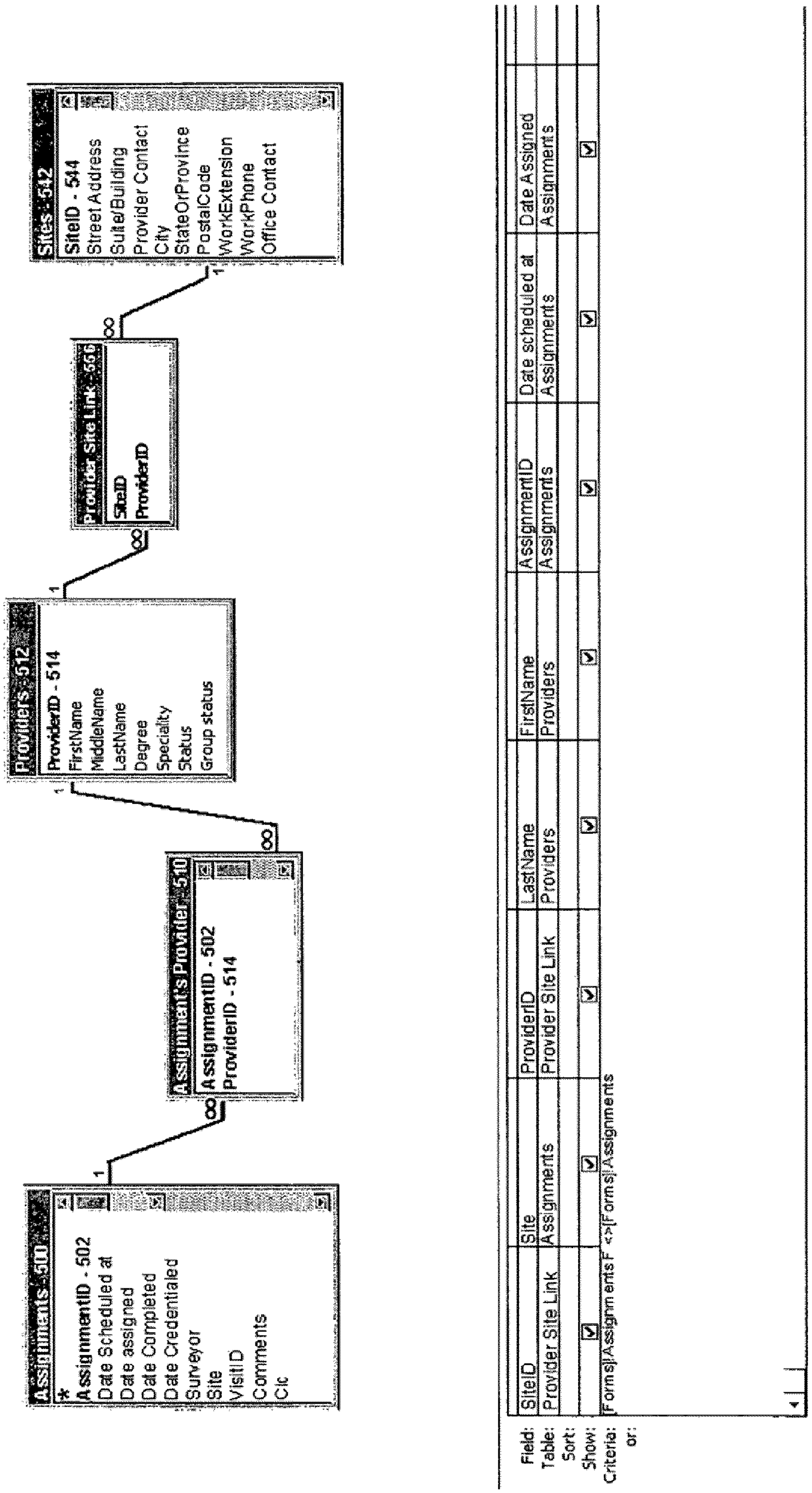

FIG. 18N illustrates the table structures for the query discussed below, which is a SQL query named "subquery other assigns other sites". The code below is referenced by the forms in the logistics manager 110 in the assignment section where the owners 300 access the project database 60 to data enter or choose details to attach to a requested assignment 500 for specific projects. The assignment 500 is linked to the assignment's provider table 510 with an assignment ID 502. This join is a one (assignmentID 502)-to-many (assignment's provider 510). The assignment's provider 510 is joined in many-to-one link with the provider table 512 through the providerID 514. The provider table 512 links to the provider site link 556 through a one-to-many join. To finish this relationship, the provider site link 556 is joined in a many-to-one relationship with the site 542 in FIG. 17F. This relationship is revealed in the logistics manager so that the owner 300 does not have to contemplate all these factors as tasks are assigned. The visualization of these relationships takes a lot of the workload off the owner 300 of the project. Although these tables generally populate the choice tables 312 in the project schema 100, these tables can also be populated by the input collected by field workers 36 from work not specifically listed in the tables but performed and data entered in a field input form 120.

```
SELECT [Provider Site Link].SiteID, Assignments.Site, [Provider Site
Link].ProviderID, Providers.LastName, Providers.FirstName,
Assignments.AssignmentID, Assignments.[Date Scheduled at Site],
Assignments.[Date Assigned], Assignments.[Date Completed],
Assignments.[Date Credentialed], Assignments.Surveyor,
Assignments.VisitID FROM Sites INNER JOIN ((Providers INNER JOIN
(Assignments INNER JOIN [Assignment's Provider] ON
Assignments.AssignmentID = [Assignment's Provider].AssignmentID)
ON Providers.ProviderID = [Assignment's Provider].ProviderID)
INNER JOIN [Provider Site Link] ON Providers.ProviderID = [Provider
Site Link].ProviderID) ON Sites.SiteID = [Provider Site Link].SiteID
WHERE ((([Provider Site Link].SiteID)=[Forms]![Assignments
Form]![Site]) AND
((Assignments.Site)<>[Forms]![Assignments Form]![Site]))
ORDER BY Assignments. [Date Completed] DESC;
```

Figure 18O:
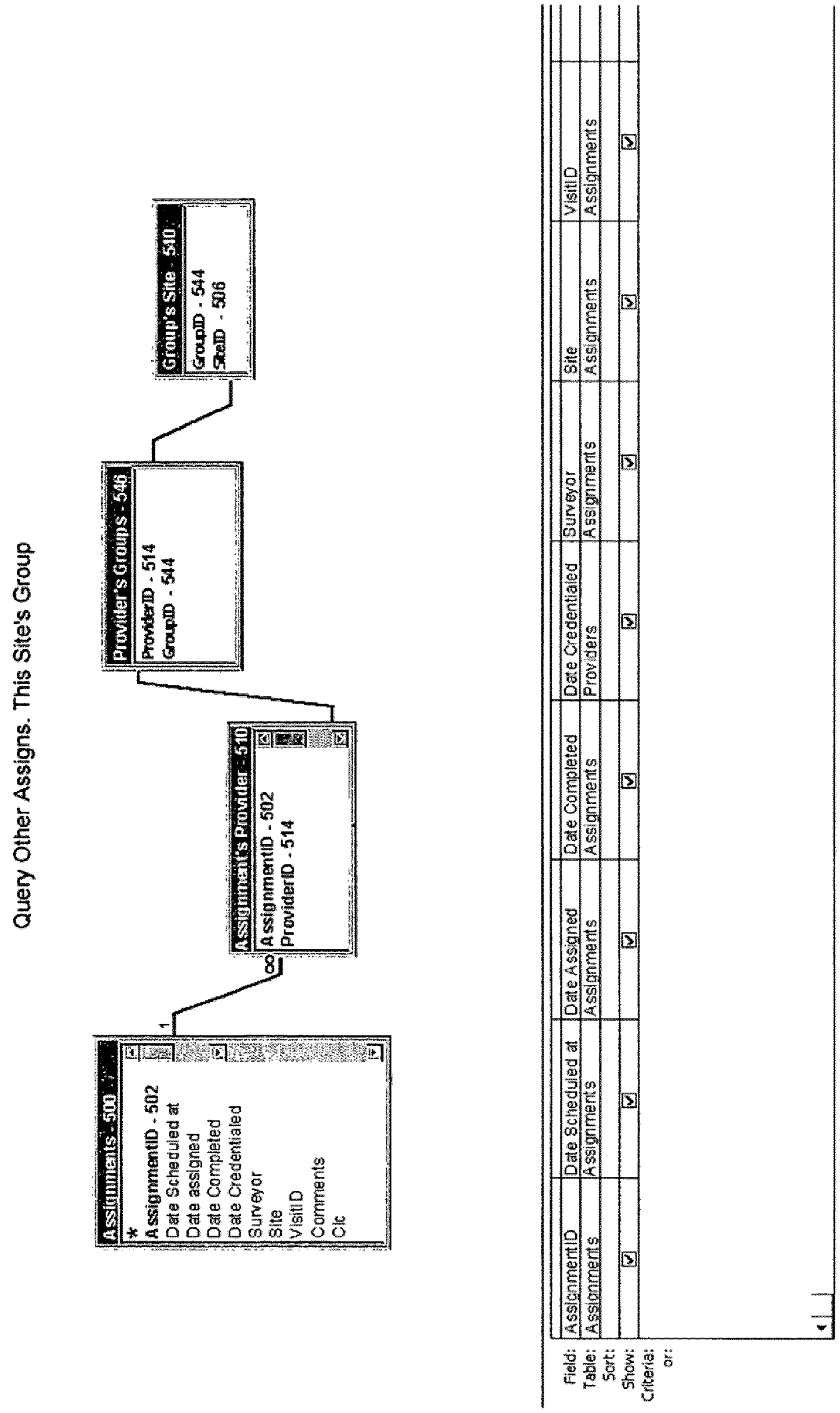

FIG. 18O illustrates the table structures for the query discussed below, which is a SQL query named "Query Other Assign This Sites Group". The code below is also referenced by the forms in the logistics manager 110 in the assignment section where the owners 300 access the project database 60 to data enter or choose details to attach to a requested assignment 500 for specific projects. This query is designed to reveal to the CDCDS user, the relationship between the present assignmentID 502 in the assignment 500 table and the other assignments for this group 544 at this site 506. Once again this relationship is given to the owner 300 in a visual form as soon as it has been made. This four-step relationship begins with assignment 500, which contains an assignmentID 502. From the assignmentID 502, the assignments 500 is linked with the assignment's provider 510 in which can be seen the assignmentID 502 and the providerID 514 in a one-to-many join, signifying that one assignment can have many assignmentID 502. Through the providerID 514 in the assignment's provider 510, it is linked with the provider's groups 546 which is linked to the group's site 800 which contains the groupID 544 and the siteID 506.

```
SELECT Assignments.AssignmentID, Assignments.[Date Scheduled at
Site], Assignments.[Date Assigned], Assignments.[Date Completed],
Assignments.[Date Credentialed], Assignments.Surveyor,
Assignments.Site, Assignments.VisitID, Assignments.Comments FROM
Assignments INNER JOIN (([Assignment's Provider] INNER JOIN
[Provider's groups] ON [Assignment's Provider].ProviderID =
[Provider's groups].ProviderID) INNER JOIN [Group's Site] ON
[Provider's groups].GroupID = [Group's Site].GroupID) ON
Assignments.AssignmentID = [Assignment's Provider].AssignmentID;
```

Figure 18P:
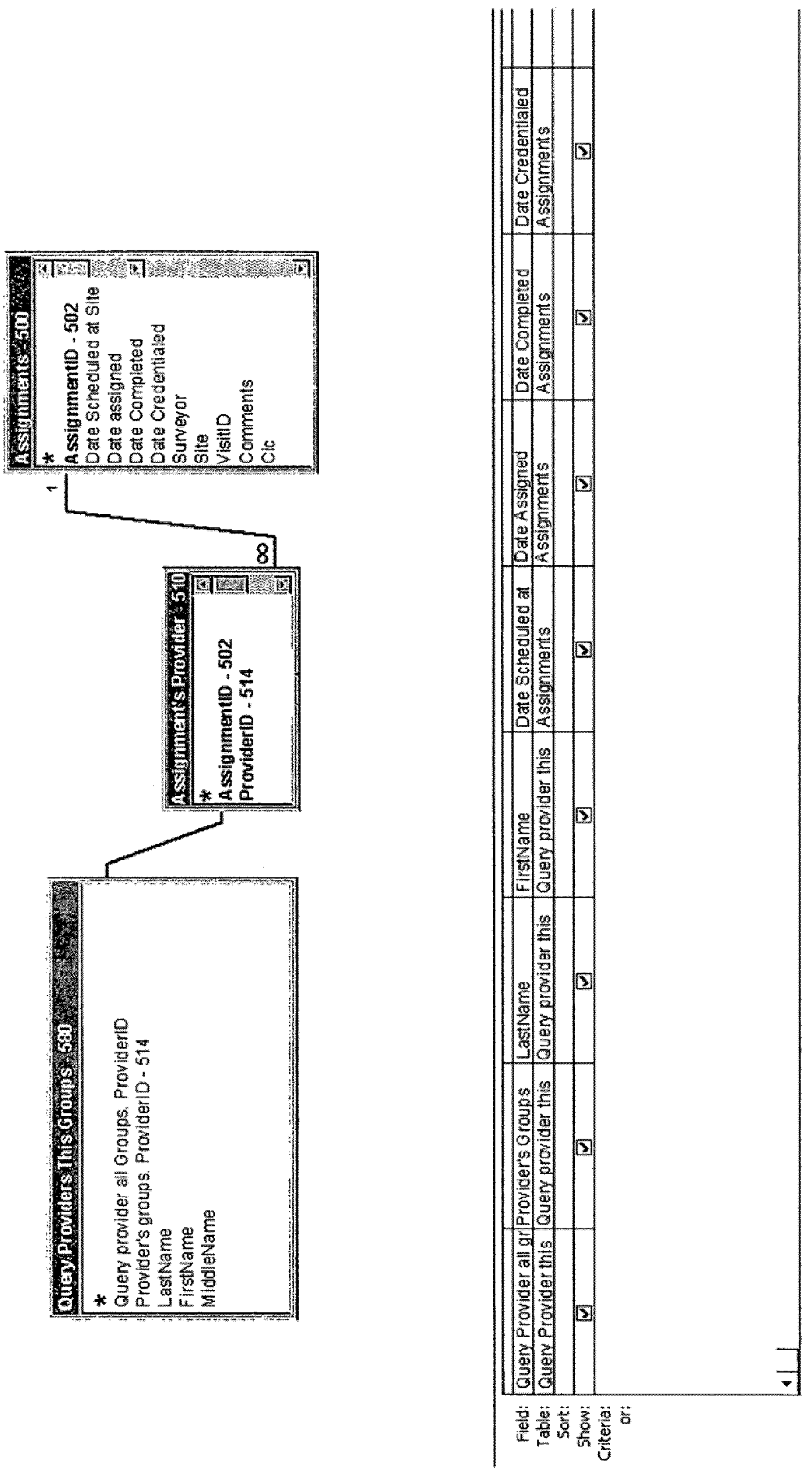

FIG. 18P illustrates the table structures and the relationships for the query discussed below, which is a query named "query other assigns this group". The code below is also referenced by the forms in the logistics manager 110 in the providers section (see FIG. 18A-18D where the owners 300 access the project database 60 to data enter or choose details to attach to a requested provider 512 for specific projects. This query returns a visualization of the relationship between all of the providers 512 in a group 536 and their assignments 500. The first part of this query simply calls up all of the providers in a group through a subquery and gets the providerID 514. The query providers in this group 580 are linked to the assignment's provider 510. This table 510 is joined in a one-to-many relationship with the assignment table 500 where one assignmentID 502 can have many providerID 502.

```
SELECT [query Providers this group].[query Provider all
groups].ProviderID, [query Providers this group]. [Provider's groups].ProviderID, [query Providers this group].LastName, [query Providers this group].FirstName, Assignments. [Date Scheduled at Site], Assignments. [Date
Assigned], Assignments. [Date Completed], Assignments.
[Date Credentialed], Assignments. Surveyor, Assignments.Comments, Assignments.VisitID FROM Assignments
INNER JOIN ([query Providers this group] INNER JOIN
[Assignment's Provider] ON [query Providers this group].
[Provider's groups].ProviderID=[Assignment's
Provider].ProviderID) ON Assignments.AssignmentID=
[Assignment's Provider].AssignmentID;
```

Figure 18Q:
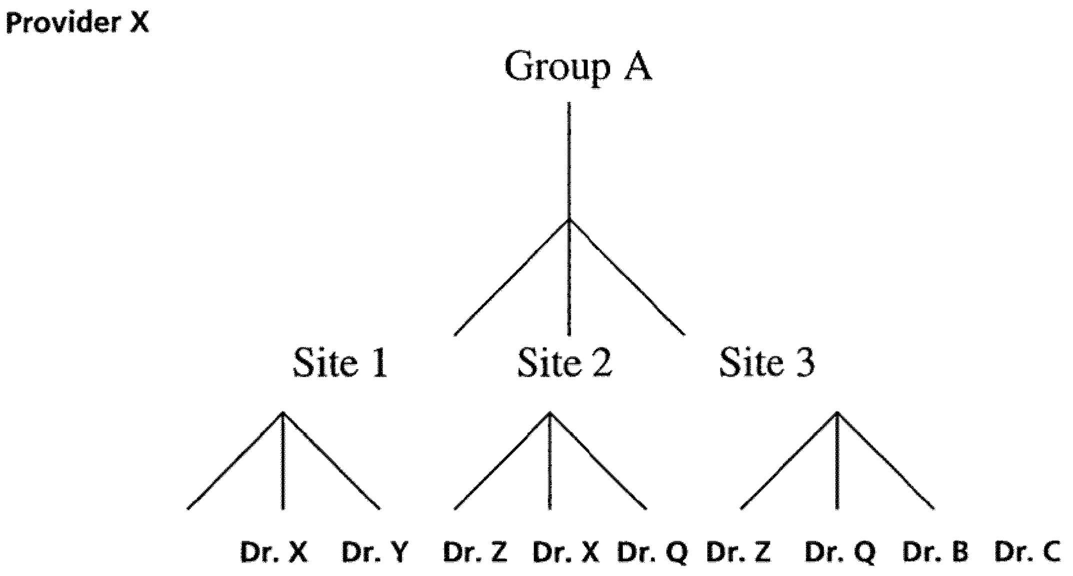
Figure 18R:
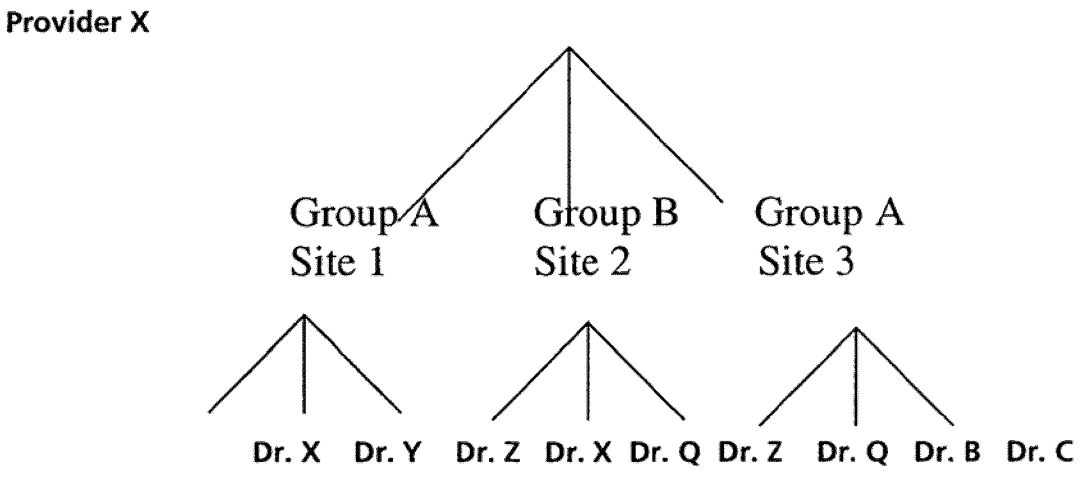

The result of these queries shows unobvious relationships. FIG. 18Q illustrates a relationship between two providers of different groups and sites. This relationship begins with a certain provider X who belongs to a certain group A. There is a secondary relationship between Dr. Q and Dr. Y through Dr. X and Dr. Z. This relationship would not be evident without the queries. FIG. 18R illustrates the relationship between two providers at different sites belonging to different groups. Dr. Q provides a relationship between Dr. X and Dr. B. Again, these relationships would not be obvious to a logistics coordinator even with a spreadsheet.

Real-World Project Sample Items Using the Conventional System

The following is detailed information on the conventional system 10 for a real world data capture and distribution project for medical providers' performance/compliance measurement and reporting for ACME HMO, illustrated in FIGS. 19-28. FIGS. 19-22 shows the questions 160 on several different audit forms 158 that a field worker 36 will reference when entering required input 162 in the blanks 164 on the audit form 158 while conducting medical records and site audits for the project. FIG. 23 shows a sample of the procedural protocols 166 for required input 162. FIG. 24 is a form showing scoring protocols 164 for each of these audit forms 158 and criteria 190 on FIG. 25 that are carried by field workers 36 as reference material. FIG. 24 shows an aggregate score sheet 168 that a field worker 36 must complete at the end of each audit. FIG. 26 shows sample assignment logistics procedural policy 184 for ordering and managing assignments for completion of audit forms 158 on FIGS. 19-22. FIG. 27 shows an illustration of the Excel spreadsheet 170 that is used as part of logistics managing and tracking. FIG. 27 records what providers 172, sites 174, and audit types 176 were requested, who was assigned to the task 178, date scheduled 180 and when it was completed 182, among other things. FIG. 28 shows an assignment request form 182, which is faxed or delivered to a field worker 36 as part of organizing the project logistics. Additional forms and procedures are developed and used to define, track and manage a project (not shown). The goal of this real world project is to measure the compliance of doctors, group practices, and medical sites with certain standards set forth by an organization. This particular project includes numerous audit forms 158 (see FIGS. 19-22), such as the general medical record review of FIG. 19, the health screening review for OB/GYN of FIG. 20, the health screening review for adults of FIG. 21, the health screening review for children of FIG. 22, and adolescent screening, site visit, and PCP inventory form (all not shown). A nurse reviewer performs the general medical record review of FIG. 19 more than once at a provider's site. The nurse must decide what other forms should be completed. Therefore, the nurse must carry all the forms with her in case they are needed during a review. There is more reference materials than is seen in FIGS. 23-26 that explain under what conditions each of the forms should be completed and how each of the individual responses should be made. For this project, the reference materials included a cross-section of three different criteria that the nurse reviewer needed to consider when completing the forms. There was criteria and policy from corporate headquarters, the state commission on medical quality and the local office criteria.

Preferred Embodiment of the Present Invention in a Real-World Project:

The following example provides detailed information on how the preferred embodiment of the present invention is used in a real-world data capture and data distribution project. This example is an illustration of the preferred embodiment of the present invention in use for an actual healthcare company. All identifying information has been removed from the documents for reasons of confidentiality. This example was chosen because it illustrates the ability of the CDCDS 70 of the present invention to automate project design, project and assignment logistics, data capture and data/report distribution for a somewhat complex healthcare provider compliance measurement project. During this project life, there were additional requirements for changes. The present invention performed its functions without disruption to the data capture tasks of the workers and without disruption to the data already available in the project.

In the preferred embodiment of the present invention, a CDCDS user must first collect the requirements and specifications for a project. This information is usually available by reviewing all of the documents shown in FIGS. 19-28 and/or speaking with the appropriate person about the information needs for the project, e.g., the objective of the project, what information is to be reported, logistics requirements for form distribution, data capture assignment requests and report compilation and distribution. FIG. 29A is a listing of the deliverables 184 needed by a CDCDS user in order to build a portable digital data capture and data/report distribution project 58. After the deliverables have been outlined, the actual implementation of the present invention for use in a project begins. This CDCDS bases the entire project on desired results being viewed as a whole, instead of each component of the project being organized and managed separately. This factor is key to improving the results of the project with the present invention over any other system.

Next, a CDCDS user organizes the information about the project before using the CDCDS to create the project. This is done in order to organize the requirements and specifications of a project as one would before using a programming language to build an application that accepts input, processes information and produces output that is needed for best results in the project. The CDCDS user then builds a flow diagram that will help the CDCDS user to more efficiently build the project schema 100 using the programming language 124 of the present invention to integrate project objects 114 and all other elements into a portable digital data capture and data/report distribution project 58, as seen in FIG. 8A. In order to build the project schema 100 that are most efficient, easy to use, and similar to the current flow of work, yet take the most advantage of the abilities of the present invention, the flow diagram should reflect the best process for field workers 36 to perform data collection during a project. In the preferred embodiment of the present invention, the project schema 100, shown in FIGS. 30A-30C for owner 300 ACME HMO consists of: any combination of one or more survey forms 302, belonging to a particular directory 218, with designated directory entries 396, designated field workers 36 and/or joins 216 with accompanying join entries 308. The project schemas 100 for any owner 300 will also have input tables 310 and/or choice tables 312. Each of these items are referenced to objects 114 that are available in the project database 60 and can be integrated by a CDCDS user into a project schema 100.

The assignment 500 logistics aspect of the ACME HMO example are screen shots of the logistics manager 110 in FIGS. 18A-18H of the framework 56 of the CDCDS 70 that allows a CDCDS user to access the project database 60 to designate particular assignment logistics to be part of a project schema 100 of a portable digital data capture and data/report distribution project 58. FIG. 18A-18H show how the CDCDS user can designate the assignments 500 of field workers 36. The logistics manager 110 accesses the project database 60 to allow the owner to visualize the relationships between the different components of ACME HMO's assignments 500. Since providers often change groups and sites, it is necessary to be able to attach and detach sites and groups to providers. Since groups sometimes move as a whole, it is also logical to be able to attach and detach sites to groups. Again, this method helps maintain the integrity of the database in that there is no room for text entry, only choices from a list. This prevents the CDCDS user from sending two different field workers 36 to what appear to be two separate sites, which are really the same site. The relationships between groups, sites, and providers can get very complicated. The logistics manager is a way to visualize these complex relationships directly on the screen to allow the CDCDS user to be more efficient in making decisions.

Figure 30A:
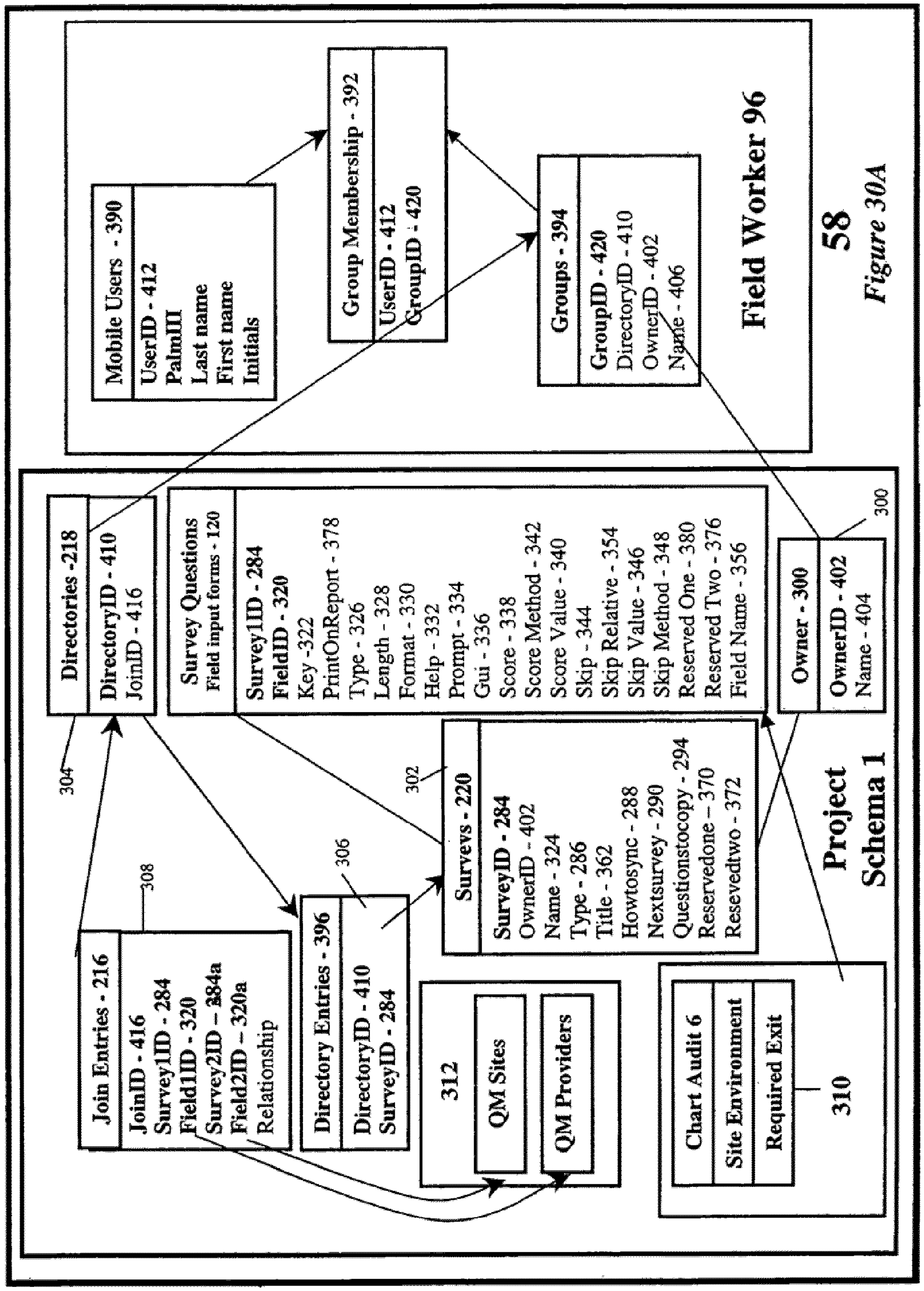
FIGS. 30A-30C are diagrammatic views of project schema 1-3 showing how the entities of each schema relate to one another.
Figure 30B:
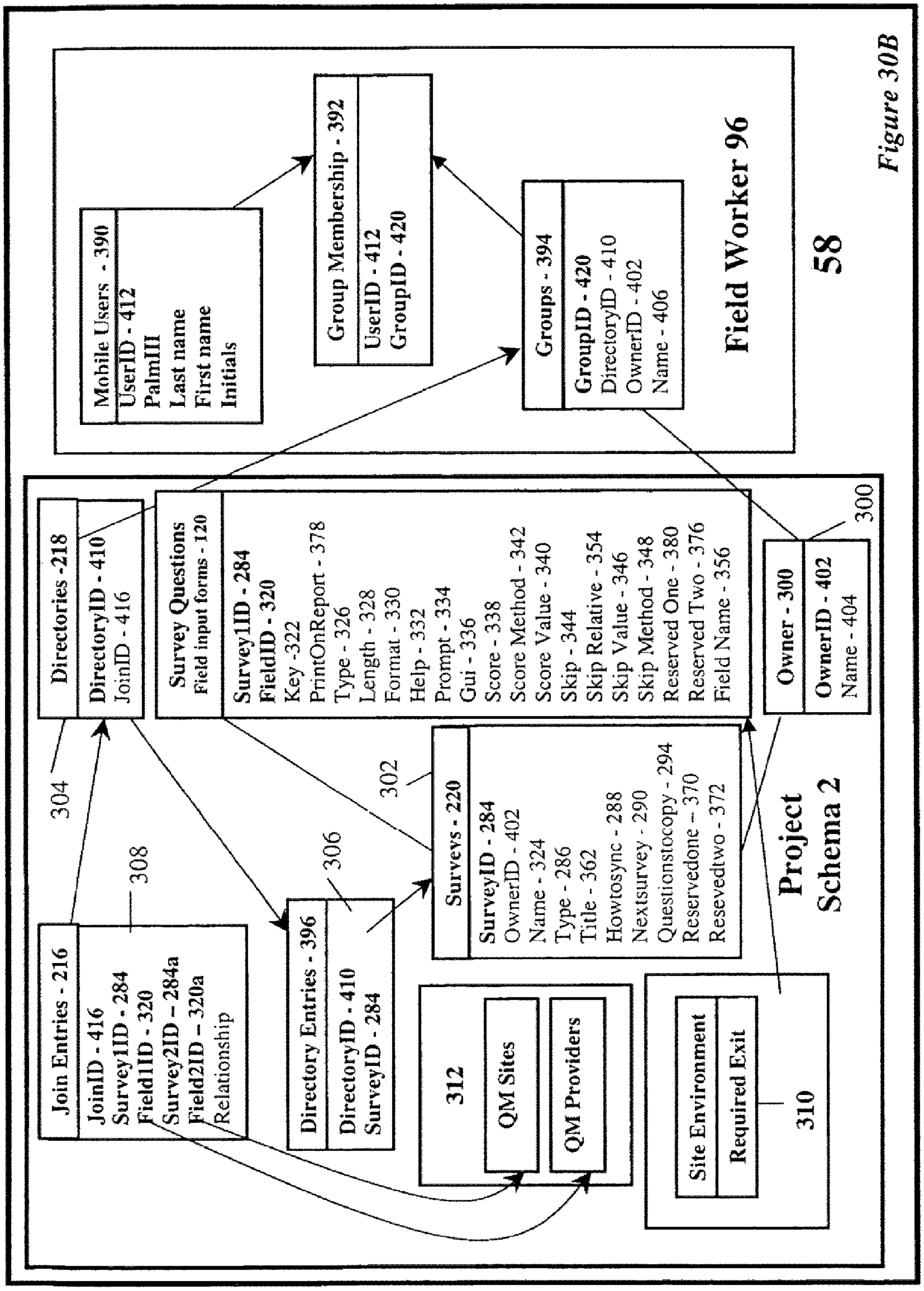
Figure 30C:
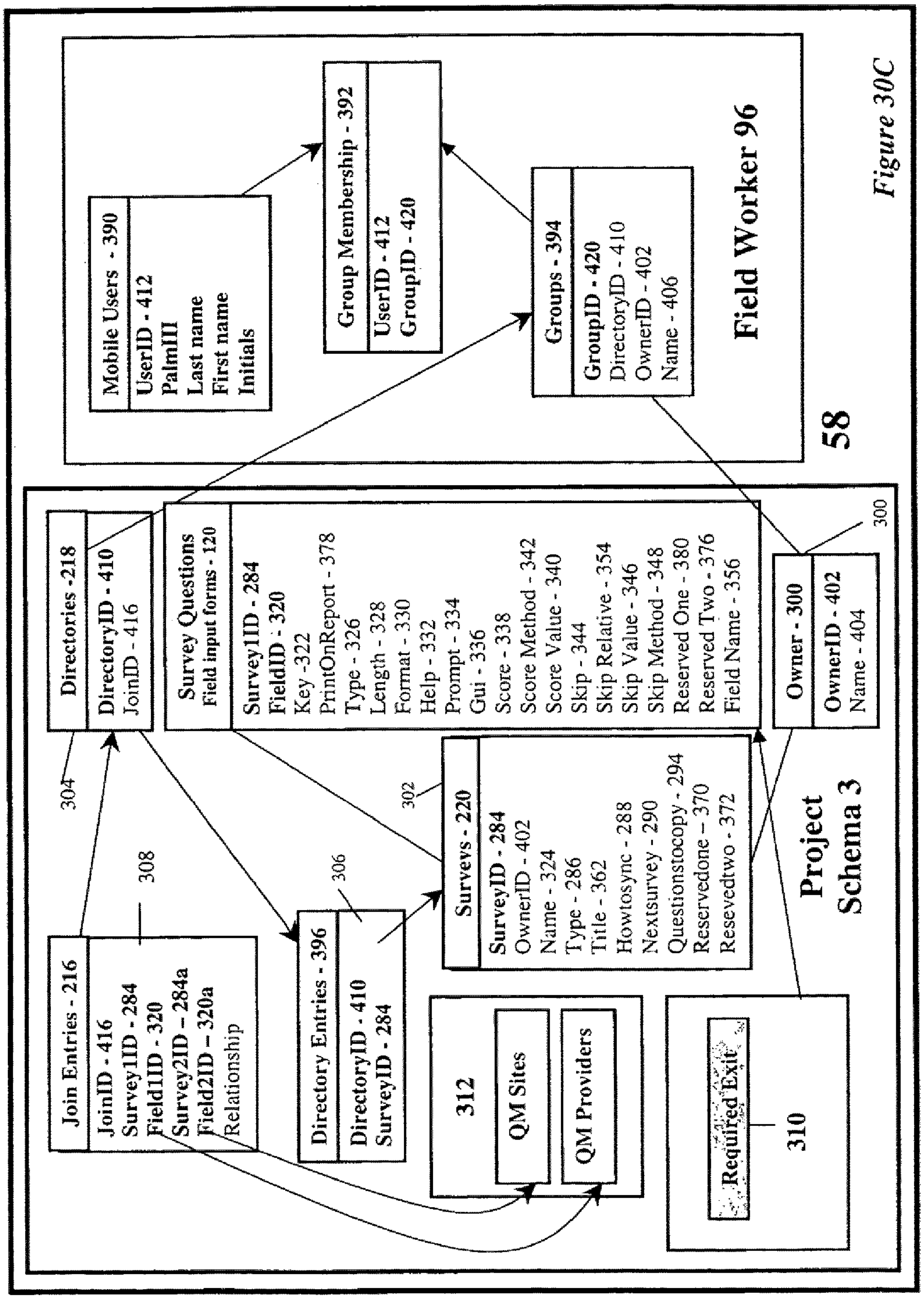

For this project, the CDCDS user programmed the general medical record review audit 158 in FIG. 19, the health screening review for OB/GYN audit 158 in FIG. 20, the health screening review for adults audit 158 in FIG. 21, health screening review for children audit 158 in FIG. 22, and the other audits (not shown) into project schema 1 100 in FIG. 30A, project schema 2 100 in FIG. 30B, project schema 3 100 in FIG. 30C. Once the CDCDS user establishes the overall flow of the project and what project schema 100 are required for the best quality data capture, the details of the individual project schema 100 is put into a flow diagram (see FIG. 30D). Here, the details of the individual project schema 100 are mapped as a design. This may appear as a complex programming process. However, a good programmer who is familiar with the programming language can simply think of the flow diagram and then begin the programming process. The CDCDS user designates the specifications and characteristics of each of the individual project schema 100. Certain audit forms are completed in duplicate at the same site for one provider, require particular protocols for completion, and are filled out by staff having a specific experience level. Assignment management for these audits may be different than for other audits. Other audit forms may be done once and applied to all the doctors working at that site. All of these characteristics are considered when making and designing the project schema 100. Forms will be programmed in an entirely different flow, yet the field worker 36 should see the field input interface 112 of FIG. 14 match her workflow during an audit. In this example, all three project schema 100 would have their own flow diagrams. See FIGS. 30A-30C.

Figure 30D:
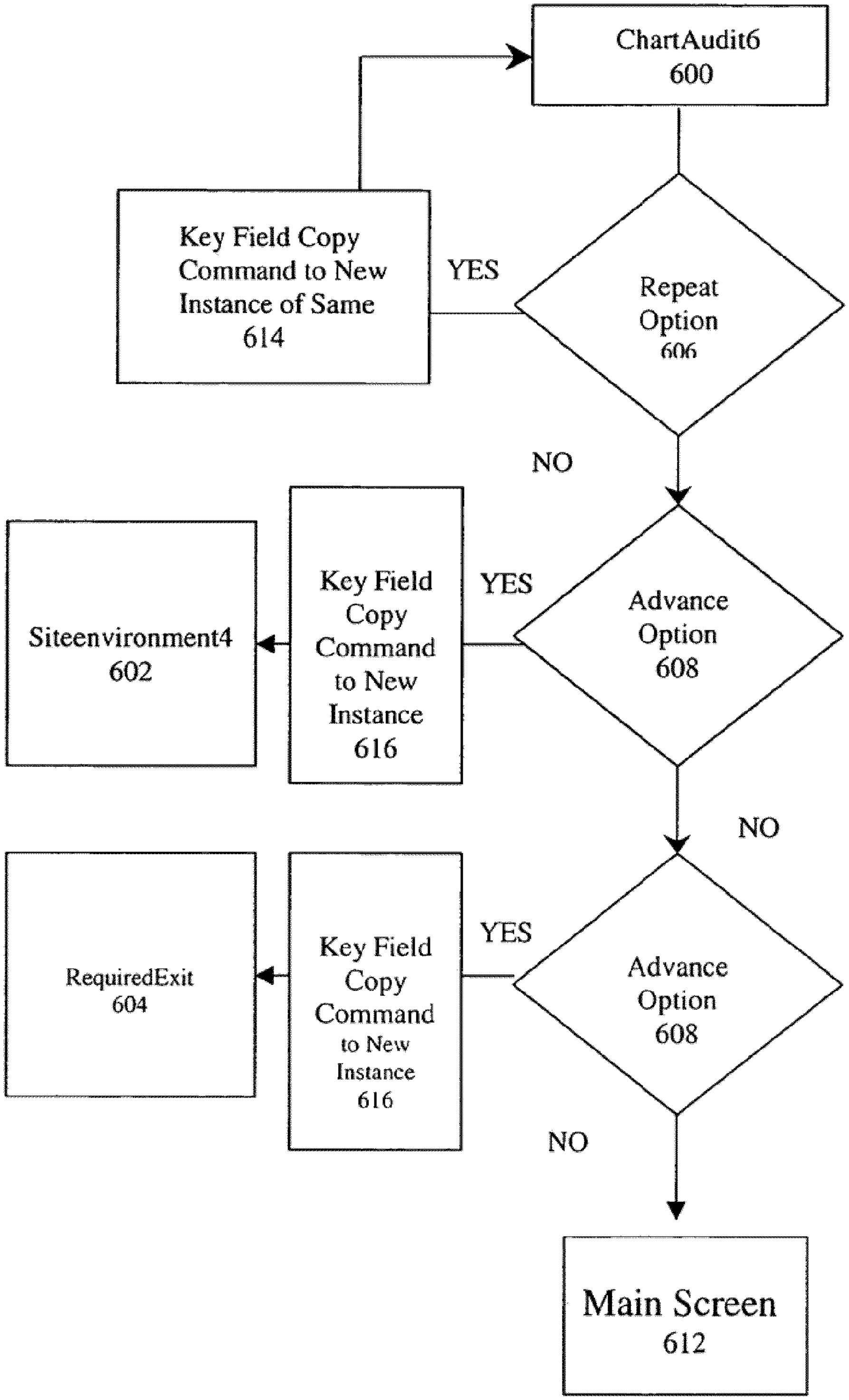
FIG. 30D is a flow diagram for an entire project schema.
Figure 30E:
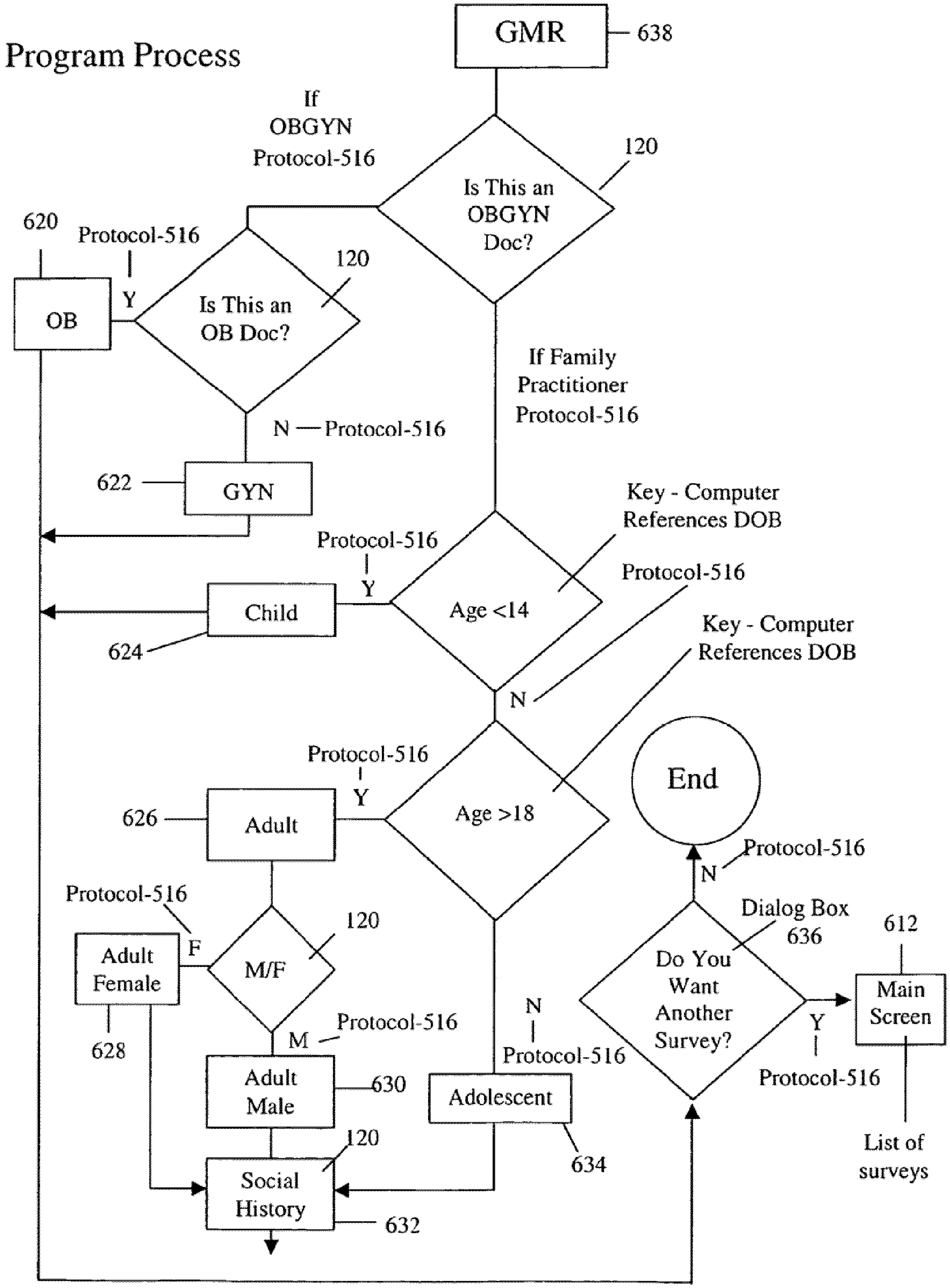
FIG. 30E is a flow showing the interchanges between the different components of field input forms.
Figure 30F:
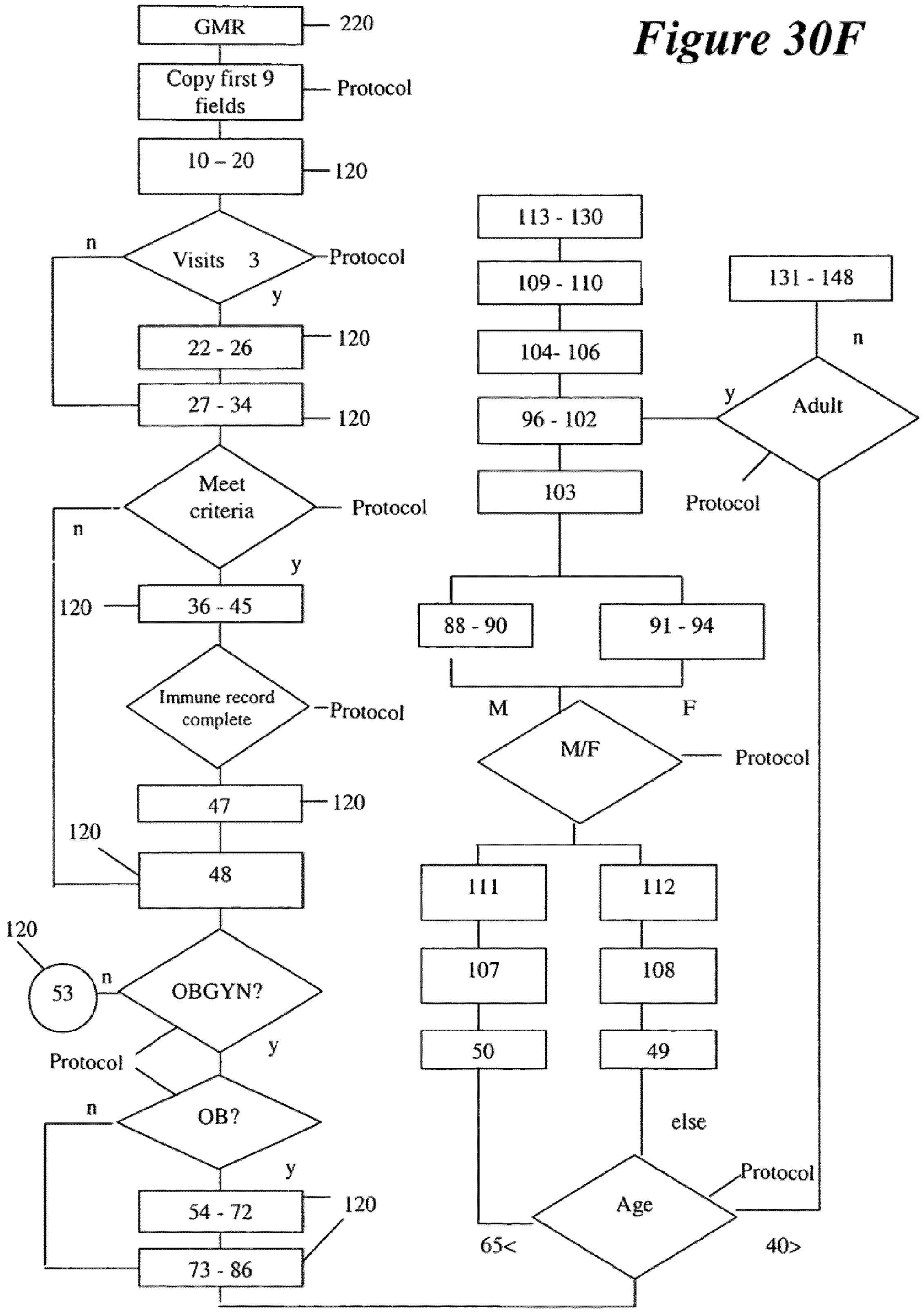
FIG. 30F is a detailed flow diagram illustrating the intelligence and sequence of field input forms.

The flow diagram in FIG. 30D for project schema 1 100 consists of (survey 220 with name 324, chartaudit6 600) that is set to reveal at the last field input form 120 a repeat option 606 (Do you wish to do another chart audit6? 600). A key field copy command 614 (copy the input from the designated number of field input form 120 to a new record 518) is performed if yes (see FIG. 8C). If the field worker 36 chooses no, an advance option 608 (Do you wish to do a site environment 4? 602 which is a survey 220 with the name 324, siteenvironment4) is revealed as a dialog box. If the field worker chooses yes to this, a key field copy command for new instance 616 (copy the input from the designated number of field input form 120 to a new instance of a siteenvironment4 record 518) is performed (see FIG. 8C) and a site environment4 is revealed. If no, another advance option 608 (Do you want to do a required exit interview? 604). If yes, the input from the designated number of field input form 120 marked key 322 is copied and an exit interview is revealed. If no, the field worker is taken the main screen 612.

The next flow diagram seen in FIG. 30E is a more detailed picture of how the audits 158 of FIGS. 19-23 are designated to be a survey 220 with the name chartaudit6 600. It is at this point in the design process that the logic for the intelligent survey is shown. This logic is the basis for the determination (upon the input of the users) of which set of input forms 120 will be revealed to the field worker 36. In addition, this logic will be the basis for the determination (upon the input of the users) of which field input forms 120 will allow input by the field worker 36 or be skipped based on any protocols 516 input into the CDCDS.

FIG. 30E is a flow diagram of the original project audits 158 and how they are built to reduce the logic requirement on the part of the field worker 36, such as which audit 158 they need to take with them to an assignment. The field worker 36 makes input into the field input form 120 and based on the input, another field-input form 120 will be revealed. For example, FIG. 30E shows that the general medical review audit 158 of FIG. 19 is kept together as a GMR 638 group of input form 120 representing the questions 162 from the general medical record review audit 158 of FIG. 19. At the end of the GMR 638, a field input form 120 is revealed to the field worker 36 whose prompt 334 reads "Is this an OBGYN Doc?". According to the protocol 516, if the Doc is an OBGYN, then a field input form 120 is revealed to the field worker 36 whose prompt 334 reads "Is this an OB Doc?". According to the protocol 516, If Yes, then an OB 620 set of field input form 120 is revealed representing the questions 162 from the OBGYN Health screening audit 158 of FIG. 20. If the field worker 36 chose no instead of yes for the field input form 120 whose prompt 334 reads "Is this an OB Doc?", then a GYN 622 set of field input forms 120 representing only GYN related questions from the OBGYN Health Screening audit 158 of FIG. 20 are revealed. The separation of the OBGYN Health Screening audit 158 of FIG. 20 is separated into two groups of field input forms 120.

Organizing the field input form 120 in this fashion would eliminate the need for the field worker 36 to read the question 162 pertaining to the GYN doctor when it is an OB doctor. This saves the field worker 36 time and also reduces to possibility of a field worker 36 making input erroneously. As can be seen in the rest of FIG. 30E, each of the pertinent groupings is organized based on age protocol 516 and male/female (M/F) protocol 516. Each of the field input form 120 is revealed to the field worker 36 based on the protocols designated by the CDCDS user at any time in the life of the project. This includes making changes to a project, protocols, or prompt 334.

In other words, the field input forms 120 are grouped as they relate to a set of parameters for a group of field input form 120 representing a grouping of questions 162 in the audit forms 158 for the project. Just as writing code allows a program to perform functions, reference other code, and reference algorithms for managing logic, the flow diagram of FIG. 30E illustrates a similar building process for integrating objects 114 into a project schema 100 using the programming language 124 of the present invention. The present invention allows sets of field input forms 120 related to protocols 516 so that when a project schema 100 is designed for use in a project, it can be used in other projects simply by changing the relationships between objects 114 in the project database 60. This saves the CDCDS user a tremendous amount of time in building other projects. It reduces error, and it adds to the efficiency of building projects in the same manner as writing objects in C++ or Java saves a programmer a tremendous amount of time when a shared library of objects are available to reference.

FIG. 30E shows additional details of the project schema 1 100. Even among the field input forms 120 in the group of field input forms GMR 638 and GYN 622, there are more detailed protocols 516 among the individual field input forms. For example, at the field input form 21, the field input form 120 prompt 334 reads "Are the visits greater than or equal to three?" If the input is made by the field worker that represents the value for "no", then the program automatically inputs the value for "not applicable" for field input forms 120 22-26 and reveals the field input form 120 27-34 to the field worker 36. Project schema 2 100 and project schema 3 100 are not shown in a detailed illustration as project schema 1 100 is shown. These other project schema 100 are similar in function to each other. The differences in these project schema 100 will be illustrated in FIGS. 35B-35D which will be discussed in the next section.

The present invention allows the CDCDS user a tremendous amount of flexibility in building the project schema 100 for the portable digital data capture and data/report distribution project 58. An audit of the project 58 showed that the present invention reduced the number of questions by 63% because the logic associated with field input forms 120 reduced the number of questions presented to the field worker 36. In addition, the automatic input made by the program (when appropriate) and the restrictions on the type of input allowed, reduces error and increases the readability factor that is important in reducing error. In addition, the automatic input made by the program when appropriate and the restrictions in the type of input that can be made, reduces error, as well as the readability factor that is important in reducing error.

The next set of figures are screen shots of the project creator/report generator 108 of the framework 56 through which a CDCDS user of the preferred embodiment of the present invention can access the project database to program a portable digital data capture and data/report distribution project 58. The project creator/report generator 108 is equipped to guide the CDCDS user through the use of the programming language 124 of the present invention to build the project schema 100 for the project. It is through this project creator/report generator 108 that a CDCDS user begins by designating the project owner 300 for the portable digital data capture and data/report distribution project 58, which for this example is ACME HMO. The toggle box 700 on FIG. 31A allows the different project owners 300 to be added to the project database 60 or to be chosen from a drop down box of a list of choices. The CDCDS user of the present invention is allowed to name a different owner 300 for a project. By naming a different owner 300 for a project, and by designating different field workers 36 with the use of the logistics manager of FIGS. 18A-18H, the entire project can be designated for forwarding to another owner 300. It is not unusual in healthcare and other industries that a project would be repeated among departments or even between enterprises. With the ability in the present invention to allow changes in owner 300, designation, the CDCDS user would not be required to build another project for the new owner 300 thus saving time and reducing error. The owner 300 in a project is a way of naming all the elements that an enterprise such as ACME HMO will include in a portable digital data capture and data/report distribution project 58. An owner 300 needs to be associated with field workers 36, who are designated in the logistics manager 110 of FIG. 18. Field workers 36 are designated with a particular hardware 34, and are members of one or more groups 394 who have one or more group memberships 392. Relating a field worker 36 to an appropriate owner 300 will designate which project subset 116 will be forwarded to a field worker 36 during a connection with the project database 60. Designating an owner 300 is also a way of limiting accesses to the design of the project. Once designated, the owner of a project is the only person or groups of people who can change the relationships, make assignments, or query reports with in a project schema 100. Owners 300 are forwarded a particular project subset 116 as it relates to a report on the project.

FIG. 31B shows how the project creator/report generator 108 is accessed to use the programming language 124 (see FIG. 8A) of the preferred embodiment of the present invention to program one or more project schema 100. Type of question set 702 is a drop down box listing the available project objects 114, formDB 208 and fixed 214, which have been listed here for ease of understanding by the CDCDS user as Survey and Non-Editable Data. In FIG. 31B, the title Chart Audit 6 362 signifies one of the characteristics of the project listed in the survey 220 table (see FIG. 8B). This is what the field worker 36 will see on the main screen 612 of their hardware 34 as part of the field input interface 112 when they receive the project subset 116 that pertains to them. The Name of survey/table name chartaudit6 324 is another characteristic of the project listed in the survey 220 table. The present invention allows the CDCDS user to designate both a title 362 and a name 324 in the survey 220 table. This gives the CDCDS the opportunity to mark either of these differently, allowing the same characteristics to be designated that will be titled differently for each field worker 36.

For example, referring to FIG. 8B, field worker 36 Mary Beth, has a userID 412 31, that has a group membership 392 with groupID 420 19, in a group 394 with ownerID 402 25 (ACME HMO) and directoryID 410 16, which is in the directory entries 396 table with surveyID 284 66, which has a name 324. In this example, chartaudit6 can be title 362 Chart Audit 6 for Mary Beth but can be title 362 Emergency Review for another field worker 36 with different group membership 392. The present invention solves one of the key problems in healthcare in particular and in other industries as well where standardization of the paperwork in the industry would be extremely helpful but is difficult to attain. The present invention does not restrict the CDCDS user to specific naming conventions or specific characteristics designations. Instead, the user is given the flexibility to manipulate the items in tables and the relationships between items so that what one owner 300 wishes to refer to as a Chart audit 6, another owner 300 can refer to as an Emergency Review. Once programmed, several different owners 300 can use project schema 100 with different characteristics, thus reducing the time for setting up other projects that will contain the same project schema 100 and solving the standardization nightmare. Each owner 300 of a project can refer to any portion or all portions of the project differently, yet the CDCDS user will be able to continue to organize and track the project with standardization on the back end of the project.

Project schemas 100 are similar to objects created with other object oriented programming languages such as JAVA and C++. Using the programming language 124 of the preferred embodiment of the present invention, a CDCDS user creates "objects" that can be reused in other projects. Making previously programmed project schemas 100 available for incorporation into other projects and/or other owners 300 applies object oriented design (that is, making small program portions available for reuse by other programs) to the CDCDS 70. Programming tools can be built that allow a user to keep project schemas 100 organized in a library of code as is done in C++ programming, and to make these project schemas available more easily for other projects. In addition to building programming tools for the programming language 124 of the preferred embodiment of the present invention, programming tools can be built for adding objects 114 to the project database 60. A programming tool such as this can more quickly allow the expansion of the capabilities of the CDCDS 70. The owner, however, interacts with the database through the project creator/report generator 108 and therefore does not need to have knowledge of the programming language 124. The project creator/report generator 108 acts as a translator between the programming language 124 and the user. This tool enables people who do not know the programming language 124 to efficiently and accurately build their own project schema 100. The project creator/report generator 108 does not allow the user to make inappropriate relationships, or affect the current data residing in the database that does not apply to this particular project schema 100. This tool also allows the user to set up the necessary data tables 310 and choice tables 312 and relationships between the tables 310 and 312. An example of this schema 100 and the relationships between the entities is illustrated in FIGS. 30A-30C.

The CDCDS user now has access to any or all of the object schema stores 62 of the project database 60 shown in FIG. 3 and begins to build a project subset 116 seen in FIG. 5. FIGS. 31A-31E guide the CDCDS user to include all the objects, their relationships to other objects, and their functions, in a project schema 100. These figures illustrate how the project creator/report generator 108 allows the user to select from a list of owners. This screen also allows the user to enter a title of the project schema 100 and survey name 324. The screen shots show how the user is able to set the type of questions needed for this particular project. In this case, the questions needed for chart audit 6 are called “survey” in the project creator/report generator 108 which refers to the form DB 208. Also visible in FIGS. 31A-31E is the choice non-editable data. This refers to a fixed form 214. In this example, the fixed form 214 would be used to list providers or sites or any other information that is chosen from a list rather then entered as text. This function serves two purposes. The first function is data integrity. This prevents the field worker 36 from misspelling a name and adding a field to the data that doesn’t exist. The second function is aggregation. For instance, the names in a list can be assigned a value and then aggregated, whereas text cannot be aggregated. The user decides on the next survey 220 from a choice in a list, rather than from a text entry. After this has been decided, the next step is choosing how to sync 288 or forward the surveys 220 as part of the project subset 116. This “how to sync 288” choice aids in the transfer of data. It allows the directories 218 to be transported to the field worker 36 and the data collected to be transferred back to the project database 60. The other options are “no sync” and “desktop to palm by user”. The no sync option would be used when entering survey 200 in a fixed form 214 that is only needed in aggregation rather than collection, and therefore would reside only in the project database 60. All of the available options are not listed here, nor are the additional options that can be easily programmed and added to the project database 60 for the CDCDS user to have access to.

These syncs 288 ensure that every field worker 36 who has group membership 392 in group 394 which also contains owner ID 402 which refers to the owner 300 ACME HMO gets these particular surveys 220 which the user is setting up in the project creator/report generator 108. With these syncing functions, the owner sets up the individual directories 218 for individual field workers 36. The screen shot in FIG. 31F shows the project schema 100 for chart audit 6. With the project subset 116 in place, the user is now ready to set up the individual project schema 100.

Figure 31D:
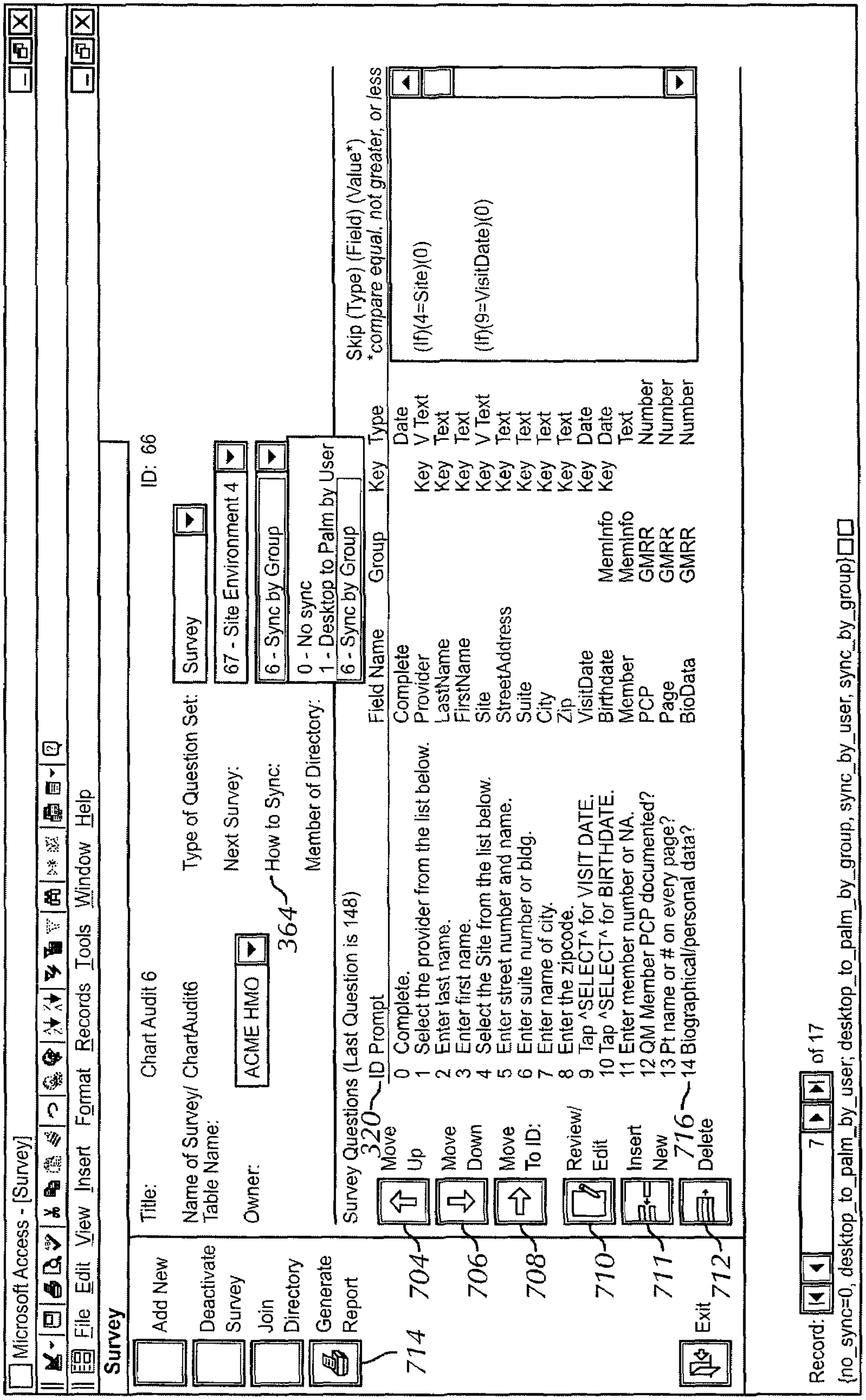

FIG. 31C illustrates how a CDCDS user can pick the next survey 366 to follow the current one. Referring to the flow diagram of FIG. 30D, a CDCDS user can designate a repeat option 606 or an advance option 608 in the project schema 100 and mark which survey 220 will follow in the project schema 100 if an advance option 608 is chosen by the field worker 36. FIG. 31D illustrates the CDCDS user’s view of options for how to sync 364. This represents the exact designations for how a project subset 116 is forwarded to a field worker 36 and how the data exchanged between the project subset 116 and the project database 60 should be managed in the project (see FIG. 15). FIG. 31D also illustrates that on the screen, the CDCDS user has the option to generate report 714 but only if field workers 36 have captured data using their field input interface 112 and reconciled it with the project database 60. Also shown are options for the CDCDS user to select a survey question 716 and select an option to move up 704, move down 706, move to 708, review/edit 710, insert new 711, or delete 712 a survey question 716. It is important that the CDCDS user is given this tool to aid in the building of project schema 100 because of the particular requirements of the project schema 100 in order to work properly in a project. For example, if a fieldID 320 is skipped among the survey questions 716, the program will have difficulty calculating the next fieldID 320 based on protocol 516 designated by the CDCDS user. The project creator/report generator 108 also enables the user to choose specific field input forms 120 and the order they are seen provided they are compatible with the logic of the project schema 100.

Figure 31E:
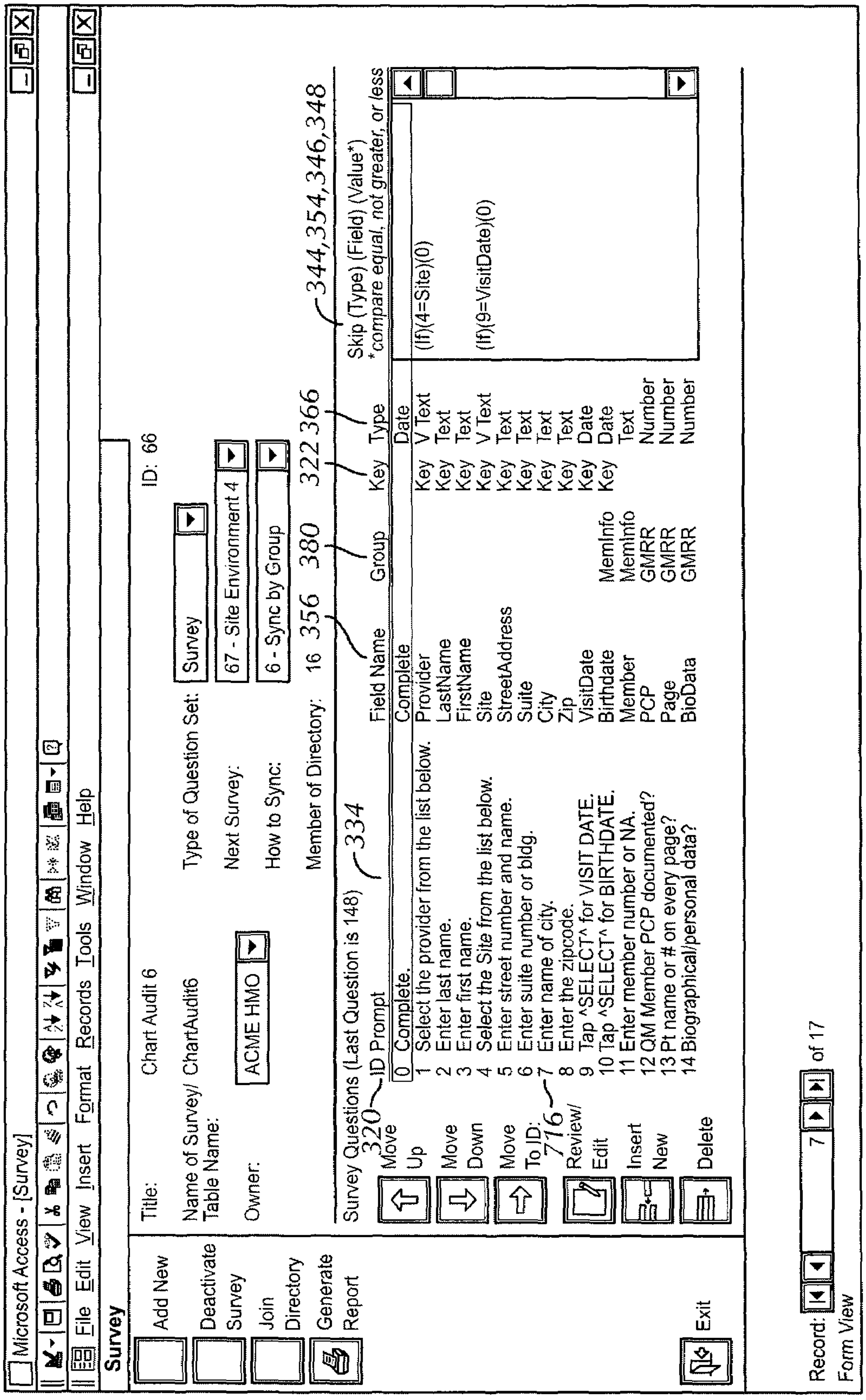

FIG. 31E shows the various characteristics 530 of the individual survey questions 716 that is known as the field input form 120 table and the elements listed as seen in FIG. 7A. As seen in FIG. 31E, the elements listed are the ID (fieldID) 320, the prompt 334, the field_name 356, the group 380, that designates which report group for aggregation, the key 322, which will be reflected in the reports and used by the field input interface 112, and the skip protocol 516: 344, 354, 346, 348. FIGS. 32A-32E are screen shots of how the CDCDS user views the section of the project creator/report generator 108 that allows the designation of characteristics of each of the individual field input forms 120 that are part of the project schema 100 (see FIGS. 30A-30C).

Designing the field input forms 120 for a project schema 100 is, in effect, the process of designing a project subset 116. As illustrated in FIGS. 30D-30F, the project schema 100 is translated into flow charts. In this stage, the logic is set forth so the user can see where the skips and joins 216 are needed between all the elements of the project schema 100. The user can then use this flow chart as a guide, while using the project creator/report generator 108 to design the actual survey questions 120. FIG. 32B is an example of a field-input form 120 that will ask for the provider’s last name. The previous question which asks if the provider is listed below is not shown here. This shows that these text answers cannot be scored for aggregation. However, the answer from the previous question can be scored. This is a much more efficient way to check the database for inaccuracies with respect to the provider and site. FIG. 32B also demonstrates the score method 342. Since this is a field input form 120 requiring a text answer, the score method 342 is no score. The other two options allows for scoring either a positive or a negative answer. In FIG. 32A, the screen shot reveals that the choice for score value 340 is zero because of the score method 342 chosen. FIG. 32B also reveals the drop down box filled with the score group. This function is important to the reporting part of the CDCDS. The score group function allows this field_name 356 to be identified and aggregated with others marked in this same way.

Figure 32C:
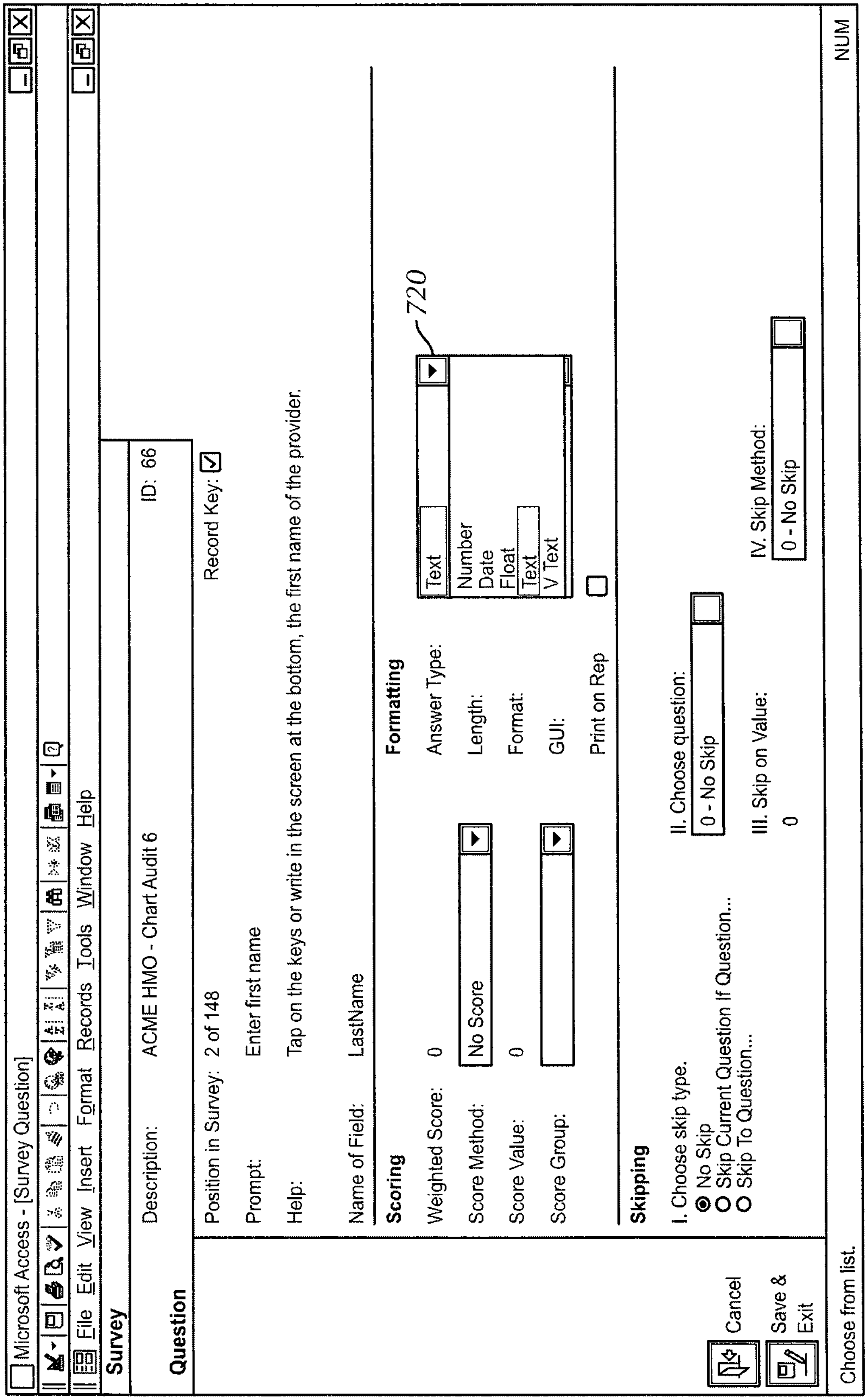

The screen shot in FIG. 32C shows the options for answer type 720. A text type is chosen in this example since it is a field input form 120 which will be input by the field worker 36 if the choice was made in the prior field input form 120 *Not on list 1*. FIG. 32D lists the possibilities for GUI 336 types. This gives the user the option to select how the questions will be displayed in the filed input form 120 and what choices are given to the field worker 36, e.g., yes/no, yes/no/na, thorough/adequate/no documentation, etc. FIG. 32E illustrates the help section 722. The help text will travel with its field input form 120 so that the field worker 36 does not need to reference an outside source or even an index within the hardware 34. The other functions shown in these figures are the skip 344, etc. functions. This allows the user to remain in control of the logic. The setting no skip 724 is chosen here again because the field input form 120 requires a text answer. If a skip function 344 was chosen, then a skip method 348 and skip value 346 would also have to be chosen from the options listed. Once the CDCDS user designates these characteristics, all of these functions are set for all of the field input forms 120 and the format of the reports.

FIGS. 33A-33O is a report on all the field-input forms 120, as they appear in the survey 220 with the title 362 Chart Audit 6. This report is a linear representation of the field input form 120 and will not reflect exactly how they appear on any field worker 36 field input interface 112. However, it shows how the fieldID 320, the field_name 356, the prompt 334, the help 332 appear for this owner 300 ACME HMO. A report such as this is often helpful to be used in conjunction with the flow diagram of FIG. 30F, which is a graphical representation of the items on this report.

FIGS. 34A-34D show each of the items that are part of the three project schema 100 that are programmed for this particular project for ACME HMO. The following is a detailed explanation of each of the elements in the figures and how they are used as part of a portable data capture and data/report distribution project 58.

Figure 34A:
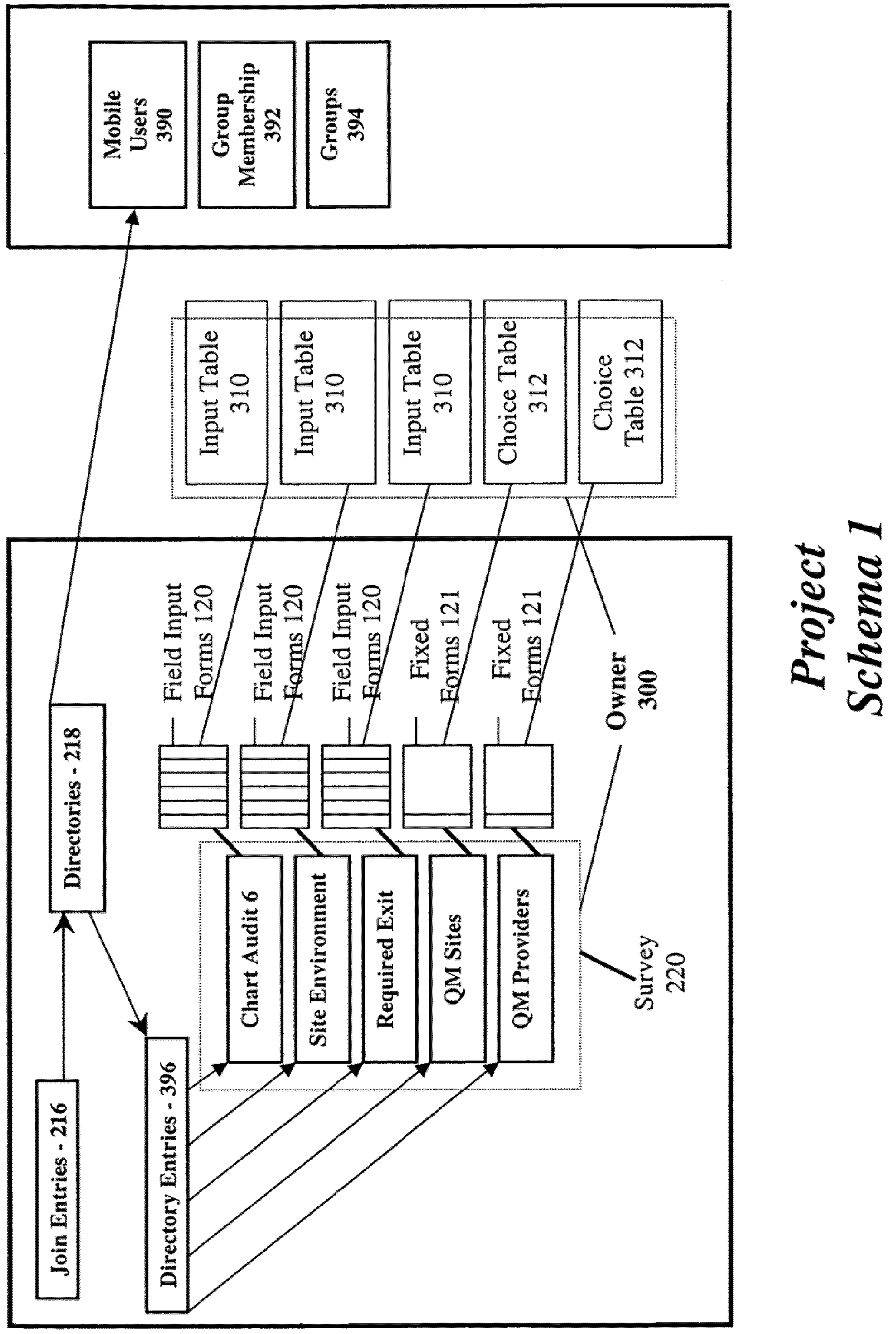
FIGS. 34A-34C are diagrams illustrating the elements and relationships of project schema 1-3 respectively.

FIG. 34A is a diagram illustrating the elements of the project schema 1 100. Input tables 310 are populated by the input made by a field worker 36 in the field-input forms 120. This input table 310 has been designated to "sync from palm to desktop by user" as part of the project schema 100. Input tables 310 store the preprogrammed numeric values for the items that a field worker 36 has chosen as a response in each of the field input forms 120 for a particular survey form 220. For example, tapping the check box "yes" will input a numeric value of 1. The CDCDS user has established all of the values in the design of the project.

Input tables 310 also store the pre-designated numeric values for field input forms 120 that have been skipped programmatically e.g., if the field input form 120 was not revealed to the field worker 36 based on the protocol 516 for the prior question (see FIG. 30E or 30F). These input tables 310 are automatically created by the CDCDS 70 with the structure and field_name 356 that have been designated by the CDCDS user as part of the programmed project schema 100. The input table is of formDB 208 and acts as a receptacle for the information collected by the field worker 36. This input table 310 holds both the values of the yes/no questions and as the selections made by the field worker 36 from a choice list.

Figure 34B:
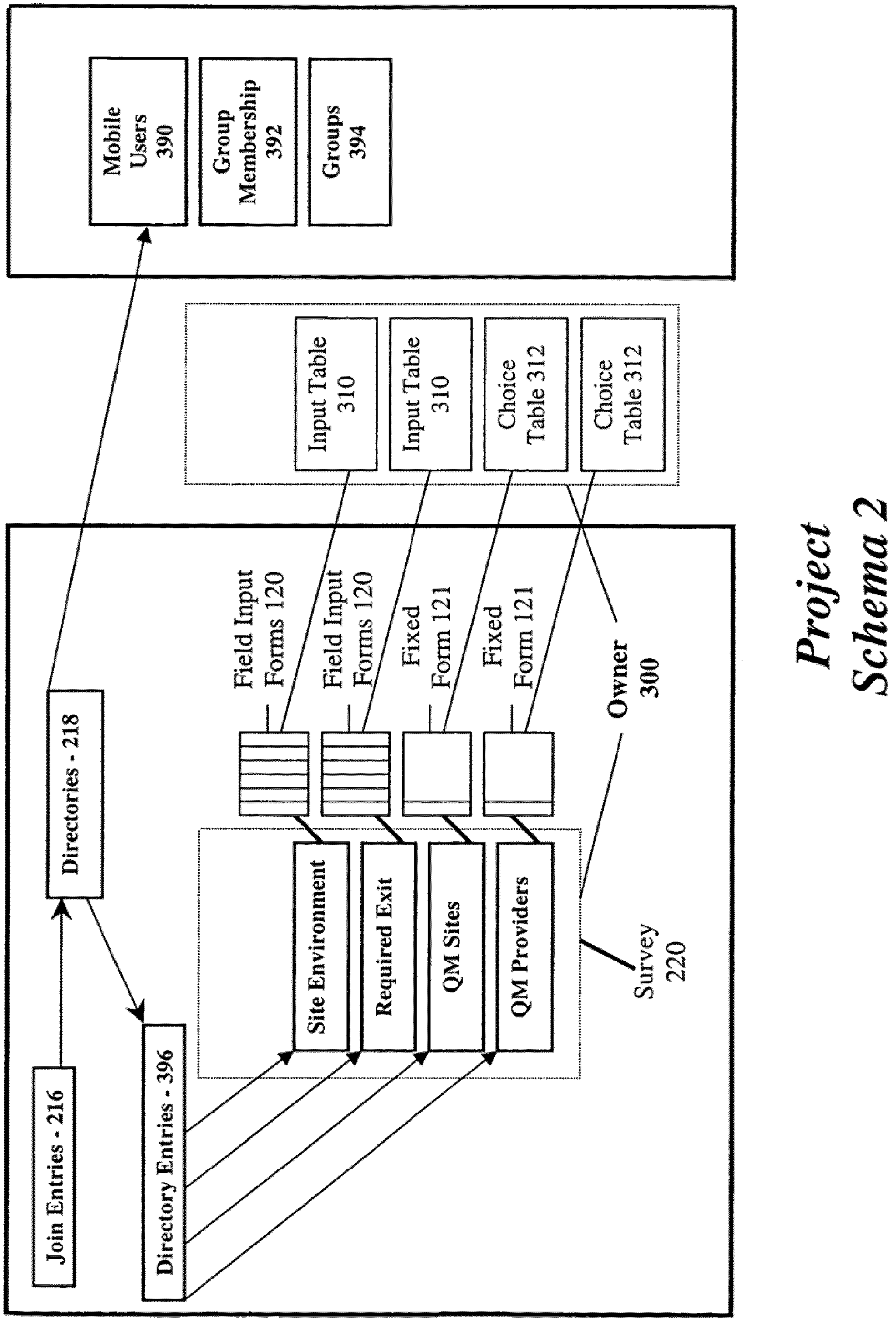

FIG. 34B is a diagram of the project schema 2 100. It appears very similar to project schema 1 100 of FIG. 34A. However, there are important differences which affect the forwarding of the project subset 116 to the field worker 36 and which will affect the appearance of the field input interface. Comparing FIG. 34B to FIG. 34A, the only difference is that project schema 1 100 contains the input table 310 for chartaudit6 survey 220, project schema 2 100 contains the input table 310 for site environment 4 survey 220, and project schema 3 100 contains the input table 310 for required exit interview survey 220 that is part of the project schema 100.

Figure 34C:
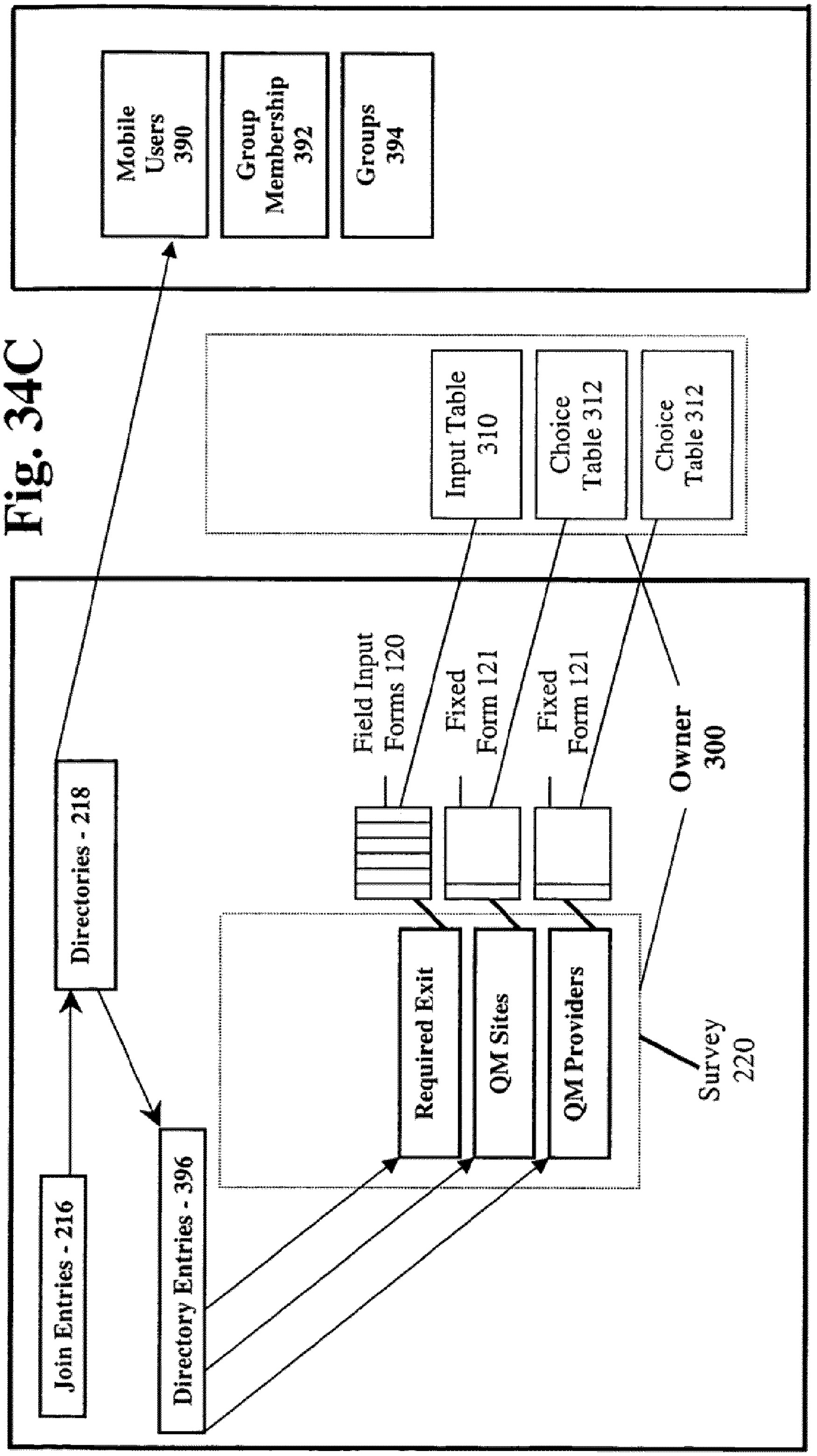
Figure 34D:
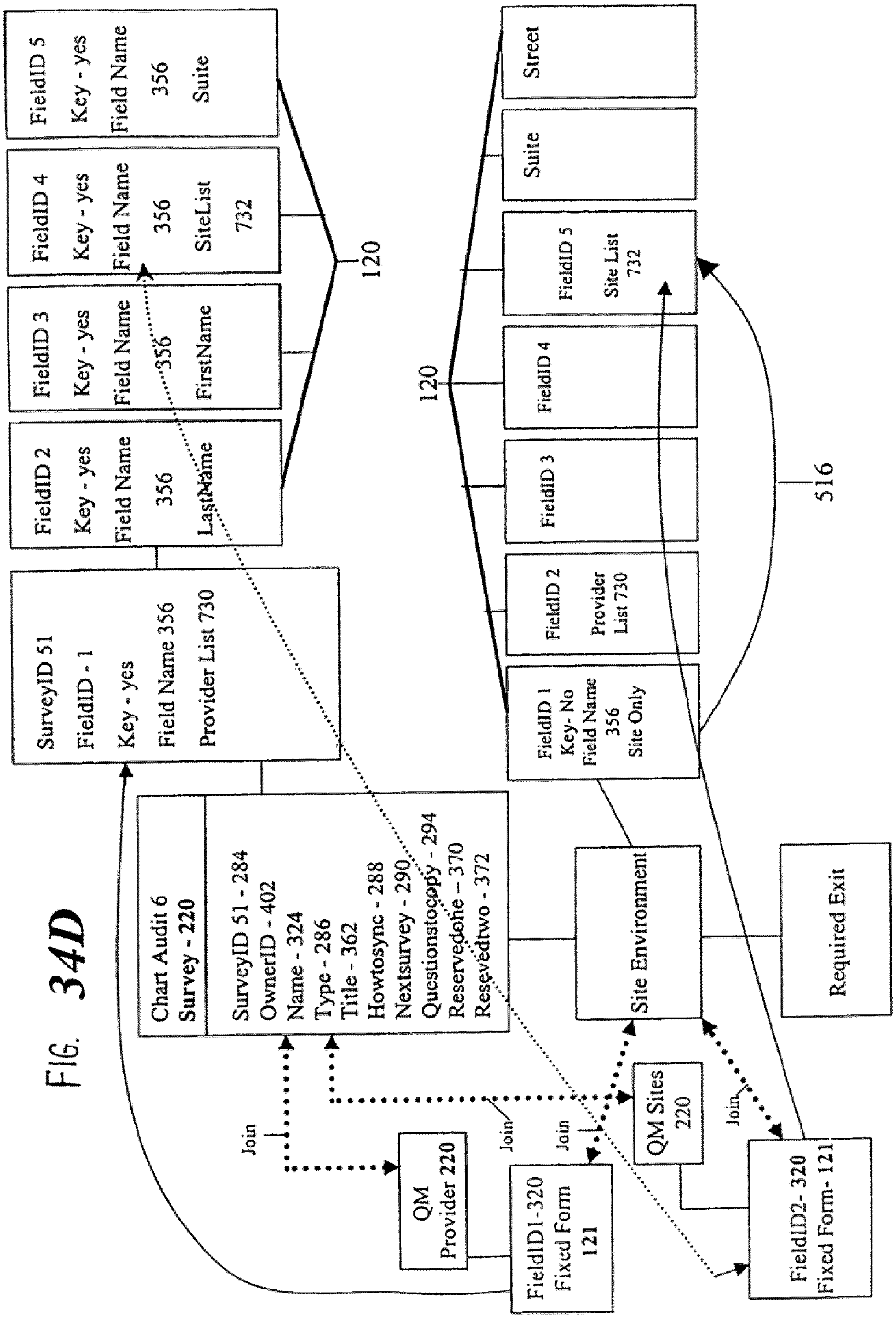
FIG. 34D is a detailed description of the project schema and how they relate to the portable digital data capture and data/report distribution.

Project schema 2 100 consists of a survey 220 site environment 4 followed by a survey 220 required exit interview and the accompanying field input forms 120, fixed forms 121 and the associated input tables 310 and choice table 312. Although it is not always the case, both of these project schema 100 reference the same choice tables 312 as the other project schema 100. A list of choices come from the choice tables 312 which is of fixed form 121. This fixed form 121 is not a field input form 120 that will appear to the field worker 36 in the field input interface 112, and it is not able to be edited by the field worker 36. Instead, as seen in FIG. 34D, the survey 220 QM Sites that consists of one fixed form 121 appears as a provider list 730. In the ACME HMO example, one of the choice tables 312 contain a list of providers from which to choose. The other choice table 312 contains a list of sites from which to choose.

In the present invention, project schemas 100 may or may not have choice tables 312. Choice tables 312 will only be created by the CDCDS 70 if joins 216 are programmed to be part of the project schema 100. A choice table 312 is an organized grouping of selected data chosen by the owner 300 to be presented to the field worker 36 as a list of possible input that can be made for specific field-input forms 120. Choice tables 312 have been designated as fixed 214 tables, which means that a field worker 36 will not have the ability to change this data. These choice table 312 have been marked by the CDCDS user to "sync to palm by user" so that during a connection with the project database 60, the choice table 312 data will be forwarded to the appropriate individual field worker 36. The nature of the three project schema will also affect the look of the field input interface 112. Since there are three project schema 100 on the ACME HMO field input interface, the main screen will have three different choices for the field worker 36. The choice table 312 can be linked to external databases in an enterprise, or populated by the forms of the logistics manager 110 or of the internet portal 186 of the framework 56 seen in FIG. 4. Data integrity is thus maintained between input made by field workers 36 and other data sources. In addition, this also allows the CDCDS user to convert possible text entry into a choice table 312 which are linked to a numeric value, thereby allowing text input to be aggregated when it was unable to be aggregated in the past. Choice tables 312 are useful to maintain and improve data integrity even within the other databases of the owner 300. Choice tables 312 contain lists of information imported from the corporate database. The CDCDS organizes the lists into user-specific choice tables 312 and distributes them according to each particular user. In other words, each field worker 36 will be delivered, as part of his or her project subset 116, choice tables 312 containing, for example, a person's name from the corporate database. The field worker 36 will have an opportunity to select it from the choice list 312, thereby reducing data entry error and preventing data entry from causing additional errors within the corporate database. Choice tables 312 delivered directly to specific field workers 36 create additional value by eliminating the need to stay connected to the corporate database in order to run time-consuming queries to search for names or other items in the corporate database. The choice table 312 will deliver to the field worker 36 precisely what they need to reference in order to complete their work for the day.

FIG. 34D is a detailed description of the project schemas 100 and how they work in the portable digital data capture and data/report distribution project 58. The three project schemas 100 include joins 216. Since joins 216 are designated for ACME HMO project schemas 100, the accompanying join entries 308 and choice tables 312 are part of the three project schema 100 as seen in FIGS. 34A-34C. Project schemas 100 can be very similar to each other or very different. For example, they can have a different set of field worker 36, different relationships between survey forms 220, etc. Project schema 100 1, 2, and 3 appear very similar to each other in FIGS. 34A-34D because for this project, all field workers 36 are trained to make input into any of the survey forms 220. It might be cost effective in other projects to have workers that only are related to the project schema 2 and 3 100. The field input form 120 that is part of this project schema 100 does not require the knowledge level of a nurse like the project schema that contains the survey 100 chart audit 6. As seen in FIG. 8C and discussed above, the survey 220 chart audit 6 is required to be repeated several times in the review of the same provider at the same site. For this reason the first set of field input forms 120 of this survey 220 are referred to as the GMR 638. This GMR 638 includes field-input forms 120 for the demographic information, such as the provider's name and address of the provider audit.

As shown in FIG. 34D, the survey 220 chart audit 6 has a join 216 to the survey 220 QM Providers on the field input form 120 generated by the survey 220 chart audit 6 that is designated as FieldID 1 320. Thus, the Provider List 730 is available to the field worker 36 as a list choice. Likewise, survey 220 chart audit 6 has a join 216 to the survey 220 QM Providers, on the field input form 120 generated by the survey 220 chart audit 6 that is designated as FieldID 1 320. Thus, the Provider List 730 is available to the field worker 36 as a list choice. The survey 220 site environment 4, which is part of project schema 1100, is configured in the same manner. This survey 220 generates the field input forms 120 listed (among others). Since the survey 220 site environment has a join 216 to the survey 220 QM Providers on the field input form 120 generated by the survey 220 site environment 4 that is designated as FieldID 2 320, the Provider List 730 is available to the field worker 36 as a list choice. Likewise, the survey 220 site environment has a join 216 to the survey 220 QM Sites on the field input form 120 generated by the survey 220 site environment 4 that is designated as FieldID 5 320. Thus, the Site List 730 is available to the field worker 36 as a list choice. Several additional things can be seen in this diagram. If the field worker 36 chooses one of the items on the provider list 730 for fieldID 1 320 in the survey 220 chart audit 6, then fieldID 2 and 3 320 are not revealed to the field worker 36. This is also the case if an item was selected on the site list 732. If so, then the field input forms 120 for suite, street, zip are not revealed.

Another important feature of the present invention that can be seen is that the CDCDS user is allowed to mark a field input form as key 322 and to recognize the field input forms 120 marked key 322 or as not being marked. Field input forms 120 may or may not be marked as key 322. This characteristic key 322 is important for copying and skipping field input forms 120 and aggregating the data from them. FIG. 35 and FIG. 36 each show the first page of the linear report on the field input forms. FIG. 35 is the report for the survey 220 chart audit 6 and shows that fieldID 320 1-11 is marked key 322. FIG. 36 is a report for the survey 220 site environment 4 and shows that fieldID 320 2-10 are marked key 322. This illustrates the logic in the project schema 100 for copying key 322 fieldID 320 between individual records 518 of the same survey 220 and copying key 322 fieldID 320 between individual records 518 between survey 220. When the field worker 36 is asked if the survey 220 is to be repeated, if the answer is yes, then the fieldID 320 in the survey 220 chart audit 6 that have already been marked as key 322 are inserted into the respective field input forms 120 in the next chart audit 6. This allows the field worker 36 to continue the audit without redundant data entry. This same feature also controls the integrity of the database by making sure that this information is consistent throughout the review.

In addition, when the program is copying the input in fieldID 320 marked key 322 among two different surveys 220, the program disregards the numerical identification of the fieldID 320 and simply copies the first 9 key 322 as requested by the CDCDS user in the original design and development of the project. Referring again to FIGS. 35 and 36, each field input form 120 has a fieldID 320, a field_name 356, a prompt 336, and help 332 among other characteristics. As discussed above, ACME HMO's project subset 116 contains schema that may use the same information from one field-input form 120. To use this information at a later point in the survey 220, this field-input form 120 is marked as key 322. This marking allows the programming language 124 to search for the key 322 label and pick these field input forms 120 for input into another data table 310. Since these field input forms 120 are marked, there is no need to refer to fieldID 320 or field_name 356. In this example, the programming language 124 is looking to copy the first six key 322 fields. This allows field input forms 120 not marked as key 322 to be inserted anywhere in the survey 220.

Consider an example wherein ACME HMO wants the first nine field input forms 120 which are marked key 322 of chart audit 6 to be copied into site environment 4. The field input forms 120 were marked with the characteristic of key 322 in the project creator/report generator 108. In FIGS. 35 and 36, this key 322 marking is indicated with the letter K next to the fieldID 320. The programming language then sets the selected input into the data tables 310 without the field worker 36 ever seeing a prompt 334 for these field input forms 120. The first prompt 334 shown to the field worker 36 is the one for a field input form having the fieldID 320 11. Even though there are eleven fields marked with the key 322 distinction, only the first nine are used by design. If ACME HMO wanted to add questions to the first thirteen fields of chart audit six, but still have the same fields transfer to the site environment 4, then the new field input forms 120 would not be marked with the distinction key 322. This allows the new field input forms 120 to be placed anywhere in the survey 220 without disrupting the questions to copy 294 function.

Figure 37A:
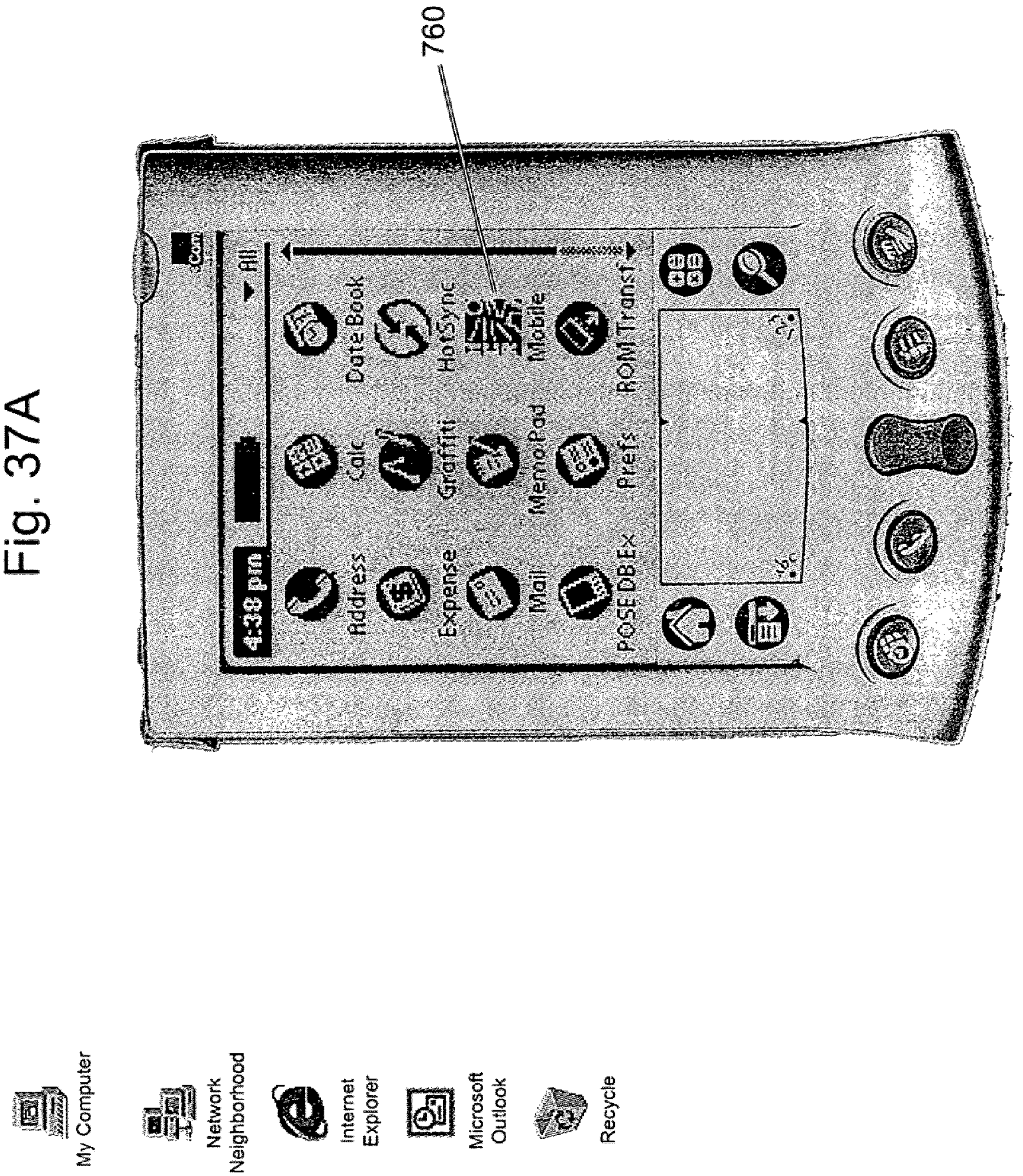

FIGS. 37A-37G are screen shots of the filed input interface 112 as it appears on the hardware 34 of the field worker 36. This particular hardware 34 has received the project subset 116 for a field worker 36 who is related to all three project schema 100. Field workers 36 will be performing tasks that relate to a data capture and data distribution project. The preferred embodiment of the present invention can accommodate field workers 36 being associated with several different owners 300 at the same time based on their group membership 392 and can also relate field workers 36 to several different project for the same owner 300. For the same owner 300, a field worker 36 can be forwarded different project subset 116 because of the group 394 with which they are associated. For the ACME HMO example, if a field worker 36 is a not a nurse, then this field worker 36 can only perform a site audit and not a review of the medical records. In this case, only the project schema 100 that relates to the survey 220 site audit 4 alone would be forwarded to this field worker's hardware 34. There is no need for this field worker 36 to be searching through forms that do not pertain to the specific assignments for which he or she is responsible. FIG. 37A shows how the field worker 36 can quickly choose the Mobile icon 760 from the main hardware 34 screen. The field worker 36 would tap the mobile icon to begin the audit.

Figure 37B:
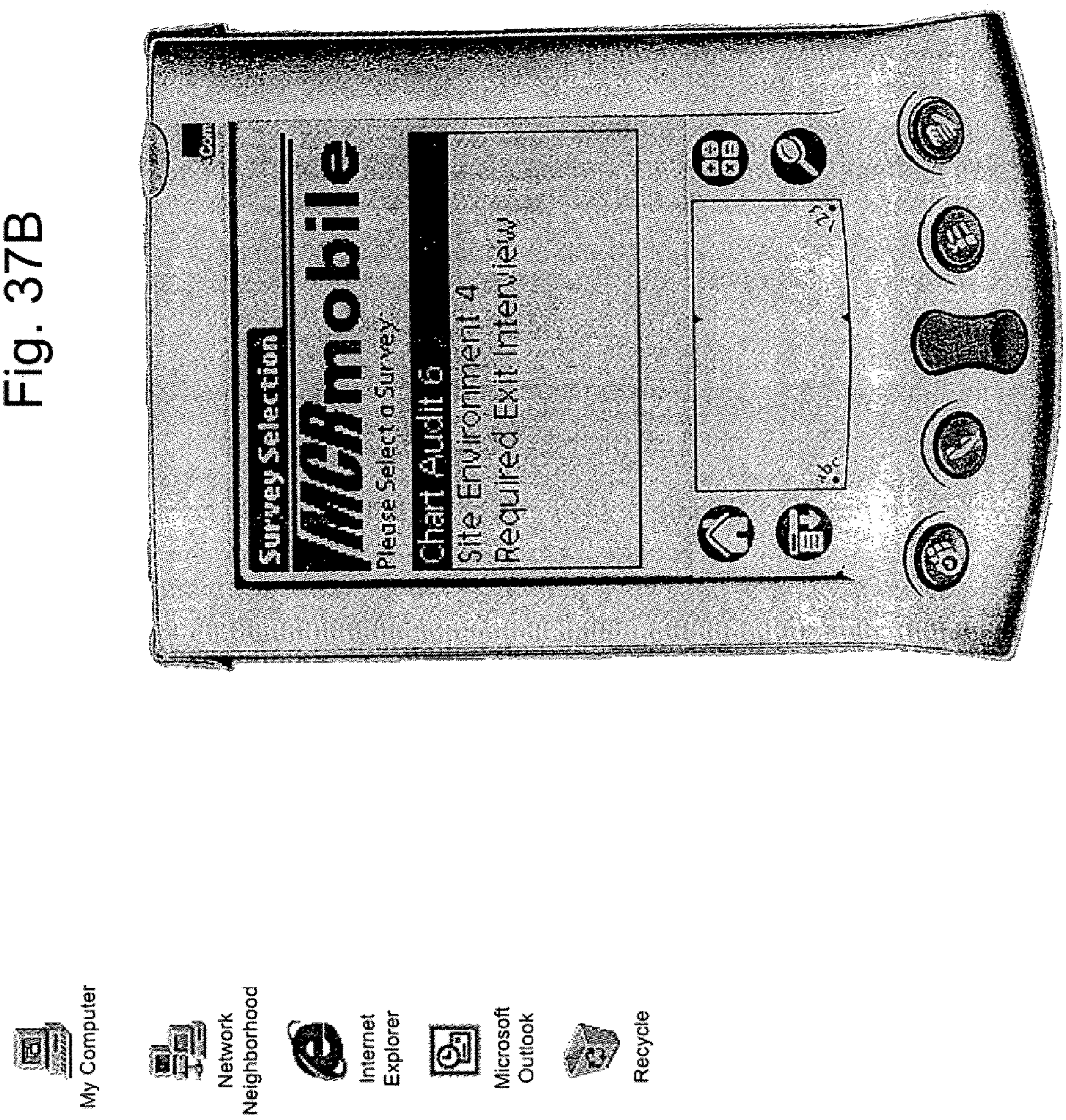

FIG. 37B shows the index of project schema 100 that appears on the hardware 34. Chart Audit 6, represents the project schema 1 100 of the project (refer to FIG. 34A). Site Environment 4 represents the project schema 2 100 of the project (refer to FIG. 34B). Required Exit Interview represents the project schema 3 100 of the project (refer to FIG. 34C). To the field worker 36, this screen appears to match the flow of his or her work and reflects the visit type 518 in FIG. 17C. To begin the chart audit 6, the field worker 36 would tap this selection on the menu. The survey 220 begins immediately. In the next screen, (not shown), the field worker would choose to generate a record 518 (see FIG. 8C) as an instance of this survey 220 to input into the field input forms 120. The field worker 36 would also be able to perform additional record functions 114C (see FIG. 8A) such as delete, score, edit.

Figure 37C:
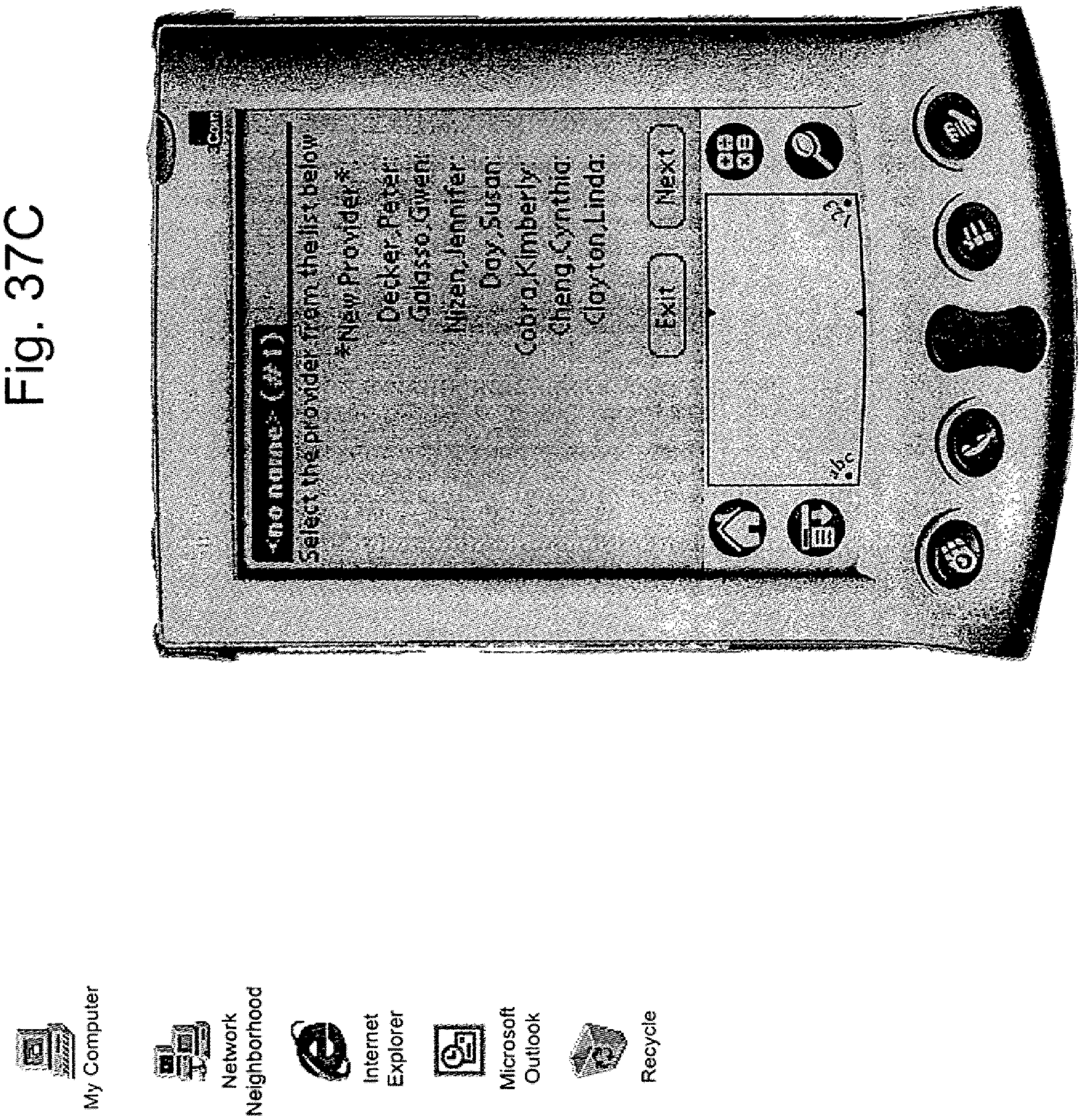

FIG. 37C is an example of one of an instance of the survey 220 of fixed form 214 that appears as a field input form 120. The entire directory 218 is forwarded during the transport mechanism 104 to the hardware 34 of the second platform even though it may not all be shown to the field worker 36. The directory 218 referred to here is the complete list of input tables 310 and choice tables 312 that are necessary for the audits to take place. FIG. 37C is a screen shot of how a choice list appears to the field worker 36. The *New Provider* choice, will take the field worker 36 to the next field input form 120 where data can be entered on the last name of the provider at this audit. ACME HMO wanted this feature as a back-up in cases where ACME HMO's information was wrong. This feature might be used in cases where a provider was married and the last name has to be changed but the change did not make it through ACME HMO's office yet. If the field worker 36 had selected a choice on the list, then the field input interface 112 would have gone to the field input form 120 to choose a site from the list. The choices that appear in the field input interface 112 for this field worker 36 are designated to be different from any other field worker 36 because of the assignment that has been designated by the CDCDS user accessing the logistics manager 110.

Figure 37D:
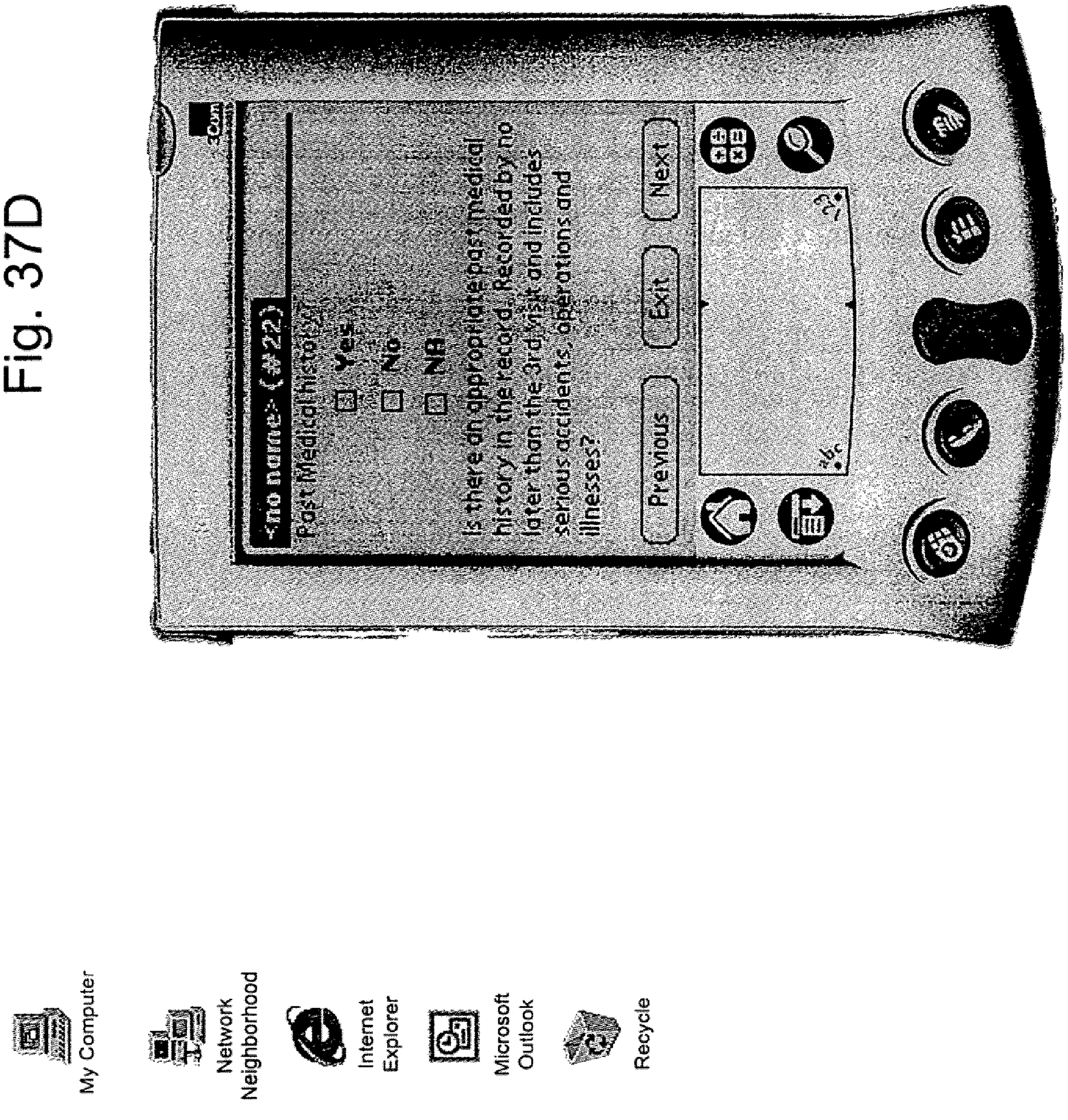

FIG. 37D shows a field input form 120 with the characteristics of a form DB 208. This is a form that is designed to take new input, whereas the form fixed 214 is designed to transfer information already in the database. FIG. 37D is an example of a GUI type 336. This is a yes/no/na type and provides to the field worker 36 the check boxes yes, no and NA. FIG. 34D also shows the help text of the questions. The help text and the questions are displayed on the same screen. The CDCDS user has designated help text at the design stage, but changes can be forwarded to the field worker 36 if needed. The programs will automatically advance the field input forms 120 as the field worker 36 makes input by tapping the check box. The flow and the look and the feel of this field input interface was designed specifically for the needs of this particular project. It is likely that the field worker 36 will skip some field input forms 120 because of the programmed logic. The information, however, still resides in the hardware 34. Once the choice from this screen has been tapped, the program automatically advances to the next question as illustrated in all these screen shots. There is no enter key in the screen shot or advance key.

The field worker 36 has all the information needed to complete this particular field input form 120. Another feature illustrated in FIG. 37D is the previous question option. Although there is automatic advancement as soon as input is entered into the device, this button allows the field worker 36 the control to correct mistakes and change data. The next button allows the field worker 36 to go to the next field input form 120. This is important in conjunction with the previous button because the next button allows the user to change answers that are more than one field input form 120 behind without changing all of the previously entered data. The third button illustrated in FIG. 34D is labeled exit. This function is designed to take the field worker 36 out of the current survey 220. Before survey 220 can be exited, a number of questions in dialog boxes on the screen automatically appear as seen in FIG. 37E.

Figure 37G:
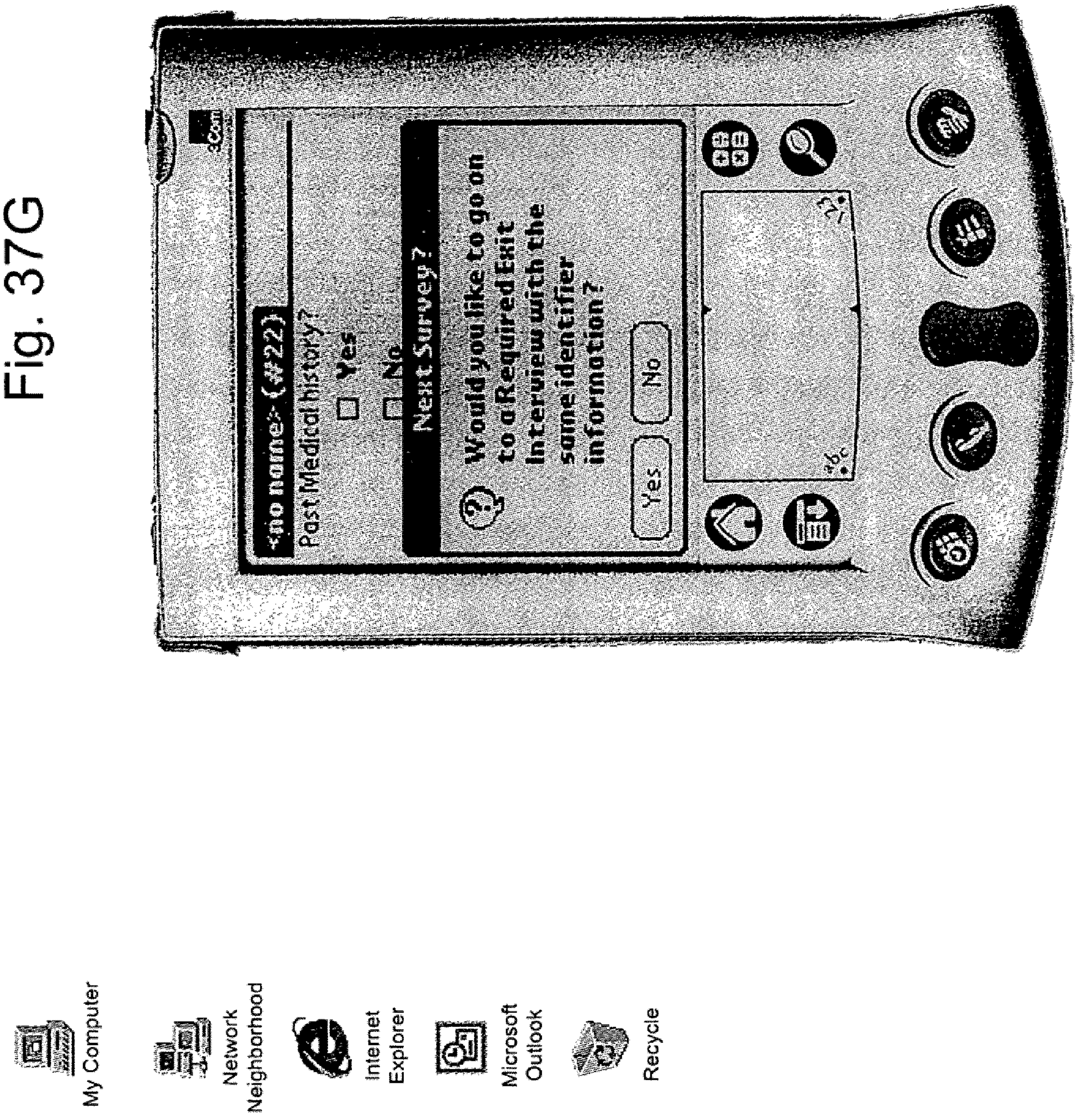

These questions in the dialog boxes relate to the logic of the project schema 100 flow as seen in FIG. 30D. This schema 100 was designed for ACME HMO in such a way that particular messages regarding the chart audit 6, site audit 4, and required exit interview appear. The first question prompted is about repeating the chart audit 6. As seen in FIG. 30D, this relates to the repeat option 606. If this answer is yes, then the next field-input form 120 to be prompted is the screen seen in FIG. 37E. This field-input form 120 allows the field worker 36 to continue this chart audit on the same provider without needing to repeat all the demographic input made in the prior chart audit 6 for this same provider. If the answer to this question is yes, then this survey 220 is logically programmed to copy the answers to these field input forms 120 so the field worker 36 is not even prompted for the input since the information already resides in the hardware 34. This idea of not repeating input makes the file smaller. The file thus taking up less room on the hardware 34 and makes file transmission faster thereby reducing chances of error and omission, especially in wireless communications. Other advantages of not repeating the input are reduction in possibility of errors on the part of the field worker 36 and a reduction in the time to complete the chart audit 6. If the field worker 36 taps the no response, then the screen on FIG. 37F appears. This prompts the field worker 36 to move to the other survey 220 in the project schema 100, if desired. Again the user has the option to reuse the data already entered if applicable even though a different survey 220 is presented. If the field worker taps no, the prompt given is illustrated in FIG. 37G. This prompt asks if the field worker 36 would like to continue the audit with the same identifier information for the survey 220 required exit interview. If the field worker 36 is completely finished with the audit and has answered no to all the exit questions, the project subset 116 is ready to be queried by the database.

Again, the hardware 34 initiates the transport protocol. The input returns to the database and the programming language builds and fills the appropriate input tables 310. The information now resides in the first platform 94. Only the input data is returned to the database because the survey 220 remains in the first platform hardware 542. This particular method also makes the files as small as possible for efficiency and integrity. As soon as the first platform 94 receives the information from the second platform hardware 34, the reports are already available as a programmed report that is put together and displayed for the owner 300.

Built-in message automation of the project creator/report generator 108 gives the present invention the ability to guide and restrict the CDCDS users to build the project in accordance with the object 114 limitations or restrictions and in accordance with the requirements of a project, e.g., a text object needs a length parameter.

The CDCDS user has already prepared the reports for the ACME HMO, already formatted designated parameters and marked the pertinent data to be aggregated. The reports are generated once the data is received from the hardware 34. The owner 300 must now return to the project creator/report generator 108 and query the project subset 116 that pertains to this owner 300 in order to gain access to the reports from the project database 60. FIG. 31D shows the generate report button 714 that allows the CDCDS user to generate a report for this owner 300 as soon as the field worker 36 has connected with the project database 60. If the owner 300 decides that it is necessary to change the report in any way, then the project creator/report generator 108 is accessed and the changes are made. If no more data is needed, then these changes can be seen as soon as they are made. The report querying process is outlined in FIG. 16. As wireless technologies and services expand, the CDCDS can be designated to forward a report without prompting on the part of the CDCDS user. The information in a report format can thus be made immediately available to alert a physician regarding a value of collected information (e.g., laboratory data is at a dangerous level).

An example of a report for the ACME HMO project can be seen in FIGS. 38A-38K. The different pages show the different aggregation of the data. FIG. 38A is the aggregation of the survey 220 marked general medical record review. When viewing these forms in reference to the project schema 100 flow chart (FIG. 31E), it is easy to see how the reports can be formed in the beginning of the project by marking each field input form 120 as belonging to a particular group 380. Each area of the report corresponds to aggregated data in its own section of the report. The adult health screening report that relates to the adult health-screening audit 158 of FIG. 21 is shown in FIG. 38D. At the time of entering the project schema 100, the user is also able to (and is recommended to) enter how the reports are to be formatted and aggregated. This process is partially illustrated in FIG. 32C when the field input forms 120 were marked for aggregation. Marking the data in this way makes it easier to form several reports, if necessary.

Figure 38L:
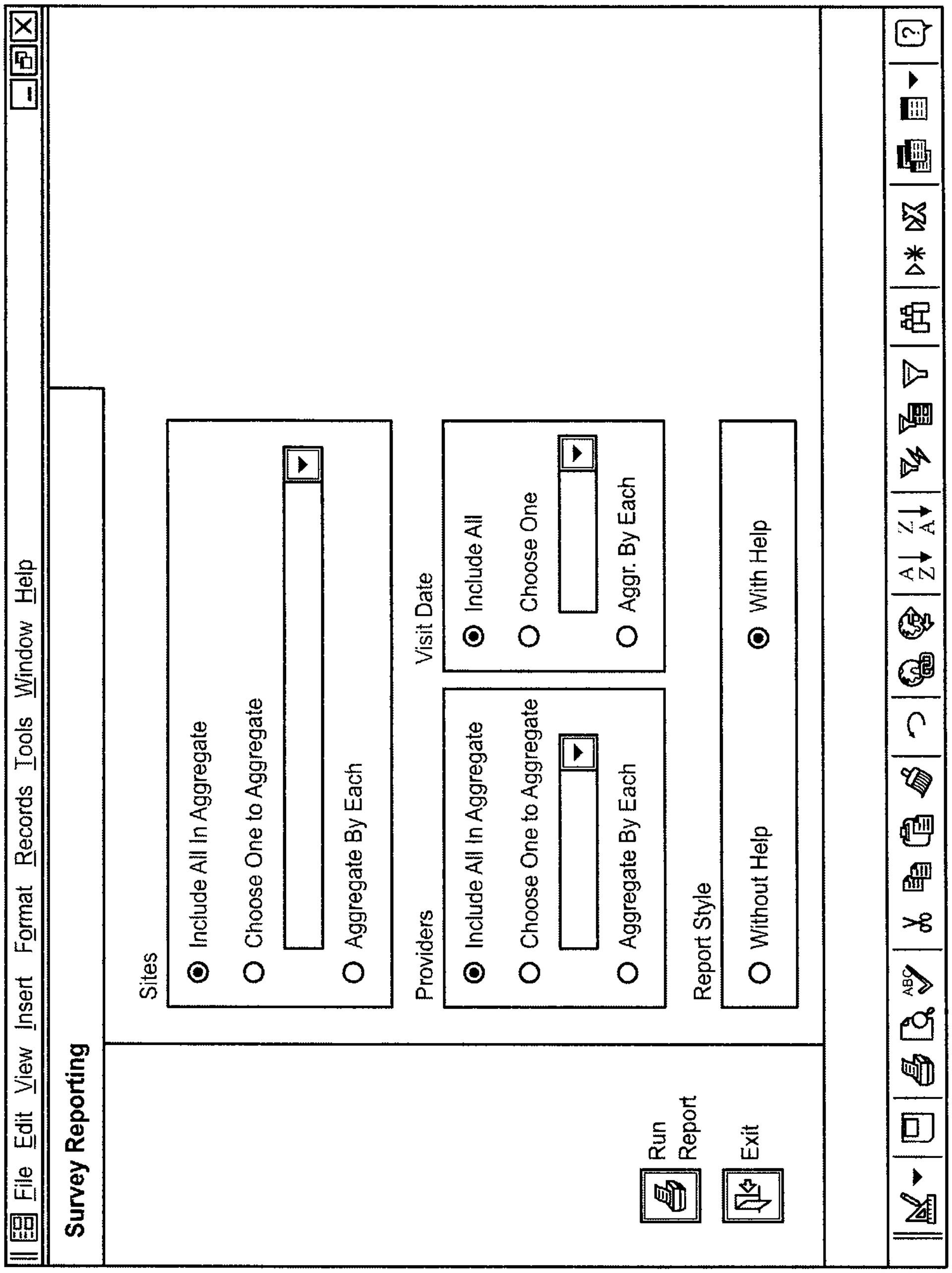

As discussed above, the project creator/report generator 108 allows the user to mark the appropriate data to be reported on. The programming language then creates the input tables 310 to be filled with the information from the field-input forms 120. This is an important function of the CDCDS that allows for the creation of real time reports to be available. There is a tremendous amount of information available for an organization with these reports. As can be seen in these figures, the report is formatted to produce an aggregate result for all the data regarding this project database 60. Numerous other slices of the data are immediately available as reports. This example for ACME HMO was a somewhat complicated request for reports. FIG. 38A shows the report for the section general medical record review under the question group 680. In FIG. 38F, the question group 680 is for the PMS/FHS General Medical Record Review. In this particular project for the ACME HMO, the data needed to be separated into two different report sets, one for the protocol 516 used in the programming of a portion of the general medical record review question group 680, and one for a different protocol used in the programming of a portion of the general medical record review question group. Both the protocols 516 were managed effectively and efficiently and the report production was successful as well. FIG. 38L is a screen shot of the project creator/report generator 108 report selection choices. Several standard formats are available for the report as can be seen in the FIGS. 38L-38O. Additional types of reports can be easily added to the project database 60 and made available for the CDCDS user to set for forwarding to an owner 300 as part of a project subset 116 through a secure web site.

Figure 13:
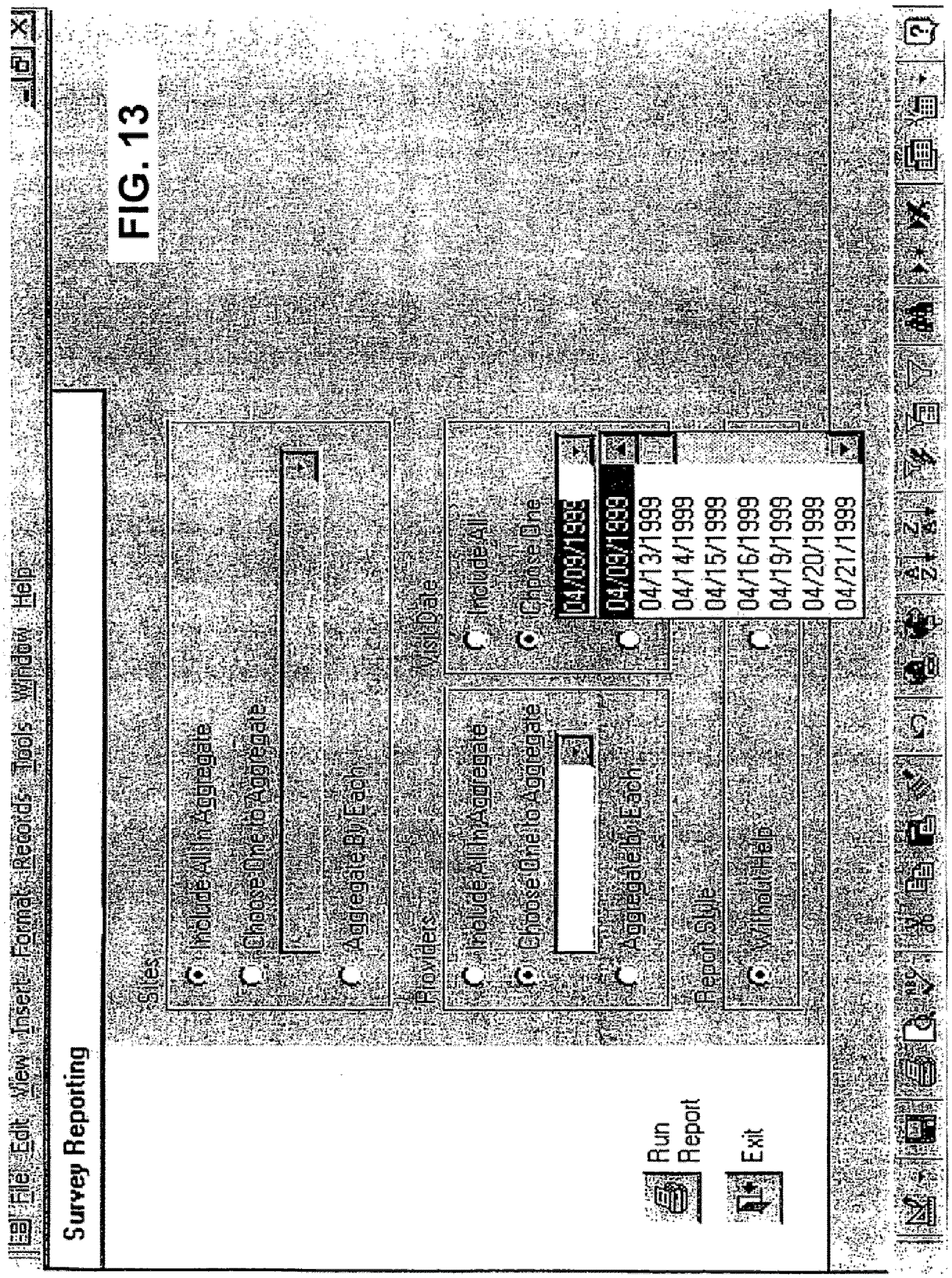
FIG. 13 is a screen shot from the project creator/report generator.
Figure 38N:
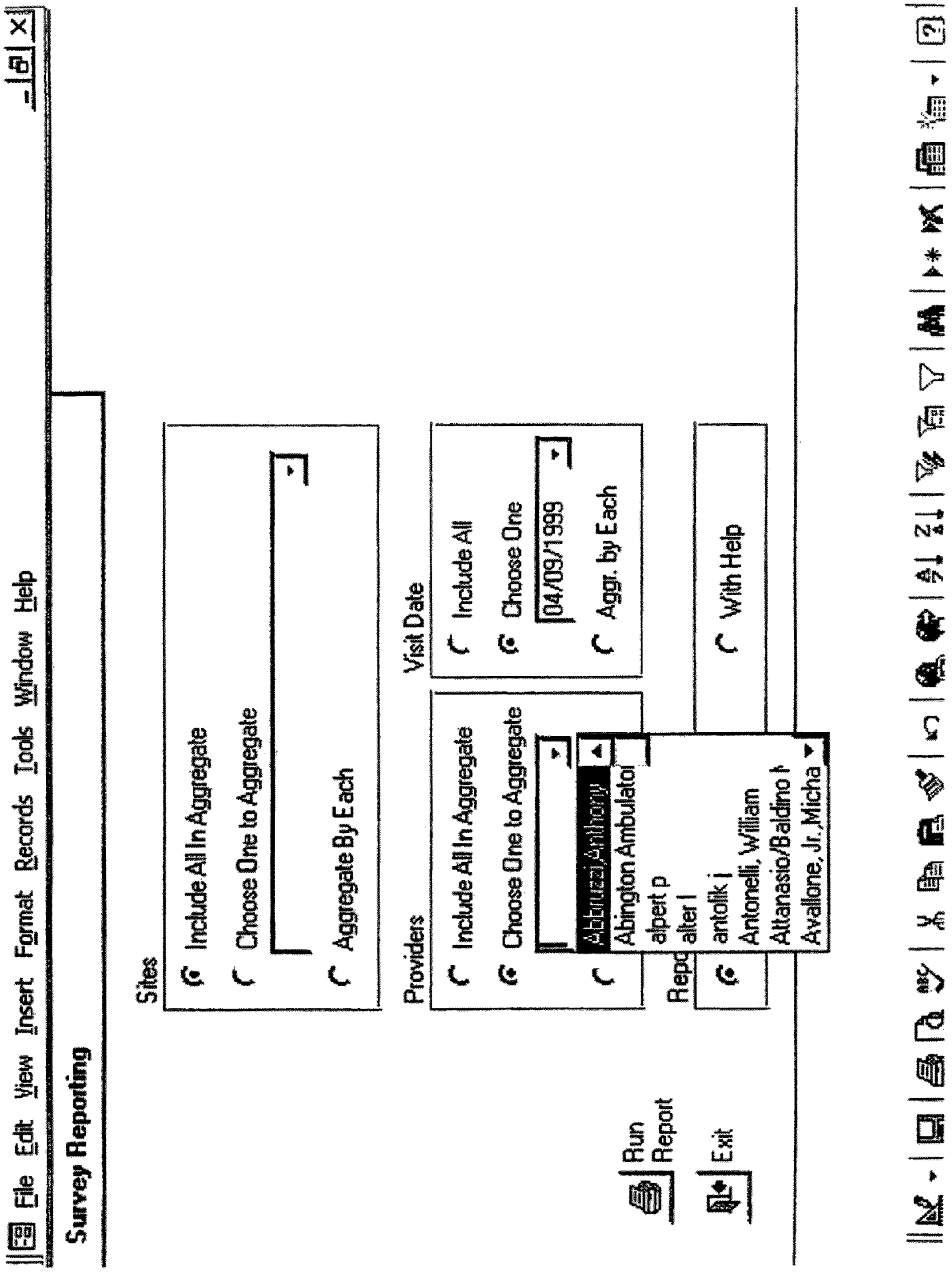

FIG. 38L is a screen shot depicting the report generator 108 of the project creator/report generator 108 of the present invention. Performing "run report" will produce the reports seen in FIG. 38A-M. It is a report that includes an aggregate of the data for a particular project subset 116 for the owner 300. FIG. 38M is a screen shot showing how a CDCDS user can simply select a report for the particular address shown and receive an aggregate report for all the data captured by field workers 36 at this site. FIG. 38N is another type of report that can aggregate the data by physician in the project database. FIG. 13 (which follows FIG. 38N) is an aggregate by date. There are additional aggregate and individual reports that are made available to the CDCDS user. The key feature is that the reports do not need to be developed separately from the development of the data capture in a project. By designating the report parameters at the time of the design of the project, the report is immediately available in the project database 60. In addition, as changes are made to the project database 60 (e.g., changes to questions or scoring parameters, or any factor), the reports will change to reflect the changes or the reports will remain the same if designated to do so by the CDCDS user.

Another important feature in the present invention is that based on the data structures and the relationships between and among data types, the CDCDS user can also make reports available on data aggregating the information between projects. The healthcare industry, as well as other industries, are at a great disadvantage when comparisons cannot be made because disparate systems are used. The present invention can be used as the infrastructure or operating system for mobile workers or devices in an organization for dynamically capturing data with the dynamic report component being produced at the same time. The logistics aspect of report distribution has not been discussed in great detail. However, the very same elements used in the present invention can be applied to the logistics of report distribution as well.

The present invention may be implemented with any combination of hardware and software. If implemented as a computer-implemented apparatus, the present invention is implemented using means for performing all of the steps and functions described above. The present invention can also be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer-implemented method for visualizing data relationships between components of a project for identifying potential duplication of selected components, one of the components being data collection assignments, the assignments being work task related assignments to be performed by workers, the method comprising:

(a) defining the project by a project database that includes a set of data tables, wherein the project includes management of the workers and differing levels of user access to the project;

(b) defining a set of data collection assignments and incorporating the data collection assignments in the set of data tables;

(c) organizing relationships between the set of data tables in a manner that allows for visually revealing all relationships in each data collection assignment;

(d) querying the project database with an assignment-related query; and (e) electronically displaying all of the relationships identified by the set of data tables for the query, thereby visually showing all of the relationships identified by the set of data tables for an assignment, including any duplication of the work task related assignments to be performed by the workers, wherein the project is a clinical trial that has been initiated, and the work task related assignments are the data collection assignments for collecting medical-related data for the initiated clinical trial.

2. A computer program product for visualizing data relationships between components of a project for identifying potential duplication of selected components, one of the components being data collection assignments, the assignments being work task related assignments to be performed by workers, the computer program product comprising non-transitory computer-readable storage media encoded with instructions for execution by a processor to perform a method comprising:

(a) defining the project by a project database that includes a set of data tables, wherein the project includes management of the workers and differing levels of user access to the project;

(b) defining a set of data collection assignments and incorporating the data collection assignments in the set of data tables;

(c) organizing relationships between the set of data tables in a manner that allows for visually revealing all relationships in each data collection assignment;

(d) querying the project database with an assignment-related query; and (e) electronically displaying all of the relationships identified by the set of data tables for the query, thereby visually showing all of the relationships identified by the set of data tables for an assignment, including any duplication of the work task related assignments to be performed by the workers, wherein the project is a clinical trial that has been initiated, and the work task related assignments are the data collection assignments for collecting medical-related data for the initiated clinical trial.

* * * * *